(12) United States Patent
Lin et al.

(10) Patent No.: US 12,508,320 B2
(45) Date of Patent: Dec. 30, 2025

(54) DRUG CONJUGATE, PHARMACEUTICAL COMPOSITION AND METHOD OF TREATING HEPATITIS

(71) Applicant: SeeCure Taiwan Co., Ltd., Kaohsiung (TW)

(72) Inventors: Wuu-Jyh Lin, Kaohsiung (TW);
Min-Ching Chung, Kaohsiung (TW);
Chi-Shiang Ke, Kaohsiung (TW);
Ya-Chen Tseng, Kaohsiung (TW);
Chin-Yu Liang, Kaohsiung (TW);
Yen-Chun Lee, Kaohsiung (TW);
Hsin-Jou Li, Kaohsiung (TW);
Tai-Yun Huang, Kaohsiung (TW);
Nai-Chen Hsueh, Kaohsiung (TW);
Yan-Feng Jiang, Kaohsiung (TW)

(73) Assignee: SeeCure Taiwan Co., Ltd., Kaohsiung (TW)

( * ) Notice: Subject to any disclaimer, the term of this patent is extended or adjusted under 35 U.S.C. 154(b) by 0 days.

(21) Appl. No.: 18/679,403

(22) Filed: May 30, 2024

(65) Prior Publication Data

US 2025/0032621 A1    Jan. 30, 2025

Related U.S. Application Data

(60) Provisional application No. 63/524,210, filed on Jun. 29, 2023.

(51) Int. Cl.
*A61K 47/54* (2017.01)
*A61P 31/20* (2006.01)

(52) U.S. Cl.
CPC ............ *A61K 47/549* (2017.08); *A61P 31/20* (2018.01)

(58) Field of Classification Search
CPC .............................. A61K 47/549; A61P 31/20
USPC ........................................................... 514/53
See application file for complete search history.

(56) References Cited

U.S. PATENT DOCUMENTS

| | | | |
|---|---|---|---|
| 8,450,467 B2 | 5/2013 | Manoharan et al. | |
| 8,828,956 B2 | 9/2014 | Manoharan et al. | |
| 10,806,791 B2 | 10/2020 | Manoharan et al. | |
| 11,268,099 B2 | 3/2022 | Krauss | |
| 2019/0100523 A1* | 4/2019 | Chu | C07C 41/26 |

FOREIGN PATENT DOCUMENTS

| | | | |
|---|---|---|---|
| AU | 2014301958 | | 11/2017 |
| CN | 101128425 | | 2/2008 |
| CN | 102006890 | | 4/2011 |
| CN | 107987083 | | 5/2018 |
| CN | 111481669 | | 8/2020 |
| CN | 109467566 | | 12/2020 |
| CN | 109485662 | | 12/2021 |
| EP | 4071163 | | 10/2022 |
| JP | H10506413 | | 6/1998 |
| JP | WO2021/153687 | * | 8/2021 |
| JP | 4 071 163 A1 | * | 10/2022 |
| RU | 2696096 | | 7/2019 |
| TW | 1732156 | | 7/2021 |
| WO | 2005041859 | | 5/2005 |
| WO | 2016030863 | | 3/2016 |
| WO | 2021153687 | | 8/2021 |

OTHER PUBLICATIONS

Warminski et al. Synthesis of RNA 5'-Azides from 2'-O-Pivaloyloxymethyl-Protected RNAs and Their Reactivity in Azide-Alkyne Cycloaddition Reactions. Org. Lett. 2017, 19, 3624-3627. (Year: 2017).*
Lee et al. Preparation of Cluster Glycosides of N-Acetylgalactosamine That Have Subnanomolar Binding Constants Towards the Mammalian Hepatic Gal/GalNAc-specific Receptor. Glycoconjugate J (1987) 4:317-328. (Year: 1987).*
Wozniak et al. Overcoming Hypoxia-Induced Chemoresistance in Cancer Using a Novel Glycoconjugate of Methotrexate. Pharmaceuticals 2021, 14, 13. https://dx.doi.org/10.3390/ph14010013 (Year: 2021).*
Bedoui et al. Methotrexate an Old Drug with New Tricks. Int. J. Mol. Sci. 2019, 20, 5023; doi: 10.3390/ijms20205023 (Year: 2019).*
Timothy M. Block et al., "Chronic hepatitis B: A wave of new therapies on the horizon", Antiviral Research, Jun. 22, 2015, pp. 1-13.
Sonia Alonso et al., "Upcoming pharmacological developments in chronic hepatitis B: can we glimpse a cure on the horizon?", BMC Gastroenterology, Dec. 21, 2017, pp. 1-12.
Yilin Ma, "Research on the varieties, characteristics of new anti-HBV drugs and related clinical trials", with English abstract thereof, Chin J Clin Infect Dis, Jun. 2017, pp. 161-169.
Yanhua Tang et al., "Advances in new antivirals for chronic hepatitis B", Chinese Medical Journal, Feb. 2, 2022, pp. 571-583.
James B Jaquith, "Targeting the Inhibitor of Apoptosis Protein BIR3 Binding Domains", Pharm. Pat. Anal., May 2014, pp. 297-312.
Mohammad Saleem et al., "Inhibitors of Apoptotic Proteins: New Targets for Anticancer Therapy", Chem Biol Drug Des, Sep. 2013, pp. 243-251.
Nicole Müller-Sienerth et al., "SMAC Mimetic BV6 Induces Cell Death in Monocytes and Maturation of Monocyte-Derived Dendritic Cells", PLoS One, Jun. 2011, pp. 1-14.

(Continued)

*Primary Examiner* — Yih-Horng Shiao
(74) *Attorney, Agent, or Firm* — JCIPRNET

(57) ABSTRACT

A drug conjugate includes a structure shown by the following formula: Z-(linker-[R]$_m$)$_n$. In the formula, Z is a drug compound, R is a sugar, and m and n are independently an integer from 1 to 6. The drug compound Z is a hepatitis virus targeting drug, a hepatitis B virus (HBV) drug, an inhibitor of apoptosis protein (IAP) antagonist, a multidrug resistance (MDR) inhibitor, or analogues, precursors, prodrugs, derivatives thereof.

19 Claims, 37 Drawing Sheets

(56) References Cited

OTHER PUBLICATIONS

Xuanyong Lu et al., "High level expression of apoptosis inhibitor in hepatoma cell line expressing Hepatitis B virus", International Journal of Medical Sciences, Jan. 5, 2005, pp. 30-35.

Gregor Ebert et al., "Cellular inhibitor of apoptosis proteins prevent clearance of hepatitis B virus", PNAS, May 5, 2015, pp. 5797-5802.

Gregor Ebert et al., "Eliminating hepatitis B by antagonizing cellular inhibitors of apoptosis", PNAS, May 5, 2015, pp. 5803-5808.

Julie Lucifora et al., "HEPATITIS: After HCV cure, HBV cure?", Nat Rev Gastroenterol Hepatol., Jul. 2015, pp. 1-2.

G Ebert et al., "Hepatitis B virus and inhibitor of apoptosis proteins—a vulnerable liaison", Cell Death Discovery, Feb. 22, 2016, pp. 1-2.

Najoua Lalaoui et al., "Recent advances in understanding inhibitor of apoptosis proteins [version 1; peer review: 2 approved]", F1000Research, Dec. 3, 2018, pp. 1-15.

Xiaoyong Zhang et al., "AS002-Targeting inhibitor of apoptosis proteins (IAPs) enhances intrahepatic antiviral immunity to clear hepatitis B virus infection in vivo", Journal of Hepatology, Aug. 2020, pp. S5-S6.

Emma Morrish et al., "Combinatorial Treatment of Birinapant and Zosuquidar Enhances Effective Control of HBV Replication In Vivo", Viruses, Aug. 17, 2020, pp. 1-12.

Michelle P. Clark et al., "Clinical stage drugs targeting inhibitor of apoptosis proteins purge episomal Hepatitis B viral genome in preclinical models", Cell Death & Disease, Jun. 23, 2021, pp. 1-11.

E. S. Shchegravina et al., "Carbohydrate Systems in Targeted Drug Delivery: Expectation and Reality", Russian Journal of Bioorganic Chemistry, Mar. 20, 2021, pp. 71-98, vol. 47, No. 1.

Sachin S. Shivatare et al., "Glycoconjugates: Synthesis, Functional Studies, and Therapeutic Developments", Chemical Reviews, Sep. 29, 2022, pp. 15603-15671, vol. 122, Issue 20.

Saugandha Das et al., "Asialoglycoprotein Receptor and Targeting Strategies", Targeted Intracellular Drug Delivery by Receptor Mediated Endocytosis, Nov. 10, 2019, pp. 353-381, vol. 39.

Krishna C. Chimalakonda et al., "Synthesis, Analysis, in Vitro Characterization, and in Vivo Disposition of a Lamivudine-Dextran Conjugate for Selective Antiviral Delivery to the Liver", Bioconjugate chemistry, Oct. 9, 2007, pp. 2097-2108, vol. 18, No. 6.

Giuseppina Di Stefano et al., "Ribavirin Conjugated with Lactosaminated Poly-L-lysine: Selective Delivery to the Liver and Increased Antiviral Activity in Mice With Viral Hepatitis", Biochemical pharmacology, Aug. 1, 1997, pp. 357-363, vol. 54, No. 3.

Hassan Javanbakht et al., "Liver-Targeted Anti-HBV Single-Stranded Oligonucleotides with Locked Nucleic Acid Potently Reduce HBV Gene Expression In Vivo", Molecular therapy-Nucleic acids, Feb. 23, 2008, pp. 441-454, vol. 11.

Xiaohong Lai et al., "Purification and mass spectrometry study of Maillard reaction impurities in five acyclic nucleoside antiviral drugs", Journal of Pharmaceutical and Biomedical Analysis, Feb. 1, 2022, pp. 1-8, vol. 212.

Emil Yu. Yamansarov et al., "Discovery of Bivalent GalNAc-Conjugated Betulin as a Potent ASGPR-Directed Agent against Hepatocellular Carcinoma", Bioconjugate Chemistry, Mar. 11, 2021, pp. 763-781, vol. 32, Issue 4.

Rostislav A. Petrov et al., "New Small-Molecule Glycoconjugates of Docetaxel and GalNAc for Targeted Delivery to Hepatocellular Carcinoma", Molecular Pharmaceutics, Dec. 2, 2020, pp. 461-468, vol. 18, Issue 1.

"Search Report of Europe Counterpart Application", issued on Dec. 3, 2024, p. 1-p. 17.

"Office Action of Russia Counterpart Application", issued on Feb. 18, 2025, p. 1-p. 12.

"Office Action of Japan Counterpart Application", issued on Apr. 22, 2025, p. 1-p. 7.

\* cited by examiner

DRUG CONJUGATE, PHARMACEUTICAL COMPOSITION AND METHOD OF TREATING HEPATITIS

CROSS-REFERENCE TO RELATED APPLICATION

This application claims the priority benefit of U.S. provisional application Ser. No. 63/524,210, filed on Jun. 29, 2023. The entirety of the above-mentioned patent application is hereby incorporated by reference herein and made a part of this specification.

BACKGROUND

Technical Field

The present disclosure relates to a drug conjugate, in particular to a pharmaceutical including such drug conjugate, and a method of using the drug conjugate or pharmaceutical composition for treating hepatitis B, hepatitis C, viral hepatitis, or other viral infections.

Description of Related Art

Tenofovir and Entecavir are the first-line of drugs used for the treatment of hepatitis B. However, these types of drugs (nucleoside/nucleotide analogues) must be taken regularly and continuously to suppress the level of virus in the body. If drug administration is improperly stopped or if a problem is encountered in the immune system, it usually results in very severe viral rebound and severe acute exacerbation of hepatitis. Therefore, other treatment methods may be desirable.

Inhibitor of apoptosis proteins (IAPs) is a family of anti-apoptotic proteins that have an important role in evasion of apoptosis, as they can both block apoptosis-signaling pathways and promote survival. Beside the use in cancer treatment, many IAP inhibitors (or IAP antagonists) are shown to have the potential for hepatitis B treatment. For example, clinical trials have been conducted for Birinapant (synthetic small molecule) in the treatment of hepatitis B. However, from the clinical studies, when Birinapant is used in combination with hepatitis B virus (HBV) drugs such as Tenofovir or Entecavir, side effects such as cranial nerve palsies (or Bell's palsies) were observed. For another IAP inhibitor APG-1387, its potential in the treatment for patients with chronic hepatitis B is recognized, but further clinical studies are still underway.

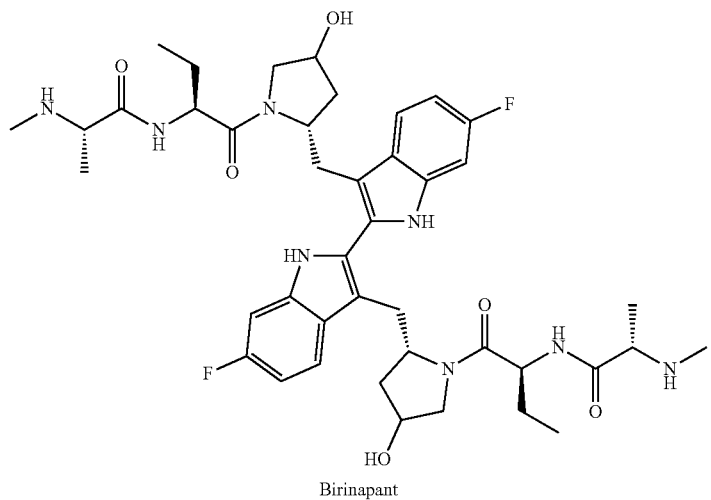

Birinapant

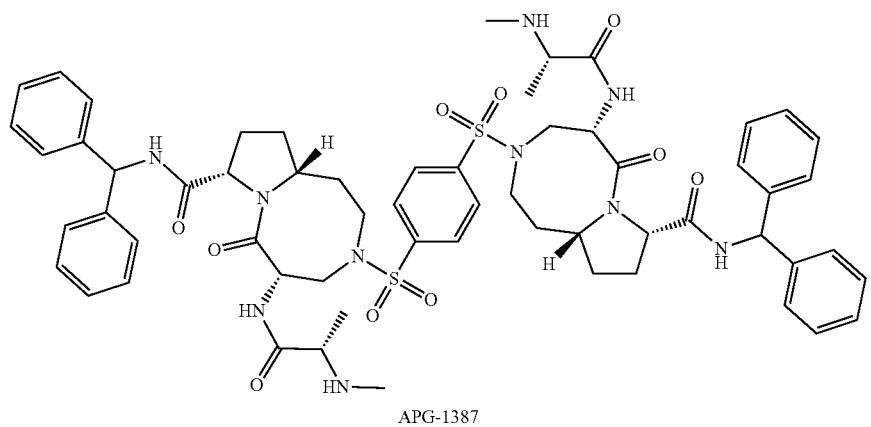

APG-1387

To realize the full potential of IAP inhibitors and the carbohydrate's liver targeting to the treatment of hepatitis B, hepatitis C, or hepatitis related disorders, further investigations and analysis need to be conducted.

SUMMARY

In the present disclosure, a drug conjugate that is more effective than conventional drugs in the treatment of hepatitis B is provided. Furthermore, a pharmaceutical composition including such drug conjugate, and a method of treating hepatitis using the drug conjugate or pharmaceutical composition is described.

In accordance with some embodiments of the present disclosure, a drug conjugate has the structure shown in formula (I).

Z-(linker-[R]$_m$)$_n$     formula (I)

wherein, in formula (I), Z is a drug compound, R is a sugar, and m and n are independently an integer from 1 to 6.

In some embodiments, the drug compound Z is a hepatitis virus targeting drug, a hepatitis B virus (HBV) drug, a hepatitis C virus (HCV) drug, an inhibitor of apoptosis protein (IAP) antagonist, a multidrug resistance (MDR) inhibitor, or analogues, precursors, prodrugs, derivatives thereof.

In some embodiments, the drug compound Z is selected from the group consisting of Tenofovir, Tenofovir diisoproxil, Tenofovir alafenamide, Entecavir, Telbivudine, Adefovir, Adefovir dipivoxil, Lamivudine, Interferon-α-2A, Interferon-α-2B, Birinapant, monomer Birinapant, Xevinapant, LCL161, GDC-0152, GDC-0917, CUDC-427, APG-1387, DeBio-1143, Selgantolimod, BI-82, Glecaprevir, Pibrentasvir, Ombitasvir, Paritaprevir, Ritonavir, Sofosbuvir, Velpatasvir, Ledipasvir, Voxilaprevir, Daclatasvir, Asunaprevir, Telaprevir, Elbasvir, Grazoprevir, Ribavarin, Telaprevir, EDP-239, Alisporivir, Filibuvir, Mericitabine, Danoprevir, Velpatasvir, Zosuquidar, or analogues, precursors, prodrugs, derivatives thereof.

In some embodiments, the sugar R is a monosaccharide, a disaccharide, a trisaccharide, a tetrasaccharide, an oligosaccharide, a polysaccharide, or derivatives thereof.

In some embodiments, the linker is selected from the group consisting of substituted or unsubstituted alkyl, substituted or unsubstituted alkenyl, substituted or unsubstituted alkynyl, arylalkyl, arylalkenyl, arylalkynyl, heteroarylalkyl, heteroarylalkenyl, heteroarylalkynyl, heterocyclylalkyl, heterocyclylalkenyl, heterocyclylalkynyl, aryl, heteroaryl, heterocyclyl, cycloalkyl, cycloalkenyl, alkylarylalkyl, alkylarylalkenyl, alkylarylalkynyl, alkenylarylalkyl, alkenylarylalkenyl, alkenylarylalkynyl, alkynylarylalkyl, alkynylarylalkenyl, alkynylarylalkynyl, alkylheteroarylalkyl, alkylheteroarylalkenyl, alkylheteroarylalkynyl, alkenylheteroarylalkyl, alkenylheteroarylalkenyl, alkenylheteroarylalkynyl, alkynylheteroarylalkyl, alkynylheteroarylalkenyl, alkynylheteroarylalkynyl, alkylheterocyclylalkyl, alkylheterocyclylalkenyl, alkylhererocyclylalkynyl, alkenylheterocyclylalkyl, alkenylheterocyclylalkenyl, alkenylheterocyclylalkynyl, alkynylheterocyclylalkyl, alkynylheterocyclylalkenyl, alkynylheterocyclylalkynyl, alkylaryl, alkenylaryl, alkynylaryl, alkylheteroaryl, alkenylheteroaryl, alkynylhereroaryl, which one or more methylenes can be interrupted or terminated by O, S, S(O), SO$_2$, N(R$^8$), C(O), substituted or unsubstituted aryl, substituted or unsubstituted heteroaryl, substituted or unsubstituted heterocyclic; where R$^8$ is hydrogen, acyl, aliphatic or substituted aliphatic.

In some embodiments, the linker is any one selected from the group consisting of formula (LX1) to formula (LX30):

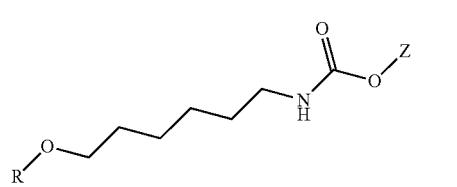

(LX1)

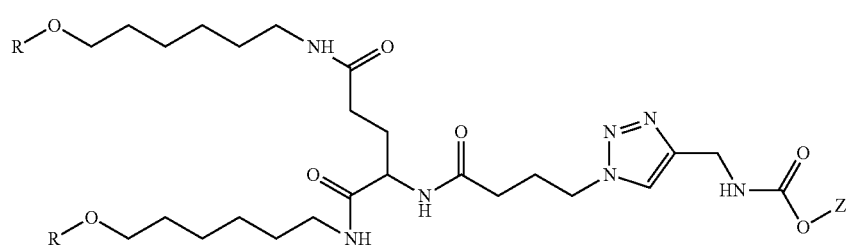

(LX2)

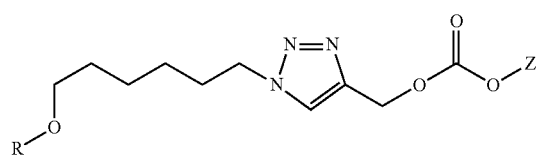

(LX3)            (LX4)

-continued
(LX5)
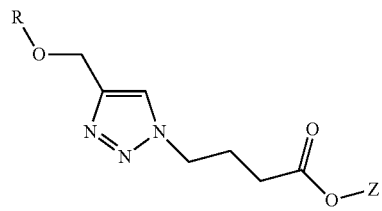
(LX6)
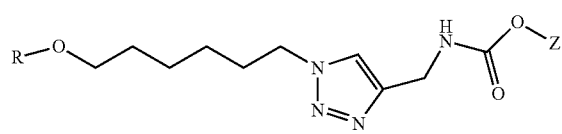
(LX7)
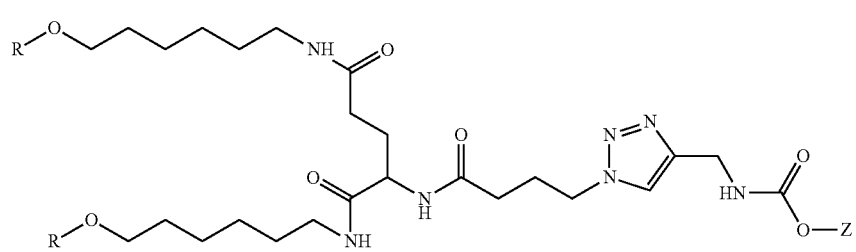
(LX8)
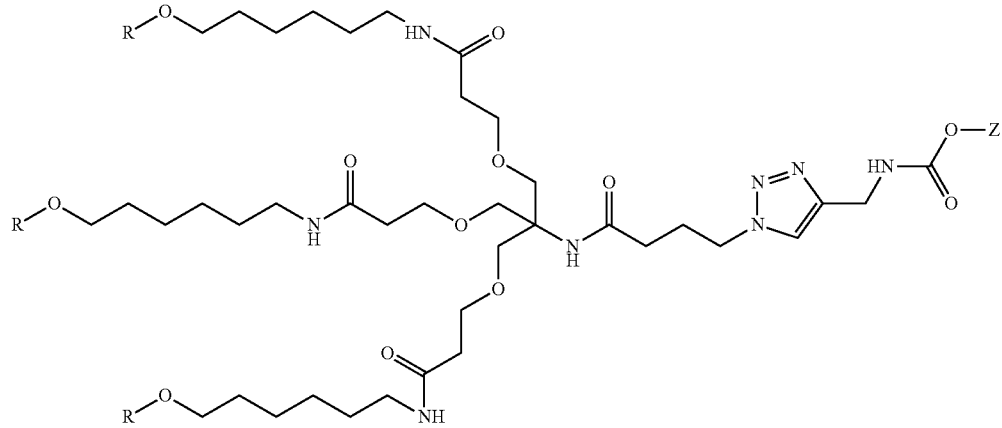
(LX9)
(LX10)
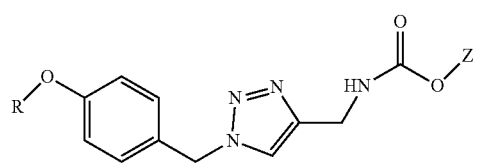
(LX11)
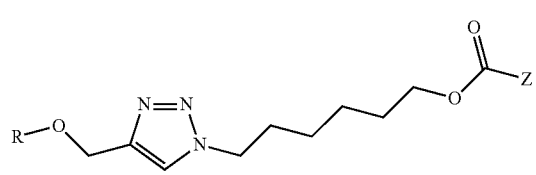
(LX12)
(LX13)
(LX14)
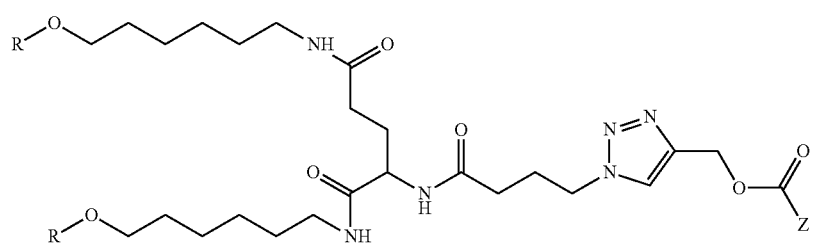

-continued
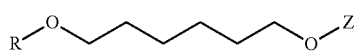 (LX15)
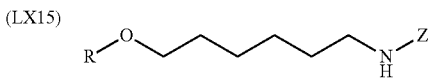 (LX16)
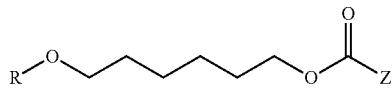 (LX17)
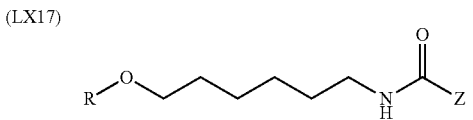 (LX18)
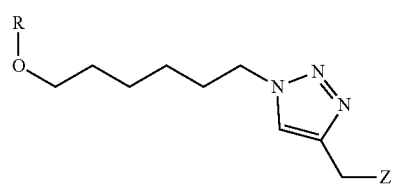 (LX19)
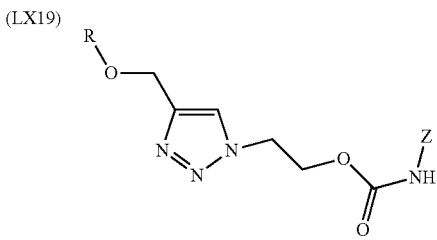 (LX20)
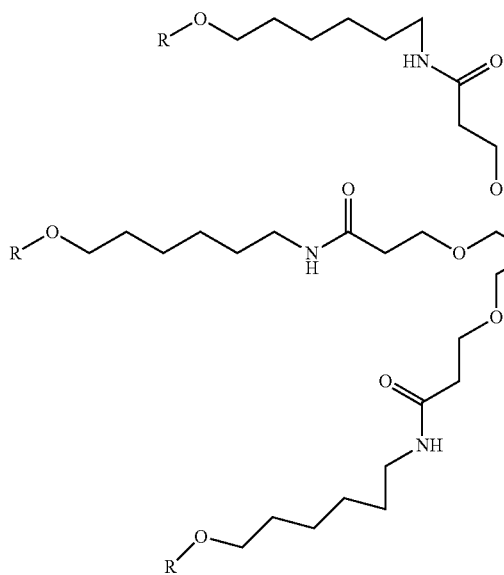 (LX21)
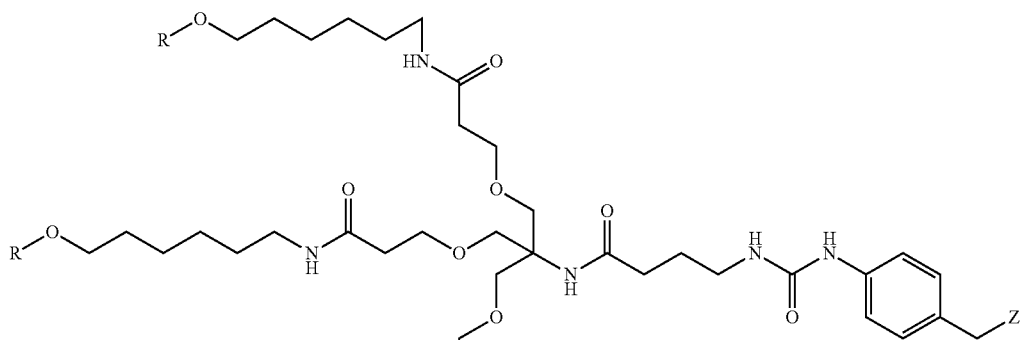
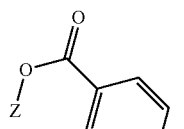 (LX22)
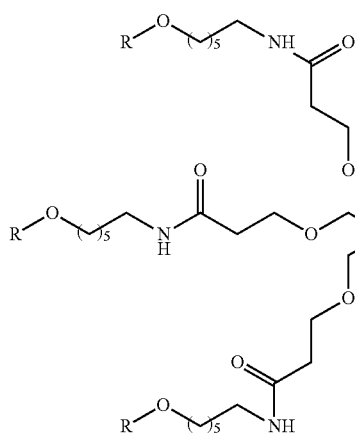
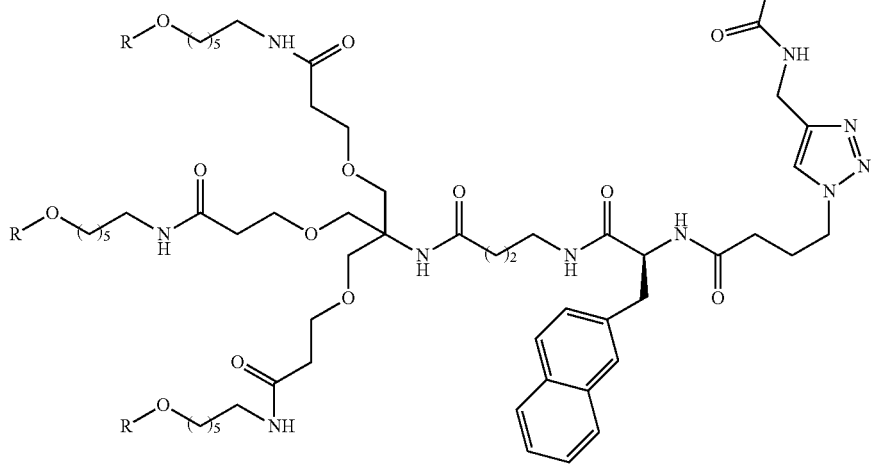

-continued
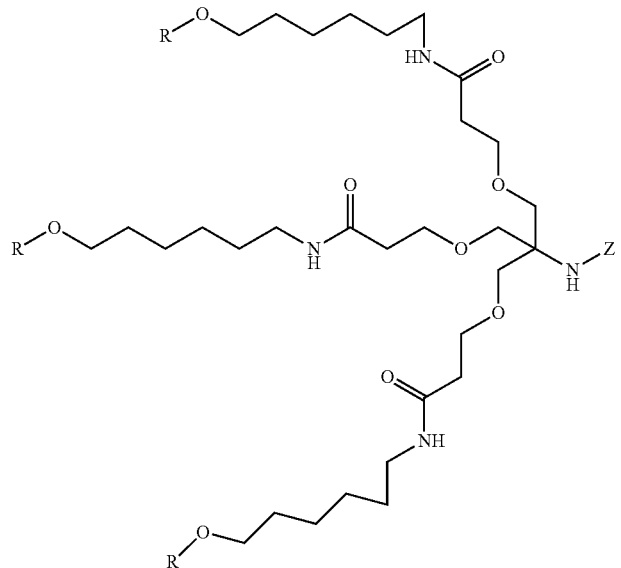
(LX23)
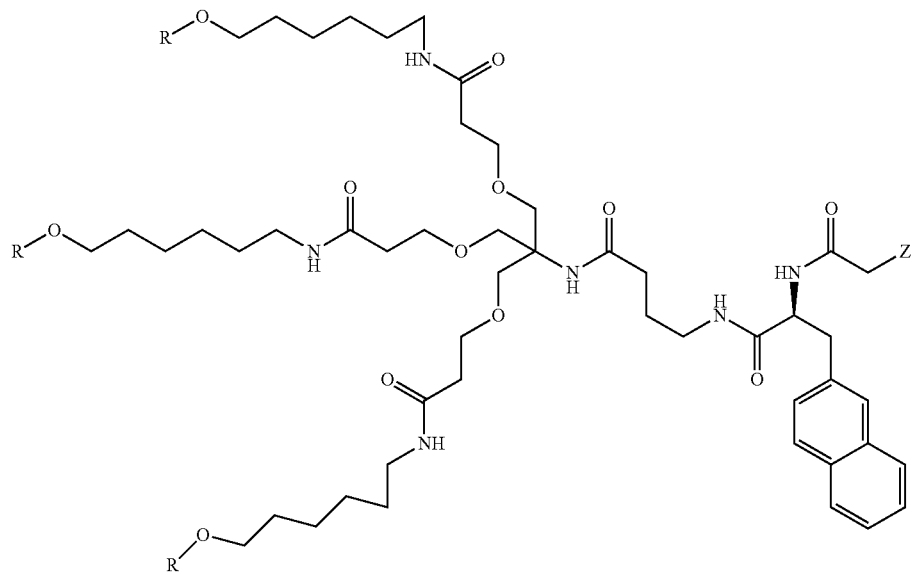
(LX24)
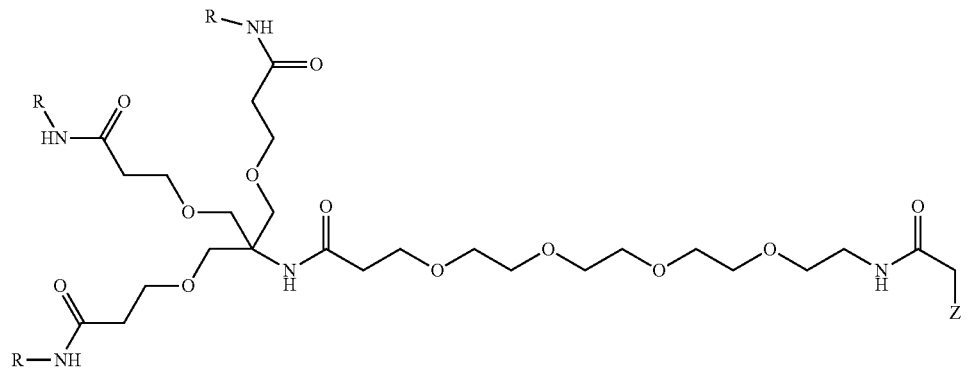
(LX25)

-continued
(LX26)
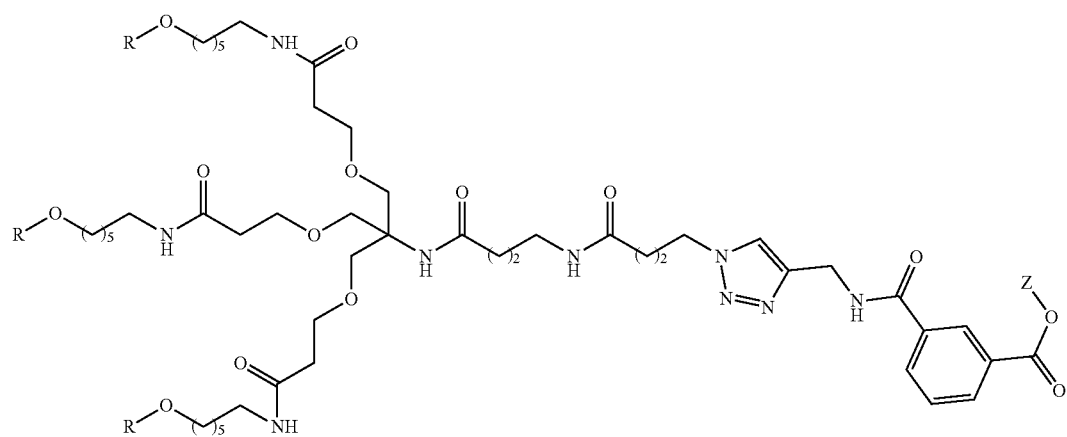
(LX27)
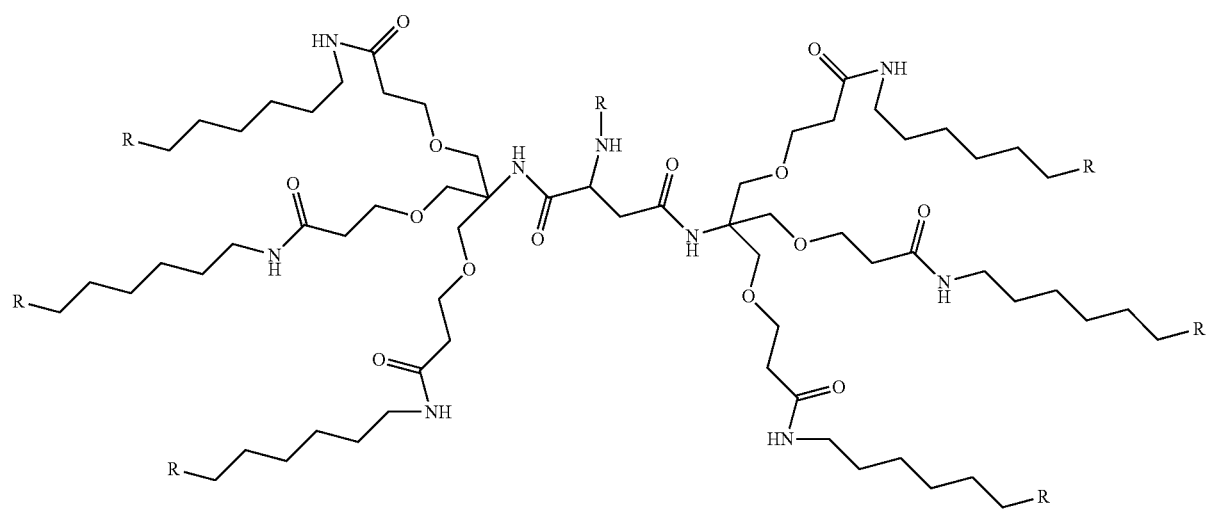
(LX28)
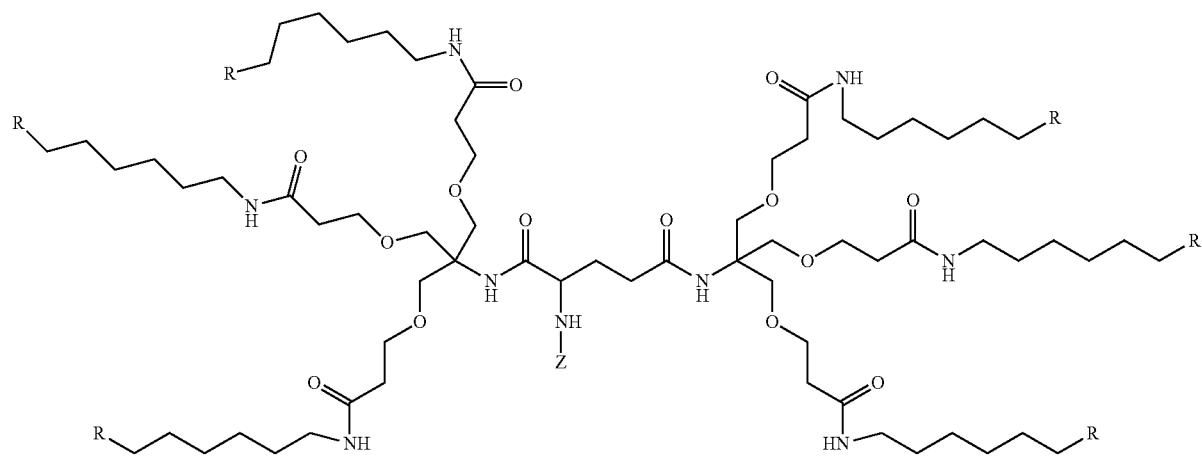

(LX29)
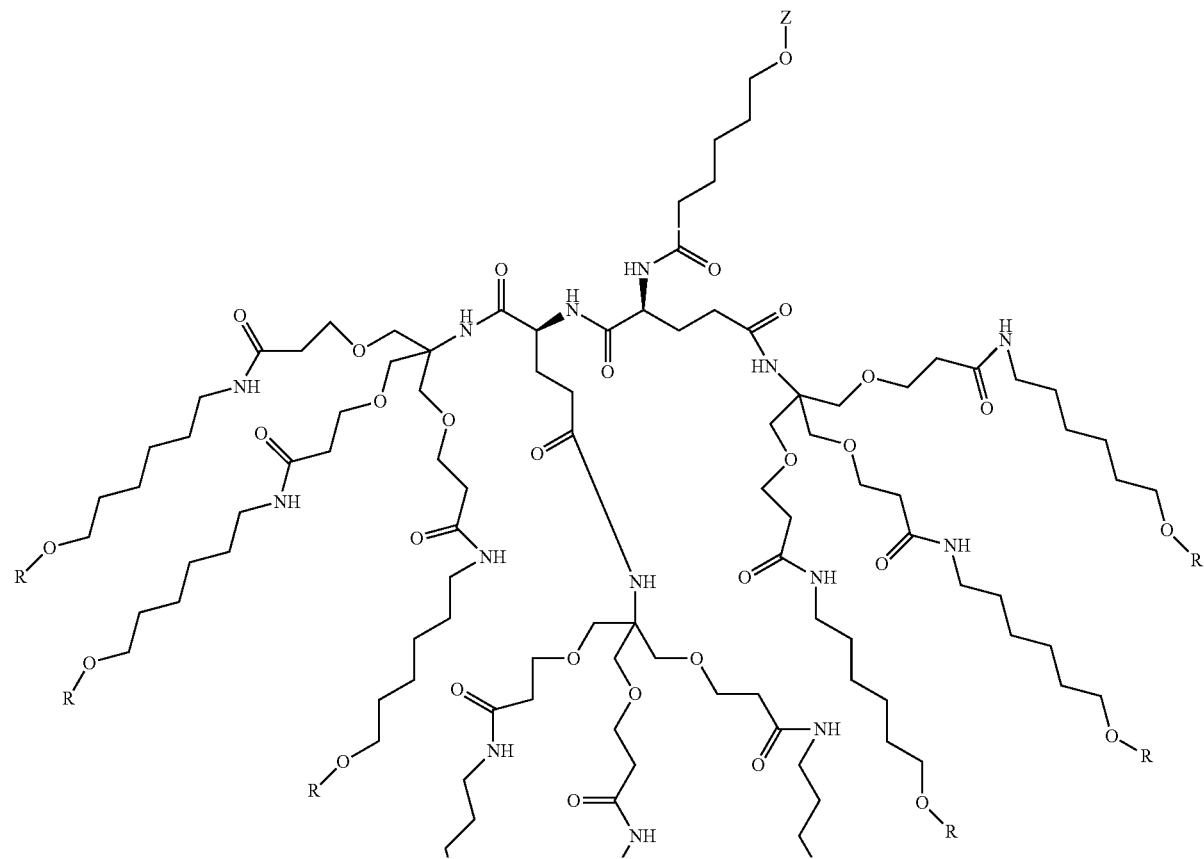
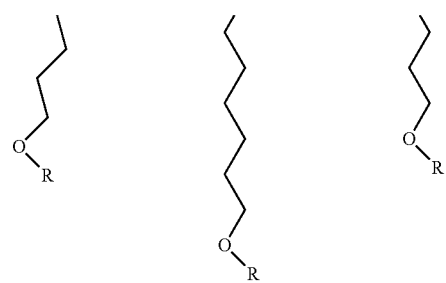
(LX30)
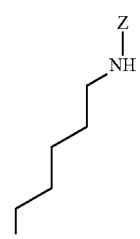

-continued

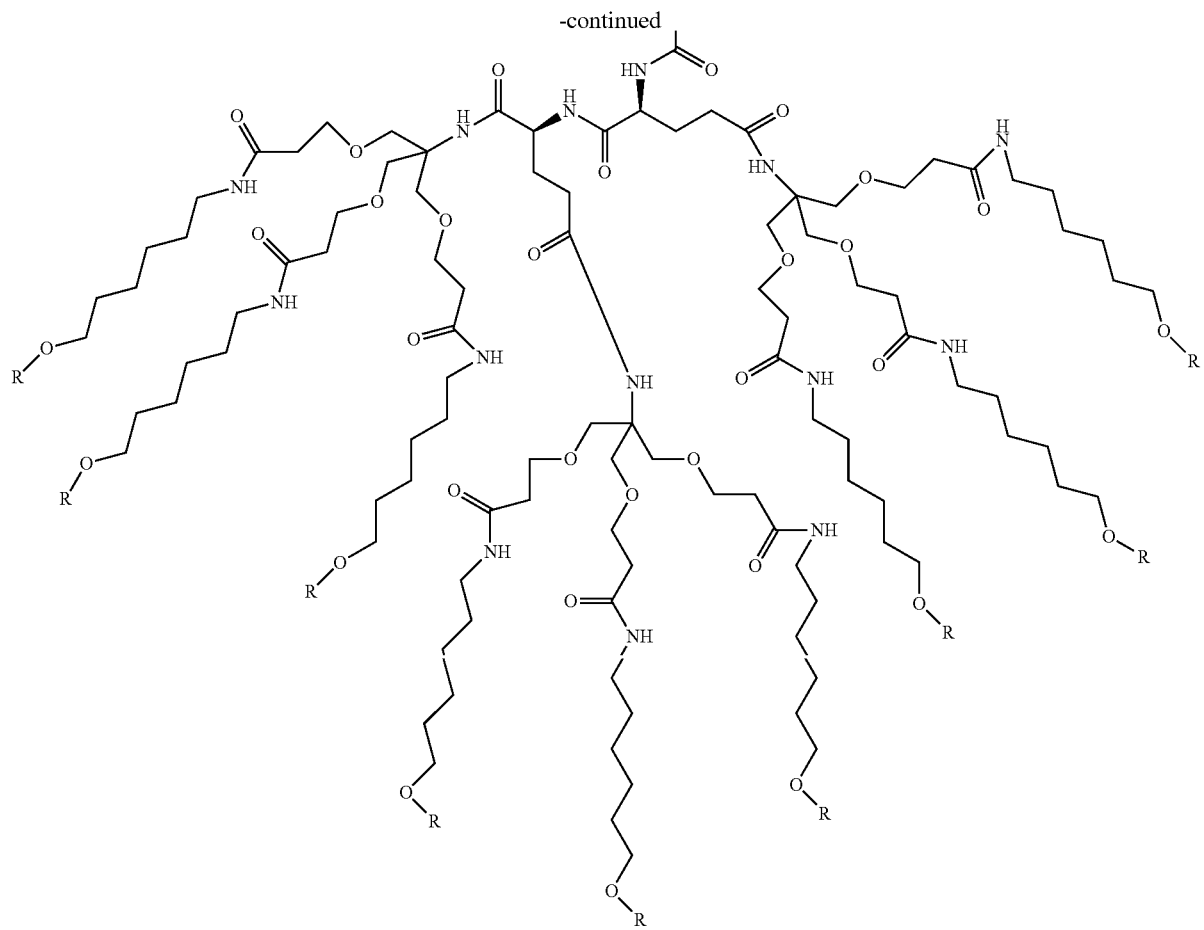

wherein, in formula (LX1) to formula (LX30), Z is the position where the linker is bonded to the drug, while R is the position where the linker is bonded to the sugar.

In some embodiments, the sugar R is selected from the group consisting of a monosaccharide, a disaccharide, and a trisaccharide, wherein the monosaccharide, the disaccharide, and the trisaccharide are independently unsubstituted, or substituted with an acetyl group or a N-acetyl group, and wherein the drug Z is selected from the group consisting of Entecavir, Adefovir, Telbivudine, Lamivudine, Tenofovir, GDC-0152, DeBio-1143, LCL161, Birinapant or analogues, precursors, prodrugs, derivatives thereof.

In some embodiments, in the drug conjugate, the drug compound Z is conjugated to the linker to form a carbamate linkage (>N—C(=O)—O—), an amide linkage (R—C(=O)—N<), a carbonate linkage (RO—C(=O)—OR'), or an ester linkage (R—C(=O)—OR').

In some embodiments, the linker at least comprises a triazole.

In some embodiments, the structure shown in formula (I) is further represented by formula (II):

$$Z\text{-(linker-}[R]_m)_2 \qquad \text{formula (II)}$$

wherein, in formula (II), Z is the drug compound, R is the sugar, and m is independently an integer from 1 to 3.

In some embodiments, the structure shown in formula (I) is further represented by any one of formula (IA1) to (IA4):

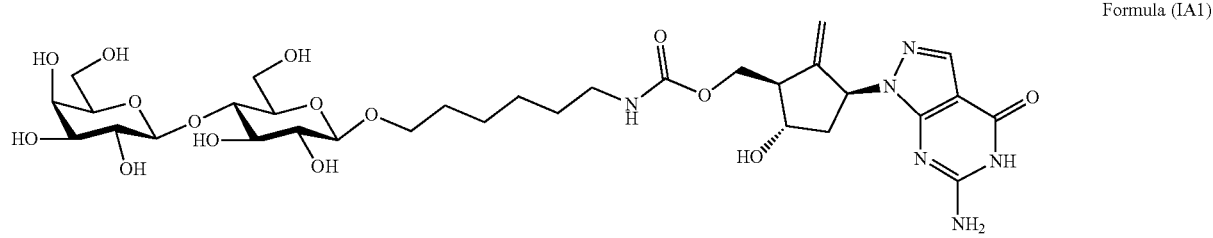

Formula (IA1)

Formula (IA2)
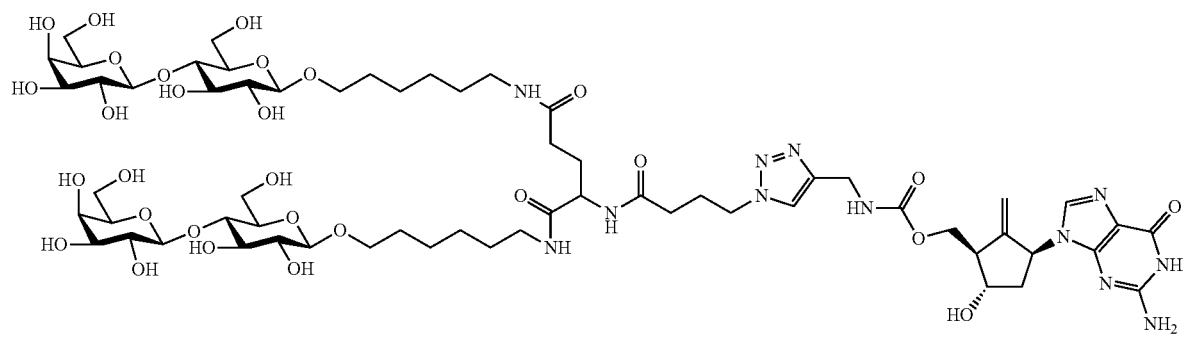
Formula (IA3)
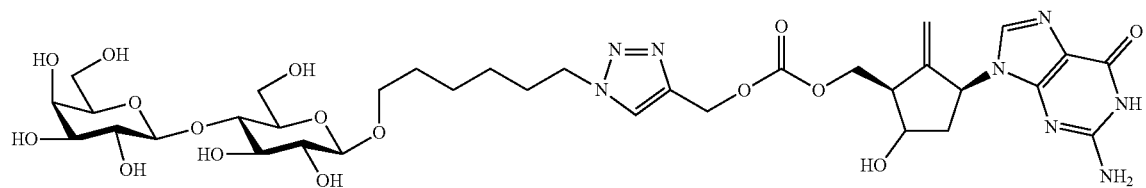
Formula (IA4)
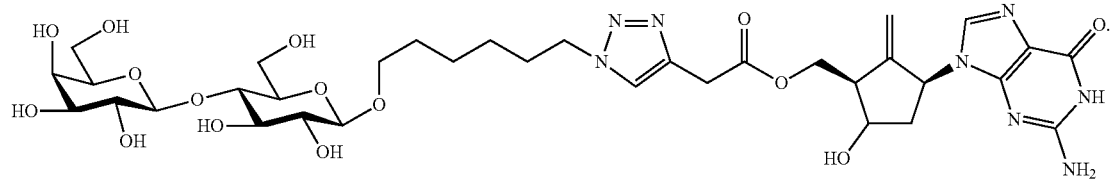
In some embodiments, the structure shown in formula (I) is further represented by any one of formula (IB1) to (IB11):
Formula (IB1)
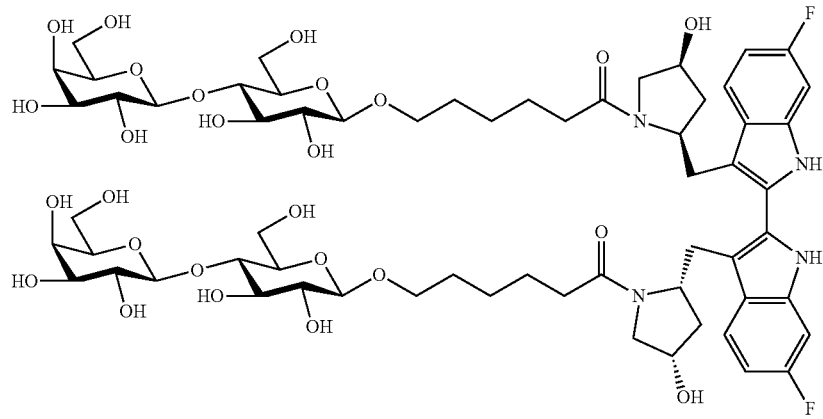

-continued
Formula (IB2)
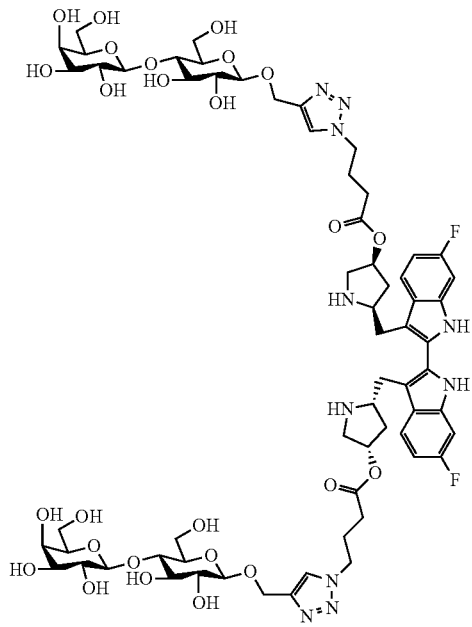
Formula (IB3)
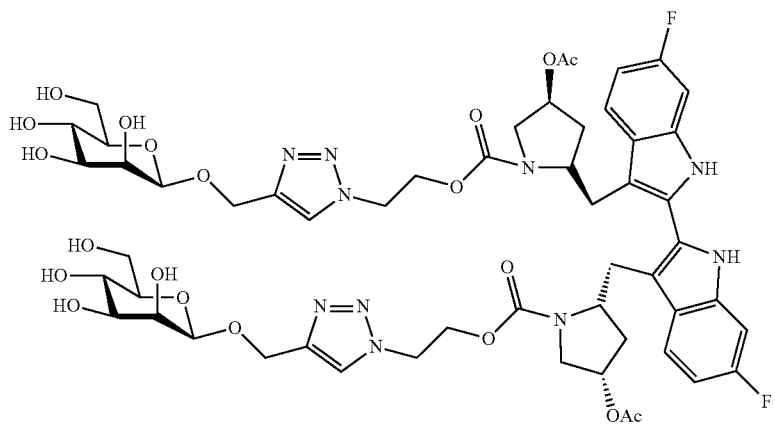
Formula (IB4)
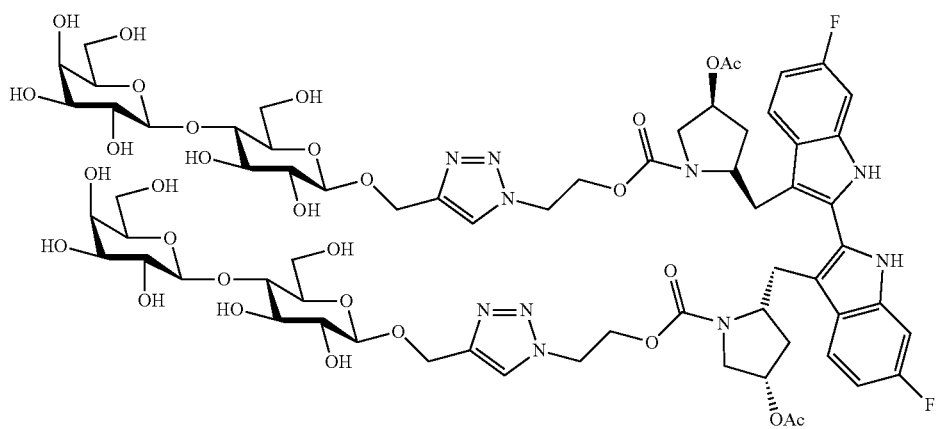

-continued
Formula (IB5)
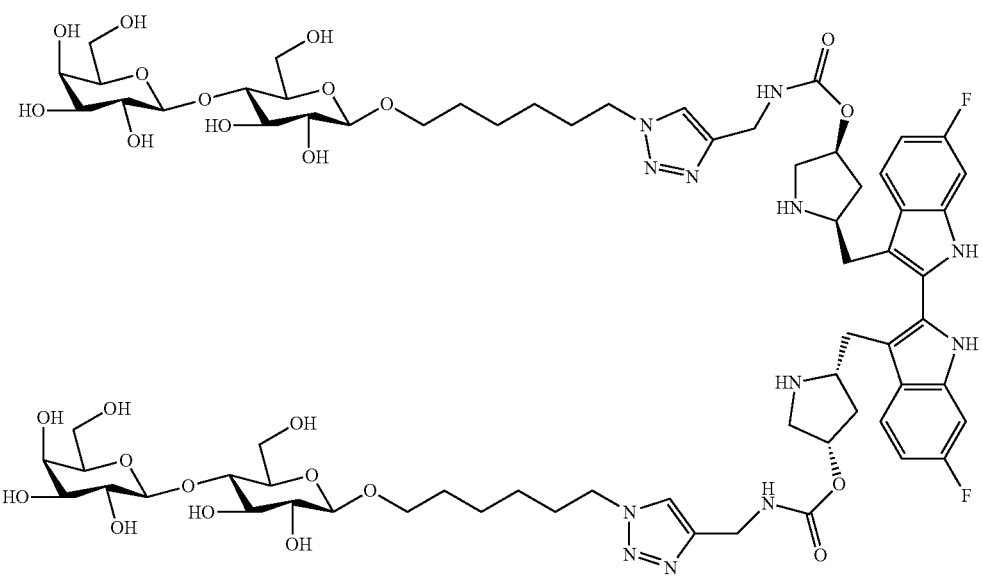
Formula (IB6)
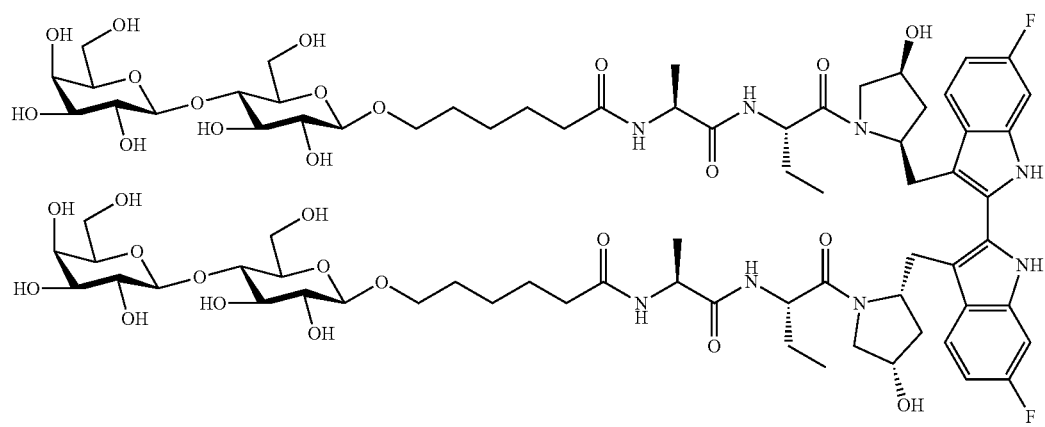
Formula (IB7)
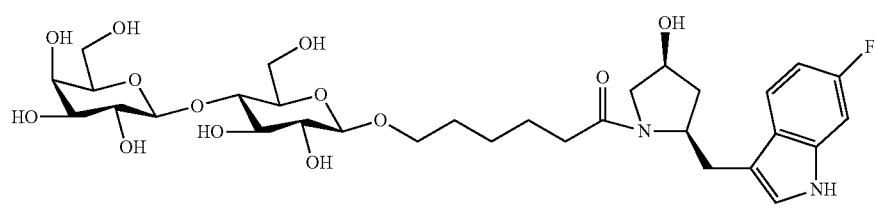
Formula (IB8)
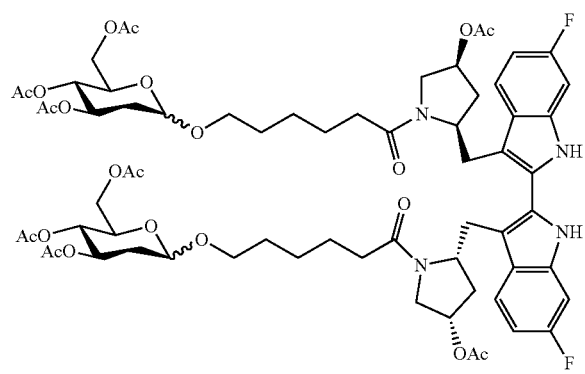
Formula (IB9)
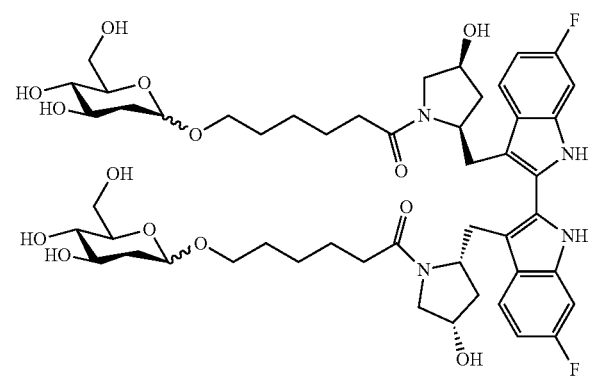

-continued
Formula (IB10)
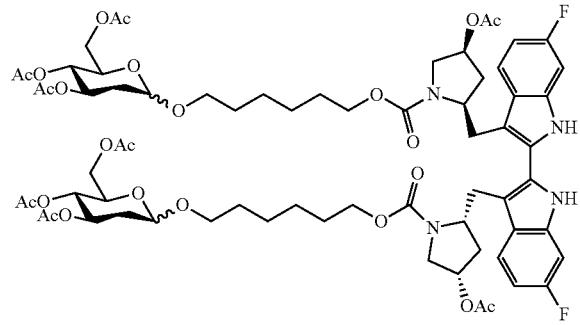
Formula (IB11)
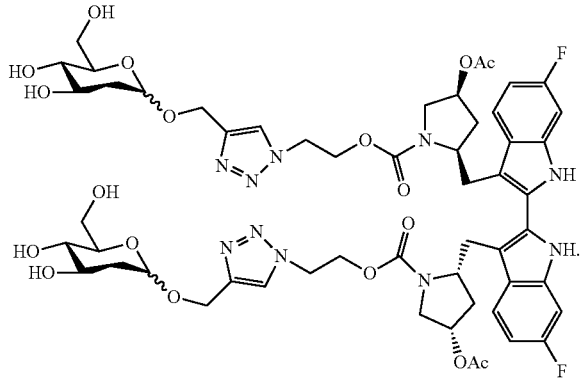
In some embodiments, the structure shown in formula (I) is further represented by any one of formula (IC1) to (IC11):
Formula (IC1)
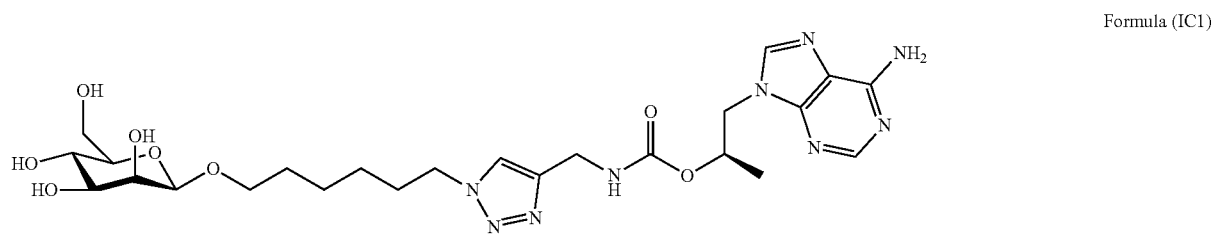
Formula (IC2)
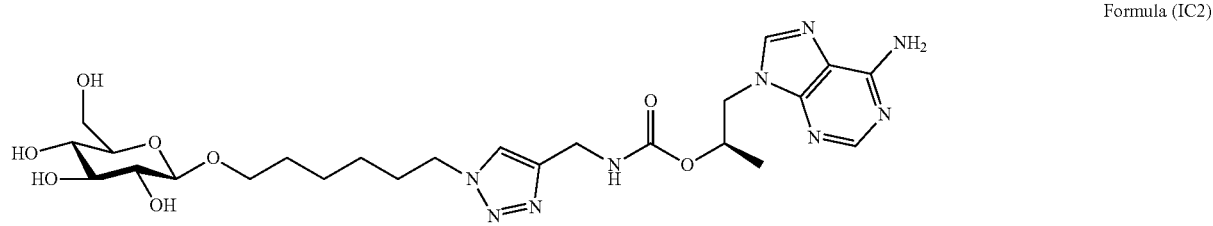
Formula (IC3)
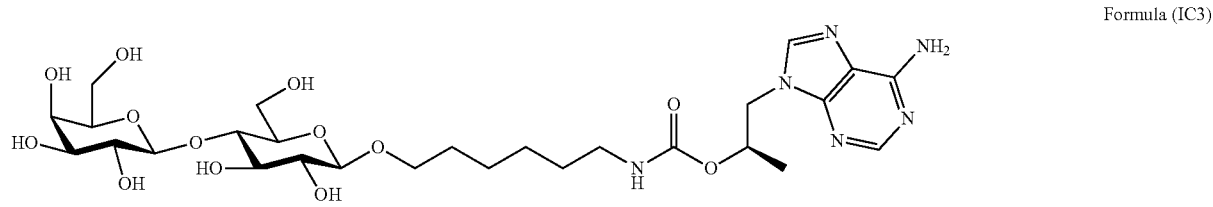
Formula (IC4)
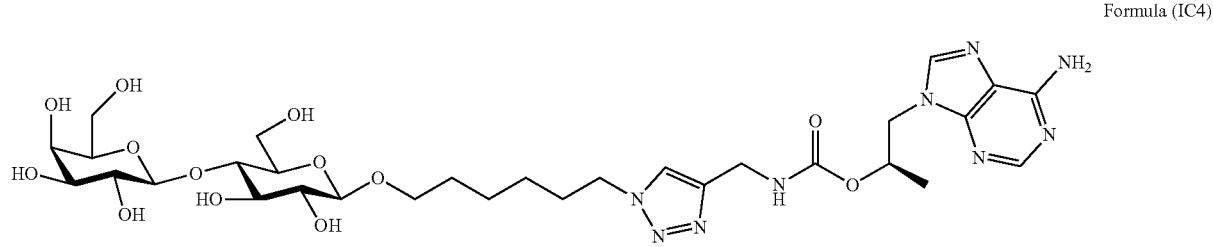
Formula (IC5)
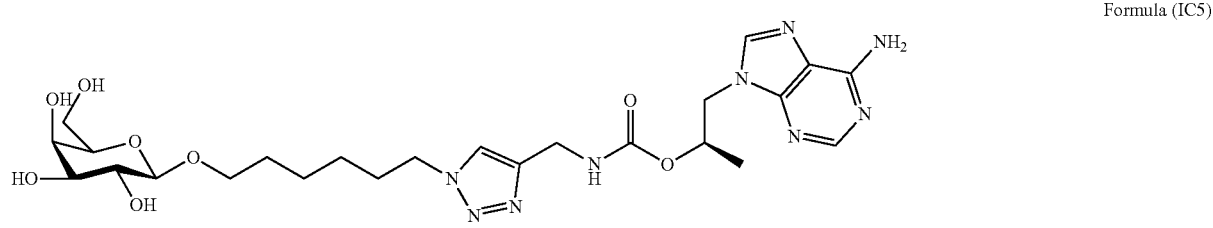

-continued
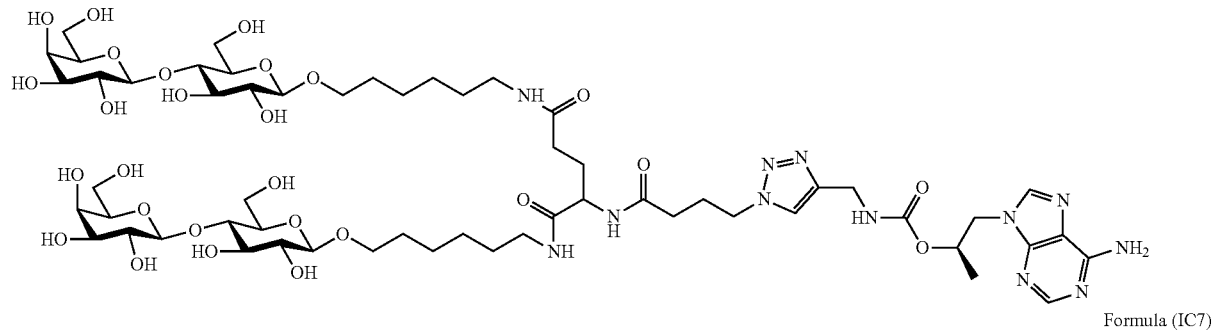
Formula (IC6)
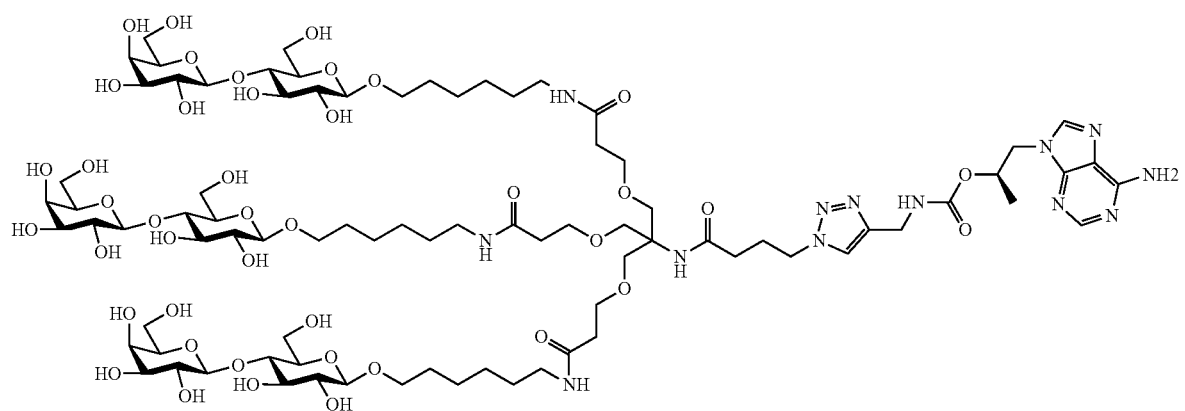
Formula (IC7)
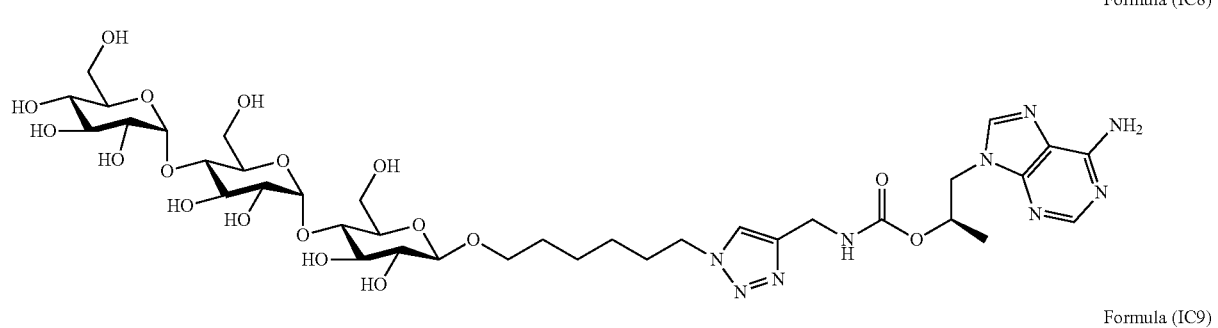
Formula (IC8)
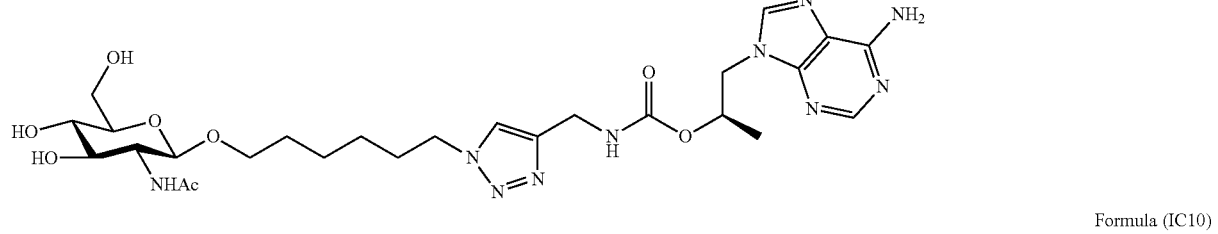
Formula (IC9)
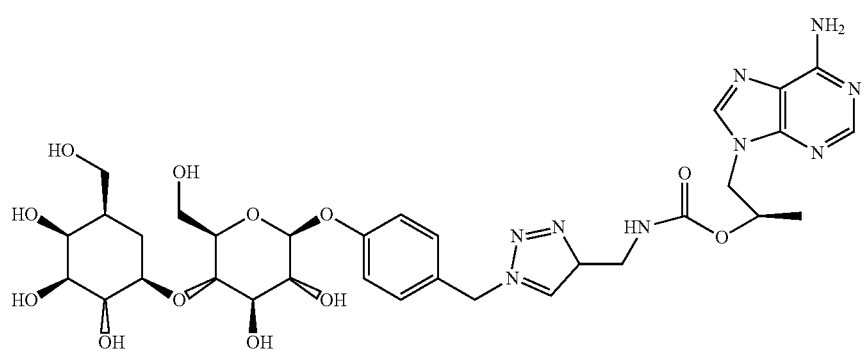
Formula (IC10)

Formula (IC11)
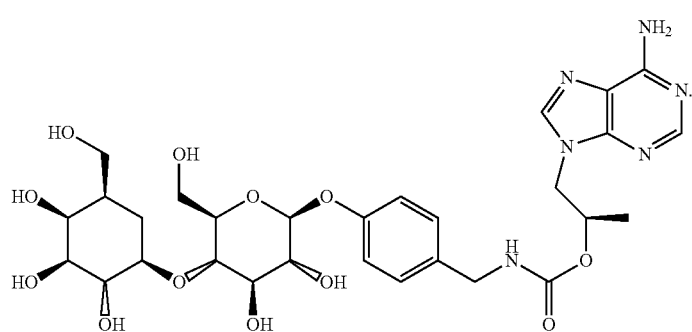
In some embodiments, the structure shown in formula (I) is further represented by any one of formula (ID1) to (ID5):
Formula (ID1)
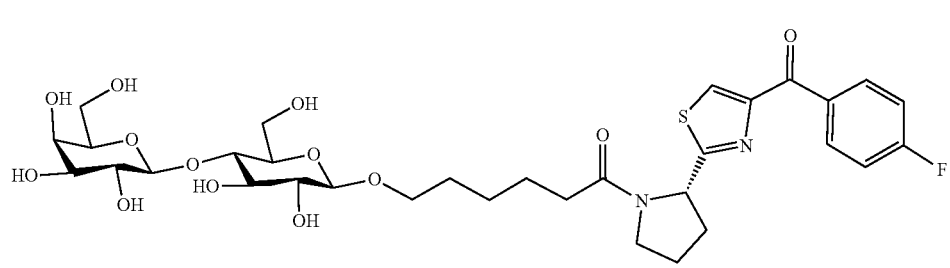
Formula (ID2)
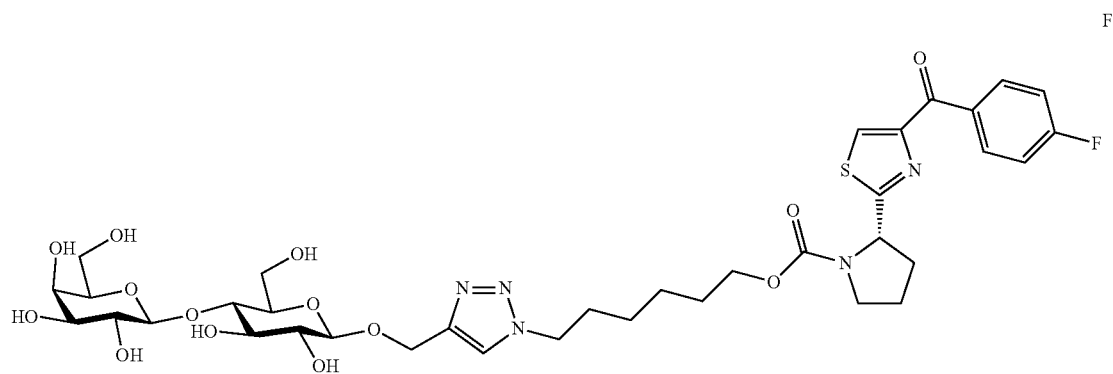
Formula (ID3)
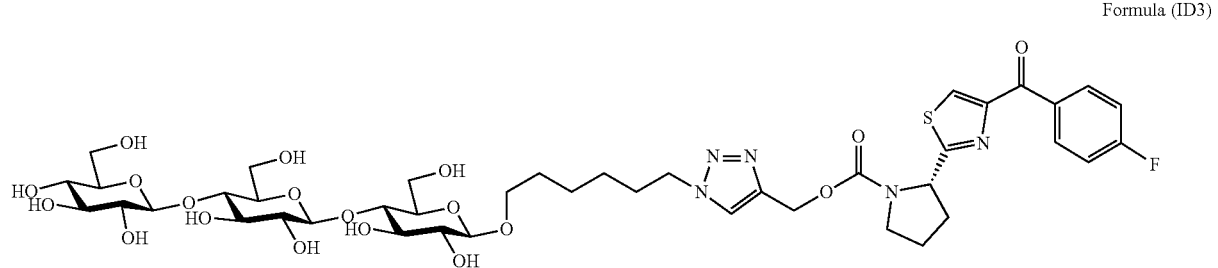

-continued
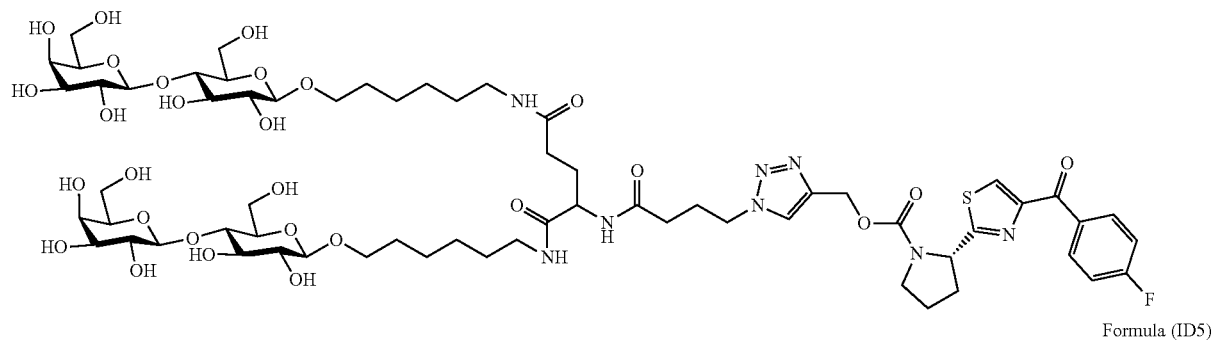
Formula (ID4)
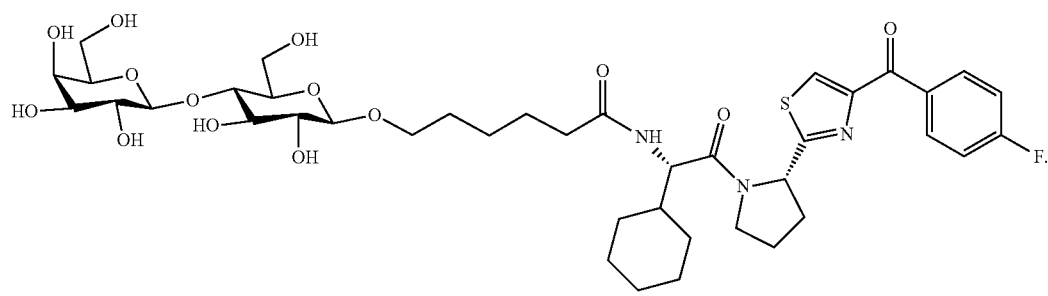
Formula (ID5)
In some embodiments, the structure shown in formula (I) is further represented by formula (IE1):
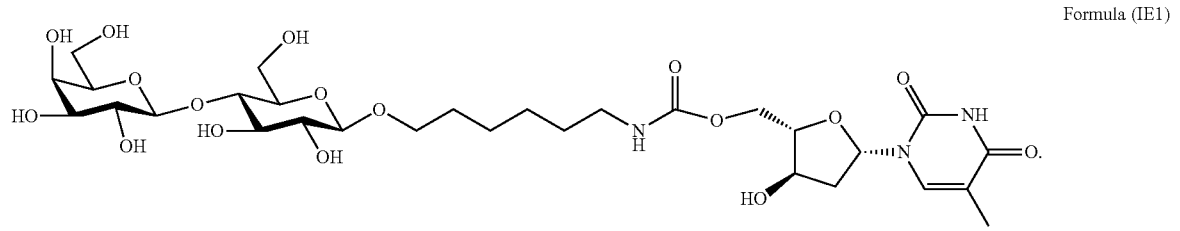
Formula (IE1)
In some embodiments, the structure shown in formula (I) is further represented by formula (IF1) or formula (IF2):
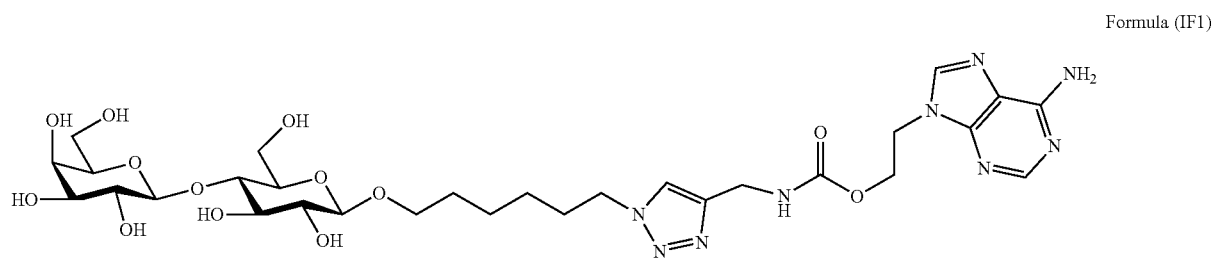
Formula (IF1)
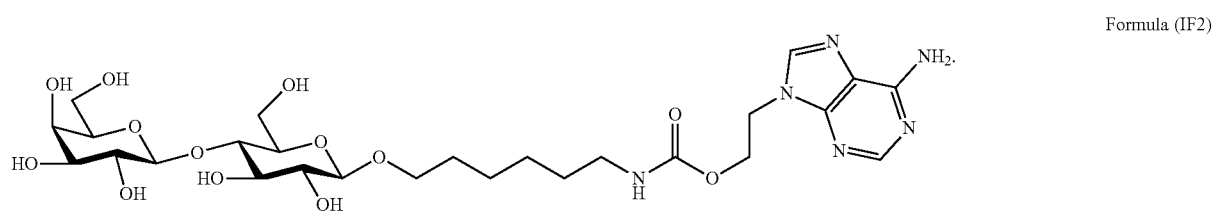
Formula (IF2)

In some embodiments, the structure shown in formula (I) is further represented by formula (IG1):
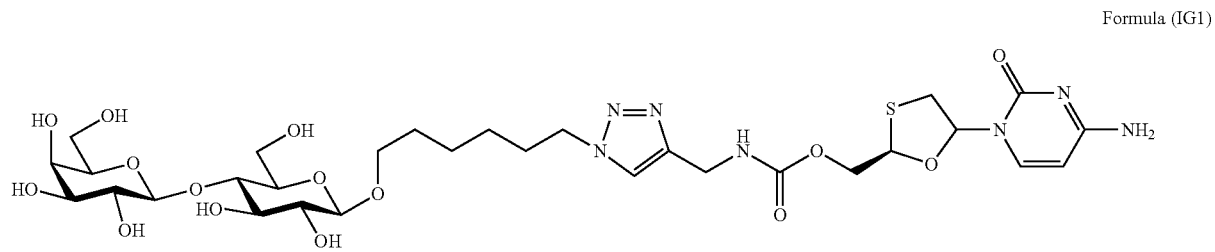
Formula (IG1)
In some embodiments, the structure shown in formula (I) is further represented by any one of formula (IH1) to formula (IH3):
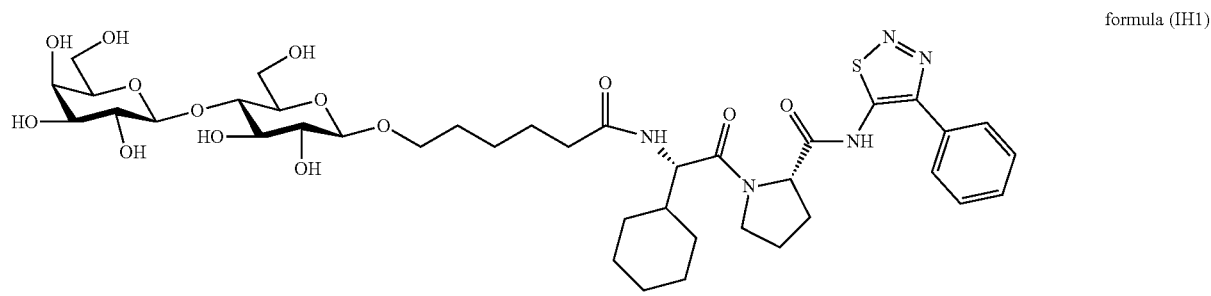
formula (IH1)
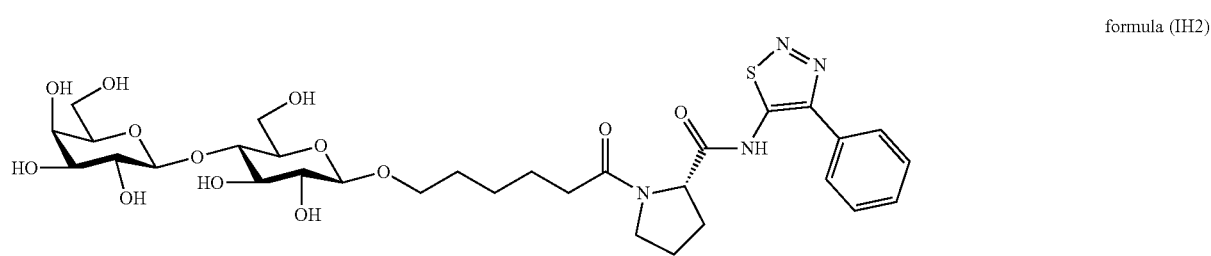
formula (IH2)
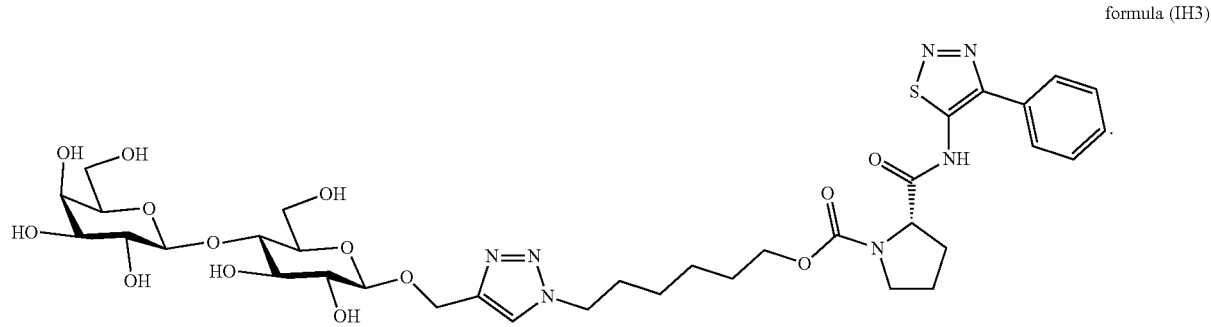
formula (IH3)

In some embodiments, the structure shown in formula (I) is further represented by formula (IJ1) or formula (IJ2):

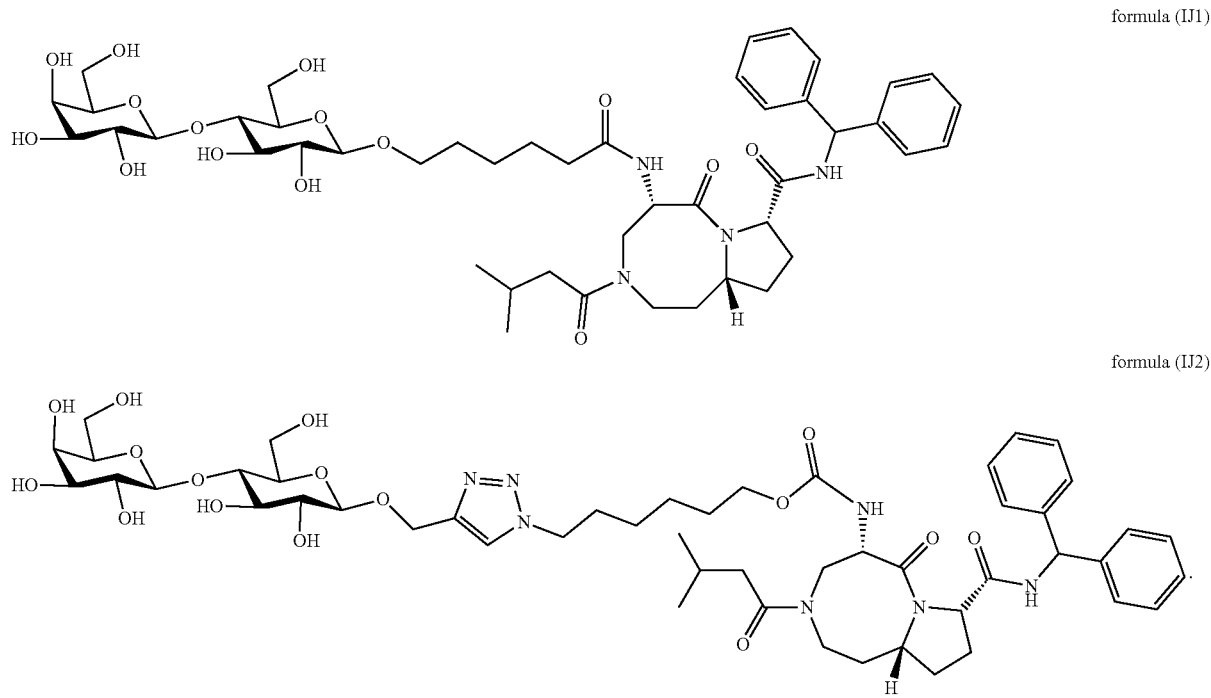

formula (IJ1)

formula (IJ2)

In accordance with some embodiments of the present disclosure, a pharmaceutical composition comprises an active ingredient, wherein the active ingredient comprises a drug conjugate having the structure shown in formula (I):

Z-(linker-[R]$_m$)$_n$   formula (I)

wherein, in formula (I), Z is a drug compound, R is a sugar, and m and n are independently an integer from 1 to 6; and at least one or more pharmaceutically acceptable excipients.

In some embodiments, the drug conjugate comprises a first drug conjugate represented by formula (I), and wherein in formula (I) the drug compound Z is a first drug compound X selected from the group consisting of Tenofovir, Tenofovir diisoproxil, Tenofovir alafenamide, Entecavir, Telbivudine, Adefovir, Adefovir dipivoxil, Lamivudine, Interferon-α-2A, Interferon-α-2B, Selgantolimod, BI-82 and Zosuquidar or analogues, precursors, prodrugs, derivatives thereof, or any HBV drugs.

In some embodiments, the first drug conjugate represented by formula (I) is further represented by any one of formula (IA1) to (IA4), any one of formula (IC1) to (IC11), or formula (IE1), or formula (IF1), or formula (IF2), or formula (IG1):

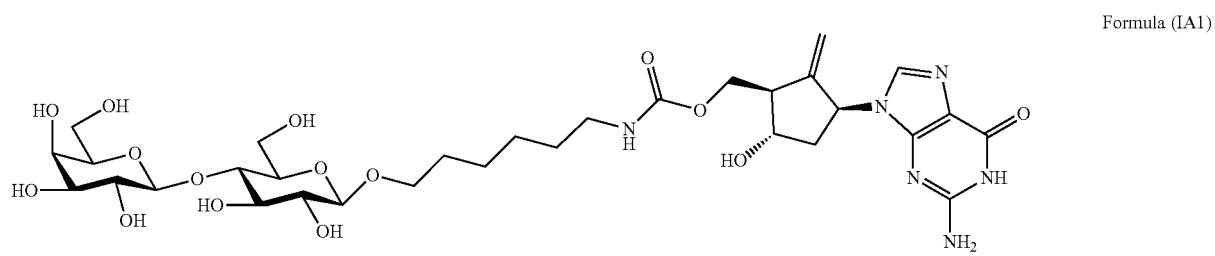

Formula (IA1)

-continued
Formula (IA2)
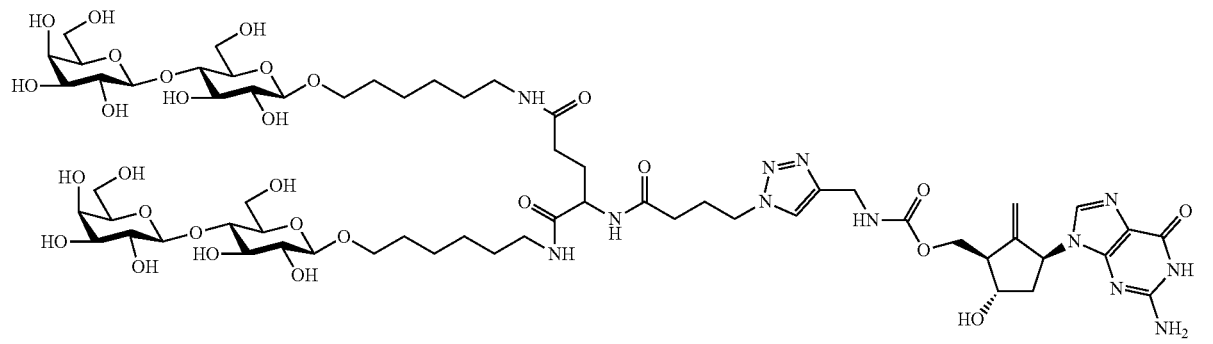
Formula (IA3)
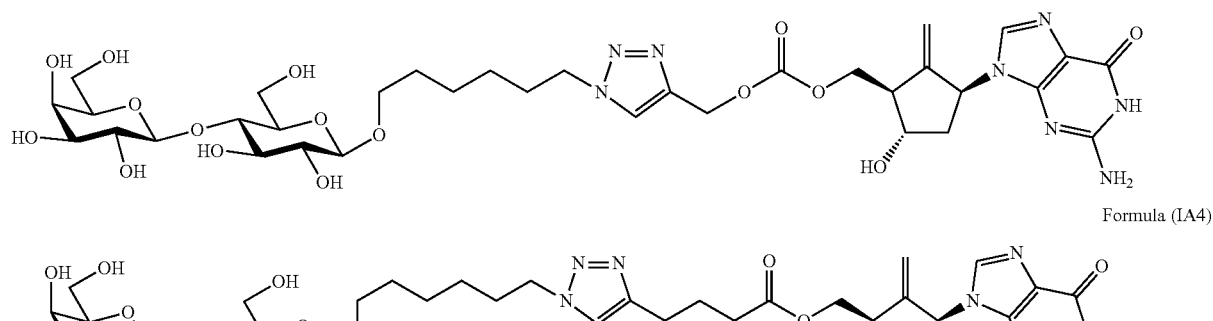
Formula (IA4)
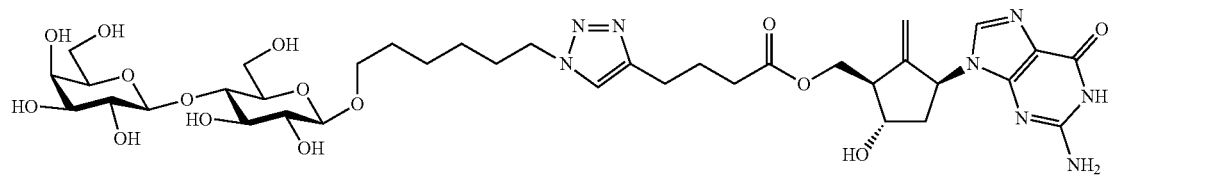
Formula (IC1)
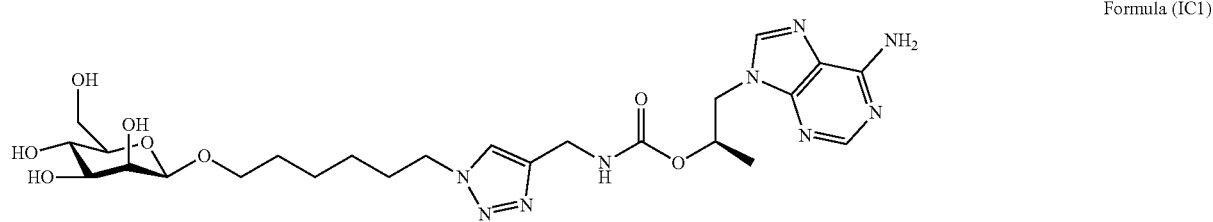
Formula (IC2)
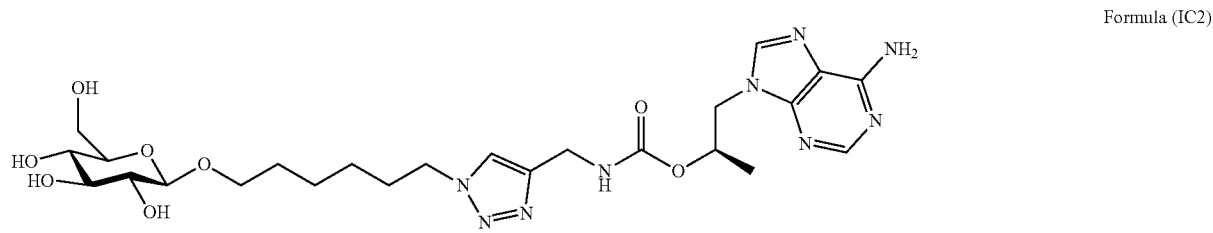
Formula (IC3)
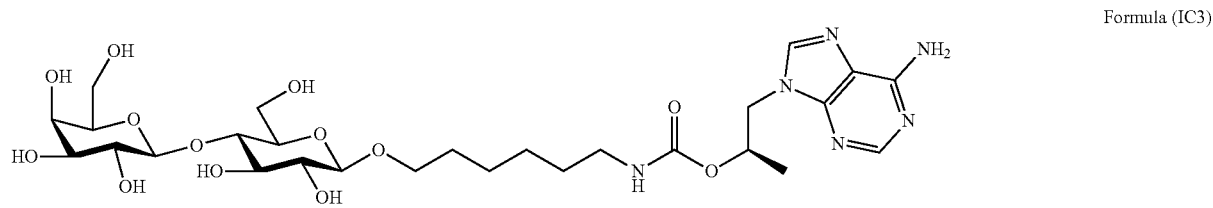

-continued
Formula (IC4)
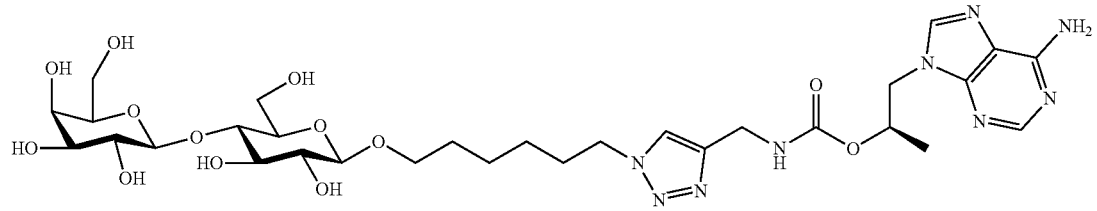
Formula (IC5)
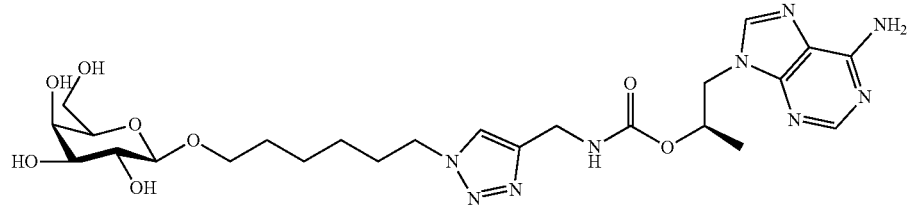
Formula (IC6)
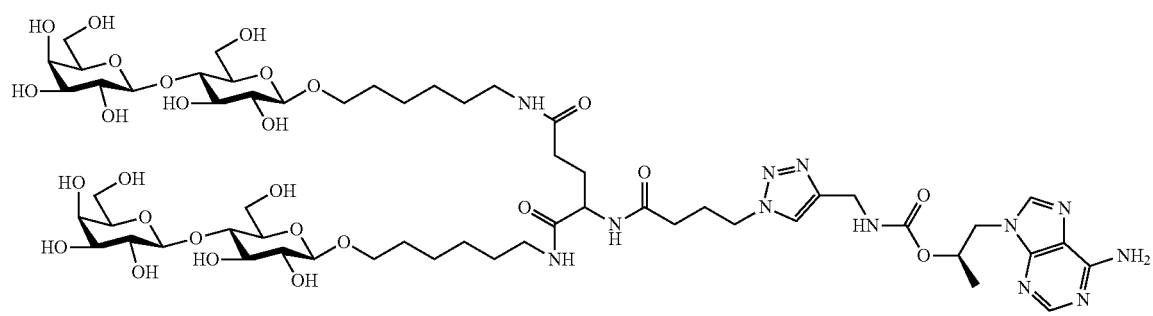
Formula (IC7)
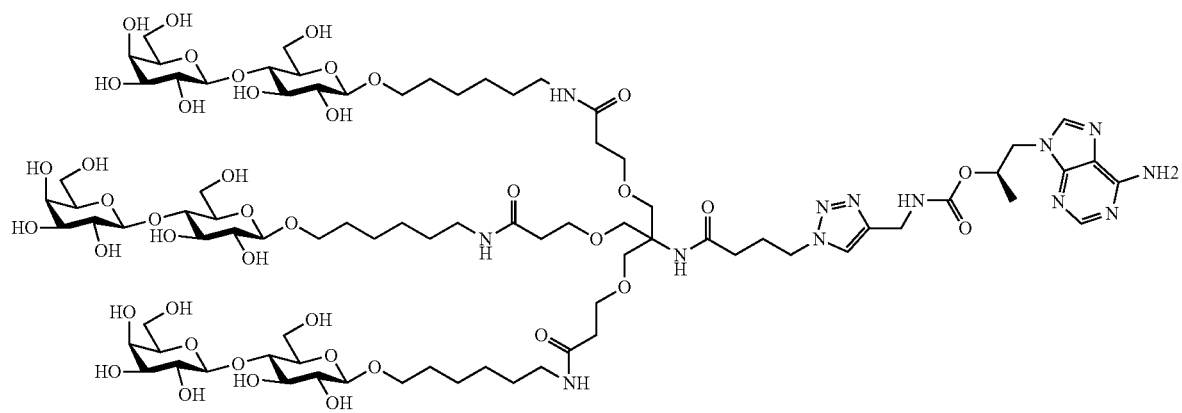
Formula (IC8)
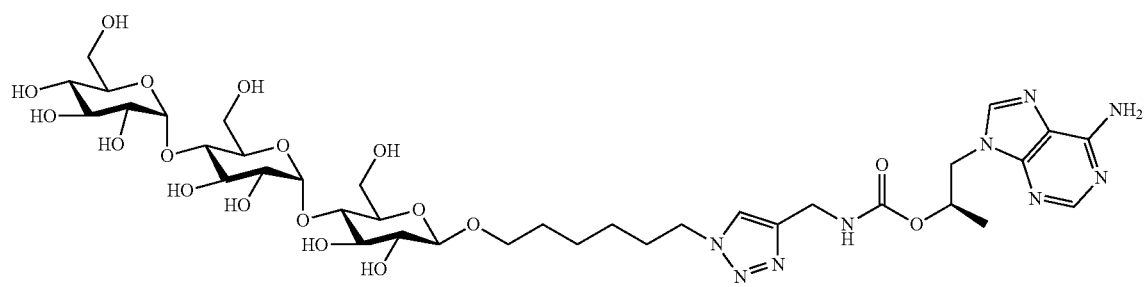

Formula (IC9)
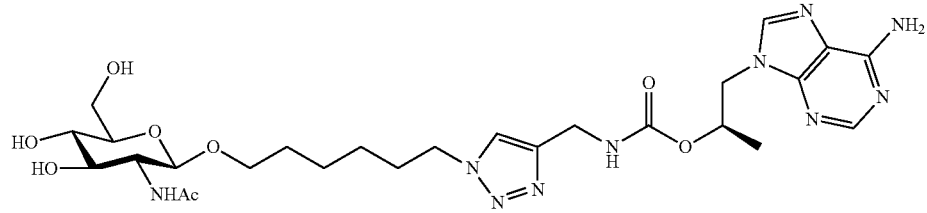
Formula (IC10)
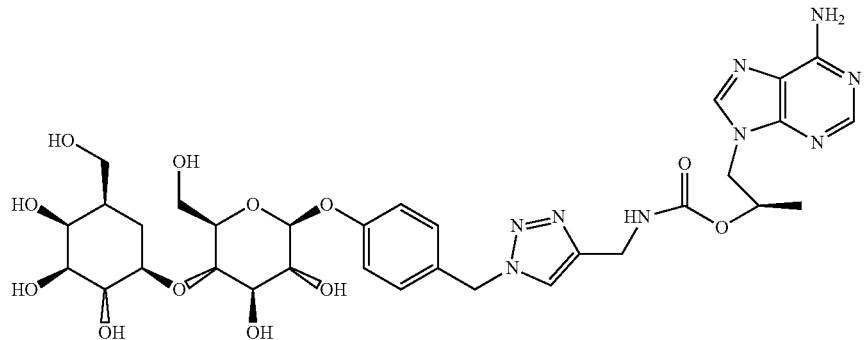
Formula (IC11)
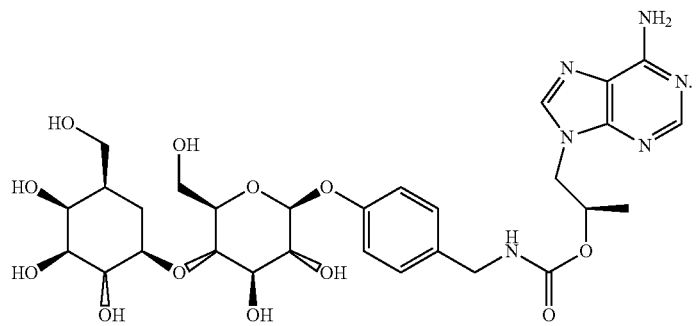
Formula (IE1)
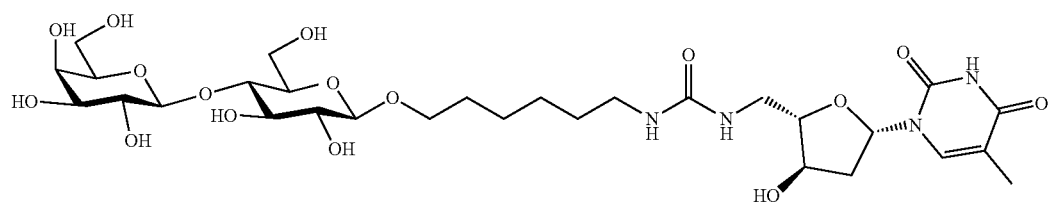
Formula (IF1)
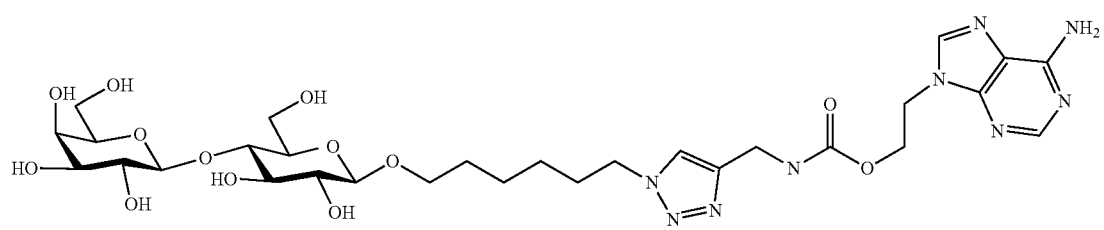
Formula (IF2)
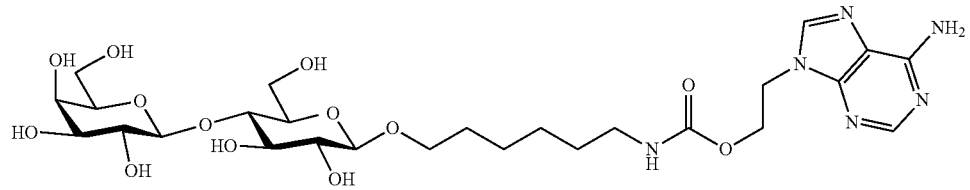

-continued

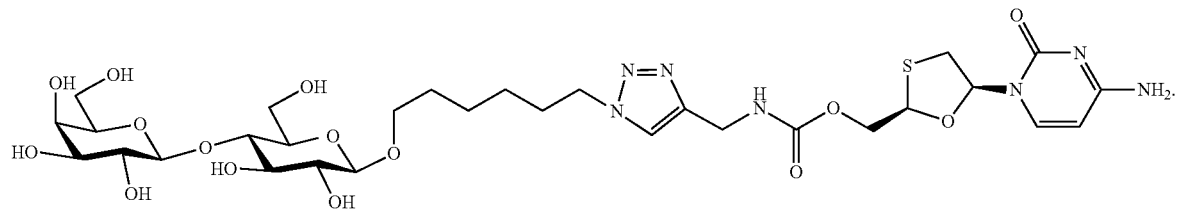

Formula (IG1)

In some embodiments, the drug conjugate further comprises a second drug conjugate represented by formula (I), and wherein in formula (I) the drug compound Z is a second drug compound Y selected from the group consisting of Birinapant, monomer Birinapant, Xevinapant, LCL161, GDC-0152, GDC-0917, CUDC-427, APG-1387, DeBio-1143 or analogues, precursors, prodrugs, derivatives thereof, or any IAP inhibitors.

In some embodiments, the second drug conjugate represented by formula (I) is further represented by any one of formula (IB1) to (IB11) or any one of formula (ID1) to (ID5), any one of formula (IH1) to (IH3), or formula (IJ1) or formula (IJ2):

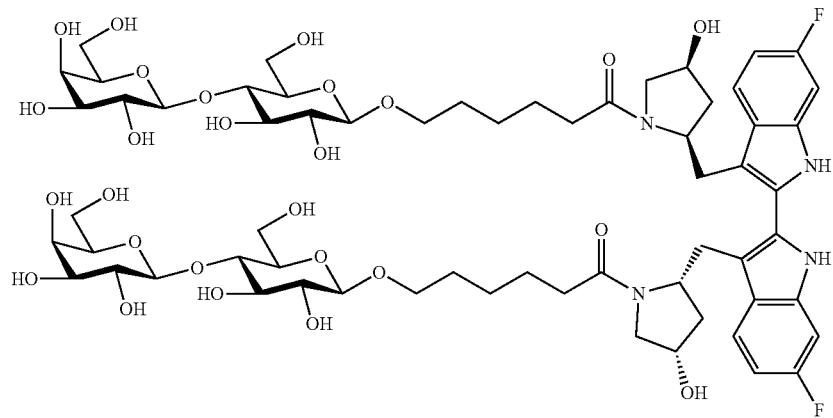

Formula (IB1)

Formula (IB2)
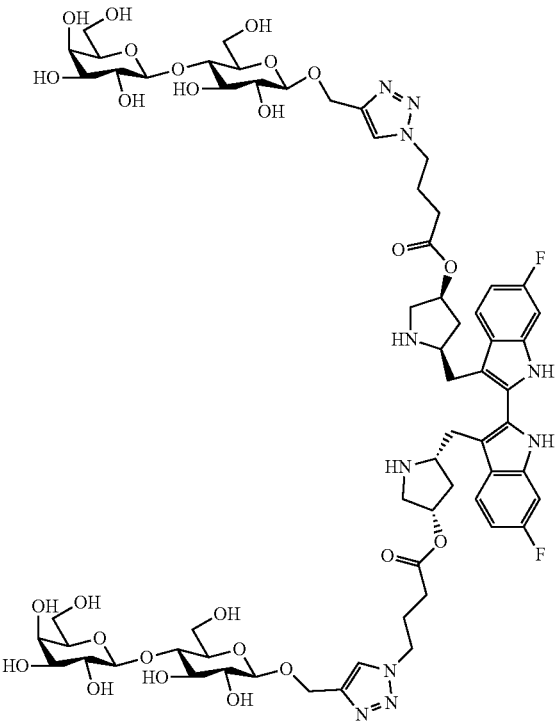
Formula (IB3)
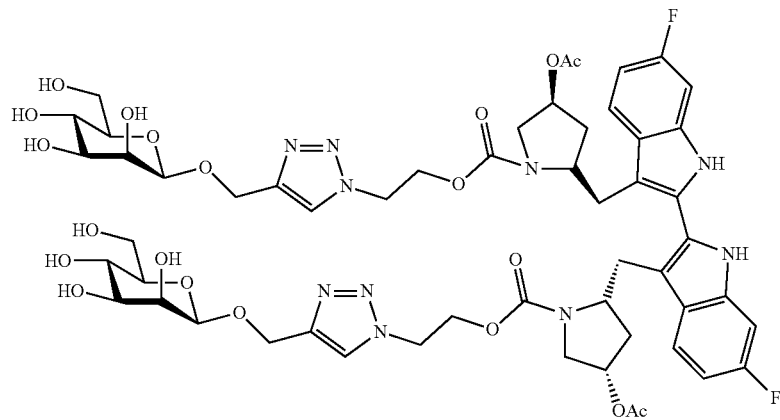
Formula (IB4)
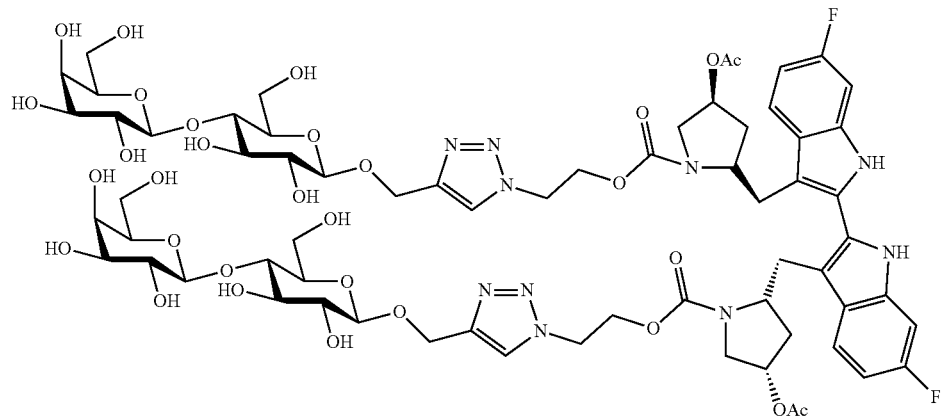

Formula (IB5)
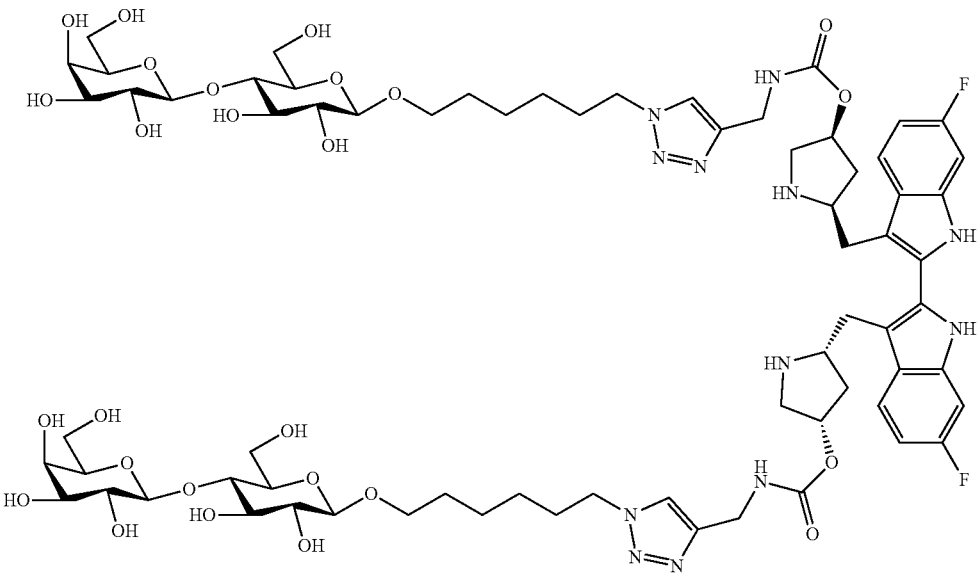
Formula (IB6)
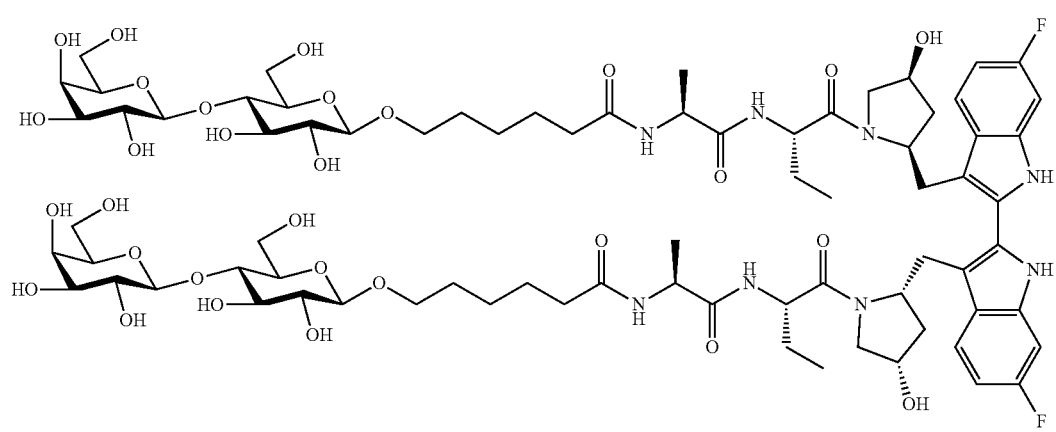
Formula (IB7)
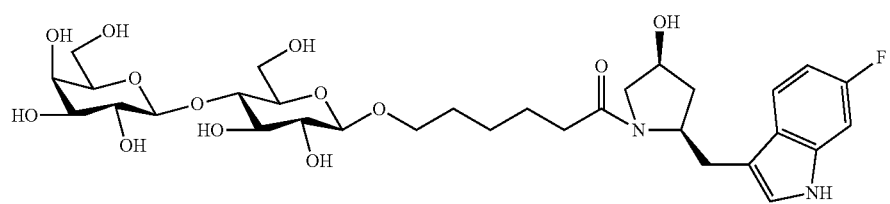
Formula (IB8)
Formula (IB9)
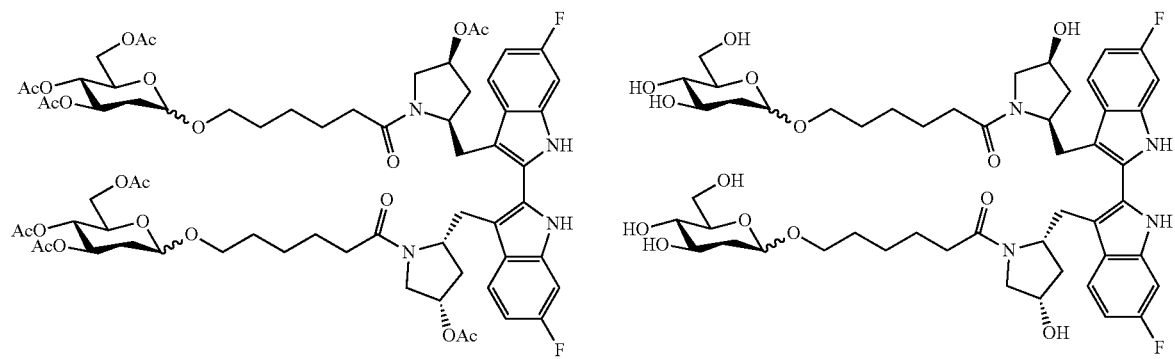

-continued
Formula (IB10)
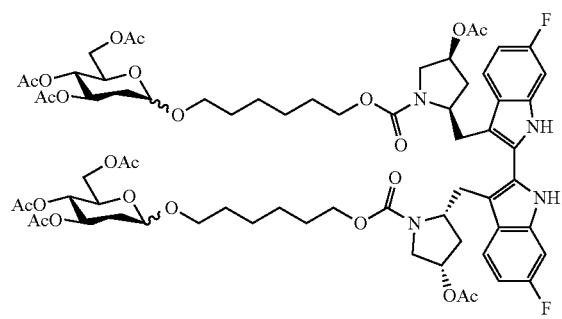
Formula (IB11)
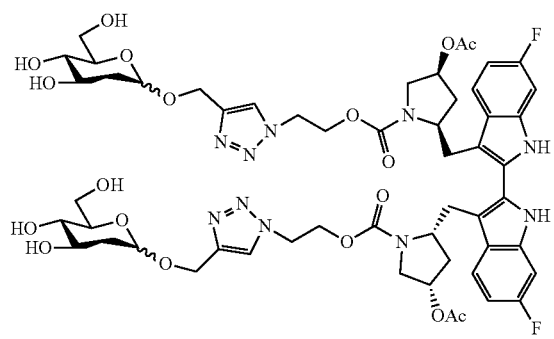
Formula (ID1)
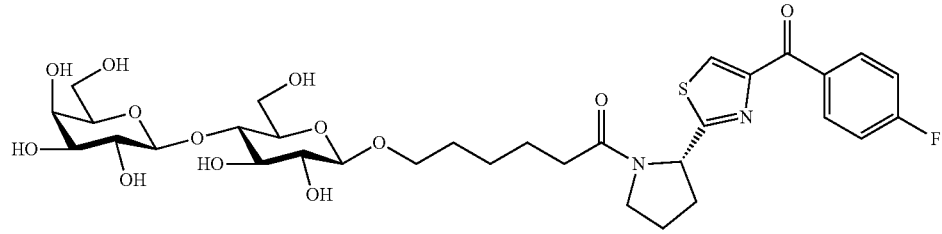
Formula (ID2)
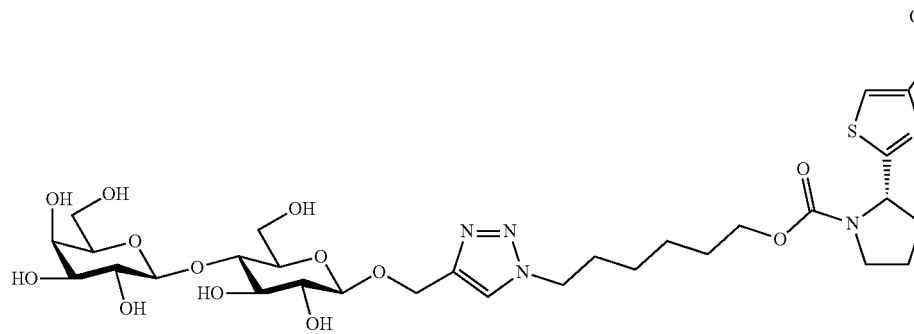
Formula (ID3)
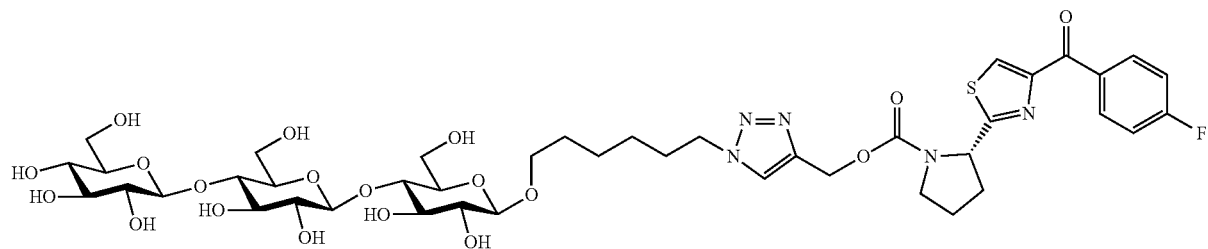
Formula (ID4)
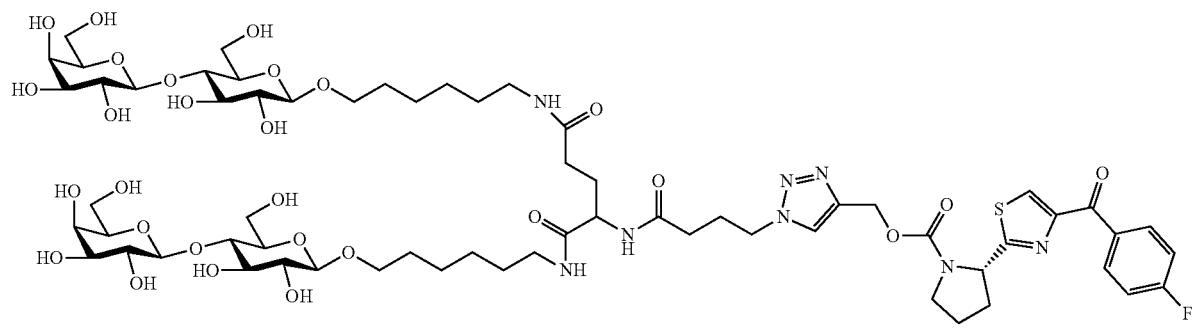

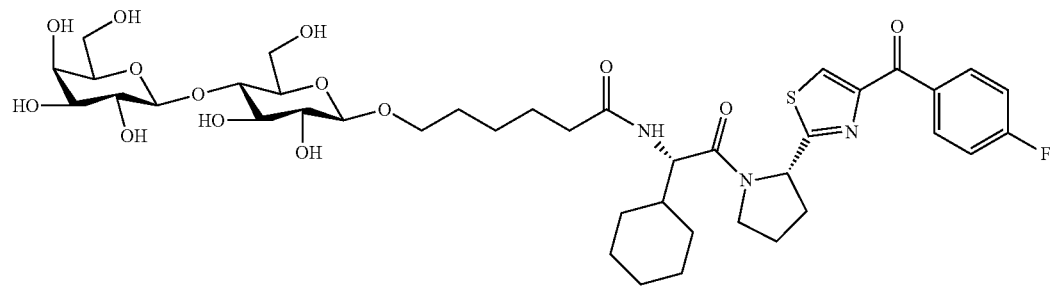
Formula (ID5)
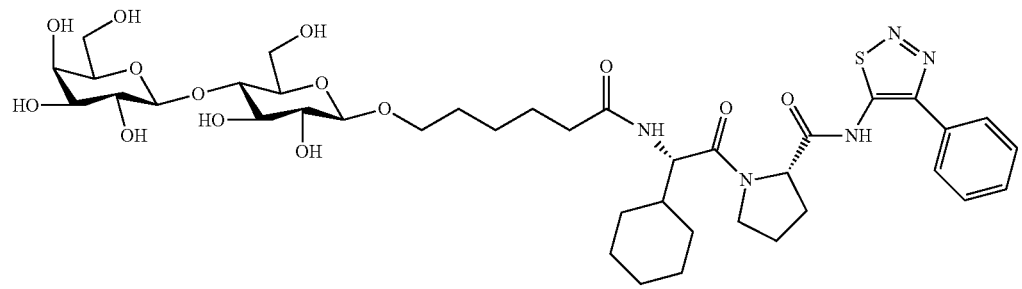
formula (IH1)
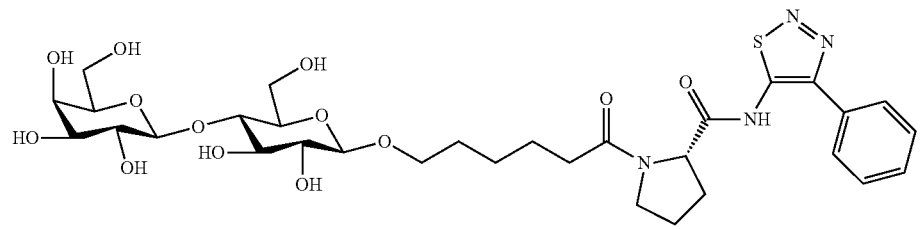
formula (IH2)
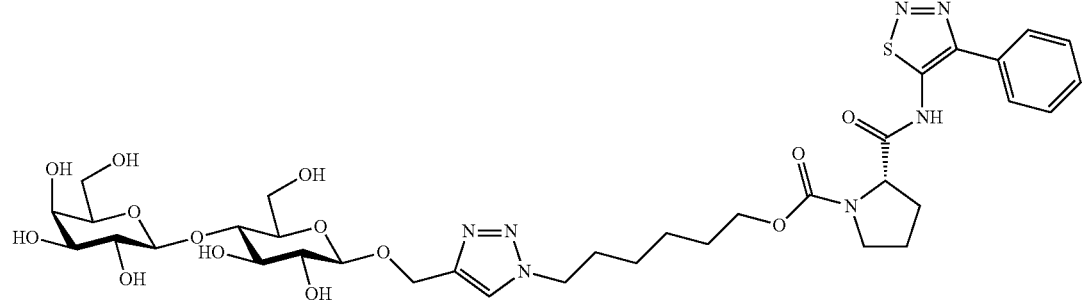
formula (IH3)
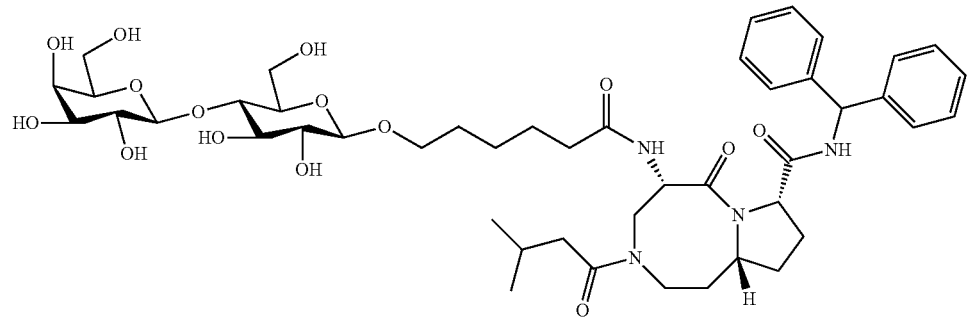
formula (IJ1)

-continued

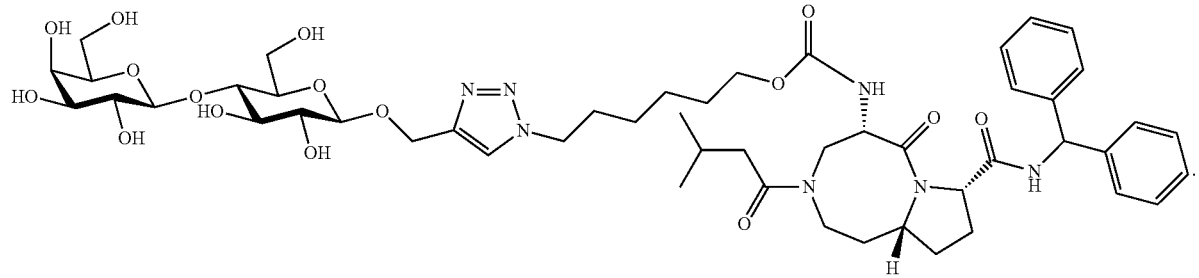

formula (IJ2)

In some embodiments, the first drug conjugate is a compound represented by formula (IA1), and the second drug conjugate is a compound represented by formula (IB1):

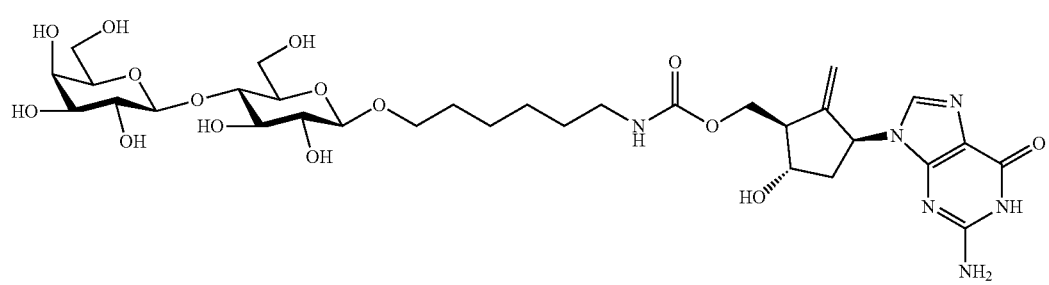

Formula (IA1)

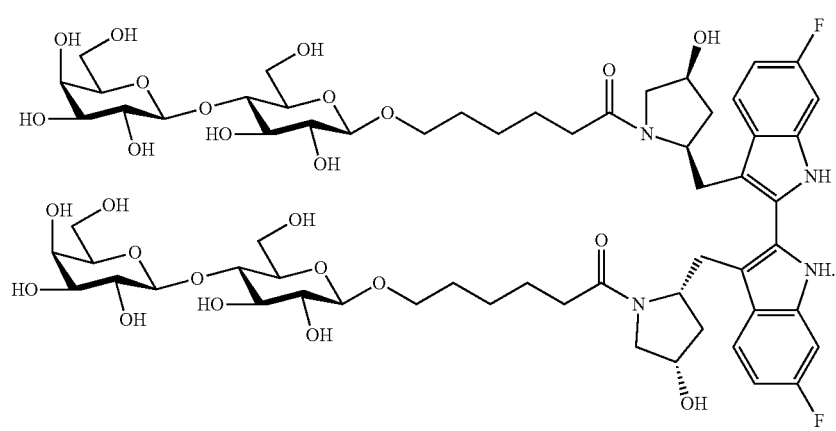

Formula (IB1)

In some embodiments, the first drug conjugate and the second drug conjugate are respectively administered in a dose of 0.1 mg/kg to 100 mg/kg.

In some embodiments, the sugar R is a monosaccharide, a disaccharide, a trisaccharide, a tetrasaccharide, an oligosaccharide, a polysaccharide, or derivatives thereof.

In some embodiments, the linker is selected from the group consisting of substituted or unsubstituted alkyl, substituted or unsubstituted alkenyl, substituted or unsubstituted alkynyl, arylalkyl, arylalkenyl, arylalkynyl, heteroarylalkyl, heteroarylalkenyl, heteroarylalkynyl, heterocyclylalkyl, heterocyclylalkenyl, heterocyclylalkynyl, aryl, heteroaryl, heterocyclyl, cycloalkyl, cycloalkenyl, alkylarylalkyl, alkylarylalkenyl, alkylarylalkynyl, alkenylarylalkyl, alkenylarylalkenyl, alkenylarylalkynyl, alkynylarylalkyl, alkynylarylalkenyl, alkynylarylalkynyl, alkylheteroarylalkyl, alkylheteroarylalkenyl, alkylheteroarylalkynyl, alkenyl- heteroarylalkyl, alkenylheteroarylalkenyl, alkenylheteroarylalkynyl, alkynylheteroarylalkyl, alkynylheteroarylalkenyl, alkynylheteroarylalkynyl, alkylheterocyclylalkyl, alkylheterocyclylalkenyl, alkylhererocyclylalkynyl, alkenylheterocyclylalkyl, alkenylheterocyclylalkenyl, alkenylheterocyclylalkynyl, alkynylheterocyclylalkyl, alkynylheterocyclylalkenyl, alkynylheterocyclylalkynyl, alkylaryl, alkenylaryl, alkynylaryl, alkylheteroaryl, alkenylheteroaryl, alkynylhereroaryl, which one or more methylenes can be interrupted or terminated by O, S, S(O), $SO_2$, $N(R^8)$, C(O), substituted or unsubstituted aryl, substituted or unsubstituted heteroaryl, substituted or unsubstituted heterocyclic; where $R^8$ is hydrogen, acyl, aliphatic or substituted aliphatic.

In some embodiments, the pharmaceutical composition is prepared into tablets, capsules, granules, powders, solutions, syrups, spray, injections or inhalations.

In some embodiments, the at least one or more pharmaceutically acceptable excipients is selected from the group consisting of fillers, extenders, binders, blending agents, surfactants, emulsifiers, dispersing agents, defoamers, lubricants, nonstick agents, blenders, coating materials, glidants, anti-sticking agents, diluents, dyes, pigments, dispersants, wetting agents, and combinations thereof.

In accordance with some embodiments, a method of treating hepatitis is described, wherein the method includes administering a therapeutically effective amount of the drug conjugate to a patient having hepatitis (hepatitis B, hepatitis C, viral hepatitis, or the like).

In accordance with some embodiments, a method of treating hepatitis is described, wherein the method includes administering the pharmaceutical composition to a patient having hepatitis.

According to the above embodiments, the drug conjugate or the pharmaceutical composition of the present disclosure is more effective than conventional drugs in the treatment of hepatitis B. For example, the drug conjugate or the pharmaceutical composition may further lower the hepatitis B surface antigen (HBsAg) and hepatitis B e antigen (HBeAg) levels while improving hepatitis B surface antibody (anti-HBsAg) levels as compared with conventional hepatitis B treatment methods. From a preliminary evaluation, the inventors have also found that modifying HCV drugs to form a drug conjugate having similar linkers and sugars may also be promising for providing a more effective treatment of hepatitis C.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
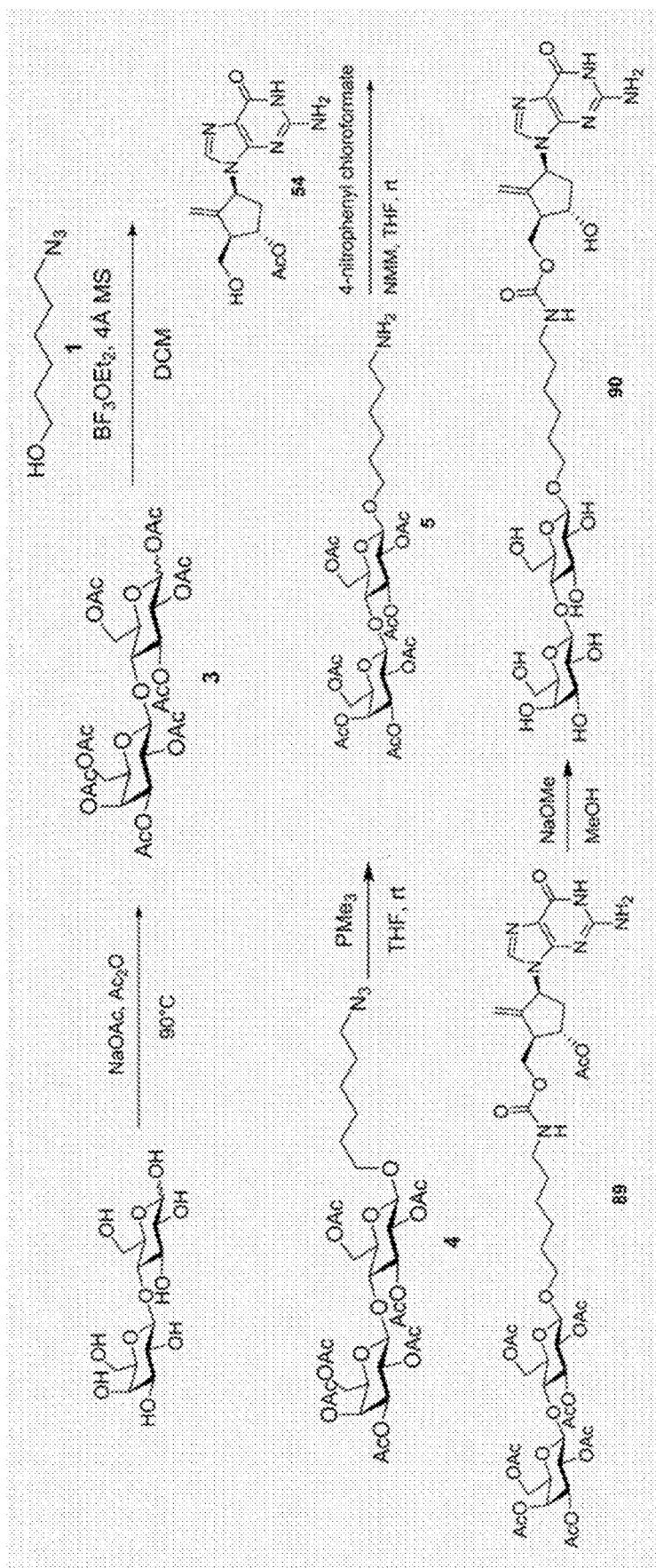
FIG. 1 is a scheme illustrating the synthesis of the drug conjugate of formula (IA1).

In the present disclosure, a drug conjugate having the structure shown in formula (I) is described:

Z-(linker-[R]$_m$)$_n$   formula (I)

wherein, in formula (I), Z is a drug compound, R is a sugar, and m and n are independently an integer from 1 to 6.

In the exemplary embodiment, the drug compound Z is a hepatitis virus targeting drug, a hepatitis B virus (HBV) drug, a hepatitis C virus (HCV) drug, an inhibitor of apoptosis protein (IAP) antagonist, a multidrug resistance (MDR) inhibitor, or analogues, precursors, prodrugs, derivatives thereof. In the exemplary embodiment, since the drug conjugate is used for hepatitis B treatment, the drug compound Z used is selected from an HBV drug or IAP antagonist. In some embodiments, the drug conjugate is used for hepatitis C treatment. In some other embodiments, the drug conjugate is used for human immunodeficiency virus (HIV) treatment. However, the disclosure is not limited thereto. In some alternative embodiments, when the drug conjugate is used for treatment of other diseases, other type of drugs may be used to form the drug conjugate shown in formula (I).

In some embodiments, when the drug compound Z is an HBV drug or an IAP antagonist, the drug compound Z is selected from the group consisting of Tenofovir, Tenofovir diisoproxil, Tenofovir alafenamide, Entecavir, Telbivudine, Adefovir, Adefovir dipivoxil, Lamivudine, Interferon-α-2A, Interferon-α-2B, Birinapant, monomer Birinapant, Xevinapant, LCL161, GDC-0152, GDC-0917, CUDC-427, APG-1387, Selgantolimod, BI-82, and Zosuquidar or analogues, precursors, prodrugs, derivatives thereof. For example, Tenofovir, Tenofovir diisoproxil, Tenofovir alafenamide, Entecavir, Telbivudine, Adefovir, Adefovir dipivoxil, Lamivudine, Interferon-α-2A, Interferon-α-2B, Selgantolimod, BI-82 and Zosuquidar are HBV drugs, while Birinapant, monomer Birinapant, Xevinapant, LCL161, GDC-0152, GDC-0917, CUDC-427, and APG-1387 are IAP antagonists. However, the disclosure is not limited thereto, and other HBV drugs, IAP antagonists, or analogues, precursors, derivatives thereof known in the art may be exemplified.

In some other embodiments, when the drug compound Z is an HCV drug, the drug compound Z is selected from the group consisting of Glecaprevir, Pibrentasvir, Ombitasvir, Paritaprevir, Ritonavir, Sofosbuvir, Velapatasvir, Ledipasvir, Voxilaprevir, Daclatasvir, Asunaprevir, Telaprevir, Elbasvir, Grazoprevir, Ribavarin, Telaprevir, EDP-239, Alisporivir, Filibuvir, Mericitabine, Danoprevir, and Velpatasvir, or analogues, precursors, prodrugs, derivatives thereof.

HBV Drugs (or analogues, precursors, derivatives thereof):

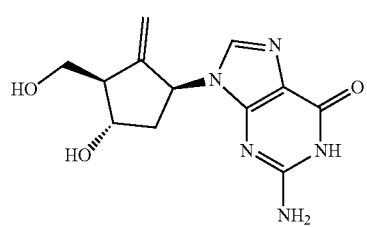

Entecavir

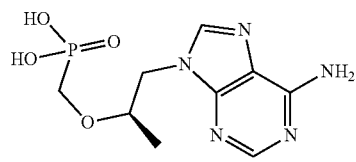

Tenofovir

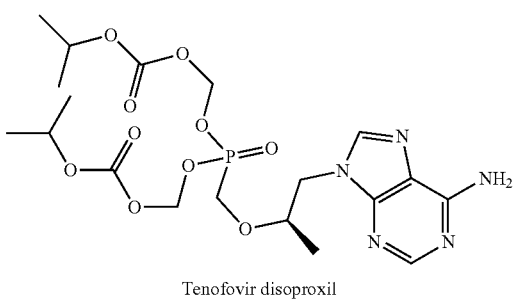

Tenofovir disoproxil

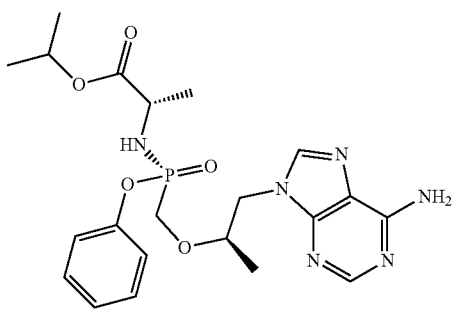

Tenofovir alafenamide

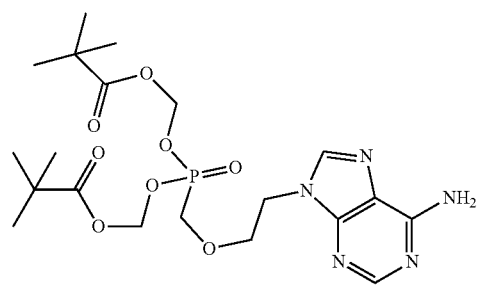

Aldefavir dipivoxil

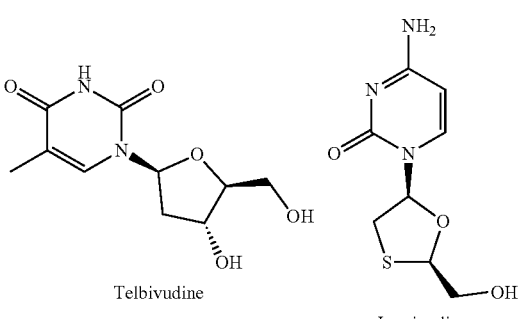

Telbivudine          Lamivudine

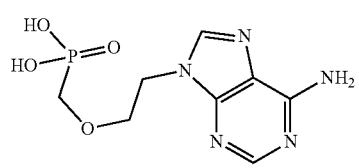

Adefovir

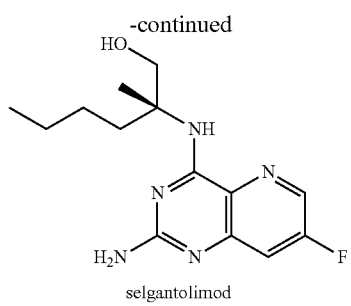
selgantolimod
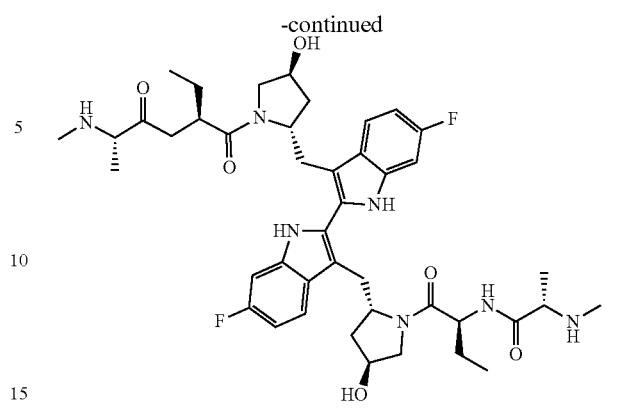
Binnapant
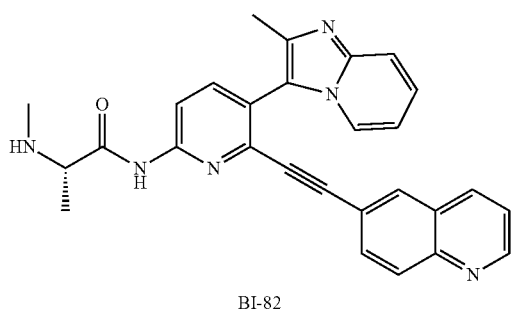
BI-82
IAP antagonists (or analogues, precursors, derivatives thereof):
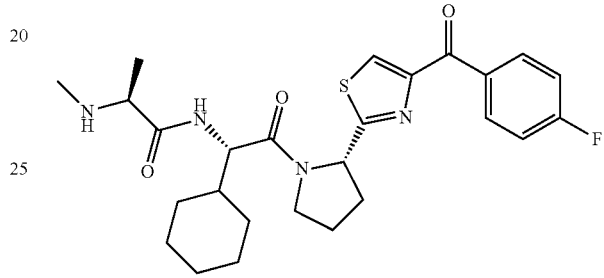
LCL-161
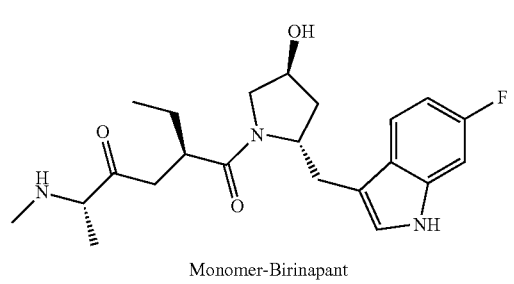
Monomer-Birinapant
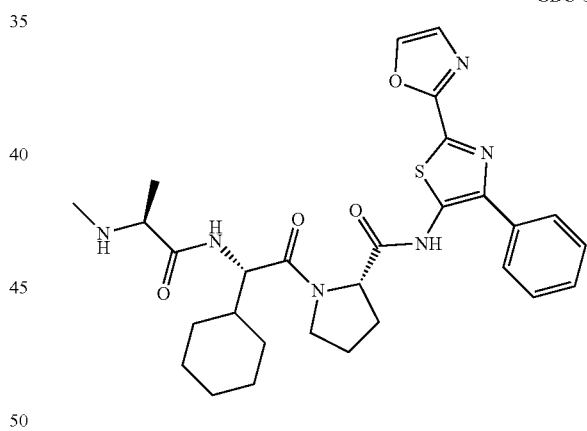
GDC-0917
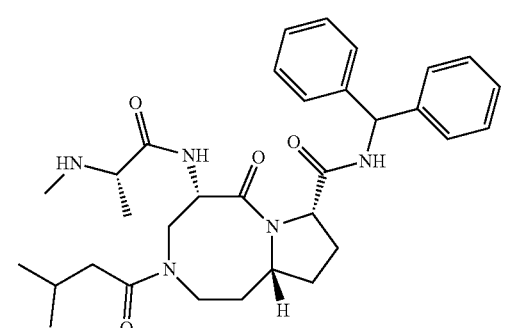
Xevinapant (Debio 1143)
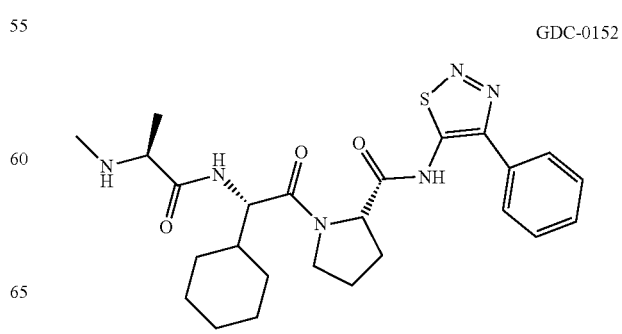
GDC-0152

-continued

APG-1387

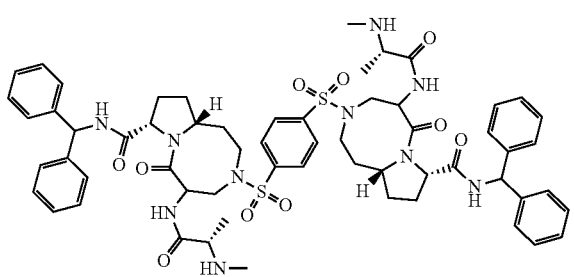

In some embodiments, the sugar R is a monosaccharide, a disaccharide, a trisaccharide, a tetrasaccharide, an oligosaccharide, a polysaccharide, or derivatives thereof. The term "monosaccharide" may include allose, altrose, arabinose, cladinose, erythrose, erythrulose, fructose, D-fucitol, L-fucitol, fucosamine, fucose, fuculose, galactosamine, D-galactosaminitol, N-acetyl-galactosamine, galactose, glucosamine, N-acetyl-glucosamine, glucosaminitol, glucose, glucose-6-phosphate, gulose glyceraldehyde, L-glycero-D-mannos-heptose, glycerol, glycerone, gulose, idose, lyxose, mannosamine, mannose, mannose-6-phosphate, psicose, quinovose, quinovosamine, rhamnitol, rhamnosamine, rhamnose, ribose, ribulose, sedoheptulose, sorbose, tagatose, talose, tartaric acid, threose, xylose and xylulose. The monosaccharide can be in D- or L configuration. The monosaccharide may further be a deoxy sugar (alcoholic hydroxy group replaced by hydrogen), amino sugar (alcoholic hydroxy group replaced by amino group), a thio sugar (alcoholic hydroxy group replaced by thiol, or C=O replaced by C=S, or a ring oxygen of cyclic form replaced by sulfur), a seleno sugar, a telluro sugar, an aza sugar (ring carbon replaced by nitrogen), an imino sugar (ring oxygen replaced by nitrogen), a phosphano sugar (ring oxygen replaced with phosphorus), a phospha sugar (ring carbon replaced with phosphorus), a C-substituted monosaccharide (hydrogen at a non-terminal carbon atom replaced with carbon), an unsaturated monosaccharide, an alditol (carbonyl group replaced with CHOH group), aldonic acid (aldehydic group replaced by carboxy group), a ketoaldonic acid, a uronic acid, an aldaric acid, and so forth. Amino sugars include amino monosaccharides, preferably galactosamine, glucosamine, mannosamine, fucosamine, quinovosamine, neuraminic acid, muramic acid, lactosediamine, acosamine, bacillosamine, daunosamine, desosamine, forosamine, garosamine, kanosamine, kansosamine, mycaminose, mycosamine, perosamine, pneumosamine, purpurosamine, rhodosamine. In some embodiments, the monosaccharide and the like can be further substituted.

In some embodiments, in formula (I), the linker is selected from the group consisting of substituted or unsubstituted alkyl, substituted or unsubstituted alkenyl, substituted or unsubstituted alkynyl, arylalkyl, arylalkenyl, arylalkynyl, heteroarylalkyl, heteroarylalkenyl, heteroarylalkynyl, heterocyclylalkyl, heterocyclylalkenyl, heterocyclylalkynyl, aryl, heteroaryl, heterocyclyl, cycloalkyl, cycloalkenyl, alkylarylalkyl, alkylarylalkenyl, alkylarylalkynyl, alkenylarylalkyl, alkenylarylalkenyl, alkenylarylalkynyl, alkynylarylalkyl, alkynylarylalkenyl, alkynylarylalkynyl, alkylheteroarylalkyl, alkylheteroarylalkenyl, alkylheteroarylalkynyl, alkenylheteroarylalkyl, alkenylheteroarylalkenyl, alkenylheteroarylalkynyl, alkynylheteroarylalkyl, alkynylheteroarylalkenyl, alkynylheteroarylalkynyl, alkylheterocyclylalkyl, alkylheterocyclylalkenyl, alkylhererocyclylalkynyl, alkenylheterocyclylalkyl, alkenylheterocyclylalkenyl, alkenylheterocyclylalkynyl, alkynylheterocyclylalkyl, alkynylheterocyclylalkenyl, alkynylheterocyclylalkynyl, alkylaryl, alkenylaryl, alkynylaryl, alkylheteroaryl, alkenylheteroaryl, alkynylhereroaryl, which one or more methylenes can be interrupted or terminated by O, S, S(O), SO$_2$, N(R$^8$), C(O), substituted or unsubstituted aryl, substituted or unsubstituted heteroaryl, substituted or unsubstituted heterocyclic; where R$^8$ is hydrogen, acyl, aliphatic or substituted aliphatic.

In some embodiments, one, two or more of the linker, and one, two or more of the sugars R may be conjugated to the drug compound Z (e.g. n is 1 to 6). Furthermore, one, two or more of the sugars R may be conjugated to the linker (e.g. m is 1 to 6). In other words, the drug compound Z may be monovalent, bivalent, trivalent or multivalent. In case where two or more sugars R and two or more linkers are used in the drug conjugate, the sugars R and the linkers may independently be the same or different. In the exemplary embodiment, although one linker is shown to be joined with one sugar R, however, the disclosure is not limited thereto. In some alternative embodiments, two or more sugars R, or two or more drug compounds Z may be joined with one linker. In other words, the linker may have a branched structure. In certain embodiments, in the drug conjugate, the drug compound Z is conjugated to the linker to form a carbamate linkage (>N—C(=O)—O—), whereby the carbamate linkage may include parts of the drug compound Z and parts of the linker. In certain embodiments, the linker at least comprises a triazole. In some other embodiments, in the drug conjugate, the drug compound Z is conjugated to the linker to form a carbamate linkage (>N—C(=O)—O—), an amide linkage (R—C(=O)—N<), a carbonate linkage (RO—C(=O)—OR'), or an ester linkage (R—C(=O)—OR').

In some embodiments, the linker in formula (I) includes L$^1$(L$^2$)$_p$ groups, wherein the L$^1$ group is linked to the drug compound Z, and the L$^2$ group is linking the L$^1$ group to the sugar R, wherein p is an integer from 1 to 4. The L$^1$ group may include carbamate, amide, ester, amidine, carboximidate, sulfonate, sulfate, sulfonamide, thioether, ether, imine, imide, thioamide, carbonate, thiocarbamide, carbamide, triazole, amine, oxime, thiocarbonate, thioester, or thiocarbamate groups that is linked to the drug compound Z. The L$^2$ group is a single bond, an alkyl having 1 to 50 carbons, alkoxy having 1 to 50 carbons, alkenyl having 2 to 50 carbons, or alkenyloxy having 2 to 50 carbons, and in the above groups, the alkyl, alkoxy, alkenyl, alkenyloxy may be linear or branched, at least one —CH$_2$— may be replaced by —CO—, —COO—, —OCO—, —S—, —O—, or —NH—, at least one —CH$_2$CH$_2$— may be replaced by —CH=CH— or —C≡C—, and at least one hydrogen in —CH$_2$—, —CH= or —NH— described above may be replaced by a halogen, trifluoromethyl, alkyl having 1 to 20 carbons, alkoxy having 1 to 20 carbons, or alkanoyl having 1 to 20 carbons, and at least one —O— above can be replaced with a phosphate, phosphonate, phosphinate, phosphine oxide, phosphoramide, phosphoramidate, phosphite, phosphonite, phosphine, aminophosphine, phosphoramidite, phosphonamidite, phosphonamide, phosphinamide or phosphorodiamidite group.

In certain embodiments, the L$^1$ group is carbamate, amide, carbonate or ester, and the L$^2$ group is an alkyl having 1 to 20 carbons, alkoxy having 1 to 20 carbons, alkenyl having 2 to 20 carbons, or alkenyloxy having 2 to 20 carbons, and in the above groups, the alkyl, alkoxy, alkenyl, alkenyloxy may be linear or branched, at least one —CH$_2$— may be replaced by —CO—, —COO—, —OCO—, —S—, —O—, or —NH—, at least one —CH$_2$CH$_2$— may be replaced by —CH=CH—.

In some embodiments, the linker has the following structure:
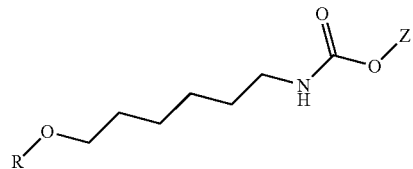 (LX1)
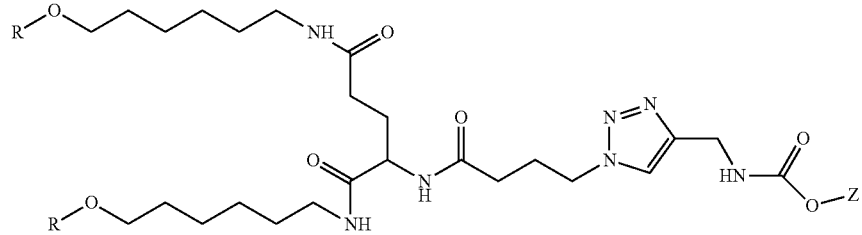 (LX2)
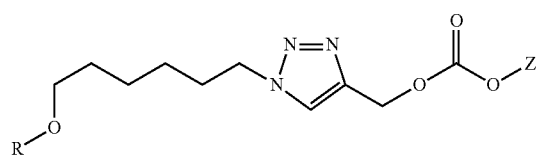 (LX3)
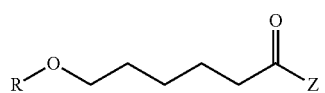 (LX4)
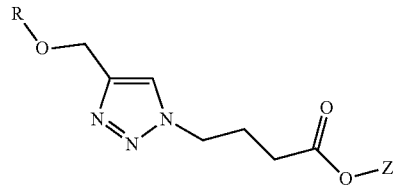 (LX5)
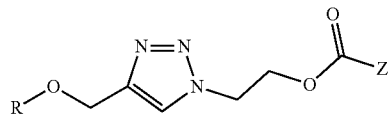 (LX6)
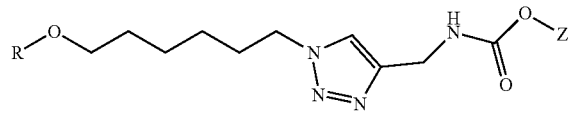 (LX7)
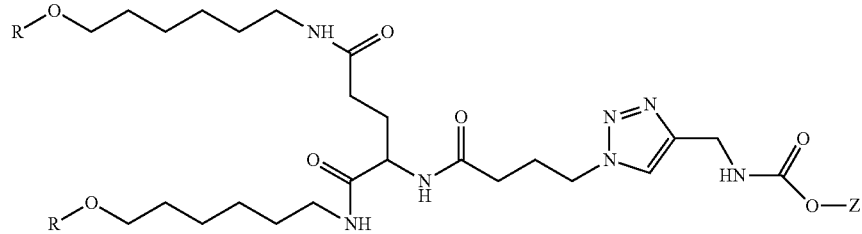 (LX8)

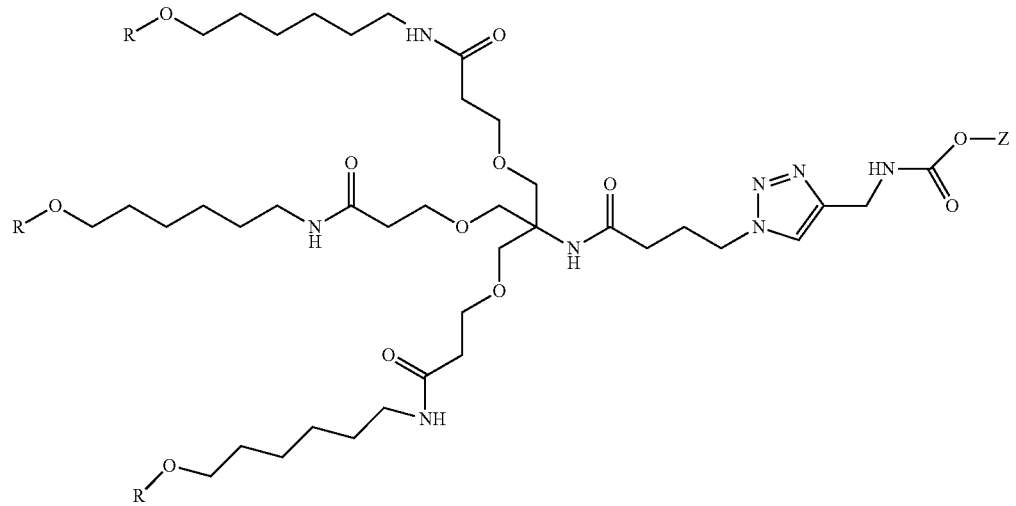
(LX9)
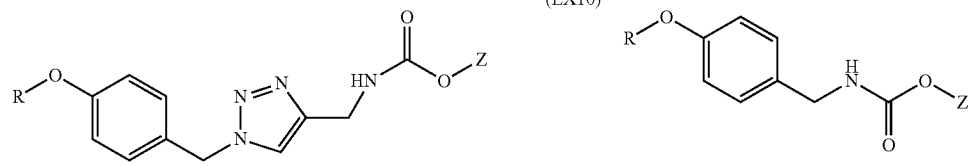
(LX10) (LX11)
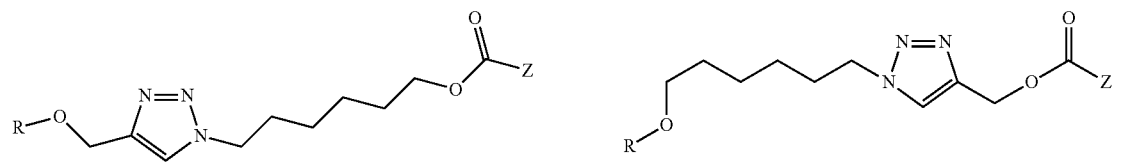
(LX12) (LX13)
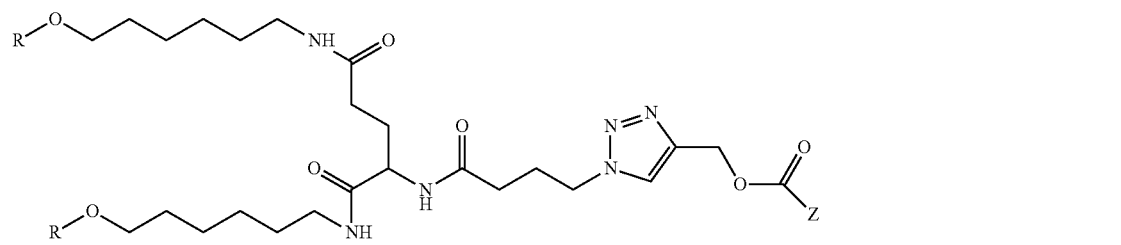
(LX14)
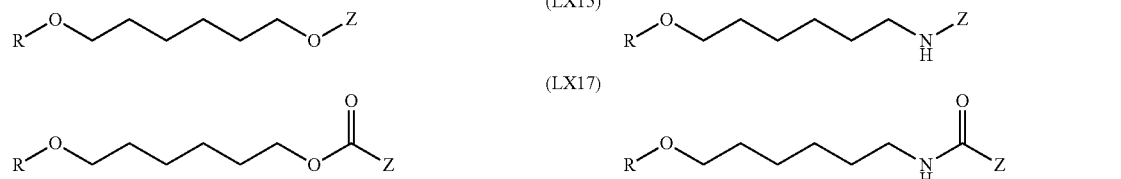
(LX15) (LX16)
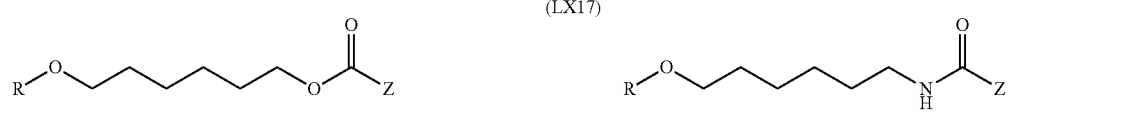
(LX17) (LX18)
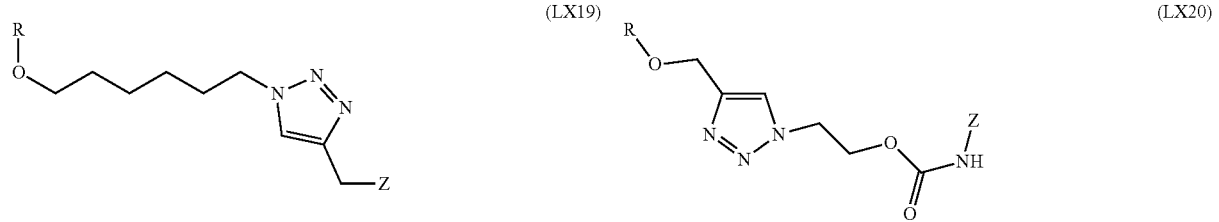
(LX19) (LX20)

-continued
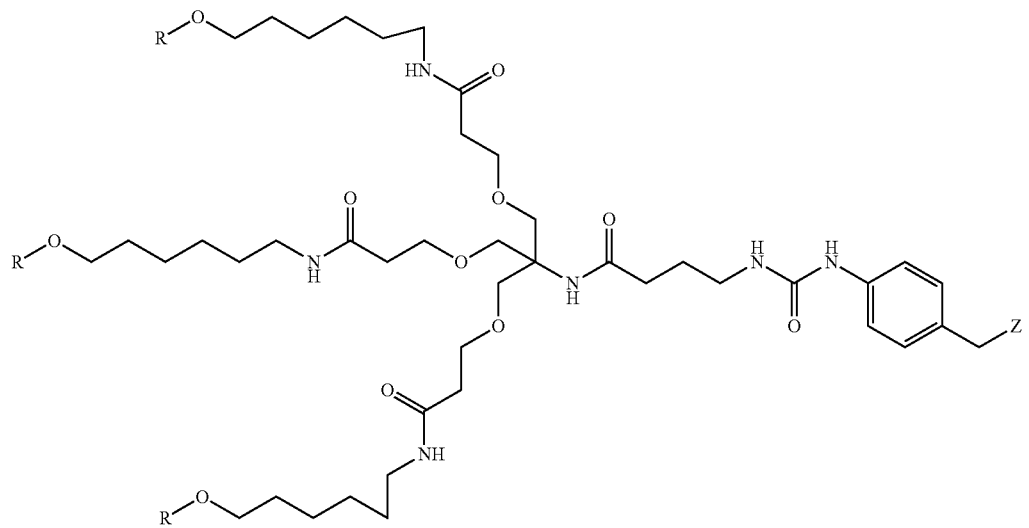
(LX21)
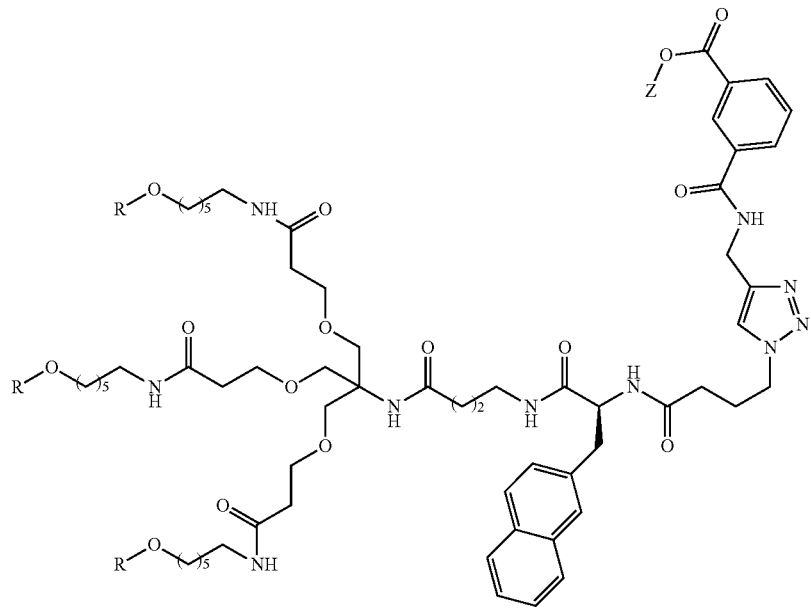
(LX22)
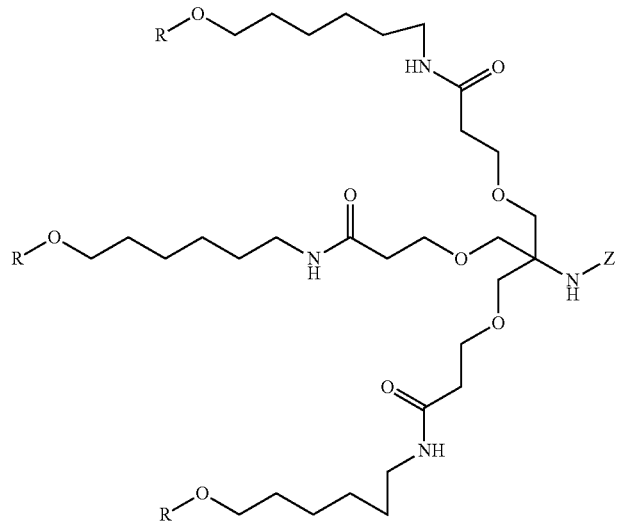
(LX23)

-continued
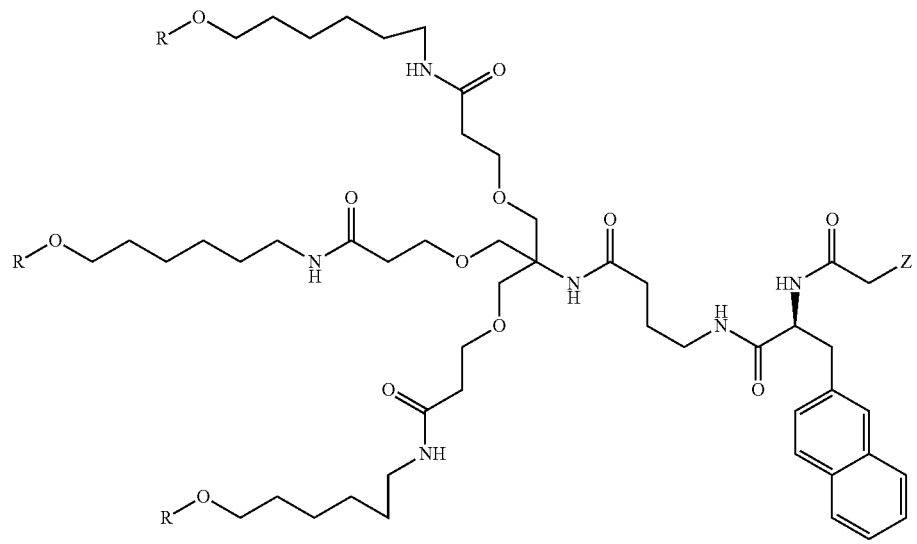
(LX24)
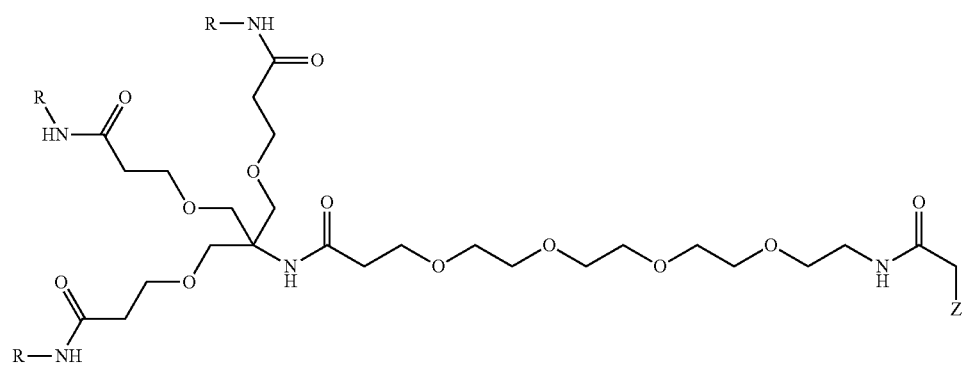
(LX25)
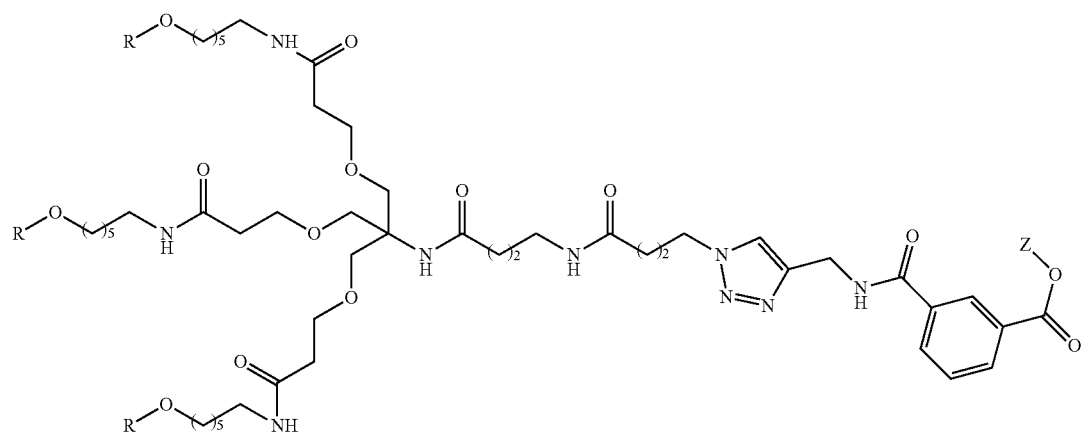
(LX26)

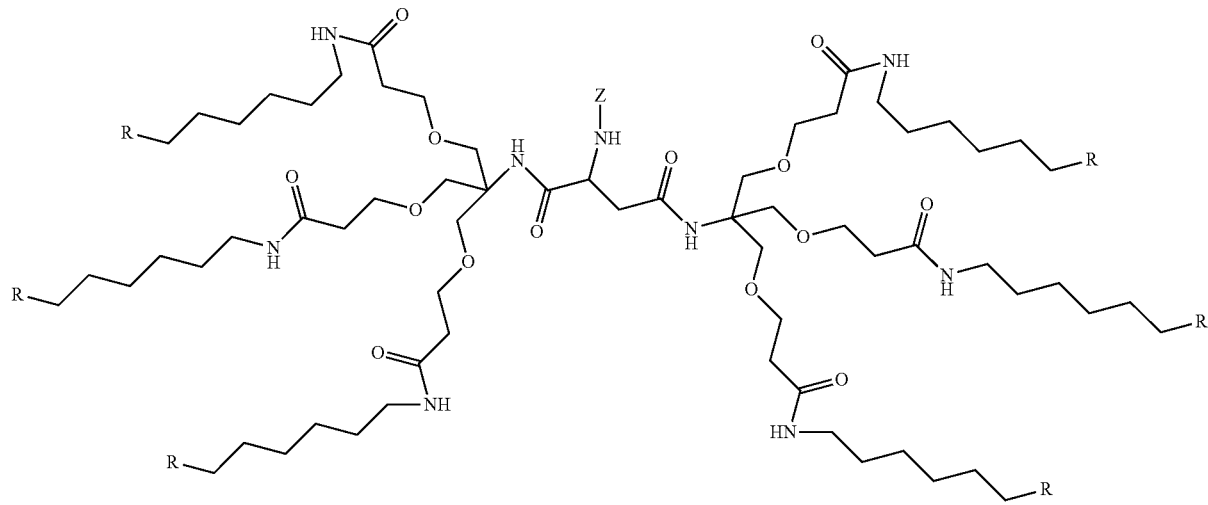
(LX27)
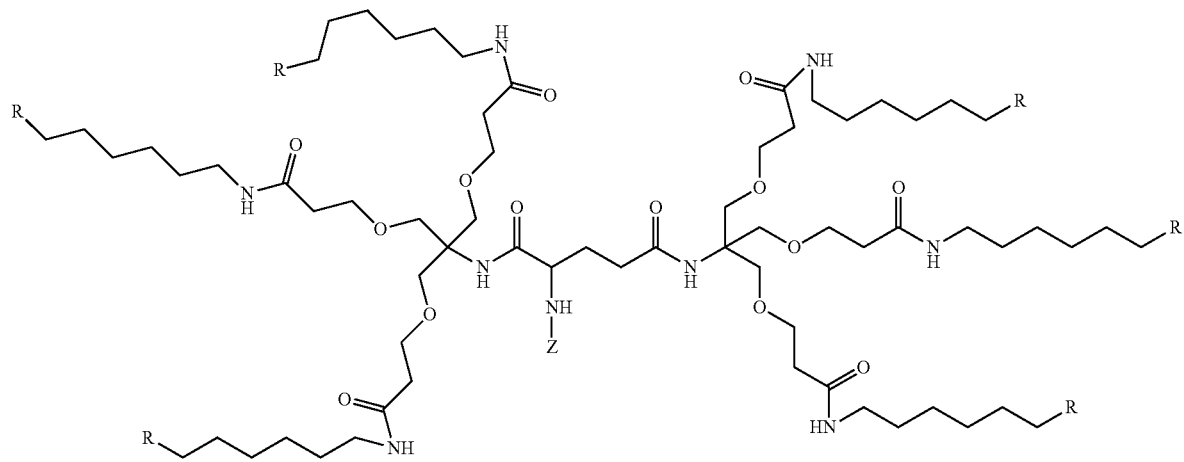
(LX28)
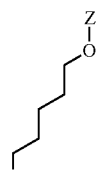
(LX29)

-continued
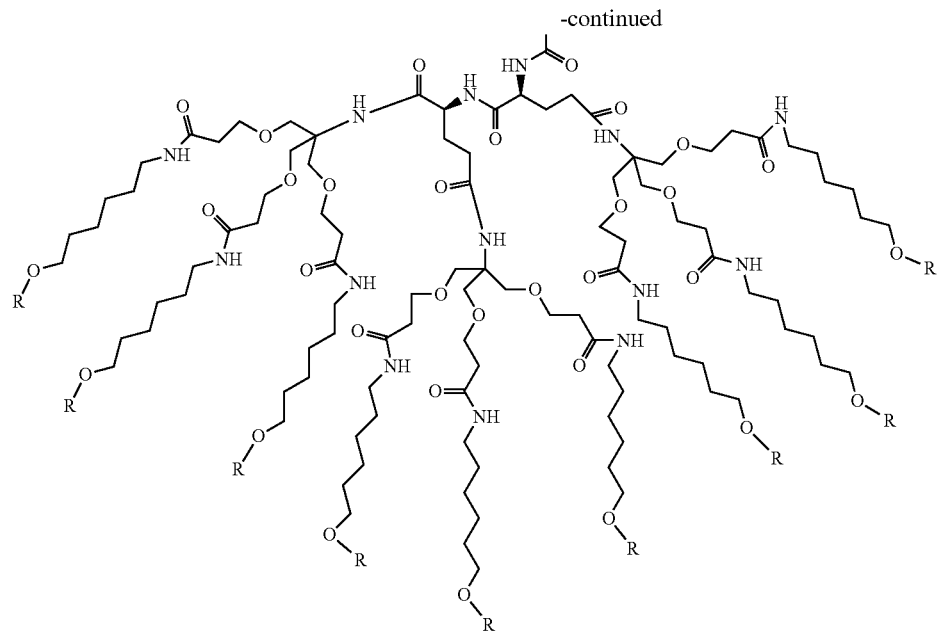
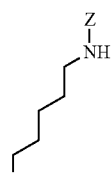
(LX30)
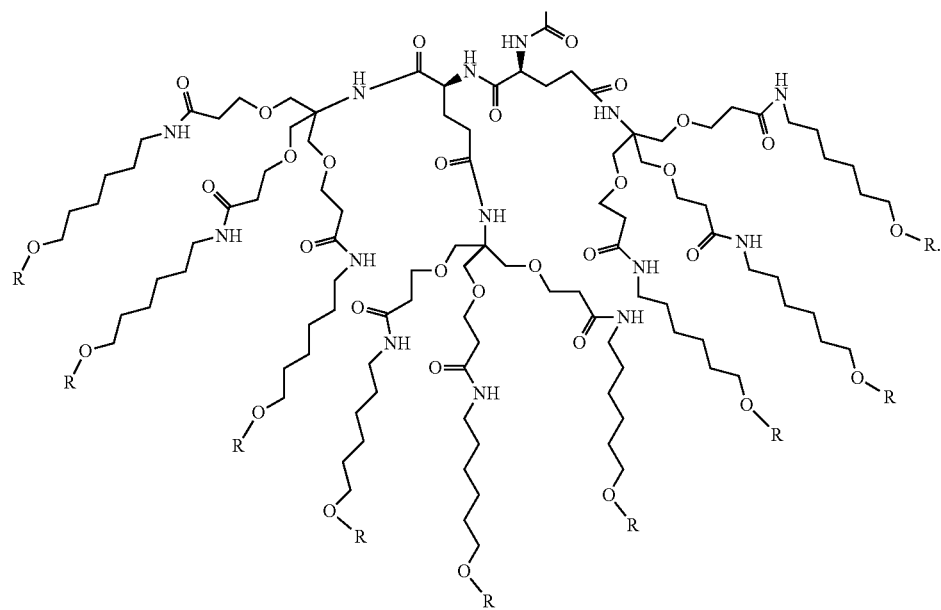

In the linkers (LX1) to (LX30) shown above, Z is the position where the linker is bonded to the drug, while R is the position where the linker is bonded to a sugar. In some embodiments, the sugar R may be conjugated to the linker through any free hydroxyl groups/free leaving groups on the sugar R. In other words, the position where the linker is attached to the sugar is not particularly limited, as long as the linker is covalently attached to the sugar R. In a similar way, the linker may be conjugated to the drug compound Z through any free leaving groups on the drug compound Z. In some other embodiments, the linker may be omitted. In other words, the drug compound Z may be directly conjugated to the sugar R.

In some embodiments, the structure shown in formula (I) is further represented by formula (II):

$$Z\text{-(linker-}[R]_m)_2 \quad \text{formula (II)}$$

wherein, in formula (II), Z is the drug compound, R is the sugar, and m is independently an integer from 1 to 3.

In other words, in formula (II), there are two sugar chains connected to the drug Z through the linker, while the sugar in the two sugar chains are selected form a monosaccharide, a disaccharide, or a trisaccharide.

In some embodiments, the structure shown in formula (I) is an Entecavir-based compound further represented by any one of formula (IA1) to (IA3):

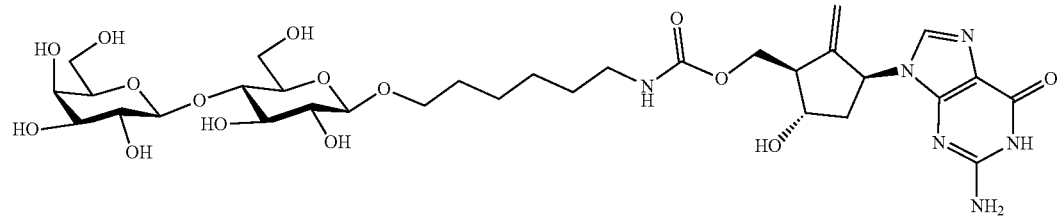

Formula (IA1)

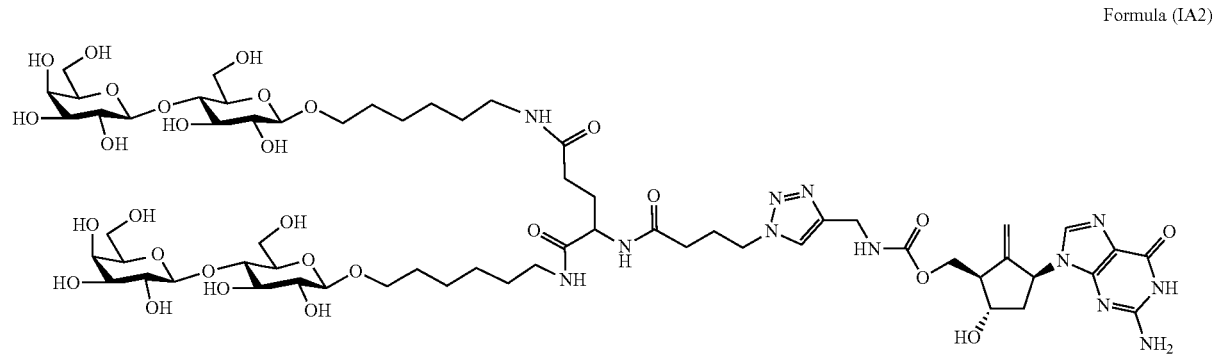

Formula (IA2)

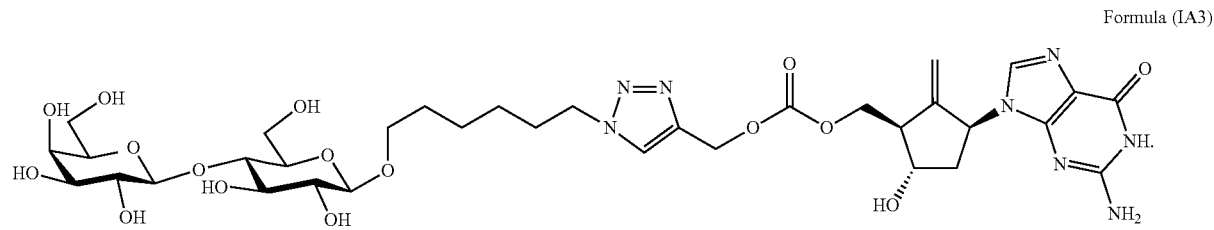

Formula (IA3)

In some other embodiments, the structure shown in formula (I) is an Entecavir-based compound further represented by any one of formula (IA4) to (IA13):
Formula (IA4)
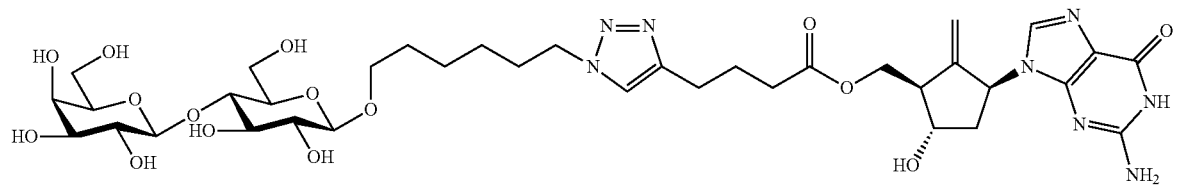
Formula (IA5)
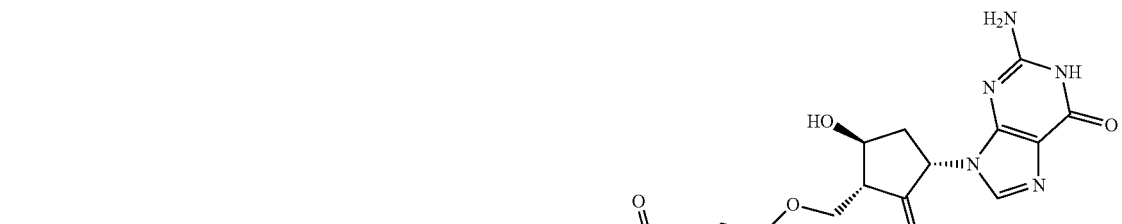
Formula (IA6)
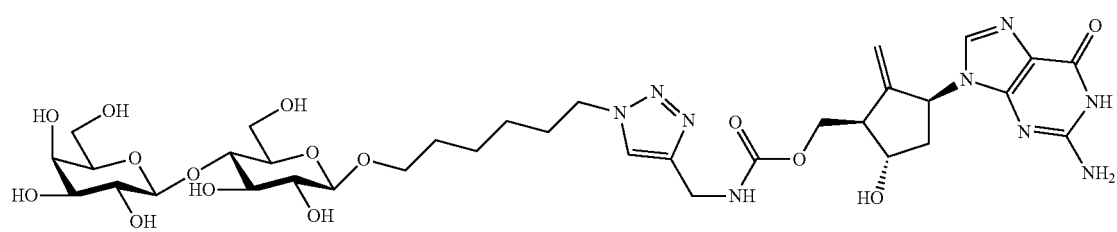
Formula (IA7)
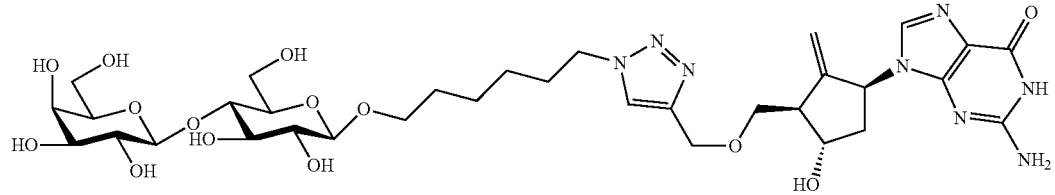
Formula (IA8)
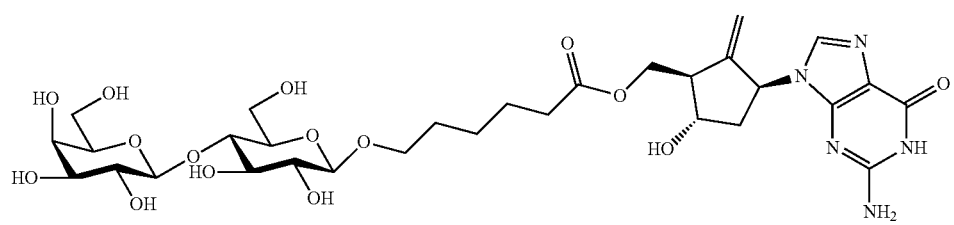

Formula (IA9)
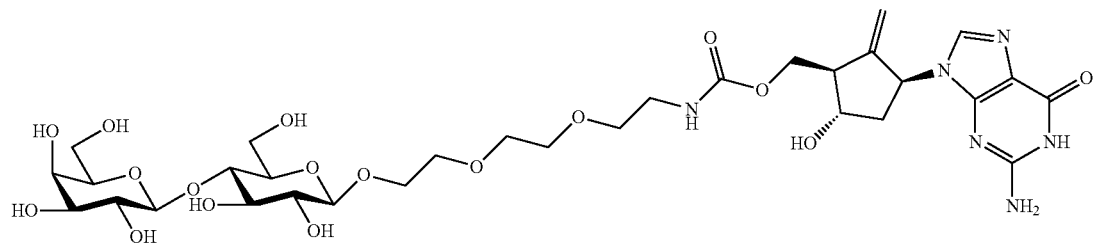
Formula (IA10)
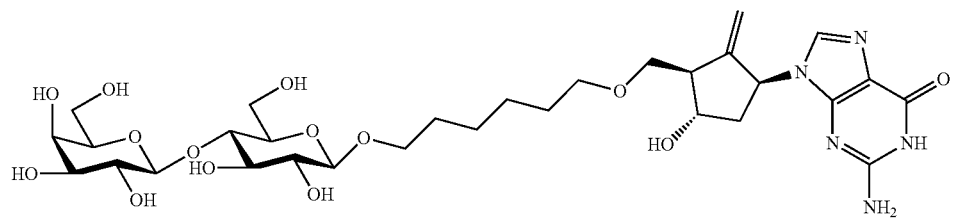
Formula (IA11)
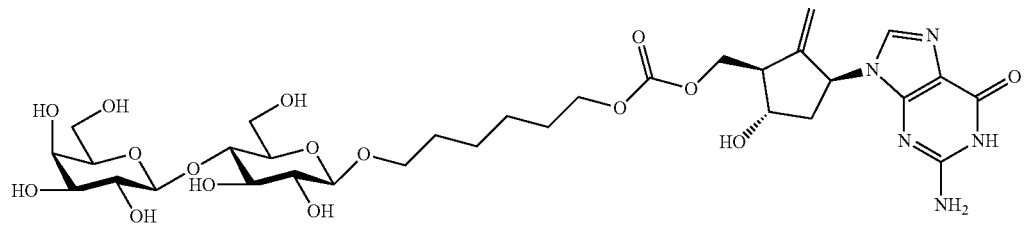
Formula (IA12)
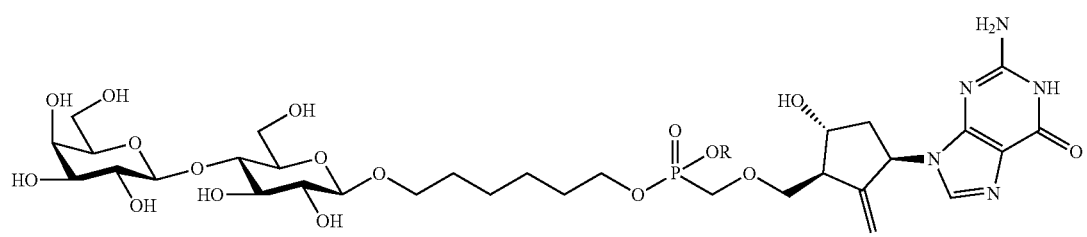
Formula (IA13)
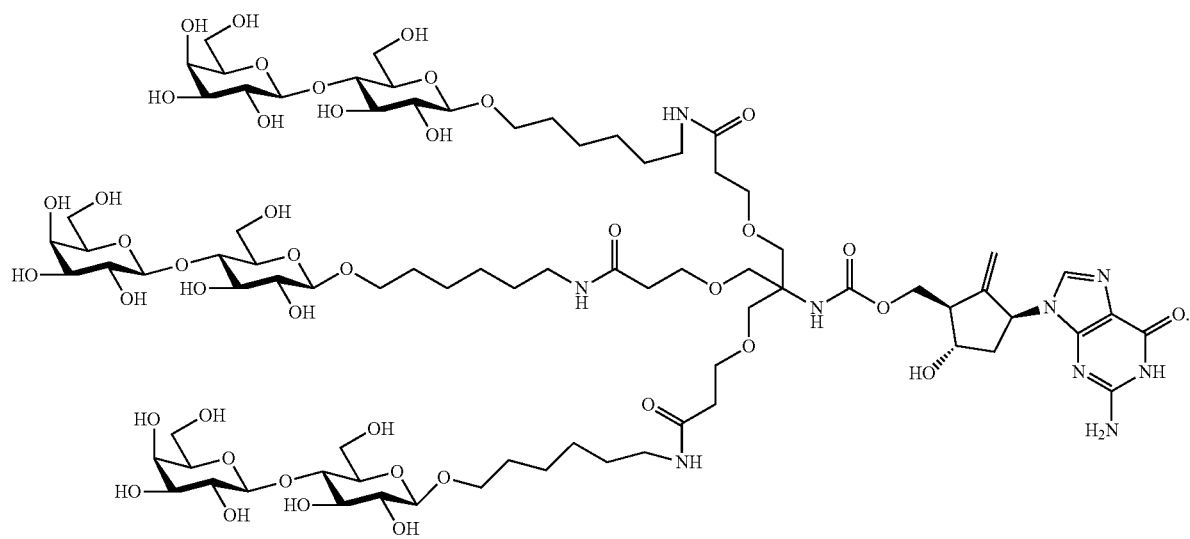

In some embodiments, the structure shown in formula (I) is a Birinapant-based compound further represented by any one of formula (IB1) to (IB5):
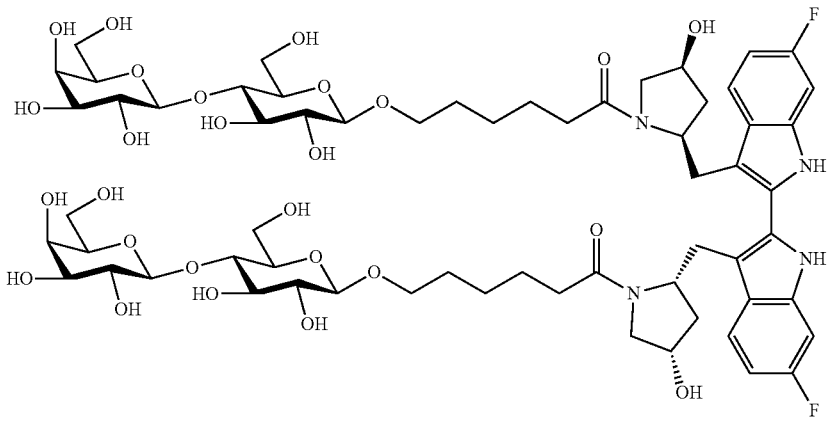
Formula (IB1)
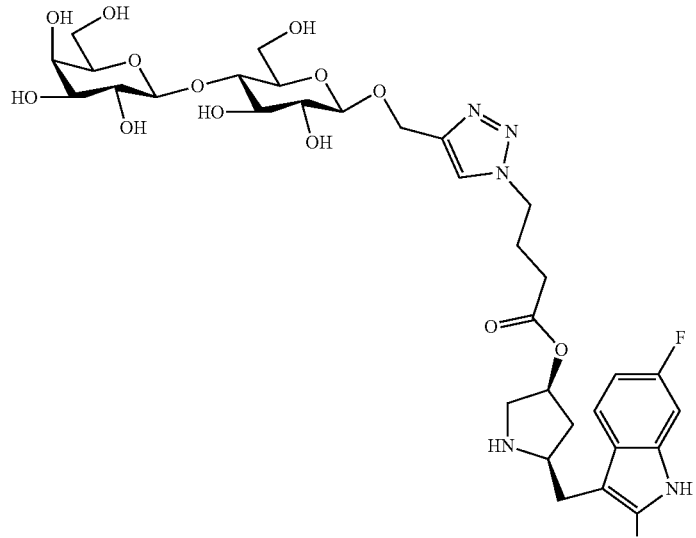
Formula (IB2)
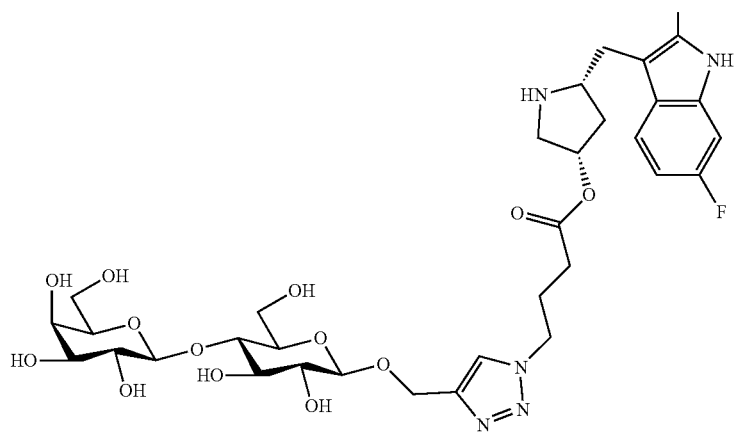

Formula (IB3)
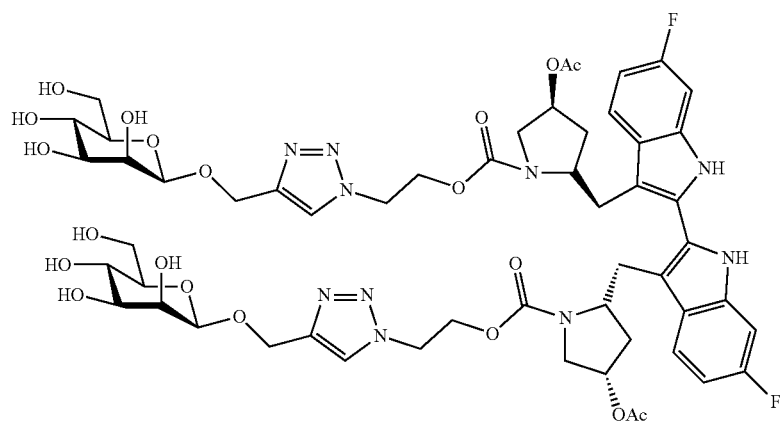
Formula (IB4)
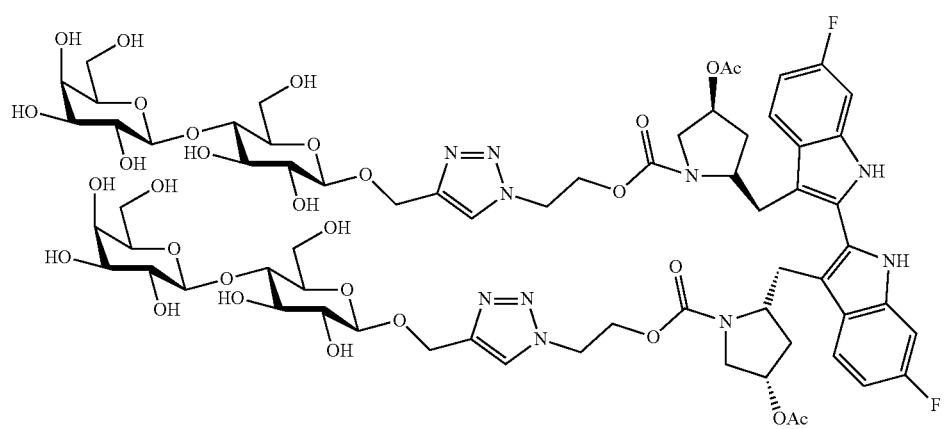
Formula (IB5)
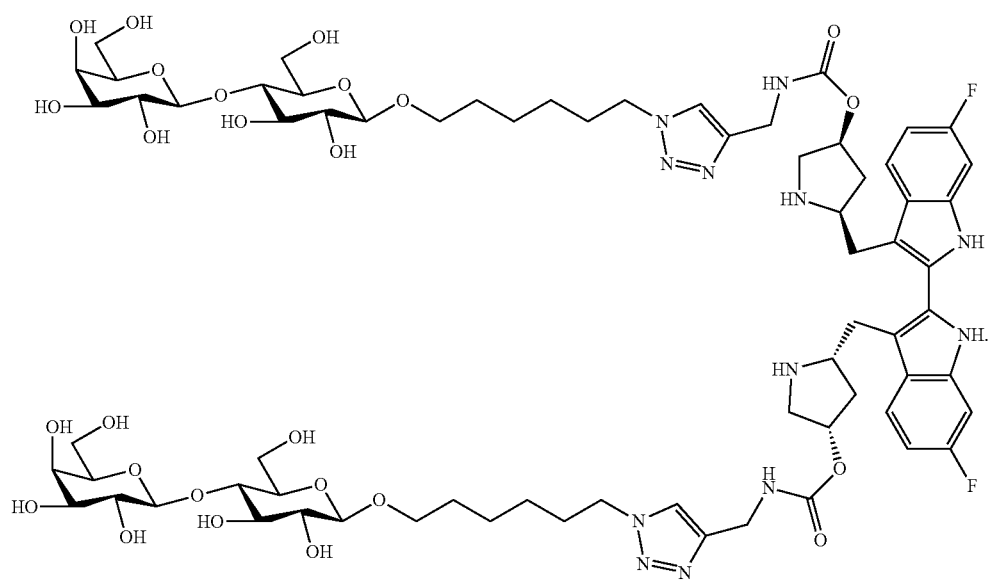

In some other embodiments, the structure shown in formula (I) is a Birinapant-based compound further represented by any one of formula (IB6) to (IB19):
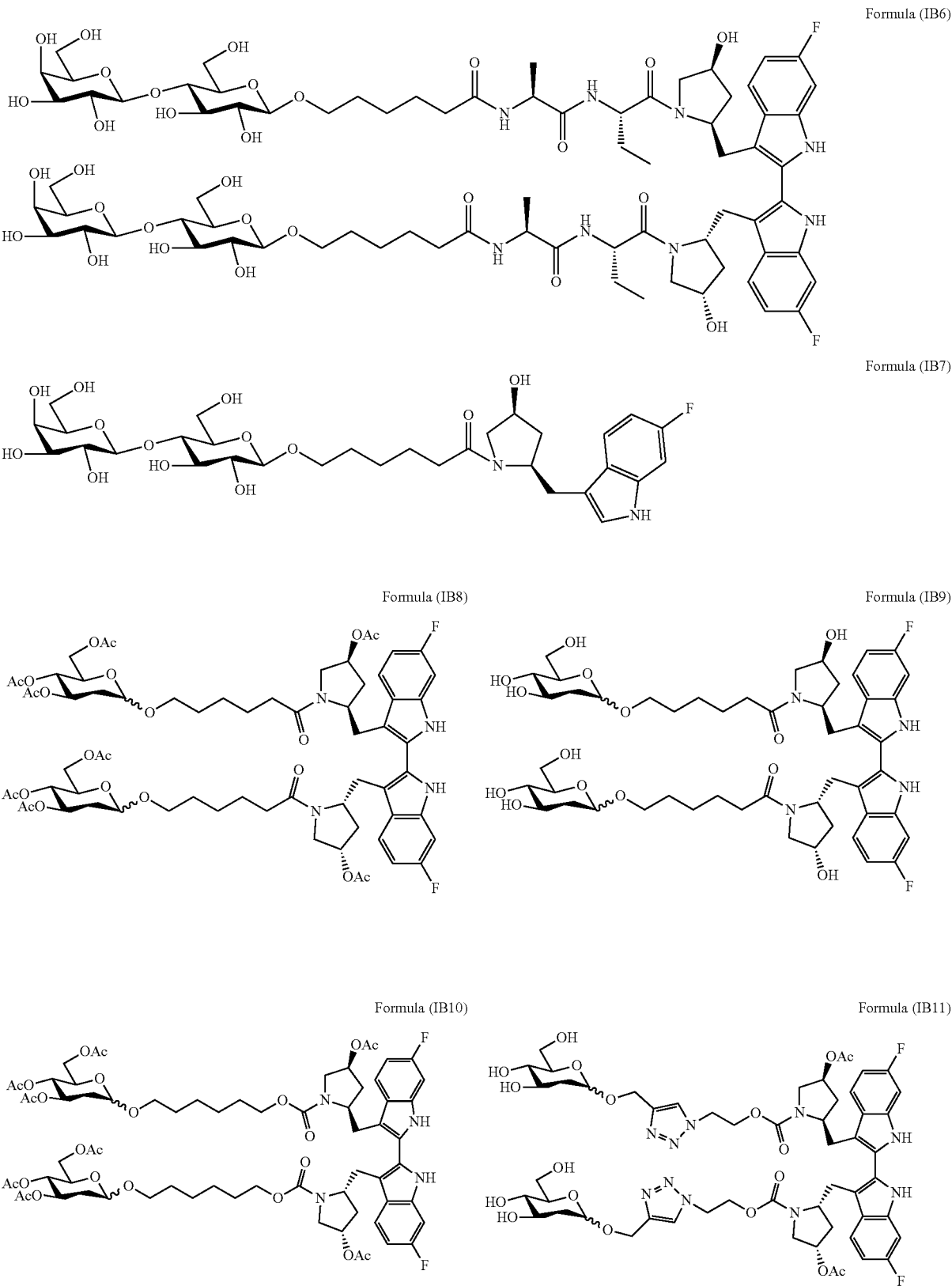

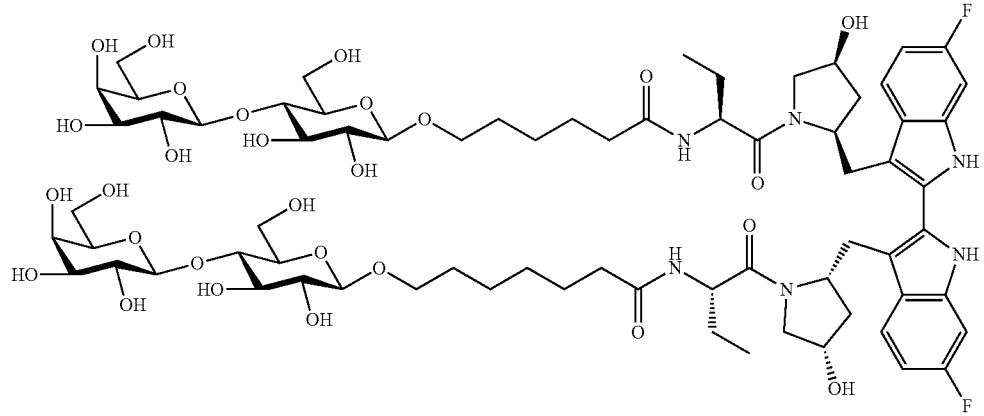
Formula (IB12)
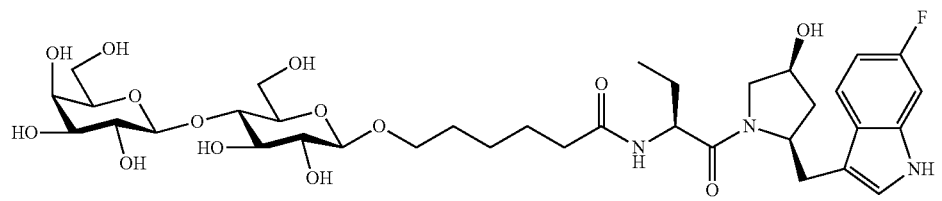
Formula (IB13)
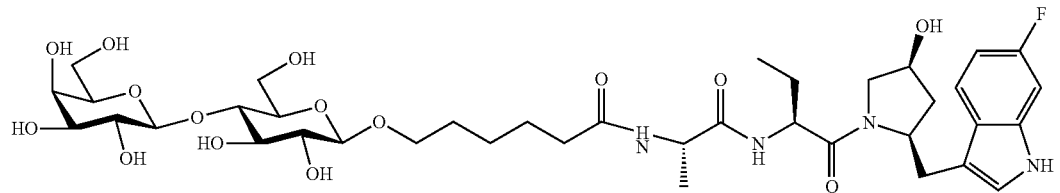
Formula (IB14)
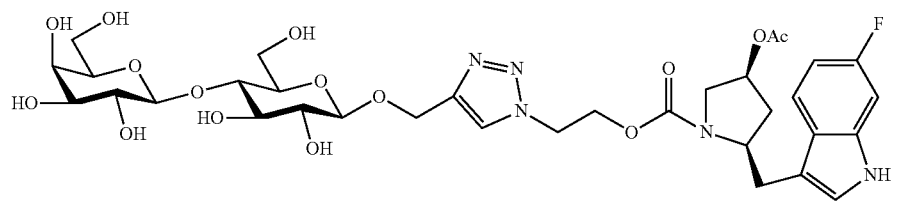
Formula (IB15)
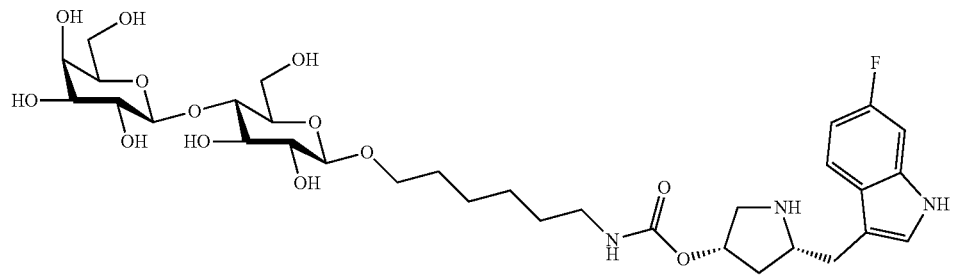
Formula (IB16)

-continued
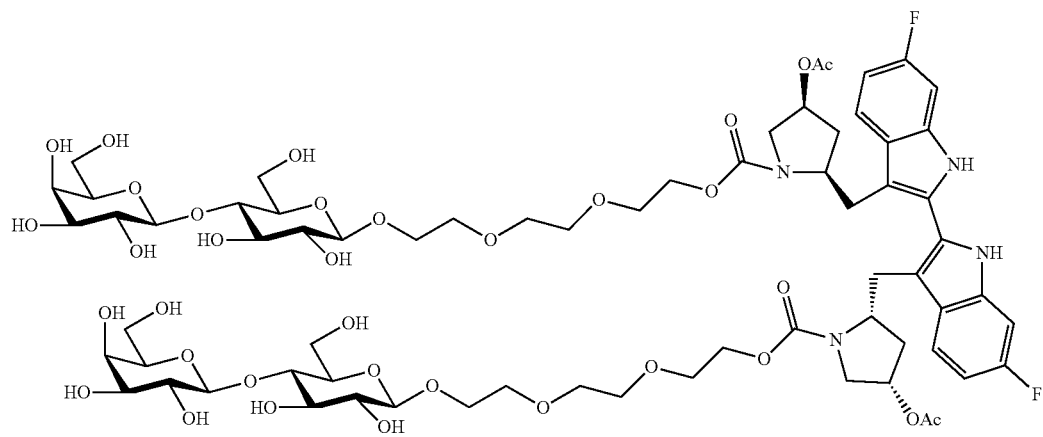
Formula (IB17)
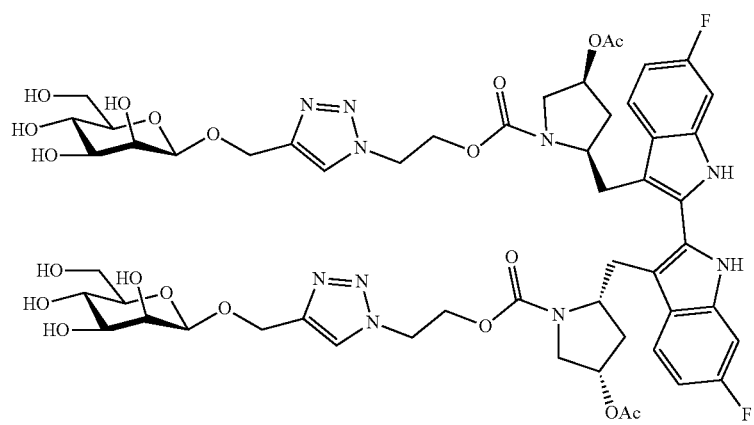
Formula (IB18)
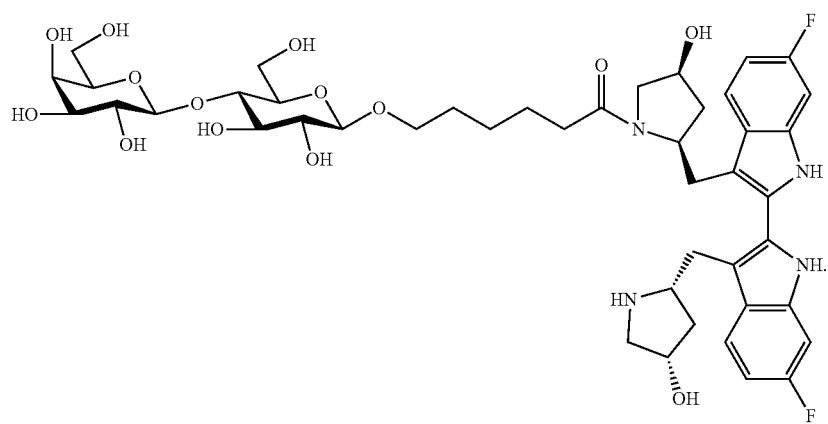
Formula (IB19)

In some embodiments, the structure shown in formula (I) is a Tenofovir-based compound further represented by any one of formula (IC1) to (IC11):
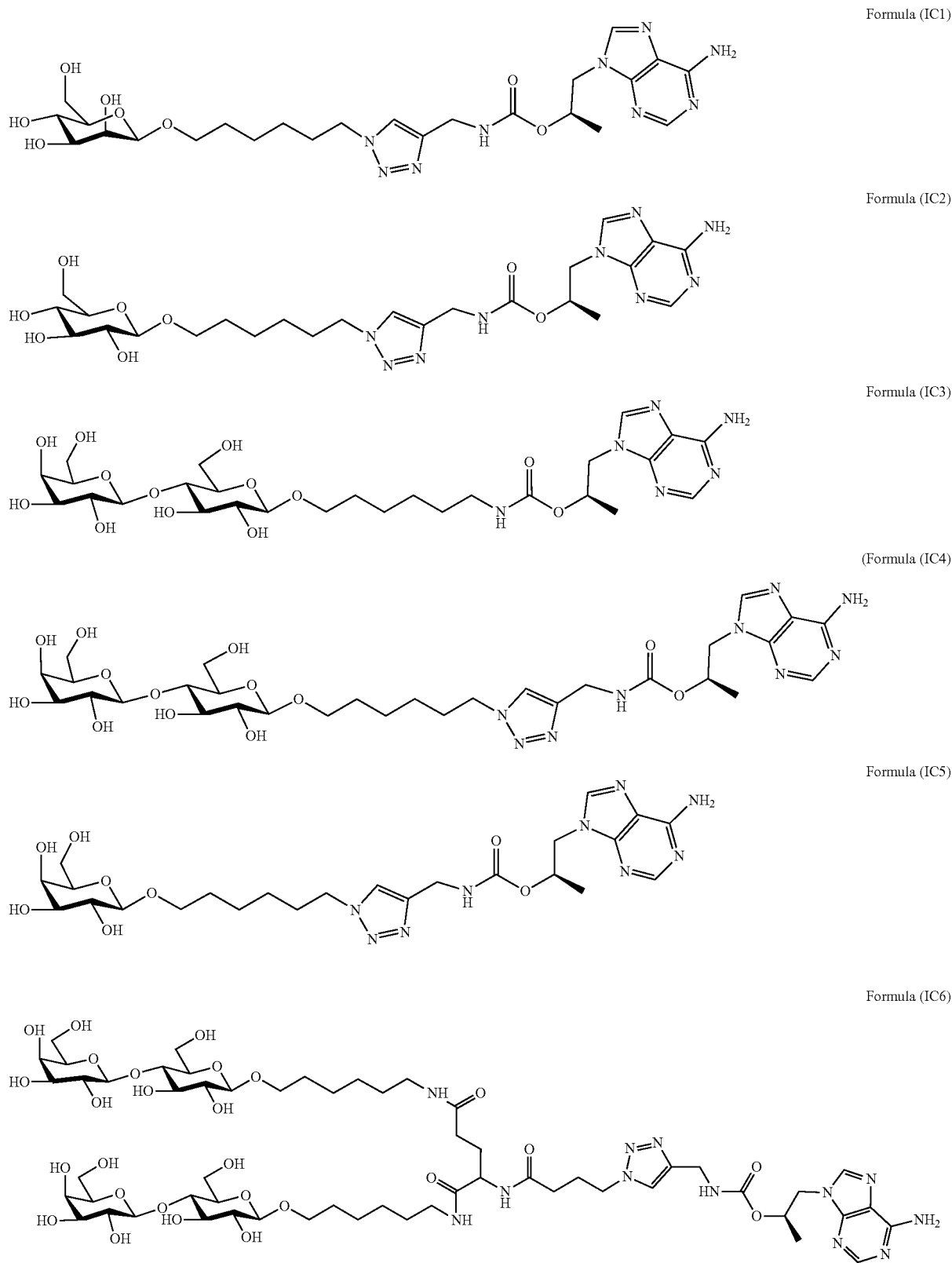
Formula (IC1)
Formula (IC2)
Formula (IC3)
(Formula (IC4)
Formula (IC5)
Formula (IC6)

Formula (IC7)
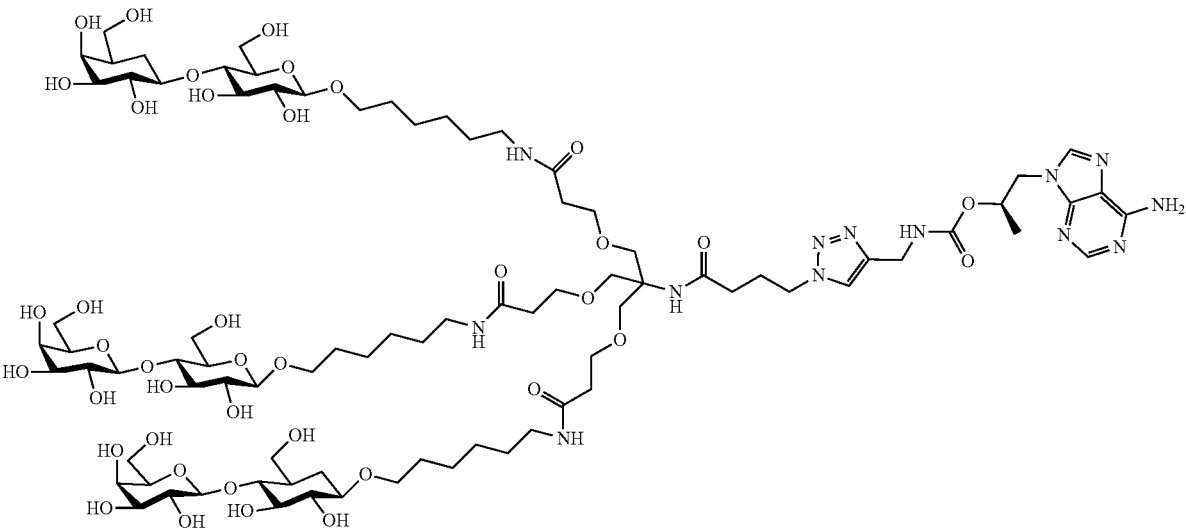
Formula (IC8)
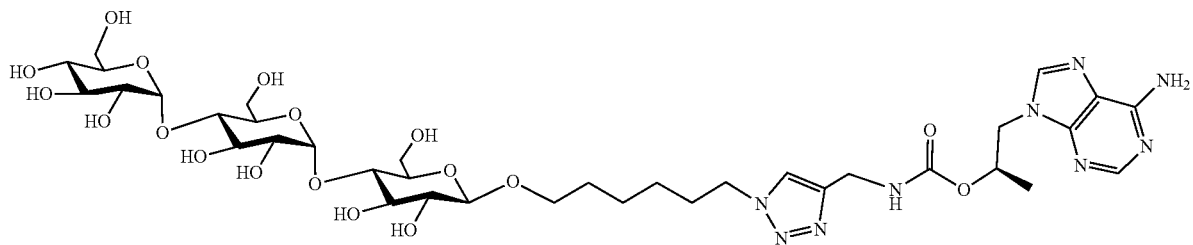
Formula (IC9)
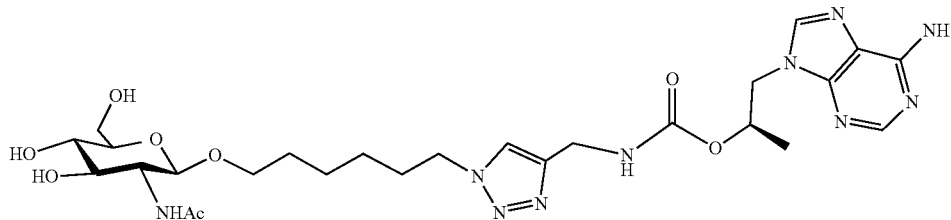
Formula (IC10)
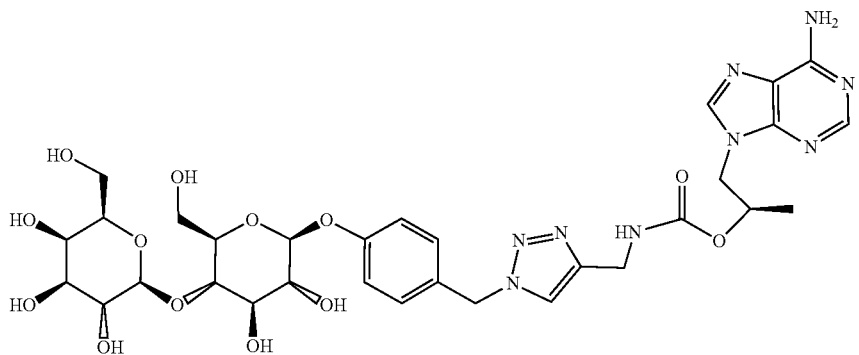

Formula (IC11)
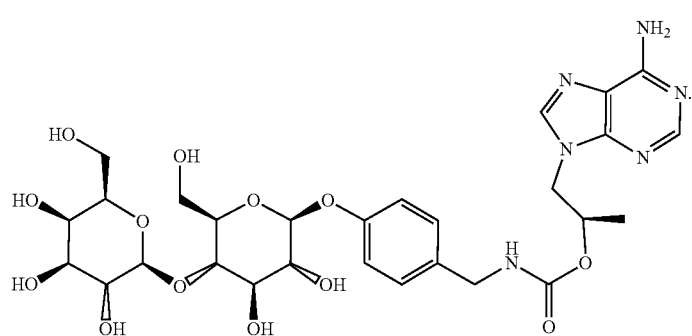
In some embodiments, the structure shown in formula (I) is a LCL161-based compound further represented by any one of formula (ID1) to (ID4):
Formula (ID1)
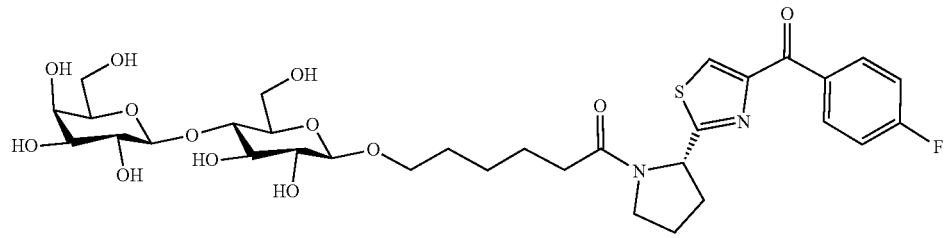
Formula (ID2)
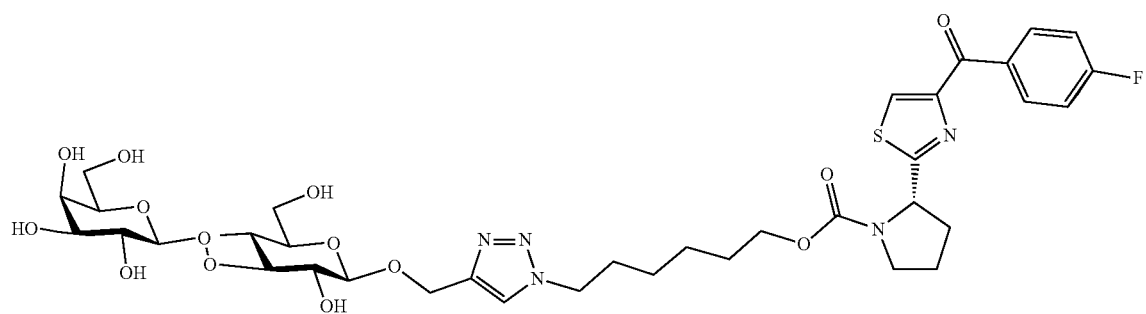
Formula (ID3)
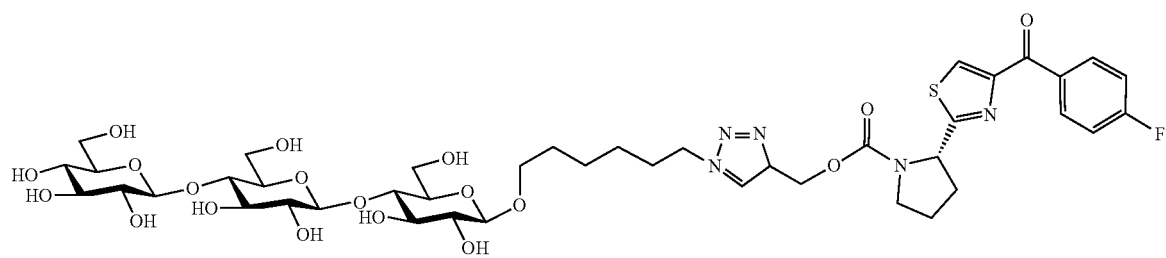

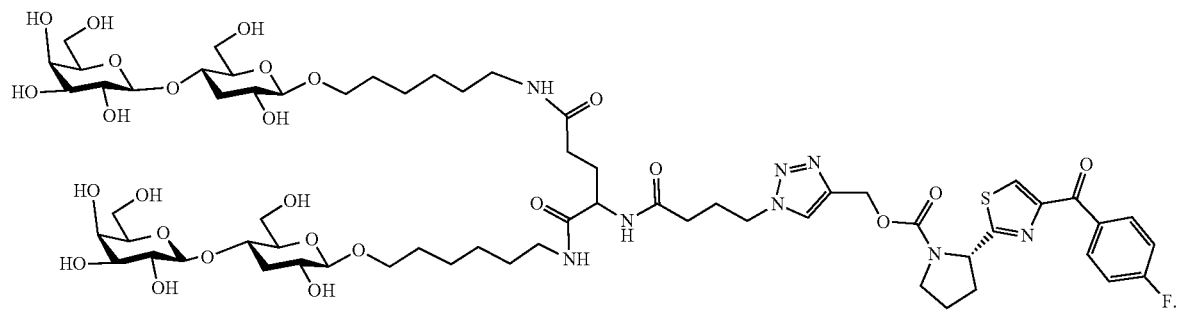
Formula (ID4)
In some other embodiments, the structure shown in formula (I) is a LCL161-based compound further represented by any one of formula (ID5) and formula (ID6).
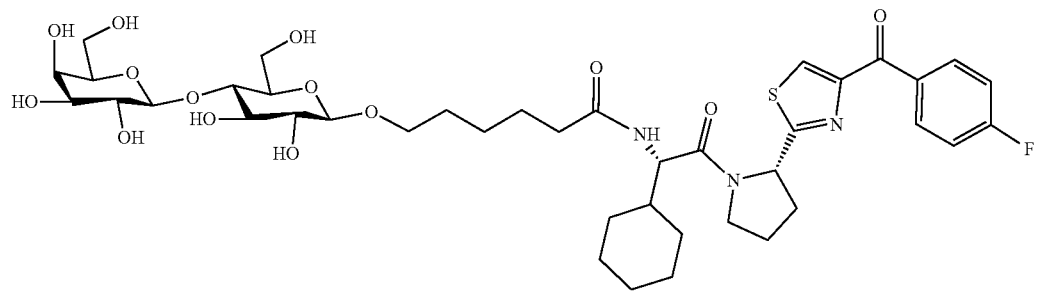
Formula (ID5)
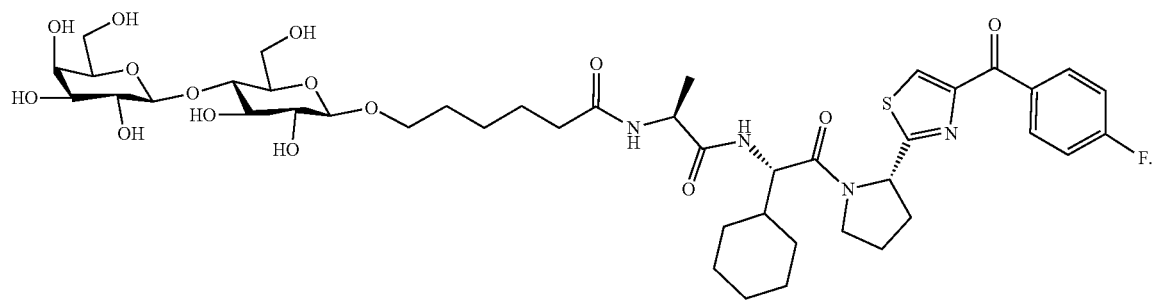
Formula (ID6)
In some embodiments, the structure shown in formula (I) is a Telbivudine-based compound further represented by formula (IE1)
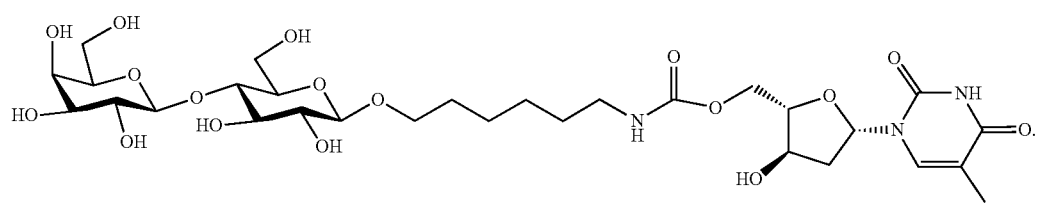
Formula (IE1)

In some embodiments, the structure shown in formula (I) is an Adefovir-based compound further represented by formula (IF1):

Formula (IF1)

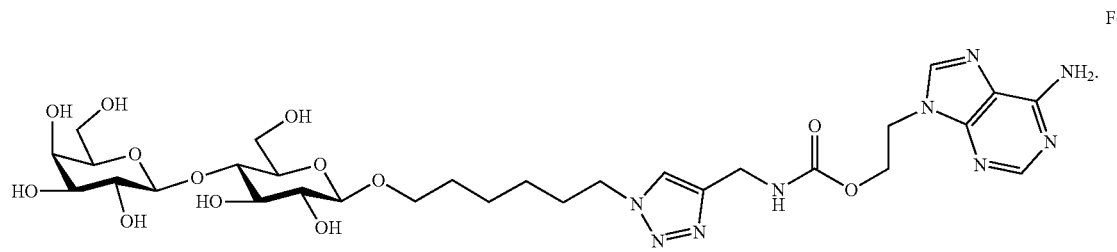

In some other embodiments, the structure shown in formula (I) is an Adefovir-based compound further represented by formula (IF2):

Formula (IF2)

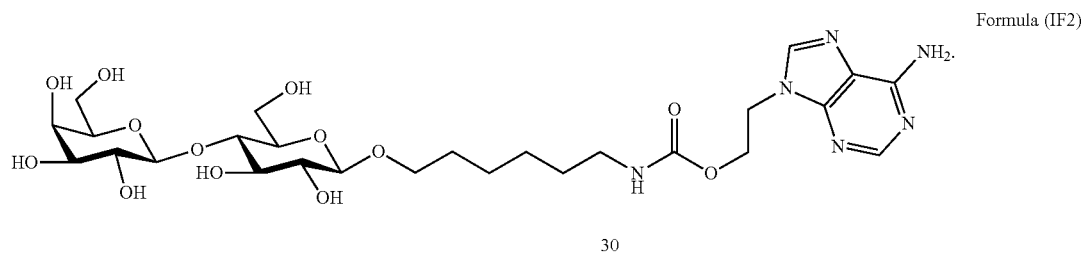

In some embodiments, the structure shown in formula (I) is a Lamivudine-based compound further represented by any one of formula (IG1) and formula (IG2):

Formula (IG1)

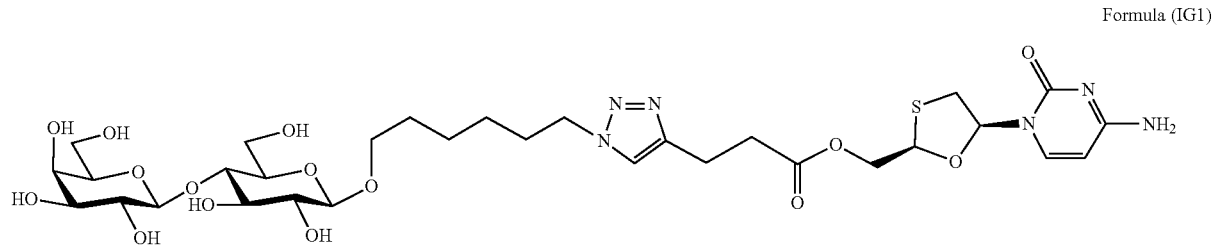

Formula (IG2)

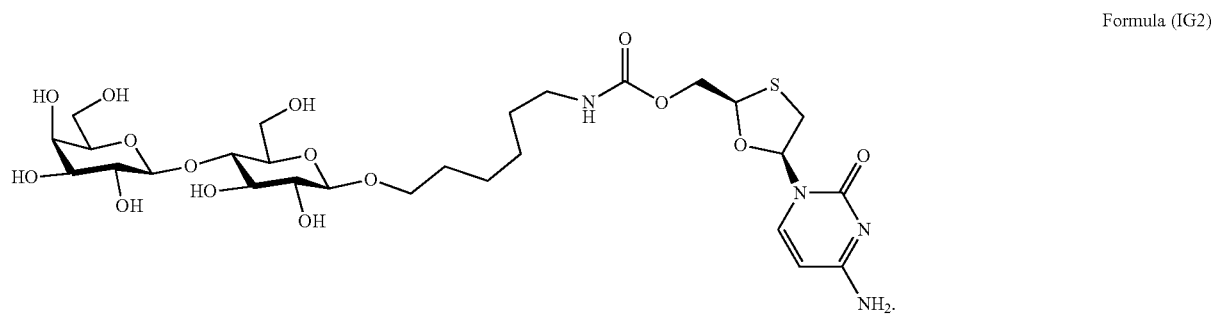

In some embodiments, the structure shown in formula (I) is a GDC-0152-based compound further represented by any one of formula (IH1) to formula (IH4):

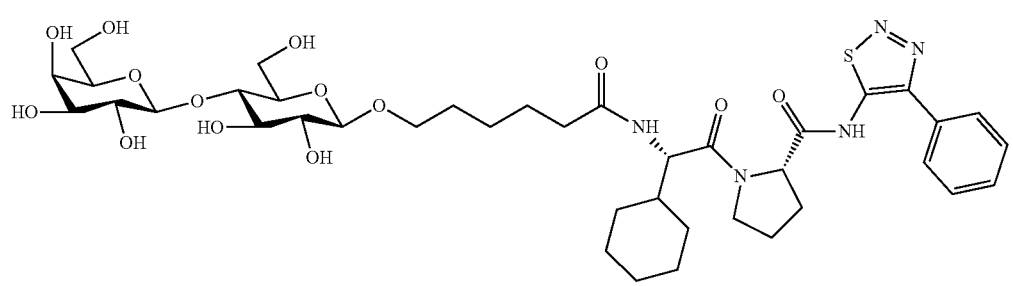
formula (IH1)
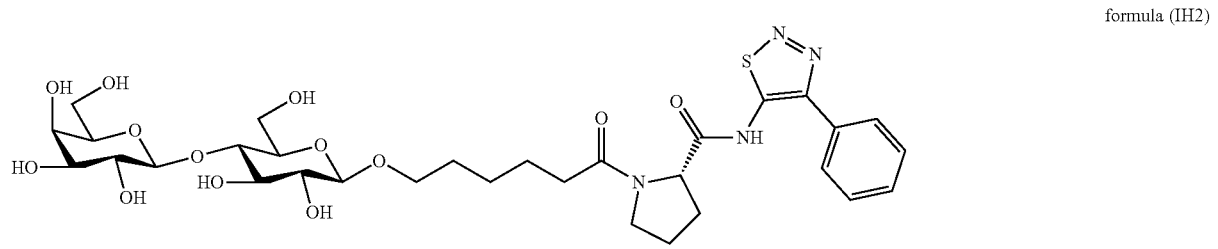
formula (IH2)
formula (IH3)
formula (IH4)
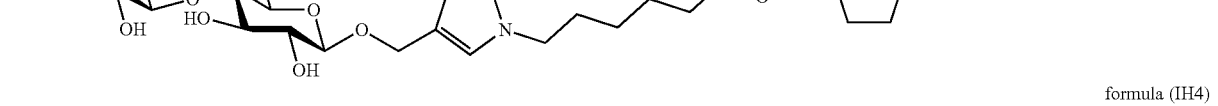
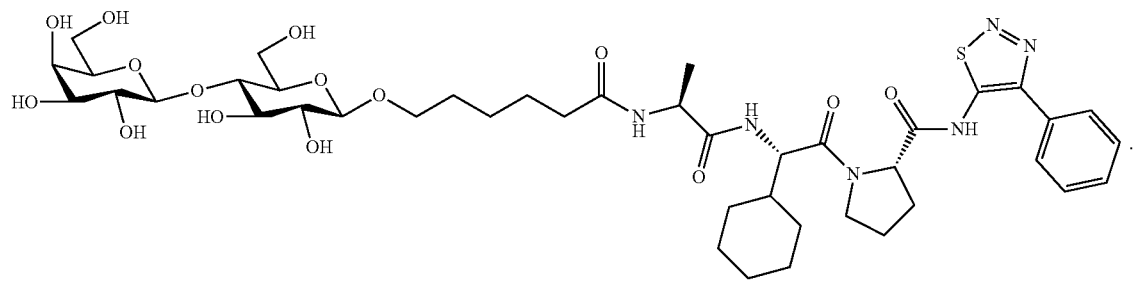
In some embodiments, the structure shown in formula (I) is a DeBio-1143-based compound further represented by any one of formula (IJ1) and formula (IJ2):
Formula (IJ1)
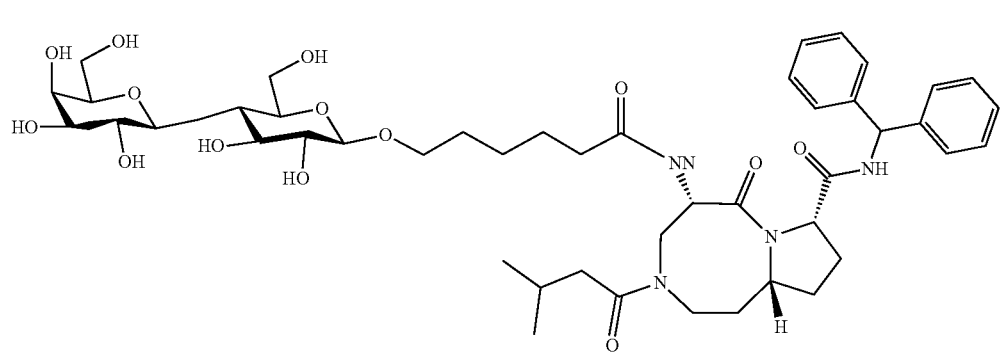

Formula (IJ2)

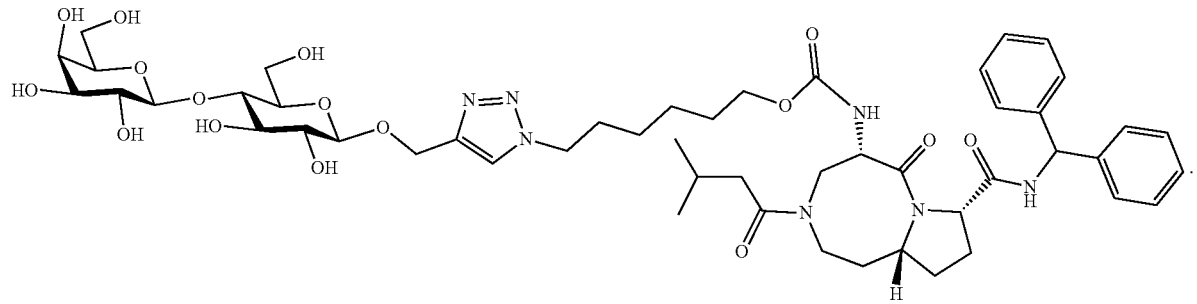

In some other embodiments, a pharmaceutical composition includes an active ingredient (active pharmaceutical ingredient) and at least one or more pharmaceutically acceptable excipients. For example, the active ingredient includes a drug conjugate having the structure shown in formula (I) above. In some embodiments, the drug conjugate includes a first drug conjugate represented by formula (I), and wherein in formula (I) the drug compound Z is a first drug compound X selected from the group consisting of Tenofovir, Tenofovir diisoproxil, Tenofovir alafenamide, Entecavir, Telbivudine, Adefovir, Adefovir dipivoxil, Lamivudine, Interferon-ca-2A, Interferon-ca-2B, Selgantolimod, BI-82 and Zosuquidar or analogues, precursors, prodrugs, derivatives thereof. For example, the first drug conjugate represented by formula (I) is further represented by any one of formula (IA1) to (IA3), any one of formula (IC1) to (IC11), formula (IE1), or formula (IF1) mentioned above. In some embodiments, the drug conjugate includes a second drug conjugate represented by formula (I), and wherein in formula (I) the drug compound Z is a second drug compound Y selected from the group consisting of Birinapant, monomer Birinapant, Xevinapant, LCL161, GDC-0152, GDC-0917, CUDC-427, APG-1387, or analogues, precursors, prodrugs, derivatives thereof. For example, the second drug conjugate represented by formula (I) is further represented by any one of formula (IB1) to (IB5) or any one of formula (ID1) to (ID4) mentioned above.

In some embodiments, by combining drug conjugates including the first drug compound X (the HBV drug) and the second drug compound Y (the IAP antagonist) in the pharmaceutical composition, the treatment of hepatitis B may be effectively improved. In one exemplary embodiment, the first drug conjugate including the first drug compound X is a compound represented by formula (IA1), and the second drug conjugate including the second drug compound Y is a compound represented by formula (IB1).

Formula (IA1)

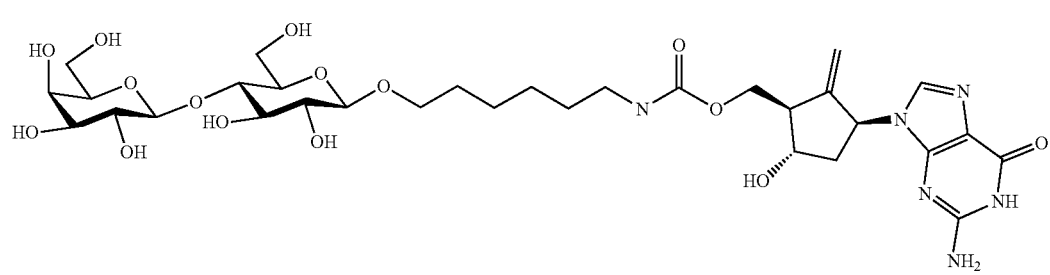

Formula (IB1)

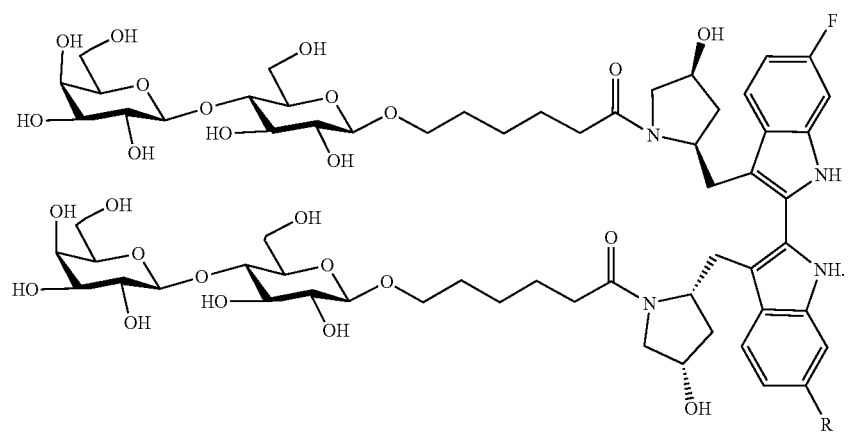

In the exemplary embodiment, the first drug conjugate and the second drug conjugate are respectively administered in a dose of 0.1 mg/kg to 100 mg/kg. In some embodiments, the pharmaceutical composition is prepared into tablets, capsules, granules, powders, solutions, syrups, spray, injections or inhalations. In some embodiments, the pharmaceutically acceptable excipients included in the pharmaceutical composition is selected from the group consisting of fillers, extenders, binders, blending agents, surfactants, emulsifiers, dispersing agents, defoamers, lubricants, nonstick agents, blenders, coating materials, glidants, anti-sticking agents, diluents, dyes, pigments, dispersants, wetting agents, and combinations thereof. For example, the excipients may be used alone, or used in combination.

In some other embodiments, a method of treating hepatitis (such as hepatitis B, hepatitis C, viral hepatitis, or the like) is described. For example, the method includes administering a therapeutically effective amount of the drug conjugate above to a patient having hepatitis (hepatitis B, hepatitis C, viral hepatitis, or the like), or administering the pharmaceutical composition to a patient having hepatitis (hepatitis B, hepatitis C, viral hepatitis, or the like). By administering the drug conjugate or pharmaceutical composition of the present disclosure, the hepatitis B surface antigen (HBsAg), hepatitis B e antigen (HBeAg) levels and/or hepatitis B virus (HBV) DNA levels may be further lowered while the hepatitis B surface antibody (anti-HBsAg) levels may be further improved as compared with conventional hepatitis B treatment methods. Similarly, modifying HCV drugs to form a drug conjugate having similar linkers and sugars may also be promising for providing a more effective treatment of hepatitis C.

EXAMPLES

To prove that the drug conjugate or pharmaceutical composition of the present disclosure is superior over conventional methods in the treatment of hepatitis, such as hepatitis B, the following experiments are conducted.

Synthesis Examples

The drug conjugate used in the experimental examples are synthesized according to the following experimental examples.

Synthesis Example A1: Synthesis of Drug Conjugate of Formula (IA1)

A drug conjugate of Formula (IA1) is synthesized according to the scheme illustrated in FIG. 1. Specifically, to a solution of (3R,4R,5S,6R)-6-(hydroxymethyl)-5-(((2S,3R,4S,5R,6R)-3,4,5-trihydroxy-6-(hydroxymethyl)tetrahydro-2H-pyran-2-yl)oxy)tetrahydro-2H-pyran-2,3,4-triol (20.00 g, 55.51 mmol) and sodium acetate (9.11 g, 111.02 mmol) in $Ac_2O$ (60 mL, 634.71 mmol) was refluxed at 90° C. for 2 h. The mixture was quenched with $NaHCO_{3(aq.)}$ and extracted with EtOAc. The combined organics were dried with $MgSO_4$ and concentrated. The crude product compound 3 was used in next step without purification.

To a solution of compound 3 ((3R,4S,5R,6R)-6-(acetoxymethyl)-5-(((2S,3R,4S,5S,6R)-3,4,5-triacetoxy-6-(acetoxymethyl)tetrahydro-2H-pyran-2-yl)oxy)tetrahydro-2H-pyran-2,3,4-triyl triacetate) (8.89 g, 13.09 mmol), compound 1 (6-azidohexan-1-ol) (7.91 g, 55.23 mmol) and 4 Å MS (1.00 g) in DCM (70 mL) at 0° C. was added $BF_3·OEt_2$ (6.6 mL, 52.38 mmol) and stirred for 15 min, then was allowed to warm to RT over 12 h. The mixture was quenched with $NaHCO_{3(aq.)}$ and extracted with DCM. The combined organics were dried with $MgSO_4$, and concentrated. The residue was purified by silica gel column chromatography with using EtOAc:hexane (1:2) as eluent to provide compound 4 ((2R,3S,4S,5R,6S)-2-(acetoxymethyl)-6-(((2R,3R,4S,5R,6R)-4,5-diacetoxy-2-(acetoxymethyl)-6-((6-azidohexyl)oxy)tetrahydro-2H-pyran-3-yl)oxy)tetrahydro-2H-pyran-3,4,5-triyl triacetate) (3.34 g, 4.46 mmol, yield 34%).

To a solution of compound 4 ((2R,3S,4S,5R,6S)-2-(acetoxymethyl)-6-(((2R,3R,4S,5R,6R)-4,5-diacetoxy-2-(acetoxymethyl)-6-((6-azidohexyl)oxy)tetrahydro-2H-pyran-3-yl)oxy)tetrahydro-2H-pyran-3,4,5-triyl triacetate) (500 mg, 0.66 mmol) in THF (5 mL) at 0° C. was added 1M $PMe_3$ in THF (1.32 mL, 1.32 mmol). After warming to RT, the reaction mixture was stirred over 12 h. The mixture was concentrated under reduced pressure to remove the solvent by evaporation. The crude product compound 5 was used in next step without purification.

To a solution of compound 54 ((1S,2R,4S)-4-(2-amino-6-oxo-1,6-dihydro-9H-purin-9-yl)-2-(hydroxymethyl)-3-methylenecyclopentyl acetate) (195 mg, 0.61 mmol) in THF (3 mL) and DMF (1 mL), NMM (338 μL, 2.42 mmol) and a solution of 4-nitrophenyl chloroformate (244 mg, 1.21 mmol) in THF (2 mL) were added at 0° C. Then, the reaction mixture was stirred at RT for 12 h. To the reaction mixture, a solution of compound 5 ((2R,3S,4S,5R,6S)-2-(acetoxymethyl)-6-(((2R,3R,4S,5R,6R)-4,5-diacetoxy-2-(acetoxymethyl)-6-((6-aminohexyl)oxy)tetrahydro-2H-pyran-3-yl) oxy)tetrahydro-2H-pyran-3,4,5-triyl triacetate) (365 mg, 0.50 mmol) in THF (3 mL) was added and stirred at RT for an additional 12 h. The mixture was concentrated and purified by silica gel column chromatography using EtOAc:hexane (1:1) as eluent to provide the product compound 89 ((2R,3S,4S,5R,6S)-2-(acetoxymethyl)-6-(((2R,3R,4S,5R,6R)-4,5-diacetoxy-6-((6-(((((1R,3S,5S)-5-acetoxy-3-(2-amino-6-oxo-1,6-dihydro-9H-purin-9-yl)-2-methylenecyclopentyl)methoxy)carbonyl)amino)hexyl)oxy)-2-(acetoxymethyl)tetrahydro-2H-pyran-3-yl)oxy)tetrahydro-2H-pyran-3,4,5-triyl triacetate) (193 mg, 0.17 mmol, yield 34%).

To a solution of compound 89 ((2R,3S,4S,5R,6S)-2-(acetoxymethyl)-6-(((2R,3R,4S,5R,6R)-4,5-diacetoxy-6-((6-(((((1R,3S,5S)-5-acetoxy-3-(2-amino-6-oxo-1,6-hydro-9H-purin-9-yl)-2-methylenecyclopentyl)methoxy) carbonyl)amino)hexyl)oxy)-2-(acetoxymethyl)tetrahydro-2H-pyran-3-yl)oxy)tetrahydro-2H-pyran-3,4,5-triyl triacetate) (193 mg, 0.17 mmol) in MeOH (2 mL), NaOMe (15 mg, 0.28 mmol) was added at 0° C. After warming to RT, the reaction mixture was stirred for 12 h. The mixture was neutralized with Amberlite IR-120 (H) until reaching pH of 7. The solution was filtered, and the solvent was removed. The resulting material was purified by reverse phase silica gel column chromatography to provide the product compound 90 ((((1R,3S,5S)-3-(2-amino-6-oxo-1,6-dihydro-9H-purin-9-yl)-5-hydroxy-2-methylenecyclopentyl)methyl (6-(((2R,3R,4R,5S,6R)-3,4-dihydroxy-6-(hydroxymethyl)-5-(((2S,3R,4S,5R,6R)-3,4,5-trihydroxy-6-(hydroxymethyl) tetrahydro-2H-pyran-2-yl)oxy)tetrahydro-2H-pyran-2-yl) oxy)hexyl)carbamate) (40 mg, 0.05 mmol, yield 30%). The compound 90 corresponds to the structure of formula (IA1).

The NMR analysis result of the compound 90 is as follow:
$^1$H-NMR (400 MHz, $CD_3OD$): δ 7.74 (s, 1H), 5.54-5.48 (m, 1H), 5.29-5.27 (m, 1H), 4.57 (s, 1H), 4.37-4.26 (m, 6H), 3.92-3.67 (m, 8H), 3.60-3.46 (m, 8H), 3.42-3.37 (m, 1H), 3.26-3.21 (m, 1H), 3.14-3.09 (m, 2H), 2.88-2.83 (m, 1H), 2.54-2.45 (m, 1H), 2.26-2.19 (m, 1H), 1.65-1.34 (m, 10H). The NMR results confirmed that the structure of formula (IA1) is obtained. From ESI-MS, the peak corresponding to the molecular weight of the structure of formula (IA1) is also identified.

Synthesis Examples A2-A4: Synthesis of Drug Conjugates of Formula (IA2)~(IA4)

In synthesis examples A2-A4, the drug conjugates of Formula (IA2) to formula (IA4) are synthesized with organic synthesis techniques similar to those described for synthesis example A1, and the details of the synthesis will be omitted herein. To prove that the drug conjugates of Formula (IA2) to formula (IA4) are successfully obtained, NMR and ESI-MS analysis are performed.

The NMR analysis result of the obtained drug conjugate of Formula (IA2) is as follows: $^1$H-NMR (400 MHz, D$_2$O): δ 7.96-7.80 (br, 2H), 5.53-4.97 (br, 7H), 4.54-3.99 (m, 10H), 3.97-3.37 (m, 28H), 3.31-2.97 (m, 10H), 2.87-2.77 (m, 3H), 2.39-1.76 (m, 10H), 1.59-1.1(m, 20H). The NMR results confirmed that the structure of formula (IA2) is obtained. From ESI-MS, the peak corresponding to the molecular weight of the structure of formula (IA2) is also identified.

The NMR analysis result of the obtained drug conjugate of Formula (IA3) is as follows: $^1$H-NMR (400 MHz, CD$_3$OD): δ 8.07 (s, 1H), 7.74 (s, 1H), 5.52-5.48 (m, 1H), 5.28-5.27 (m, 2H), 5.25-5.24 (m, 1H), 4.79-4.78 (m, 1H), 4.49-4.28 (m, 8H), 3.92-3.68 (m, 7H), 3.62-3.48 (m, 7H), 3.43-3.39 (m, 1H), 3.27-3.23 (m, 1H), 2.91-2.88 (m, 1H), 2.47-2.40 (m, 1H), 2.27-2.21 (m, 1H), 1.91-1.84 (m, 2H), 1.62-1.55 (m, 2H), 1.44-1.37 (m, 2H), 1.33-1.26 (m, 2H). The NMR results confirmed that the structure of formula (IA3) is obtained. From ESI-MS, the peak corresponding to the molecular weight of the structure of formula (IA3) is also identified.

The NMR analysis result of the obtained drug conjugate of Formula (IA4) is as follows: $^1$H-NMR (400 MHz, CD$_3$OD): δ 7.75 (s, 1H), 7.72 (s, 1H), 5.52-5.48 (m, 1H), 5.27-5.26 (m, 1H), 4.38-4.34 (m, 7H), 4.28-4.26 (m, 1H), 3.91-3.68 (m, 7H), 3.60-3.47 (m, 7H), 3.41-3.37 (m, 1H), 3.26-3.21 (m, 1H), 2.90-2.85 (m, 1H), 2.77-2.73 (m, 2H), 2.53-2.46 (m, 1H), 2.45-2.41 (m, 2H), 2.26-2.20 (m, 1H), 2.03-1.96 (m, 2H), 1.93-1.85 (m, 2H), 1.64-1.56 (m, 2H), 1.46-1.39 (m, 2H), 1.35-1.28 (m, 2H). The NMR results confirmed that the structure of formula (IA4) is obtained. From ESI-MS, the peak corresponding to the molecular weight of the structure of formula (IA4) is also identified.

Synthesis Example B1: Synthesis of Drug Conjugate of Formula (IB1)

Figure 2:
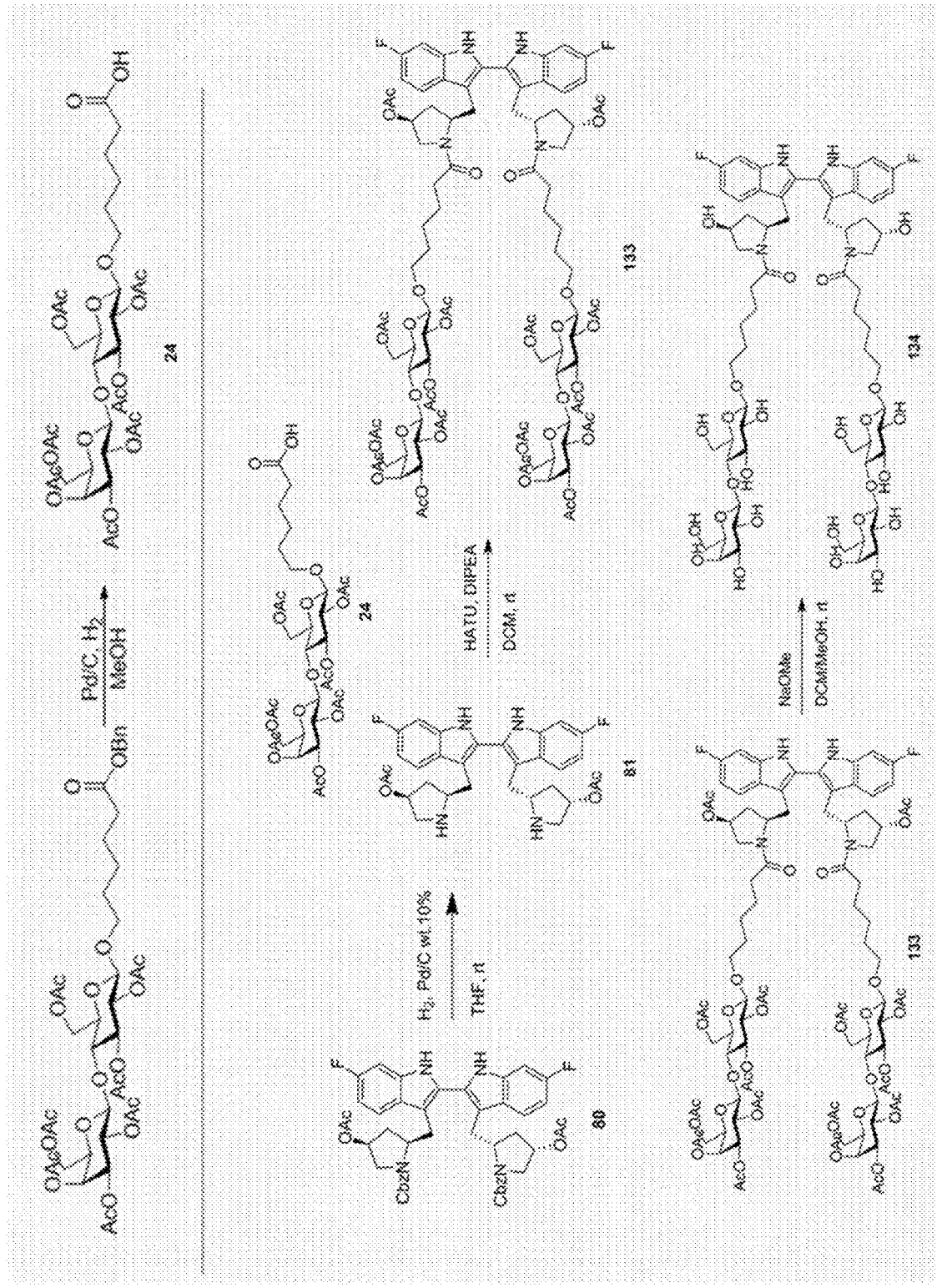
FIG. 2 is a scheme illustrating the synthesis of the drug conjugate of formula (IB1).

A drug conjugate of Formula (IB1) is synthesized according to the scheme illustrated in FIG. 2. Specifically, to a solution of ((2R,3S,4S,5R,6S)-2-(acetoxymethyl)-6-(((2R,3R,4S,5R,6R)-4,5-diacetoxy-2-(acetoxymethyl)-6-((6-(benzyloxy)-6-oxohexyl)oxy)tetrahydro-2H-pyran-3-yl)oxy)tetrahydro-2H-pyran-3,4,5-triyl triacetate) (600 mg, 0.71 mmol) in MeOH (5 mL), 10% Pd/C (60 mg, 0.1 w %) was added and stirred under H$_2$ for 3 h. The mixture was filtered with celite to remove Pd/C and concentrated under reduced pressure to remove the solvent by evaporation to obtain a crude product compound (compound 24). The crude product compound 24 was used in next step without purification.

To a solution of compound 80 (dibenzyl 5,5'-((6,6'-difluoro-1H,1'H-[2,2'-biindole]-3,3'-diyl)bis(methylene))(3S,3'S,5R,5'R)-bis(3-acetoxypyrrolidine-1-carboxylate)) (300 mg, 0.34 mmol) in THF (30 mL), Palladium on carbon 10 wt. % (30 mg) was added. The reaction mixture was stirred at RT under hydrogen for 2 h. After the reaction was completed, the resulting material was filtrated and concentrated. Desired product was obtained as a yellow solid of ((3S,3'S,5R,5'R)-((6,6'-difluoro-1H,1'H-[2,2'-biindole]-3,3'-diyl)bis(methylene))bis(pyrrolidine-5,3-diyl) diacetate) (Yield equivalent). The obtained compound is designated as compound 81.

To a solution of compound 81(132 mg, 0.24 mmol) and compound 24 (6-(((2R,3R,4S,5R,6R)-3,4-diacetoxy-6-(acetoxymethyl)-5-(((2S,3R,4S,5S,6R)-3,4,5-triacetoxy-6-(acetoxymethyl)tetrahydro-2H-pyran-2-yl)oxy)tetrahydro-2H-pyran-2-yl)oxy)hexanoic acid) (533 mg, 0.71 mmol) in DCM (10 mL), HATU (280 mg, 0.74 mmol) and DIPEA (800 μL, 5.87 mmol) were added and stirred at RT for 12 h. The mixture was purified by silica gel column chromatography to provide a compound designated as compound 133 (450 mg, 0.22 mmol, yield 93%).

To a solution of compound 133 (450 mg, 0.21 mmol) in MeOH (6 mL) and DCM (6 mL), NaOMe (32 mg, 0.60 mmol) was added at 0° C. After warming to RT, the reaction mixture was stirred for 1 h. The mixture was quenched with Amberlite IR-120 (H) and filtered to remove. The resulting material was purified by reverse phase silica gel column chromatography to provide the product compound 134 (1,1'-((3S,3'S,5R,5'R)-((6,6'-difluoro-1H,1'H-[2,2'-biindole]-3,3'-diyl)bis(methylene))bis(3-hydroxypyrrolidine-5,1-diyl))bis(6-(((2R,3R,4R,5S,6R)-3,4-dihydroxy-6-(hydroxymethyl)-5-(((2S,3R,4S,5R,6R)-3,4,5-trihydroxy-6-(hydroxymethyl)tetrahydro-2H-pyran-2-yl)oxy)tetrahydro-2H-pyran-2-yl)oxy)hexan-1-one)) (200 mg, 0.15 mmol, yield 67%). The compound 134 corresponds to the structure of formula (IB1).

The NMR analysis result of the compound 134 (formula (IB1)) is as follow: $^1$H-NMR (400 MHz, d-DMSO): δ 12.11 (s, 1H), 7.86-7.82 (m, 2H), 7.41-7.38 (m, 2H), 6.96-6.90 (m, 2H), 5.64 (s, 2H), 5.11-5.08 (m, 3H), 4.83-4.79 (m, 4H), 4.66-4.63 (m, 4H), 4.56-4.49 (m, 8H), 4.25-4.17 (m, 5H), 3.84-3.38 (m, 32H), 3.31-3.22 (m, 10H), 2.47-2.41 (m, 4H), 1.95-1.83 (m, 4H), 1.75-1.72 (m, 4H), 1.67-1.62 (m, 4H), 1.51-1.46 (m, 4H). The NMR results confirmed that the structure of formula (IB1) is obtained. From ESI-MS, the peak corresponding to the molecular weight of the structure of formula (IB1) is also identified.

Synthesis Examples B2-B11: Synthesis of Drug Conjugates of Formula (IB2)~(IB11)

In synthesis examples B2-B11, the drug conjugates of Formula (IB2) to formula (IB11) are synthesized with organic synthesis techniques similar to those described for synthesis example B1, and the details of the synthesis will be omitted herein. To prove that the drug conjugates of Formula (IB2) to formula (IB11) are successfully obtained, NMR and ESI-MS analysis are performed.

The NMR analysis result of the obtained drug conjugate of Formula (IB2) is as follows: $^1$H-NMR (400 MHz, CD$_3$OD): δ 8.21 (s, 2H), 7.99-7.89 (m, 2H), 7.14-7.10 (m, 2H), 6.94-6.90 (m, 2H), 5.16-5.07 (m, 4H), 4.91-4.88 (m, 8H), 4.65-4.53 (m, 4H), 4.48-4.35 (m, 4H), 4.29-4.16 (m, 4H), 3.96-3.39 (m, 16H), 2.93-2.62 (m, 10H), 2.48-2.26 (m, 6H), 2.16-1.99 (m, 4H), 1.91-1.54 (m, 8H), 1.40-1.31 (m, 4H), 1.15-1.12 (m, 2H), 0.92-0.87 (m, 2H). The NMR results confirmed that the structure of formula (IB2) is obtained. From ESI-MS, the peak corresponding to the molecular weight of the structure of formula (IB2) is also identified.

The NMR analysis result of the obtained drug conjugate of Formula (IB3) is as follows: $^1$H-NMR (400 MHz, $D_6$-DMSO): δ 11.30 (s, 2H), 8.22-8.05 (m, 3H), 7.90-7.81 (m, 2H), 7.36-7.28 (m, 1H), 7.14-7.05 (m, 2H), 6.97-6.80 (m, 2H), 4.96-4.88 (m, 2H), 4.76-4.58 (m, 8H), 4.56-4.33 (m, 6H), 4.18-4.03 (m, 2H), 3.71-3.61 (m, 2H), 3.58-3.48 (m, 3H), 3.48-3.34 (m, 7H), 3.31-3.15 (m, 6H), 2.87-2.74 (m, 2H), 1.94-1.78 (m, 2H), 1.45-1.11 (m, 6H). The NMR results confirmed that the structure of formula (IB3) is obtained. From ESI-MS, the peak corresponding to the molecular weight of the structure of formula (IB3) is also identified.

The NMR analysis result of the obtained drug conjugate of Formula (IB4) is as follows: $^1$H-NMR (400 MHz, $D_6$-DMSO): δ 11.30 (s, 2H), 8.24-8.12 (m, 3H), 7.90-7.80 (m, 2H), 7.37-7.30 (m, 1H), 7.14-7.05 (m, 2H), 6.97-6.81 (m, 2H), 5.20-5.05 (m, 4H), 4.94-4.76 (m, 6H), 4.71-4.56(m, 10H), 4.55-4.41 (m, 4H), 4.40-4.28 (m, 4H), 4.24-4.02 (m, 4H), 3.84-3.73 (m, 3H), 3.68-3.57 (m, 4H), 3.56-3.38 (m, 8H), 3.08-2.97 (m, 3H), 2.86-2.73 (m, 2H), 1.95-1.79 (m, 2H), 1.45-1.11 (m, 7H). The NMR results confirmed that the structure of formula (IB4) is obtained. From ESI-MS, the peak corresponding to the molecular weight of the structure of formula (IB4) is also identified.

The NMR analysis result of the obtained drug conjugate of Formula (IB5) is as follows: $^1$H-NMR (400 MHz, DMSO): δ 13.87 (s, 2H), 8.21 (s, 2H), 7.58-7.52 (m, 4H), 7.08-7.05 (m, 2H), 6.89-6.84 (m, 2H), 5.11-5.07 (m, 4H), 4.67-4.65 (m, 4H), 4.30-4.10 (m, 12H), 3.75-3.23 (m, 42H), 3.05-2.93 (m, 10H), 1.80-1.70 (m, 4H), 1.51-1.47 (m, 4H), 1.35-1.30 (m, 4H), 1.26-1.20 (m, 4H). The NMR results confirmed that the structure of formula (IB5) is obtained. From ESI-MS, the peak corresponding to the molecular weight of the structure of formula (IB5) is also identified.

The NMR analysis result of the obtained drug conjugate of Formula (IB6) is as follows: $^1$H-NMR (400 MHz, $CD_3OD$): δ 7.86-7.81 (m, 2H), 7.45-7.41 (m, 2H), 6.88-6.81 (m, 2H), 4.60-4.53 (m, 6H), 4.47-4.42 (m, 6H), 4.36-4.33 (m, 4H), 4.24-4.21 (m, 2H), 4.08-4.00 (m, 2H), 3.84-3.66 (m, 20H), 3.59-3.45 (m, 20H), 3.24-3.19 (m, 2H), 7.45-7.41 (m, 2H), 2.30-2.25 (m, 4H), 2.13-1.86 (m, 8H), 1.67-1.59 (m, 12H), 1.41-1.38 (m, 12H), 1.13-1.09 (m, 6H). The NMR results confirmed that the structure of formula (IB6) is obtained. From ESI-MS, the peak corresponding to the molecular weight of the structure of formula (IB6) is also identified.

The NMR analysis result of the obtained drug conjugate of Formula (IB7) is as follows: $^1$H-NMR (400 MHz, $CD_3OD$): δ 7.75-7.71 (m, 1H), 7.54-7.51 (m, 1H), 7.08 (s, 1H), 7.07-6.99 (m, 1H), 6.85-6.75 (m, 1H), 4.53-4.26 (m, 5H), 3.96-3.68 (m, 6H), 3.60-3.36 (m, 7H), 3.27-3.00 (m, 4H), 2.39-2.34 (m, 2H), 2.19-2.12 (m, 1H), 2.00-1.87 (m, 2H), 1.75-1.66 (m, 2H), 1.54-1.47 (m, 2H). The NMR results confirmed that the structure of formula (IB7) is obtained. From ESI-MS, the peak corresponding to the molecular weight of the structure of formula (IB7) is also identified.

The NMR analysis result of the obtained drug conjugate of Formula (IB8) is as follows: $^1$H-NMR (400 MHz, $CDCl_3$): δ 8.74-8.72 (m, 2H), 8.44-8.41 (m, 2H), 7.47-7.43 (m, 2H), 5.37-5.28 (m, 2H), 5.03-4.95 (m, 4H), 4.33-4.23 (m, 2H), 4.07-4.03 (m, 2H), 3.99-3.93 (m, 4H), 3.72-3.65 (m, 2H), 3.46-3.38 (m, 2H), 2.92-2.85 (m, 4H), 2.28-2.22 (m, 2H), 2.09-2.01 (m, 24H), 1.72-1.50 (m, 28H). The NMR results confirmed that the structure of formula (IB8) is obtained. From ESI-MS, the peak corresponding to the molecular weight of the structure of formula (IB8) is also identified.

The NMR analysis result of the obtained drug conjugate of Formula (IB9) is as follows: $^1$H-NMR (400 MHz, $CD_3OD$): δ 7.86-7.80 (m, 2H), 7.35-7.31 (m, 2H), 6.87-6.80 (m, 2H), 4.56-4.52 (m, 2H), 4.45-.4.40 (m, 2H), 3.88-3.37 (m, 22H), 3.31-3.17 (m, 8H), 2.49-2.40 (m, 2H), 2.11-1.52 (m, 20H), 1.32-1.24 (m, 2H). The NMR results confirmed that the structure of formula (IB9) is obtained. From ESI-MS, the peak corresponding to the molecular weight of the structure of formula (IB9) is also identified.

The NMR analysis result of the obtained drug conjugate of Formula (IB10) is as follows: $^1$H-NMR (400 MHz, $CD_3OD$): δ 7.57-7.52 (m, 2H), 7.44-7.41 (m, 2H), 6.91-6.85 (m, 2H), 7.57-7.52 (m, 2H), 5.40-5.28 (m, 4H), 5.03-4.94 (m, 4H), 4.33-4.23 (m, 8H), 4.12-3.78 (m, 6H), 3.82-3.61 (m, 2H), 3.50-3.26 (m, 2H), 2.25-2.00 (m, 24H), 1.87-1.62 (m, 16H), 1.48-1.46 (m, 10H). The NMR results confirmed that the structure of formula (IB10) is obtained. From ESI-MS, the peak corresponding to the molecular weight of the structure of formula (IB10) is also identified.

The NMR analysis result of the obtained drug conjugate of Formula (IB11) is as follows: $^1$H-NMR (400 MHz, $CD_3OD$): δ 8.04-8.00 (m, 2H), 7.86-7.80 (m, 1H), 7.38-7.31 (m, 1H), 7.12-7.08 (m, 2H), 6.88-6.84 (m, 2H), 5.04-4.91 (m, 4H), 4.73-4.42 (m, 16H), 4.30-4.19 (m, 2H), 3.81-3.37 (m, 16H), 8.04-8.00 (m, 2H), 3.22-2.91 (m, 6H), 2.05-1.86 (m, 4H), 1.71-1.24 (m, 6H). The NMR results confirmed that the structure of formula (IB11) is obtained. From ESI-MS, the peak corresponding to the molecular weight of the structure of formula (IB11) is also identified.

Synthesis Example C1: Synthesis of Drug Conjugate of Formula (IC1)

Figure 3:
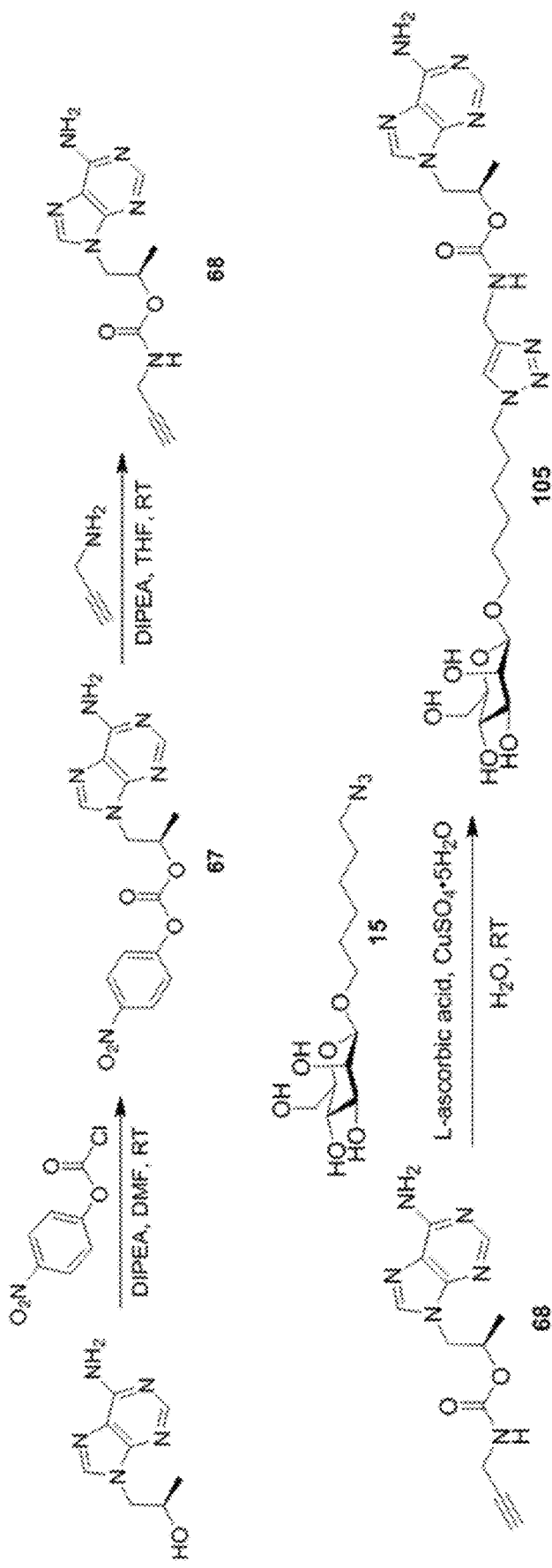
FIG. 3 is a scheme illustrating the synthesis of the drug conjugate of formula (IC1).

A drug conjugate of Formula (IC1) is synthesized according to the scheme illustrated in FIG. 3. Specifically, to a solution of (R)-1-(6-amino-9H-purin-9-yl)propan-2-ol (300.00 mg, 1.55 mmol) in dried DMF (7 mL), 4-Nitrophenyl chloroformate (350.71 mg, 1.74 mmol) and DIPEA (301.15 mg, 2.33 mmol) were added. The reaction mixture was stirred at RT for 18 h. The reaction mixture was diluted in EtOAc and washed with 10% $LiCl_{(aq.)}$, $H_2O$ and $NH_4Cl_{(aq.)}$. The combined organic layer was dried over $MgSO_4$, filtered and concentrated. The resulting crude product compound 67 was used in the next step without purification.

To a solution of compound 67 ((R)-1-(6-amino-9H-purin-9-yl)propan-2-yl (4-nitrophenyl) carbonate) (1.86 g, 5.18 mmol) in dried THF (30 mL), propargylamine (712.74 mg, 12.94 mmol) and DIPEA (669.52 mg, 5.18 mmol) were added and stirred at RT for 18 h. After removing the solvent, the resulting material was purified by silica gel column chromatography (0-5% MeOH in EtOAc as eluent) to provide compound 68 ((R)-1-(6-amino-9H-purin-9-yl)propan-2-yl prop-2-yn-1-ylcarbamate) (707.00 mg, 2.58 mmol, 49.8%).

To a solution of compound 68 ((R)-1-(6-amino-9H-purin-9-yl)propan-2-yl prop-2-yn-1-ylcarbamate) (174.44 mg, 0.64 mmol) and compound 15 ((2R,3S,4S,5S,6R)-2-((6-azidohexyl)oxy)-6-(hydroxymethyl)tetrahydro-2H-pyran-3,4,5-triol) (161.83 mg, 0.53 mmol) in $H_2O$ (2.5 mL), a solution of L-ascorbic acid (36.99 mg, 0.21 mmol) and $CuSO_4·5H_2O$ (26.25 mg, 0.11 mmol) in $H_2O$ (2.5 mL) was added. The reaction mixture was stirred at RT in 1-2 h. The resulting material was purified by C18 column chromatography (0-12% ACN in H₂O as eluent) to provide compound 105 ((R)-1-(6-amino-9H-purin-9-yl)propan-2-yl ((1-(6-(((2R,3S,4S,5S,6R)-3,4,5-trihydroxy-6-(hydroxyl-methyl)tetrahydro-2H-pyran-2-yl)-oxy)hexyl)-1H-1,2,3-triazol-4-yl)methyl)car-bamate) (152.30 mg, 0.26 mmol, yield 49.1%). The compound 105 corresponds to the structure of formula (IC1).

The NMR analysis result of the compound 105 (formula (IC1)) is as follow: $^1$H-NMR (400 MHz, D$_2$O): δ 8.12 (s, 1H), 8.10 (s, 1H), 7.50 (s, 1H), 5.17-5.14 (m, 1H), 4.38-4.03 (m, 7H), 3.90-3.43 (m, 8H), 1.83-1.74 (m, 2H), 1.49-1.16 (m, 9H). The NMR results confirmed that the structure of formula (IC1) is obtained. From ESI-MS, the peak corresponding to the molecular weight of the structure of formula (IC1) is also identified.

Synthesis Examples C2-C11: Synthesis of Drug Conjugates of Formula (IC2)~(IC11)

In synthesis examples C2-C11, the drug conjugates of Formula (IC2) to formula (IC11) are synthesized with organic synthesis techniques similar to those described for synthesis example C1, and the details of the synthesis will be omitted herein. To prove that the drug conjugates of Formula (IC2) to formula (IC11) are successfully obtained, NMR and ESI-MS analysis are performed.

The NMR analysis result of the obtained drug conjugate of Formula (IC2) is as follows: $^1$H-NMR (400 MHz, D$_2$O): δ 8.20 (s, 1H), 8.15 (s, 1H), 7.56 (s, 1H), 5.23-5.19 (m, 1H), 4.47-4.09 (m, 7H), 3.97-3.86 (m, 2H), 3.78-3.74 (m, 1H), 3.67-3.61 (m, 1H), 3.55-3.40 (m, 3H), 3.31-3.27 (m, 1H) 1.89-1.80 (m, 2H), 1.58-1.21 (m, 9H). $^1$H-NMR (400 MHz, d$_6$-DMSO): δ 8.13 (s, 1H), 8.06 (s, 1H), 7.77 (s, 1H), 7.65 (t, 1H), 7.19 (s, 2H), 5.08-5.00 (m, 1H), 4.95-4.88 (m, 3H), 4.48-4.46 (m, 1H), 4.32-4.26 (m, 4H), 4.16-4.08 (m, 3H), 3.76-3.64 (m, 2H), 3.15-3.00 (m, 4H), 2.94-2.90 (m, 1H), 1.77 (p, 2H), 1.48 (p, 2H), 1.32 (p, 2H), 1.22 (p, 2H), 1.13 (d, 3H). The NMR results confirmed that the structure of formula (IC2) is obtained. From ESI-MS, the peak corresponding to the molecular weight of the structure of formula (IC2) is also identified.

The NMR analysis result of the obtained drug conjugate of Formula (IC3) is as follows: $^1$H-NMR (400 MHz, d$_6$-DMSO): δ 8.13 (s, 1H), 8.03 (s, 1H), 7.17 (s, 2H), 7.08 (t, 1H), 5.12-5.10 (m, 2H), 5.04-4.98 (m, 1H) 4.81 (s, br, 1H), 4.66 (s, br, 2H), 4.57-4.52 (m, 2H), 4.30-4.16 (m, 4H), 3.77-3.73 (m, 2H), 3.61-3.40 (m, 8H), 3.03-2.97 (m, 1H), 2.88 (q, 2H), 1.51-1.46 (m, 2H), 1.34-1.21 (m, 6H), 1.12 (d, 3H). The NMR results confirmed that the structure of formula (IC3) is obtained. From ESI-MS, the peak corresponding to the molecular weight of the structure of formula (IC3) is also identified.

The NMR analysis result of the obtained drug conjugate of Formula (IC4) is as follows: $^1$H-NMR (400 MHz, D$_2$O): δ 8.15 (s, 1H), 8.12 (s, 1H), 7.51 (s, 1H), 5.19-5.15 (m, 1H), 4.47-3.93 (m, 10H), 3.87-3.53 (m, 11H), 3.32-3.27 (m, 1H), 1.85-1.74 (m, 2H), 1.56-1.52 (m, 2H), 1.37-1.18 (m, 7H). The NMR results confirmed that the structure of formula (IC4) is obtained. From ESI-MS, the peak corresponding to the molecular weight of the structure of formula (IC4) is also identified.

The NMR analysis result of the obtained drug conjugate of Formula (IC5) is as follows: $^1$H-NMR (400 MHz, D$_2$O): δ 8.19 (s, 1H), 8.15 (s, 1H), 7.55 (s, 1H), 5.22-5.19 (m, 1H), 4.47-4.09 (m, 7H), 3.97-3.76 (m, 4H), 3.72-3.60 (m, 3H), 3.56-3.52 (m, 1H), 1.88-1.73 (m, 2H), 1.60-1.56 (m, 2H) 1.40-1.21 (m, 7H). The NMR results confirmed that the structure of formula (IC5) is obtained. From ESI-MS, the peak corresponding to the molecular weight of the structure of formula (IC5) is also identified.

The NMR analysis result of the obtained drug conjugate of Formula (IC6) is as follows: $^1$H-NMR (400 MHz, D$_2$O): δ 8.08 (s, 1H), 8.05 (s, 1H), 7.54 (s, 1H), 5.14-5.05 (m, 1H), 4.43-4.17 (m, 9H), 4.16-3.97 (m, 3H), 3.95-3.83 (m, 5H), 3.82-3.63 (m, 12H), 3.63-3.44(m, 10H), 3.28-3.19 (m, 2H), 3.18-2.97 (m, 5H), 2.23-2.16 (m, 4H), 2.15-1.91 (m, 4H), 1.91-1.78 (m, 2H), 1.56-1.30 (m, 8H), 1.30-1.13(m, 10H). The NMR results confirmed that the structure of formula (IC6) is obtained. From ESI-MS, the peak corresponding to the molecular weight of the structure of formula (IC6) is also identified.

The NMR analysis result of the obtained drug conjugate of Formula (IC7) is as follows: $^1$H-NMR (400 MHz, D$_2$O): δ 8.11 (s, 1H), 8.07 (s, 1H), 7.58 (s, 1H), 5.14-5.05 (m, 1H), 4.44-4.00 (m, 15H), 3.97-3.42 (m, 47H), 3.28-3.18 (m, 3H), 3.14-2.99 (m, 7H), 2.45-2.34 (m, 7H), 2.18-1.99 (m, 5H), 1.58-1.13 (m, 32H). The NMR results confirmed that the structure of formula (IC7) is obtained. From ESI-MS, the peak corresponding to the molecular weight of the structure of formula (IC7) is also identified.

The NMR analysis result of the obtained drug conjugate of Formula (IC8) is as follows: $^1$H-NMR (400 MHz, D$_2$O): δ 8.16 (s, 1H), 8.11 (s, 1H), 7.51 (s, 1H), 5.41-5.38 (m, 2H), 5.19-5.16 (m, 1H), 4.43-4.17 (m, 6H), 4.08-3.40 (m, 22H), 3.30-3.25 (m, 1H), 1.85-1.75 (m, 2H), 1.55-1.52 (m, 2H), 1.37-1.16 (m, 7H). The NMR results confirmed that the structure of formula (IC8) is obtained. From ESI-MS, the peak corresponding to the molecular weight of the structure of formula (IC8) is also identified.

The NMR analysis result of the obtained drug conjugate of Formula (IC9) is as follows: $^1$H-NMR (400 MHz, D$_2$O): δ 8.15 (s, 1H), 8.12 (s, 1H), 7.50 (s, 1H), 5.18-5.14 (m, 1H), 4.46-4.04 (m, 7H), 3.93-3.42 (m, 8H), 1.97 (s, 3H), 1.84-1.74 (m, 2H), 1.44-1.14 (m, 9H). The NMR results confirmed that the structure of formula (IC9) is obtained. From ESI-MS, the peak corresponding to the molecular weight of the structure of formula (IC9) is also identified.

The NMR analysis result of the obtained drug conjugate of Formula (IC10) is as follows: $^1$H-NMR (400 MHz, D$_2$O): δ 8.18-7.98 (m, 2H), 7.71-7.43 (m, 1H), 7.28-7.16 (m, 2H), 7.11-6.95 (m, 2H), 5.58-5.39 (m, 1H), 5.19-4.92 (m, 2H), 4.51-4.47 (d, 1H, J=7.8 Hz), 4.41-3.91 (m, 5H), 3.90-3.65 (m, 10H), 3.65-3.53 (m, 2H), 1.37-1.27 (d, 3H, J=6.3 Hz). The NMR results confirmed that the structure of formula (IC10) is obtained. From ESI-MS, the peak corresponding to the molecular weight of the structure of formula (IC10) is also identified.

The NMR analysis result of the obtained drug conjugate of Formula (IC11) is as follows: $^1$H-NMR (400 MHz, D$_2$O): δ 8.14-7.97 (m, 2H), 7.03-6.79 (m, 5H), 5.19-5.06 (m, 1H), 5.06-4.99 (d, 1H, J=7.8), 4.45-4.15 (m, 3H), 4.08-3.61 (m, 11H), 3.61-3.44 (m, 3H), 1.33-1.24 (d, 3H, J=6.2 Hz). The NMR results confirmed that the structure of formula (IC11) is obtained. From ESI-MS, the peak corresponding to the molecular weight of the structure of formula (IC11) is also identified.

Synthesis Example D1: Synthesis of Drug Conjugate of Formula (ID1)

Figure 4:
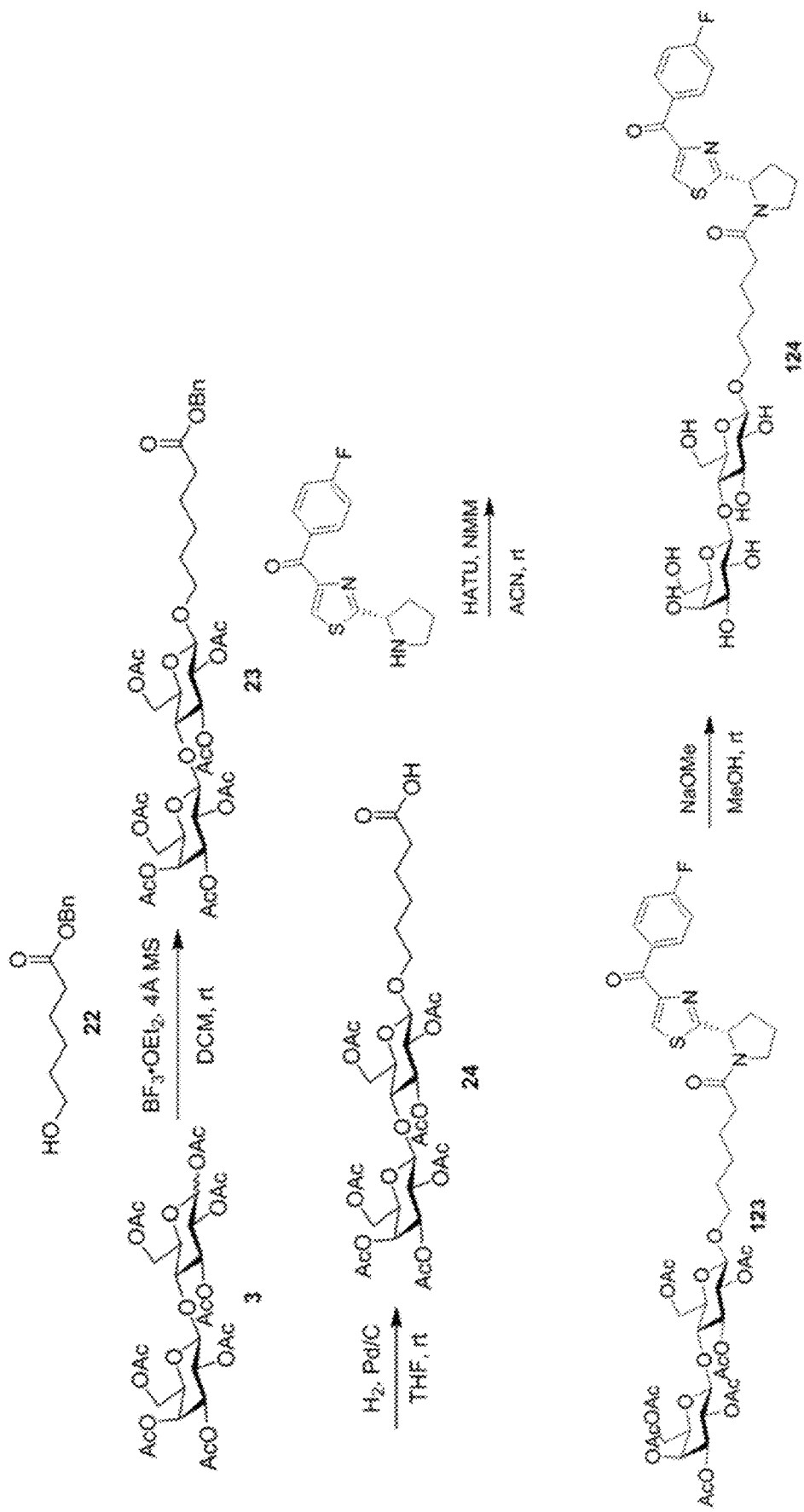
FIG. 4 is a scheme illustrating the synthesis of the drug conjugate of formula (ID1).

A drug conjugate of Formula (ID1) is synthesized according to the scheme illustrated in FIG. 4. Specifically, to a solution of compound 3 ((3R,4S,5R,6R)-6-(acetoxymethyl)-5-(((2S,3R,4S,5S,6R)-3,4,5-triacetoxy-6-(acetoxymethyl)

tetrahydro-2H-pyran-2-yl)oxy)tetrahydro-2H-pyran-2,3,4-triyl triacetate) (6.87 g, 10.1 mmol), compound 22 (benzyl 6-hydroxyhexanoate) (4.50 g, 20.02 mmol) and 4 Å MS (1.00 g) in DCM (70 mL) was added $BF_3 \cdot OEt_2$ (5.1 mL, 4.05 mmol) at 0° C. and stirred for 15 min, then was allowed to warm to RT over 12 h. The mixture was quenched with $NaHCO_{3(aq.)}$ and extracted with DCM. The combined organics were dried with $MgSO_4$, and concentrated. The residue was purified by silica gel column chromatography with using EtOAc:hexane (1:2) as eluent to provide compound 23 ((2R,3S,4S,5R,6S)-2-(acetoxymethyl)-6-(((2R,3R,4S,5R,6R)-4,5-diacetoxy-2-(acetoxymethyl)-6-((6-(benzyloxy)-6-oxohexyl)oxy)tetrahydro-2H-pyran-3-yl)oxy)tetrahydro-2H-pyran-3,4,5-triyl triacetate) (2.52 g, 3.00 mmol, yield 30%).

To a solution of compound 23 ((2R,3S,4S,5R,6S)-2-(acetoxymethyl)-6-(((2R,3R,4S,5R,6R)-4,5-diacetoxy-2-(acetoxymethyl)-6-((6-(benzyloxy)-6-oxohexyl)oxy)tetrahydro-2H-pyran-3-yl)oxy)tetrahydro-2H-pyran-3,4,5-triyl triacetate) (600 mg, 0.71 mmol) in MeOH (5 mL), 10% Pd/C (60 mg, 0.1 w %) was added and stirred under $H_2$ for 3 h. The mixture was filtered with celite to remove Pd/C and concentrated under reduced pressure to remove the solvent by evaporation. The crude product compound 24 was used in next step without purification.

To a solution of compound 24 (6-(((2R,3R,4S,5R,6R)-3,4-diacetoxy-6-(acetoxymethyl)-5-(((2S,3R,4S,5S,6R)-3,4,5-triacetoxy-6-(acetoxymethyl)tetrahydro-2H-pyran-2-yl)oxy)tetrahydro-2H-pyran-2-yl)oxy)hexanoic acid) (448 mg, 0.60 mmol) and (S)-(4-fluorophenyl)(2-(pyrrolidin-2-yl)thiazol-4-yl)methanonein (200 mg, 0.64 mmol) in ACN (10 mL), HATU (450 mg, 1.20 mmol) and NMM (350 µL, 3.19 mmol) were added and stirred at RT for 12 h. The mixture was concentrated and purified by silica gel column chromatography to provide the product compound 123 ((2R,3S,4S,5R,6S)-2-(acetoxymethyl)-6-(((2R,3R,4S,5R,6R)-4,5-diacetoxy-2-(acetoxymethyl)-6-((6-((S)-2-(4-(4-fluorobenzoyl)thiazol-2-yl)pyrrolidin-1-yl)-6-oxohexyl)oxy)tetrahydro-2H-pyran-3-yl)oxy)tetrahydro-2H-pyran-3,4,5-triyl triacetate) (435 mg, 0.43 mmol, yield 72%).

To a solution of compound 123 ((2R,3S,4S,5R,6S)-2-(acetoxymethyl)-6-(((2R,3R,4S,5R,6R)-4,5-diacetoxy-2-(acetoxymethyl)-6-((6-((S)-2-(4-(4-fluorobenzoyl)thiazol-2-yl)pyrrolidin-1-yl)-6-oxohexyl)oxy)tetrahydro-2H-pyran-3-yl)oxy)tetrahydro-2H-pyran-3,4,5-triyl triacetate) (435 mg, 0.43 mmol) in MeOH (20 mL), NaOMe (330 mg, 6.11 mmol) was added at 0° C. After addition, the reaction mixture was allowed to warm to RT and stirred for 1h. Subsequently, the reaction mixture was neutralized with Amberlite IR-120 (H) until reaching pH of 7. The solution was then filtered, and the solvent was removed. The resulting material was purified by reverse phase silica gel column chromatography to provide the product compound 124 (6-(((2R,3R,4R,5S,6R)-3,4-dihydroxy-6-(hydroxymethyl)-5-(((2S,3R,4S,5R,6R)-3,4,5-trihydroxy-6-(hydroxymethyl)tetrahydro-2H-pyran-2-yl)oxy)tetrahydro-2H-pyran-2-yl)oxy)-1-((S)-2-(4-(4-fluorobenzoyl)thiazol-2-yl)pyrrolidin-1-yl)hexan-1-one) (200 mg, 0.28 mmol, yield 65%). The compound 124 corresponds to the structure of formula (ID1).

The NMR analysis result of the compound 105 (formula (ID1)) is as follow: $^1$H-NMR (400 MHz, $CD_3OD$): δ 8.34-8.32 (m, 1H), 8.26-8.23 (m, 2H), 7.28-7.24 (m, 2H), 5.54-5.45 (m, 2H), 4.37-4.21 (m, 3H), 3.92-3.66 (m, 10H), 3.60-3.37 (m, 8H), 3.25-3.13 (m, 2H), 2.51-2.31 (m, 4H), 2.21-2.04 (m, 2H), 1.70-1.64 (m, 4H), 1.53-1.47 (m, 2H). The NMR results confirmed that the structure of formula (ID1) is obtained. From ESI-MS, the peak corresponding to the molecular weight of the structure of formula (ID1) is also identified.

Synthesis Examples D2-D5: Synthesis of Drug Conjugates of Formula (ID2)~(ID5)

In synthesis examples D2-D5, the drug conjugates of Formula (ID2) to formula (ID5) are synthesized with organic synthesis techniques similar to those described for synthesis example D1, and the details of the synthesis will be omitted herein. To prove that the drug conjugates of Formula (ID2) to formula (ID5) are successfully obtained, NMR and ESI-MS analysis are performed.

The NMR analysis result of the obtained drug conjugate of Formula (ID2) is as follows: $^1$H-NMR (400 MHz, $D_2O$): δ 8.22 (s, 1H), 7.89-7.78 (m, 2H), 7.24-7.15 (m, 2H), 5.26-5.15 (m, 1H), 4.90-4.81 (m, 1H), 4.488 (d, J=7.24, 1H), 4.387 (d, J=8, 1H), 4.19-4.09 (m, 2H), 4.04-3.95 (m, H), 3.94-3.81 (m, 3H), 3.79-3.42 (m, 11H), 3.32-3.23 (m, 1H), 2.51-2.30 (m, 1H), 2.12-1.89 (m, 3H), 1.88-1.72 (m, 1H), 1.61-1.45 (m, 2H), 1.44-1.16 (m, 3H), 1.01-0.89 (m, 2H), 0.86-0.72 (m, 2H). The NMR results confirmed that the structure of formula (ID2) is obtained. From ESI-MS, the peak corresponding to the molecular weight of the structure of formula (ID2) is also identified.

The NMR analysis result of the obtained drug conjugate of Formula (ID3) is as follows: $^1$H-NMR (400 MHz, $D_2O$): δ 8.20 (s, 1H), 7.95-7.91 (m, 2H), 7.78 (s, 1H), 7.35-7.31 (m, 2H), 5.40-5.35 (m, 2H), 5.27-5.24 (m, 2H), 4.93-4.90 (m, 1H), 4.41-4.39 (m, 2H), 4.25-4.22 (m, 2H), 3.98-3.41 (m, 29H), 3.30-3.25 (m, 1H), 2.54-2.45 (m, 1H), 2.12-2.02 (m, 4H), 1.87-1.83 (m, 1H), 1.74-1.66 (m, 2H), 1.53-1.45 (m, 2H), 1.25-1.19 (m, 2H), 1.14-1.08 (m, 2H). The NMR results confirmed that the structure of formula (ID3) is obtained. From ESI-MS, the peak corresponding to the molecular weight of the structure of formula (ID3) is also identified.

The NMR analysis result of the obtained drug conjugate of Formula (ID4) is as follows: $^1$H-NMR (400 MHz, $D_2O$): δ 8.20 (s, 1H), 8.15 (s, 1H), 7.98 (s, 1H), 7.96-7.83 (m, 3H), 7.78 (s, 1H), 7.27 (m, 2H), 5.31-5.16 (m, 3H), 4.90-4.84 (m, 1H), 4.42-4.34 (m, 6H), 4.28-4.20 (m, 2H), 4.12-4.03 (m, 2H), 3.92-3.83 (m, 5H), 3.82-3.62 (m, 7H), 3.61-3.44 (m, 10H), 3.25-3.18 (m, 3H), 3.13-2.98 (m, 6H), 2.48-2.35 (m, 2H), 2.26-2.17 (m, 2H), 2.16-2.08 (m, 2H), 2.07-1.90 (m, 6H), 1.88-1.76 (m, 2H), 1.56-1.43 (m, 4H), 1.43-1.32 (m, 4H), 1.3-1.13 (m, 10H). The NMR results confirmed that the structure of formula (ID4) is obtained. From ESI-MS, the peak corresponding to the molecular weight of the structure of formula (ID4) is also identified.

The NMR analysis result of the obtained drug conjugate of Formula (ID5) is as follows: $^1$H-NMR (400 MHz, $D_2O$): δ 8.25 (s, 1H), 8.05-8.01 (m, 2H), 7.30-7.25 (m, 2H), 5.44-5.41 (m, 1H), 4.90-4.89 (m, 1H), 4.46-4.44 (m, 1H), 3.94-3.53 (m, 18H), 8.34-8.32 (m, 1H), 2.43-2.06 (m, 7H), 1.64-1.09 (m, 18H). The NMR results confirmed that the structure of formula (ID5) is obtained. From ESI-MS, the peak corresponding to the molecular weight of the structure of formula (ID5) is also identified.

Synthesis Example E1: Synthesis of Drug Conjugate of Formula (IE1)

Figure 5:
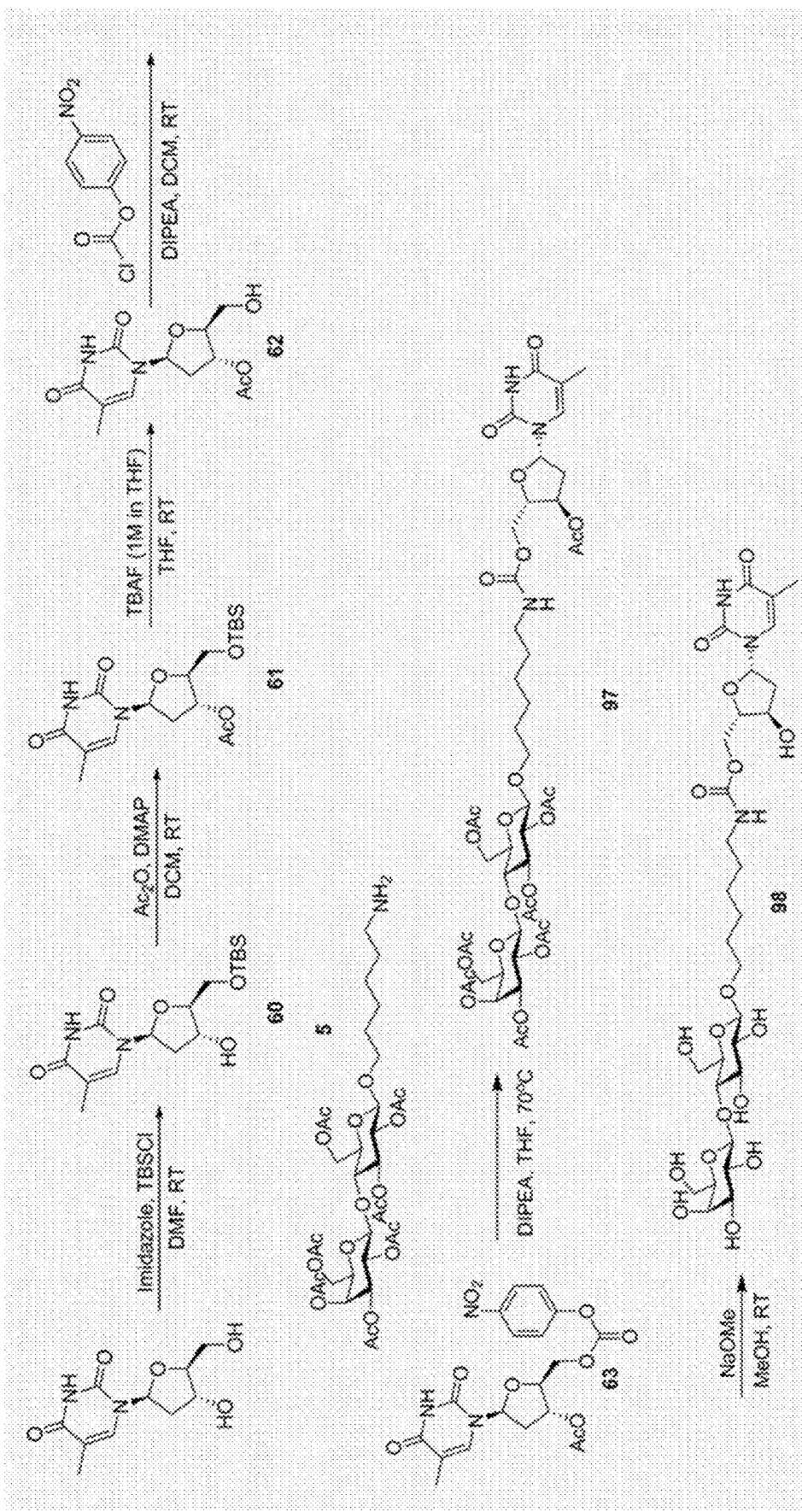
FIG. 5 is a scheme illustrating the synthesis of the drug conjugate of formula (IE1).

A drug conjugate of Formula (IE1) is synthesized according to the scheme illustrated in FIG. 5. Specifically, to a solution of 1-((2S,4R,5S)-4-hydroxy-5-(hydroxymethyl)tetrahydrofuran-2-yl)-5-methylpyrimidine-2,4(1H,3H)-dione (300.37 mg, 1.24 mmol) and Imidazole (168.83 mg, 2.48 mmol) in dried DMF (0.6 mL), a solution of TBSCl (186.89 mg, 1.24 mmol) in dried DMF (0.6 mL) was added at 0° C. and stirred for 30 min. Then, it was allowed to warm to RT and stirred for 18 h. The reaction mixture was diluted with EtOAc and washed with 10% $LiCl_{(aq.)}$ and $NaHCO_{3(aq.)}$. The combined organic layer was dried over $MgSO_4$, filtered and concentrated to provide compound 60 (1-((2S,4R,5S)-5-(((tert-butyldimethyl-silyl)oxy)methyl)-4-hydroxytetrahydrofuran-2-yl)-5-methylpyrimidine-2,4(1H,3H)-dione) (377.10 mg, 1.06 mmol, yield 85.4%).

To a solution of compound 60 (1-((2S,4R,5S)-5-(((tert-butyldimethyl-silyl)oxy)methyl)-4-hydroxytetrahydrofuran-2-yl)-5-methylpyrimidine-2,4(1H,3H)-dione) (950.00 mg, 2.66 mmol) in dried DCM (26 mL), DMAP (422.12 mg, 3.46 mmol) and $Ac_2O$ (407.34 mg, 3.99 mmol) was added. The mixture was stirred at RT for 6 h. After Removing the solvent, the resulting material was dissolved in EtOAc and washed with $NH_4Cl_{(aq.)}$. The combined organic layer was dried over $MgSO_4$, filtered and concentrated to provide compound 61 ((2S,3R,5S)-2-(((tert-butyldimethylsilyl)oxy) methyl)-5-(5-methyl-2,4-dioxo-3,4-dihy-dropyrimidin-1 (2H)-yl)tetrahydrofuran-3-yl acetate) (1060.09 mg, 2.66 mmol, yield equivalent).

To a solution of compound 61 ((2S,3R,5S)-2-(((tert-butyldimethylsilyl)oxy)methyl)-5-(5-methyl-2,4-dioxo-3,4-dihydropyrimidin-1(2H)-yl)tetrahydrofuran-3-yl acetate) (530.05 mg, 1.33 mmol) in THF (9 mL), 1M TBAF in THF (2 mL) was added at 0° C. and stirred for 1.5 h. After removing the solvent, the resulting material was purified by silica gel column chromatography (40% Hexane in Acetone as eluent) to provide compound 62 ((2S,3R,5S)-2-(hydroxymethyl)-5-(5-methyl-2,4-dioxo-3,4-dihydropyrimidin-1(2H)-yl)tetrahydrofuran-3-yl acetate) (266.40 mg, 0.94 mmol, 70.6%).

To a solution of compound 62 ((2S,3R,5S)-2-(hydroxymethyl)-5-(5-methyl-2,4-dioxo-3,4-dihydropyrimidin-1(2H)-yl)tetrahydrofuran-3-yl acetate) (310.00 mg, 1.09 mmol) in dried DCM (7 mL), 4-Nitrophenyl chloroformate (330.56 mg, 1.64 mmol) and DIPEA (351.56 mg, 2.72 mmol) were added. The reaction mixture was stirred at RT for 2 h. After removing the solvent, the resulting material was dissolved in EtOAc and washed with $H_2O$ and $NH_4Cl_{(aq.)}$. The combined organic layer was dried over $MgSO_4$, filtered and concentrated. The resulting crude product compound 63 was used in the next step without purification.

To a solution of compound 63 ((2S,3R,5S)-5-(5-methyl-2,4-dioxo-3,4-dihydropyrimidin-1(2H)-yl)-2-((((4-nitrophenoxy)carbonyl)oxy)methyl)tetrahydrofuran-3-yl acetate) (489.80 mg, 1.09 mmol) in dried THF (7 mL), compound 5 ((2R,3S,4S,5R,6S)-2-(acetoxymethyl)-6-(((2R,3R,4S,5R,6R)-4,5-diacetoxy-2-(aceto-xymethyl)-6-((6-aminohexyl)oxy)tetrahydro-2H-pyran-3-yl)oxy)tetrahydro-2H-pyran-3,4,5-triyl triacetate) (1.16 g, 1.58 mmol) and DIPEA (351.56 mg, 2.72 mmol) were added. The reaction mixture was heated to 70° C. and stirred for 18 h. After removing the solvent, the mixture was dissolved in EtOAc and washed with $H_2O$ and $NH_4Cl_{(aq.)}$. The combined organic layer was dried over $MgSO_4$, filtered and concentrated. The resulting material was purified by silica gel column chromatography (14.3% Hexane in EtOAc as eluent) to provide compound 97 ((2R,3S,4S,5R,6S)-2-(acetoxymethyl)-6-(((2R,3R,4S,5R,6R)-4,5-diacetoxy-6-((6-(((((2S,3R,5S)-3-acetoxy-5-(5-methyl-2,4-dioxo-3,4-dihydropyrimi-din-1(2H)-yl)tetrahydrofuran-2-yl)methoxy)carbonyl)amino)hexyl)oxy)-2-(aceto-xymethyl)tetrahydro-2H-pyran-3-yl)oxy)tetrahydro-2H-pyran-3,4,5-triyl triacetate) (474.60 mg, 0.45 mmol, 41.3%).

To a solution of compound 97 ((2R,3S,4S,5R,6S)-2-(acetoxymethyl)-6-(((2R,3R,4S,5R,6R)-4,5-diacetoxy-6-((6-(((((2S,3R,5S)-3-acetoxy-5-(5-methyl-2,4-dioxo-3,4-dihydropyrimi-din-1(2H)-yl)tetrahydrofuran-2-yl)methoxy)carbonyl)amino)hexyl)oxy)-2-(aceto-xymethyl)tetrahydro-2H-pyran-3-yl)oxy)tetrahydro-2H-pyran-3,4,5-triyl triacetate) (210.00 mg, 0.20 mmol) in MeOH (2 mL), NaOMe (27.01 mg, 0.50 mmol) was added and stirred at RT for 2 h. Subsequently, the reaction mixture was neutralized with resin until reaching a pH of 7. The solution was then filtered, and the solvent was removed. The resulting material was purified by C18 column chromatography (0-20% MeOH in $H_2O$ as eluent) to provide compound 98 (((2S, 3R,5S)-3-hydroxy-5-(5-methyl-2,4-dioxo-3,4-dihydropyrimidin-1(2H)-yl)tetrahydrofuran-2-yl)methyl (6-(((2R,3R, 4R,5S,6R)-3,4-dihydroxy-6-(hydroxylme-thyl)-5-(((2S,3R, 4S,-5R,6R)-3,4,5-trihydroxy-6-(hydroxymethyl)tetrahydro-2H-pyran-2-yl)oxy)tetrahydro-2H-pyran-2-yl)oxy)hexyl) carbamate) (51.30 mg, 0.07 mmol, yield 35.0%). The compound 98 corresponds to the structure of formula (IE1).

The NMR analysis result of the compound 98 (formula (IE1)) is as follow: $^1$H-NMR (400 MHz, $D_2O$): δ 7.51 (s, 1H), 6.28-6.24 (t, 1H), 4.53-4.41 (m, 4H), 4.29-4.17 (m, 2H), 3.99-3.54 (m, 13H), 3.33-3.29 (m, 1H), 3.12-3.09 (t, 2H), 2.46-2.31 (m, 2H), 1.89 (s, 3H), 1.60-1.32 (m, 8H). The NMR results confirmed that the structure of formula (IE1) is obtained. From ESI-MS, the peak corresponding to the molecular weight of the structure of formula (IE1) is also identified.

Synthesis Example F1: Synthesis of Drug Conjugate of Formula (IF1)

Figure 6:
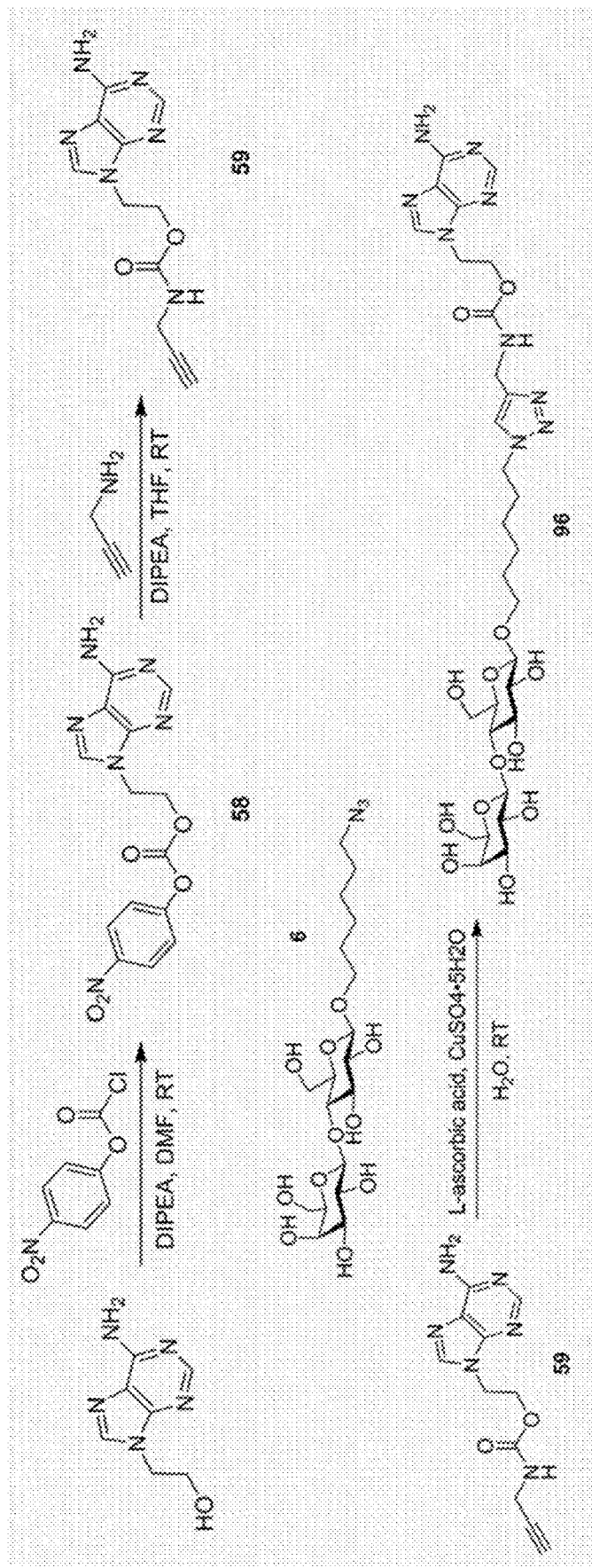
FIG. 6 is a scheme illustrating the synthesis of the drug conjugate of formula (IF1).

A drug conjugate of Formula (IF1) is synthesized according to the scheme illustrated in FIG. 6. Specifically, to a solution of 2-(6-amino-9H-purin-9-yl)ethan-1-ol (500.00 mg, 2.79 mmol) in dried DMF (5.5 mL), 4-Nitrophenyl chloroformate (1.52 g, 7.54 mmol) and DIPEA (1.08 g, 8.37 mmol) were added. The reaction mixture was stirred at RT under $N_2$ for 18 h, resulting a yellow solution with precipitate. The reaction mixture was then diluted with $H_2O$, and the resulting precipitate was collected as a light-yellow solid (compound 58). Subsequently, the light-yellow solid was dissolved in dried THF (18 mL), and propargylamine (384.46 mg, 6.98 mmol) and DIPEA (360.61 mg, 2.79 mmol) were added. The reaction mixture was stirred at RT under $N_2$ for 4 h, resulting an orange solution with precipitate. The solvent was removed under reduced pressure, and the precipitate was washed with EtOAc and acetone to provide compound 59 (2-(6-amino-9H-purin-9-yl)ethyl prop-2-yn-1-ylcarbamate) (314.90 mg, 1.21 mmol, yield 43.4%).

To a solution of compound 59 (2-(6-amino-9H-purin-9-yl)ethyl prop-2-yn-1-ylcarbamate) (83.28 mg, 0.32 mmol) and compound 6 ((2S,3R,4S,5R,6R)-2-(((2R,3S,4R,5R,6R)-6-((6-azidohexyl)oxy)-4,5-dihydroxy-2-(hydroxymethyl) tetrahydro-2H-pyran-3-yl)oxy)-6-(hydroxymethyl)tetrahydro-2H-pyran-3,4,5-triol) (122.90 mg, 0.26 mmol) in MeOH (2 mL), a green solution of L-ascorbic acid (18.65 mg, 0.11 mmol) and $CuSO_4 \cdot 5H_2O$ (13.25 mg, 0.05 mmol) in $H_2O$ (2 mL) was added. The reaction mixture was stirred at RT for 1-2 h, resulting a yellow-green solution. Removed the MeOH and then the resulting material was purified by C18 column chromatography (0-15% ACN in $H_2O$ as eluent) to provide compound 96 (2-(6-amino-9H-purin-9-yl)ethyl ((1-(6-(((2R,3R,4R,5S,6R)-3,4-dihydroxy-6-(hydroxymethyl)-5-(((2S,3R,4S,5R,6R)-3,4,5-trihydroxy-6-(hydroxymethyl)tetrahydro-2H-pyran-2-yl)oxy)tetrahydro-2H-pyran-2-yl)oxy)hexyl)-1H-1,2,-3-triazol-4-yl)methyl) carbamate) (70.70 mg, 0.10 mmol, yield 38.5%). The compound 96 corresponds to the structure of formula (IF1).

The NMR analysis result of the compound 96 (formula (IF1)) is as follow: $^1$H-NMR (400 MHz, $D_2O$): δ 8.19 (s, 1H), 8.17 (s, 1H), 7.66 (s, 1H), 4.53-4.44 (m, 7H), 4.28-4.23 (m, 3H), 4.02-3.97 (m, 2H), 3.91-3.57 (m, 12H), 3.36-3.32 (m, 1H), 1.90-1.79 (m, 2H), 1.61-1.57 (m, 2H), 1.35-1.18 (m, 4H). The NMR results confirmed that the structure of formula (IF1) is obtained. From ESI-MS, the peak corresponding to the molecular weight of the structure of formula (IF1) is also identified.

Synthesis Example F2: Synthesis of Drug Conjugate of Formula (IF2)

In synthesis examples F2, the drug conjugate of Formula (IF2) is synthesized with organic synthesis techniques similar to those described for synthesis example F1, and the details of the synthesis will be omitted herein. To prove that the drug conjugates of Formula (IF2) is successfully obtained, NMR and ESI-MS analysis are performed.

The NMR analysis result of the drug conjugate of Formula (IF2) is as follow: $^1$H-NMR (400 MHz, $D_2O$): δ 8.23 (s, 1H), 8.16 (s, 1H), 4.48-4.46 (m, 5H), 4.00-3.54 (m, 15H), 2.88-2.85 (m, 2H), 1.58-1.55 (m, 2H), 1.27-1.07 (m, 6H). The NMR results confirmed that the structure of formula (IF2) is obtained. From ESI-MS, the peak corresponding to the molecular weight of the structure of formula (IF2) is also identified.

Synthesis Example G1: Synthesis of Drug Conjugate of Formula (IG1)

Figure 7:
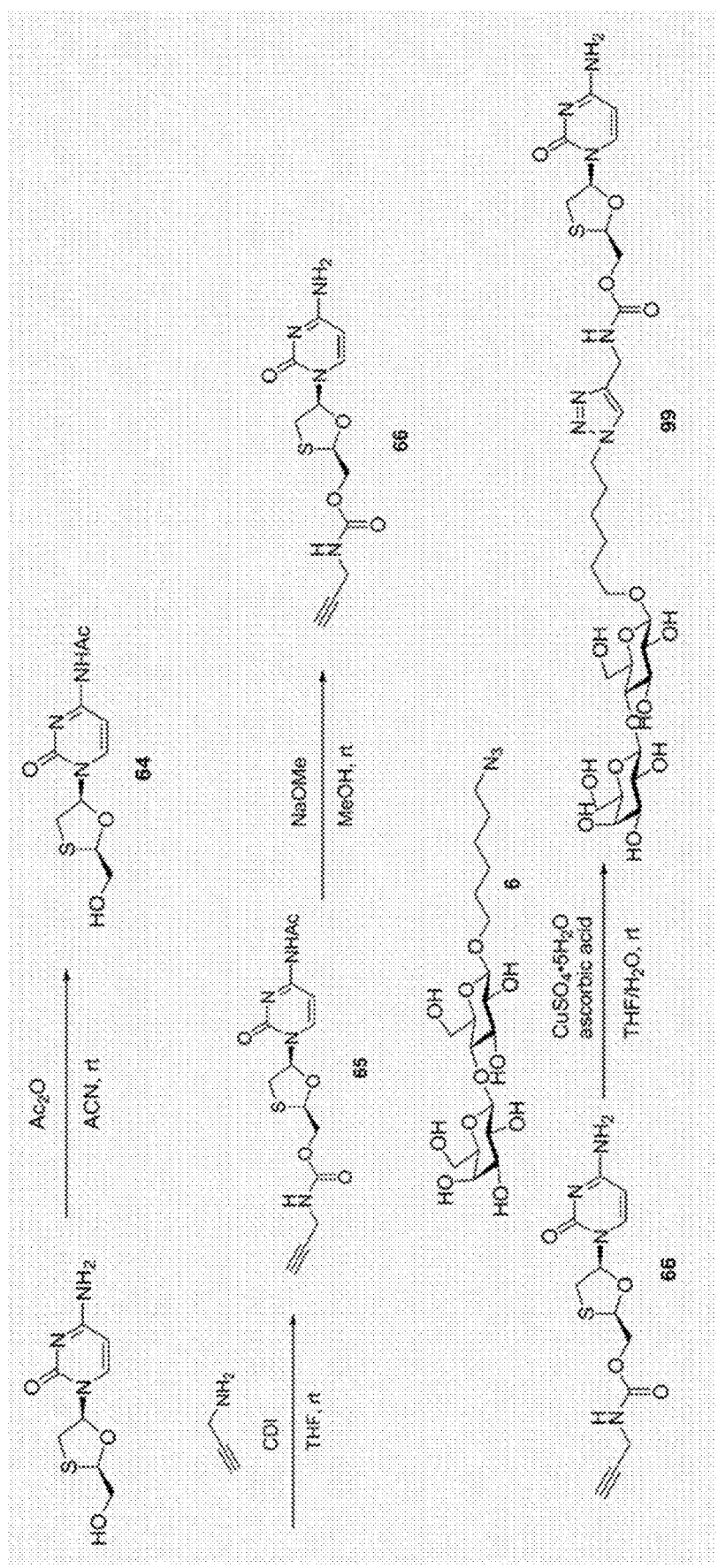
FIG. 7 is a scheme illustrating the synthesis of the drug conjugate of formula (IG1).

A drug conjugate of Formula (IG1) is synthesized according to the scheme illustrated in FIG. 7. Specifically, to a solution of Lamivudine (2.00 g, 8.72 mmol) in ACN (90 mL), $Ac_2O$ (1 mL, 8.99 mmol) was added and stirred at RT for 12 h. The reaction mixture was then diluted with $H_2O$, and the resulting precipitate was collected. The crude product compound 64 (N-(1-((2R,5S)-2-(hydroxymethyl)-1,3-oxathiolan-5-yl)-2-oxo-1,2-dihydropyrimidin-4-yl)acetamide) (2.03 g, crude yield 85%) was used in the next step without purification.

To a solution of compound 64 (N-(1-((2R,5S)-2-(hydroxymethyl)-1,3-oxathiolan-5-yl)-2-oxo-1,2-dihydropyrimidin-4-yl)acetamide) (1.00 mg, 3.69 mmol) in THF (40 mL), CDI (1.20 g, 7.37 mmol) was added and stirred at 50° C. for 3 h. Then, prop-2-yn-1-amine (0.90 mL, 14.74 mmol) was added and stirred at 50° C. for 12 h. The solvent was removed under reduced pressure. The resulting material was purified by silica gel column chromatography with using EtOAc:MeOH (5%) as eluent to provide the product compound 65 (((2R,5S)-5-(4-acetamido-2-oxopyrimidin-1(2H)-yl)-1,3-oxathiolan-2-yl)methyl prop-2-yn-1-ylcarbamate) (0.72 g, 2.04 mmol, yield 55%).

To a solution of compound 65 (((2R,5S)-5-(4-acetamido-2-oxopyrimidin-1(2H)-yl)-1,3-oxathiolan-2-yl)methyl prop-2-yn-1-ylcarbamate) (260 mg, 0.72 mmol) in MeOH (5 mL), NaOMe (40 mg, 0.72 mmol) was added at 0° C. After addition, the reaction mixture was allowed to warm to RT and stirred for 15 min. Subsequently, the reaction mixture was neutralized with Amberlite IR-120 (H) until reaching pH of 7. The solution was then filtered, and the solvent was removed. The crude product compound 66 was used in the next step without purification.

To a solution of compound 66 (((2R,5S)-5-(4-amino-2-oxopyrimidin-1(2H)-yl)-1,3-oxathiolan-2-yl)methyl prop-2-yn-1-ylcarbamate) (223 mg, 0.72 mmol) and compound 6 ((2S,3R,4S,5R,6R)-2-(((2R,3S,4R,5R,6R)-6-((6-azidohexyl)oxy)-4,5-dihydroxy-2-(hydroxymethyl)tetrahydro-2H-pyran-3-yl)oxy)-6-(hydroxymethyl)tetrahydro-2H-pyran-3,4,5-triol) (280 mg, 0.60 mmol) in THF (3 mL), a solution of $CuSO_4$—$H_2O$ (30 mg, 0.12 mmol) and ascorbic acid (42 mg, 0.24 mmol) in $H_2O$ (3 mL) was added and stirred at RT for 3 h. The mixture was concentrated under reduced pressure to remove the THF. The resulting material was purified by reverse phase silica gel column chromatography using ACN:$H_2O$ (15%) as eluent to provide the product compound 99 (((2R,5S)-5-(4-amino-2-oxopyrimidin-1(2H)-yl)-1,3-oxathiolan-2-yl)methyl ((1-(6-(((2R,3R,4R,5S,6R)-3,4-dihydroxy-6-(hydroxymethyl)-5-(((2S,3R,4S,5R,6R)-3,4,5-trihydroxy-6-(hydroxymethyl)tetrahydro-2H-pyran-2-yl)oxy)tetrahydro-2H-pyran-2-yl)oxy)hexyl)-1H-1,2,3-triazol-4-yl)methyl)carbamate) (300 mg, 0.39 mmol, yield 64%). The compound 99 corresponds to the structure of formula (IG1).

The NMR analysis result of the compound 99 (formula (IG1)) is as follow: $^1$H-NMR (400 MHz, $CD_3OD$): δ 7.85-7.83 (m, 1H), 7.82 (s, 1H), 6.29-6.27 (m, 1H), 5.88-5.87 (m, 1H), 5.40-5.39 (m, 1H), 4.58 (s, 1H), 4.54-4.34 (m, 7H), 4.29-4.27 (m, 1H), 3.91-3.68 (m, 7H), 3.60-3.47 (m, 7H), 3.41-3.38 (m, 1H), 3.26-3.22 (m, 1H), 3.14-3.10 (m, 1H), 1.90-1.83 (m, 2H), 1.63-1.56 (m, 2H), 1.46-1.38 (m, 2H), 1.34-1.26 (m, 2H). The NMR results confirmed that the structure of formula (IG1) is obtained. From ESI-MS, the peak corresponding to the molecular weight of the structure of formula (IG1) is also identified.

Synthesis Example H1: Synthesis of Drug Conjugate of Formula (IH1)

Figure 8:
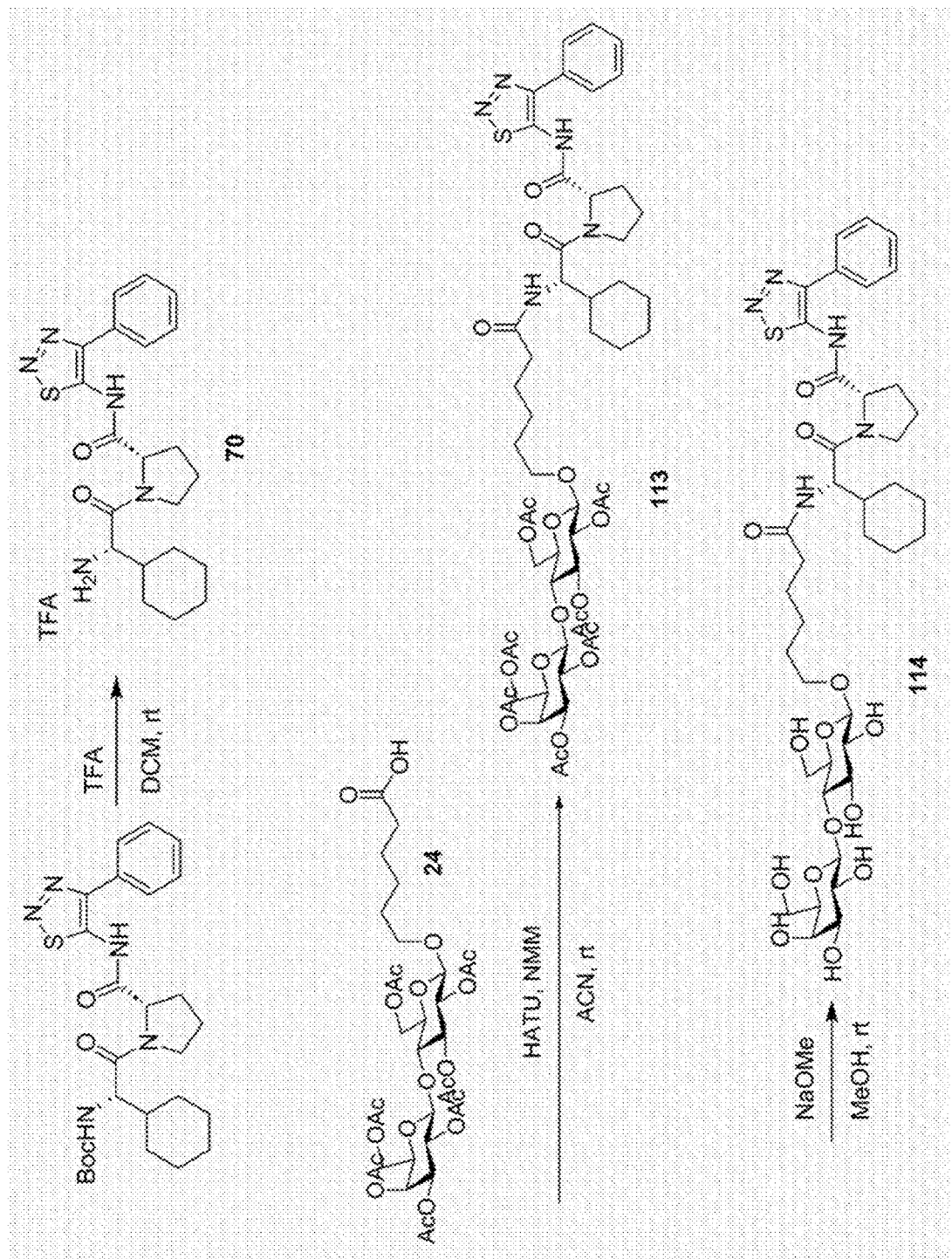
FIG. 8 is a scheme illustrating the synthesis of the drug conjugate of formula (IH1).

A drug conjugate of Formula (IH1) is synthesized according to the scheme illustrated in FIG. 8. Specifically, to a solution of tert-butyl ((S)-1-cyclohexyl-2-oxo-2-((S)-2-((4-phenyl-1,2,3-thiadiazol-5-yl)carbamoyl)pyrrolidin-1-yl)ethyl)carbamate (500 mg, 0.97 mmol) in DCM (3 mL), TFA (3 mL, 39.18 mmol) was added and stirred at RT. After the reaction was completed, the solvent and TFA were removed under reduced pressure. The crude product compound 70 ((S)-1-((S)-2-amino-2-cyclohexylacetyl)-N-(4-phenyl-1,2,3-thiadiazol-5-yl)pyrrolidine-2-carboxamide trifluoroacetic acid salt) (Yield equivalent) was used in the next step without purification.

To a solution of compound 24 (6-(((2R,3R,4S,5R,6R)-3,4-diacetoxy-6-(acetoxymethyl)-5-(((2S,3R,4S,5S,6R)-3,4,5-triacetoxy-6-(acetoxymethyl)tetrahydro-2H-pyran-2-yl)oxy)tetrahydro-2H-pyran-2-yl)oxy)hexanoic acid) (720 mg, 0.96 mmol) and compound 70 ((S)-1-((S)-2-amino-2-cyclohexylacetyl)-N-(4-phenyl-1,2,3-thiadiazol-5-yl)pyrrolidine-2-carboxamide trifluoroacetic acid salt) (512 mg, 0.97 mmol) in ACN (10 mL), HATU (370 mg, 0.97 mmol) and NMM (0.5 mL, 4.54 mmol) were added and stirred at RT for 12 h. The mixture was purified by silica gel column chromatography to provide compound 113 ((2R,3S,4S,5R,6S)-2-(acetoxymethyl)-6-(((2R,3R,4S,5R,6R)-4,5-diacetoxy-2-(acetoxymethyl)-6-((6-(((S)-1-cyclohexyl-2-oxo-2-((S)-2-((4-phenyl-1,2,3-thiadiazol-5-yl)carbamoyl)pyrrolidin-1-yl)

ethyl)amino)-6-oxohexyl)oxy)tetrahydro-2H-pyran-3-yl) oxy)tetrahydro-2H-pyran-3,4,5-triyl triacetate) (550 mg, 0.48 mmol, yield 50%).

To a solution of compound 113 ((2R,3S,4S,5R,6S)-2-(acetoxymethyl)-6-(((2R,3R,4S,5R,6R)-4,5-diacetoxy-2-(acetoxymethyl)-6-((6-(((S)-1-cyclohexyl-2-oxo-2-((S)-2-((4-phenyl-1,2,3-thiadiazol-5-yl)carbamoyl)pyrrolidin-1-yl) ethyl)amino)-6-oxohexyl)oxy)tetrahydro-2H-pyran-3-yl) oxy)tetrahydro-2H-pyran-3,4,5-triyl triacetate) (550 mg, 0.48 mmol) in MeOH (10 mL), NaOMe (350 mg, 6.48 mmol) was added at 0° C. After warming to RT, the reaction mixture was stirred until the reaction completed. The mixture was quenched with Amberlite IR-120 (H) and filtered to remove. The resulting material was purified by reverse phase silica gel column chromatography to provide the product compound 114 ((S)-1-((S)-2-cyclohexyl-2-(6-(((2R,3R,4R, 5S,6R)-3,4-dihydroxy-6-(hydroxymethyl)-5-(((2S,3R,4S, 5R,6R)-3,4,5-trihydroxy-6-(hydroxymethyl)tetrahydro-2H-pyran-2-yl)oxy)tetrahydro-2H-pyran-2-yl)oxy)hexanamido) acetyl)-N-(4-phenyl-1,2,3-thiadiazol-5-yl)pyrrolidine-2-carboxamide) (180 mg, 0.21 mmol, yield 44%). The compound 114 corresponds to the structure of formula (IH1).

The NMR analysis result of the compound 114 (formula (IH1)) is as follow: $^1$H-NMR (400 MHz, CD$_3$OD): δ 7.76-7.74 (m, 2H), 7.61-7.58 (m, 2H), 7.54-7.50 (m, 1H), 4.58 (s, 1H), 4.42-4.26 (m, 4H), 4.04-3.99 (m, 1H), 3.91-3.67 (m, 9H), 3.60-3.46 (m, 7H), 3.40-3.36 (m, 1H), 3.25-3.20 (m, 1H), 2.25-2.04 (m, 7H), 1.85-1.58 (m, 10H), 1.44-1.36 (m, 2H), 1.24-1.16 (m, 2H), 1.10-0.97 (m, 2H). The NMR results confirmed that the structure of formula (IH1) is obtained. From ESI-MS, the peak corresponding to the molecular weight of the structure of formula (IH1) is also identified.

Synthesis Examples H2-H3: Synthesis of Drug Conjugates of Formula (IH2)~(IH3)

In synthesis examples H2-H3, the drug conjugates of Formula (IH2) to formula (IH3) are synthesized with organic synthesis techniques similar to those described for synthesis example H1, and the details of the synthesis will be omitted herein. To prove that the drug conjugates of Formula (IH2) to formula (IH3) are successfully obtained, NMR and ESI-MS analysis are performed.

The NMR analysis result of the drug conjugate of Formula (IH2) is as follow: $^1$H-NMR (400 MHz, CD$_3$OD): δ 7.75-7.72 (m, 2H), 7.62-7.57 (m, 2H), 7.55-7.51 (m, 1H), 4.52 (s, 4H), 4.37-4.34 (m, 1H), 4.29-4.27 (m, 1H), 3.91-3.37 (m, 15H), 3.25-3.21 (m, 1H), 2.43-2.39 (m, 2H), 2.21-2.01 (m, 4H), 1.67-1.60 (m, 4H), 1.47-1.39 (m, 2H). The NMR results confirmed that the structure of formula (IH2) is obtained. From ESI-MS, the peak corresponding to the molecular weight of the structure of formula (IH2) is also identified.

The NMR analysis result of the drug conjugate of Formula (IH3) is as follow: $^1$H-NMR (400 MHz, D$_6$-DMSO): δ 8.16-8.04 (m, 1H), 7.95-7.79 (br, 2H), 7.62-7.29 (br, 3H), 5.22-5.14 (m, 1H), 5.09(d, 1H, J=3.6), 4.91-4.80 (m, 1H), 4.70-4.57 (m, 4H), 2.11-1.77 (br, 4H), 4.50(d, 1H, J=4.4), 4.45-4.23 (m, 4H), 4.23-4.17 (m, 1H), 4.15-3.97 (m, 2H), 3.86-3.75 (m, 1H), 3.73-3.56 (m, 4H), 3.56-3.40 (m, 4H), 3.09-3.01 (m, 1H), 2.30-2.18 (m, 1H), 2.02-1.68 (br, 4H), 1.63-1.47 (br, 3H), 1.39-1.16 (br, 3H). The NMR results confirmed that the structure of formula (IH3) is obtained.

From ESI-MS, the peak corresponding to the molecular weight of the structure of formula (IH3) is also identified.

Synthesis Example J1: Synthesis of Drug Conjugate of Formula (IJ1)

Figure 9:
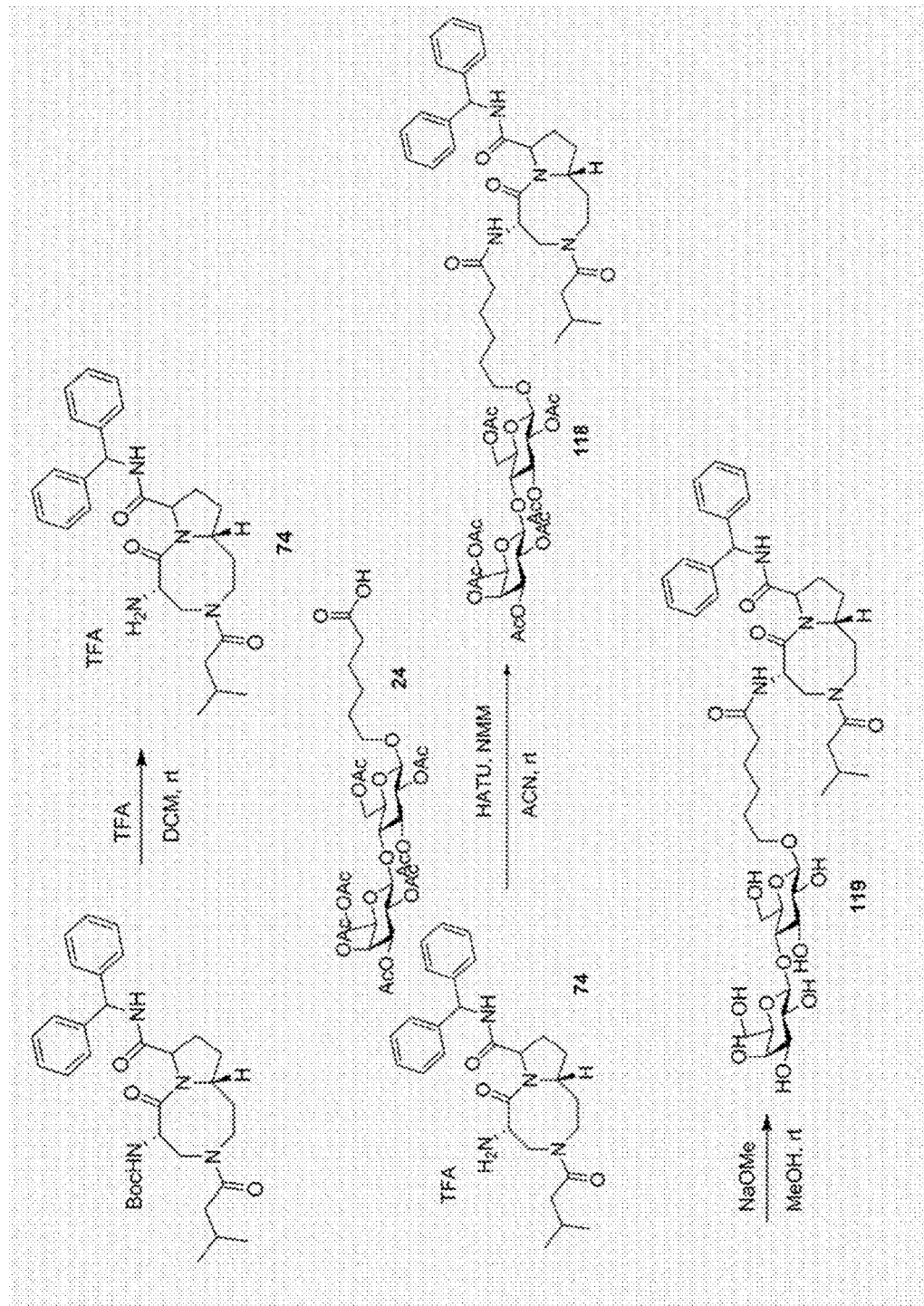
FIG. 9 is a scheme illustrating the synthesis of the drug conjugate of formula (IJ1).

A drug conjugate of Formula (IJ1) is synthesized according to the scheme illustrated in FIG. 9. Specifically, to a solution of tert-butyl ((5S,10aR)-8-(benzhydrylcarbamoyl)-3-(3-methylbutanoyl)-6-oxodecahydropyrrolo[1,2-a][1,5] diazocin-5-yl)carbamate (200 mg, 0.35 mmol) in DCM (3 mL), TFA (3 mL, 39.18 mmol) was added and stirred at RT. After the reaction was completed, the solvent and TFA were removed under reduced pressure. The crude product compound 74 ((5S,10aR)-5-amino-N-benzhydryl-3-(3-methylbutanoyl)-6-oxodecahydropyrrolo[1,2-a][1,5]diazocine-8-carboxamide trifluoroacetic acid salt) (Yield equivalent) was used in the next step without purification.

To a solution of compound 24 (6-(((2R,3R,4S,5R,6R)-3, 4-diacetoxy-6-(acetoxymethyl)-5-(((2S,3R,4S,5S,6R)-3,4, 5-triacetoxy-6-(acetoxymethyl)tetrahydro-2H-pyran-2-yl) oxy)tetrahydro-2H-pyran-2-yl)oxy)hexanoic acid) (390 mg, 0.52 mmol) and compound 74 ((5S,10aR)-5-amino-N-benzhydryl-3-(3-methylbutanoyl)-6-oxodecahydropyrrolo[1,2-a][1,5]diazocine-8-carboxamide trifluoroacetic acid salt) (207 mg, 0.35 mmol) in ACN (5 mL), HATU (265 mg, 0.69 mmol) and NMM (0.2 mL, 1.86 mmol) were added and stirred at RT for 12 h. The mixture was purified by silica gel column chromatography to provide compound 118 ((2R,3S, 4S,5R,6S)-2-(acetoxymethyl)-6-(((2R,3R,4S,5R,6R)-4,5-diacetoxy-2-(acetoxymethyl)-6-((6-(((5S,10aR)-8-(benzhydrylcarbamoyl)-3-(3-methylbutanoyl)-6-oxodecahydropyrrolo[1,2-a][1,5]diazocin-5-yl)amino)-6-oxohexyl)oxy)tetrahydro-2H-pyran-3-yl)oxy)tetrahydro-2H-pyran-3,4,5-triyl triacetate) (320 mg, 0.26 mmol, yield 75%).

To a solution of compound 118 ((2R,3S,4S,5R,6S)-2-(acetoxymethyl)-6-(((2R,3R,4S,5R,6R)-4,5-diacetoxy-2-(acetoxymethyl)-6-((6-(((5S,10aR)-8-(benzhydrylcarbamoyl)-3-(3-methylbutanoyl)-6-oxodecahydropyrrolo[1,2-a] [1,5]diazocin-5-yl)amino)-6-oxohexyl)oxy)tetrahydro-2H-pyran-3-yl)oxy)tetrahydro-2H-pyran-3,4,5-triyl triacetate) (320 mg, 0.26 mmol) in MeOH (10 mL), NaOMe (200 mg, 3.70 mmol) was added at 0° C. After warming to RT, the reaction mixture was stirred until the reaction completed. The mixture was quenched with Amberlite IR-120 (H) and filtered to remove. The resulting material was purified by reverse phase silica gel column chromatography to provide the product compound 119 ((5S,10aR)—N-benzhydryl-5-(6-(((2R,3R,4R,5S,6R)-3,4-dihydroxy-6-(hydroxymethyl)-5-(((2S,3R,4S,5R,6R)-3,4,5-trihydroxy-6-(hydroxymethyl) tetrahydro-2H-pyran-2-yl)oxy)tetrahydro-2H-pyran-2-yl) oxy)hexanamido)-3-(3-methylbutanoyl)-6-oxodecahydropyrrolo[1,2-a][1,5]diazocine-8-carboxamide) (90 mg, 0.10 mmol, yield 38%). The compound 118 corresponds to the structure of formula (IJ1).

The NMR analysis result of the compound 118 (formula (IJ1)) is as follow: $^1$H-NMR (400 MHz, CD$_3$OD): δ 7.36-7.25 (m, 10H), 6.14 (s, 1H), 4.83-4.81 (m, 1H), 4.77-4.76 (m, 1H), 4.59 (s, 1H), 4.35-4.33 (m, 1H), 4.23-4.18 (m, 1H), 3.94-3.33 (m, 17H), 2.48-1.40 (m, 21H), 0.98-0.94 (m, 6H). The NMR results confirmed that the structure of formula (IJ1) is obtained. From ESI-MS, the peak corresponding to the molecular weight of the structure of formula (IJ1) is also identified.

Synthesis Example J2: Synthesis of Drug Conjugate of Formula (IJ2)

In synthesis example J2, the drug conjugate of Formula (IJ2) is synthesized with organic synthesis techniques similar to those described for synthesis example J1, and the details of the synthesis will be omitted herein. To prove that the drug conjugates of Formula (IJ2) is successfully obtained, NMR and ESI-MS analysis are performed.

The NMR analysis result of the drug conjugate of Formula (IJ2) is as follow: $^1$H-NMR (400 MHz, $D_6$-DMSO): δ 8.92-8.86 (m, 1H), 8.11(s, H), 7.37-7.21 (m, 10H), 6.91-6.85 (m, 1H), 6.07 (d, 1H, J=8.8), 5.19-5.06 (m, 2H), 4.84(d, 1H, J=12.0), 4.80-4.76 (m, 2H), 4.70-4.60 (m, 4H), 4.54-4.41 (m, 4H), 4.36-4.30 (m, 4H), 4.23-4.18 (m, 2H), 4.13-4.04 (m, 2H), 4.01-3.41 (m, 2H), 3.25-2.99 (m, 4H), 2.34-2.13 (m, 4H), 2.13-1.92 (m, 4H), 1.90-1.46 (m, 10H), 1.40-1.18 (m, 5H). The NMR results confirmed that the structure of formula (IJ2) is obtained. From ESI-MS, the peak corresponding to the molecular weight of the structure of formula (IJ2) is also identified.

Experimental Examples

In the following experimental examples, in vitro cell line evaluation and in vivo animal experiments are conducted to prove that the drug conjugate of the present disclosure is superior over conventional methods in the treatment of hepatitis B. The following materials and methods may be applied to all the experimental examples.

[Cell Lines and Culture Conditions]—HepG2 2.2.15 Cells

In the following experimental examples, when HepG2 2.2.15 cells (a cell line that expresses the hepatitis B virus) are used, the cells are maintained in Dulbecco's modified Eagle's medium (DMEM) (Gibco BRL, Grand Island, NY, USA) plus 10% fetal bovine serum (Hyclone, Logan, UT, USA), 100U/mL penicillin, 100 U/mL streptomycin. HepG2.2.15 cells were seeded at the same density and used as a medium control. The experimental group is composed by administering the substance in the concentration specified by the manufacturer. All cultures were grown in humidified incubators at 37° C. and 5% CO2.

[Detection of Hepatitis B Surface Antigen (HBsAg), Hepatitis B e Antigen (HBeAg)]

HepG2 2.2.15 cells were plated into 12-well microtiter plates. On day zero, the cells were washed several times with PBS and treated with tetracycline-free medium that contained either a test drug or a vehicle control group. Each test compound was screened at one concentration in triplicate. On day 3, day 6 and/or day 9, the medium was removed and replaced with fresh medium containing the compound. Twenty-four hours later, the medium was collected and clarified by centrifugation (Sorvall RT-6000D centrifuge, 1,000 rpm, 5 min). Media of HepG2 2.2.15 cells cultures were harvested at 3—, 6-, and 9-days post-HBV infection, and levels of hepatitis B surface antigen (HBsAg) and hepatitis B e antigen (HBeAg) in culture media were measured using an AXSYM system kit (Abbott Diagnostika).

[Cell Lines and Culture Conditions]—HepAD38 Cells

In the following experimental examples, when HepAD38 cells (a cell line that expresses the hepatitis B virus) are used, the cells are maintained in Dulbecco's modified Eagle's/F-12 medium (DMEM/F-12; GIBCO BRL/Life Technologies, Gaithersburg, Md.) supplemented with 10% fetal bovine serum (FBS), 100 U/ml penicillin, 100 g/ml streptomycin, 5 g/ml ITS, 400 g/ml G418, and 1.5 g/ml tetracycline. The production of HBV particle was induced in the HepAD38 cell line by incubation in medium lacking tetracycline. When HepAD38 cells were used for HBV collection, tetracycline was removed from the cell culture for 9 days and then treated with test drug or dimethyl sulfoxide (DMSO) vehicle control.

[Detection of Hepatitis B Surface Antigen (HBsAg), Hepatitis B e Antigen (HBeAg)]

HepAD38 cells were plated into 12-well microtiter plates (seeding $2\times10^5$ cells/well) and grown for 3 days in the presence of 0.3 mg of tetracycline per ml. On day zero, the cells were washed several times with PBS and treated with tetracycline-free medium that contained either a test drug or a vehicle control group. Each test compound was screened at one concentration in triplicate. On day 3, day 6 and day 9, the medium was removed and replaced with fresh medium containing the compound. Twenty-four hours later, the medium was collected and clarified by centrifugation (Sorvall RT-6000D centrifuge, 1,000 rpm, 5 min). Media of HepAD38 cells cultures were harvested at 3—, 6-, and 9-days post-HBV infection, and levels of hepatitis B surface antigen (HBsAg) and hepatitis B e antigen (HBeAg) in culture media were measured using an AXSYM system kit (Abbott Diagnostika). Supernatant medium was assayed for the presence of HBV DNA by RT-PCR.

[In Vivo Materials and Method]

For the in vivo experiments, male C3H/HeN mice were purchased from the National Laboratory Animal Center (Taipei, Taiwan). The animals were kept in the National Yang Ming Chiao Tung University College of Medicine Laboratory Animal Center in specific pathogen-free conditions. All mice were used according to guidelines for experimental animal use specified by the National Yang Ming Chiao Tung University College of Medicine. Four mice per cage were fed normal chow and kept in a temperature-controlled room (21±3° C.) with a 12/12 h day-night cycle (lights on from 06:00 am to 06:00 pm) containing a twilight period of 30 min.

[Hydrodynamic Injection and Serum Collection]

For the in vivo experiments, HBV expression plasmid-pAAV/HBV1.2 (genotype A) was used in accordance with Huang et al. (Proc Natl Acad Sci USA 2006; 103:17862-17867). Before hydrodynamic injection (HDI), all animals were anesthetized using ketamine (0.75 g/kg; Merial) and xylazine (60 µg/kg; Bayer) administered by intramuscular injection. Ten micrograms of pAAV/HBV1.2 dissolved in 8% body weight of PBS was injected into the tail veins of the mice. The injection time was controlled between 5 and 8s. Approximately 150 µL of serum was collected on days 2, and every week following HDI until the end of the experiment. Serum HBsAg, HBeAg, and anti-HBs were measured using an AXSYM system kit (Abbott Diagnostika). The anti-HBs measurements were absolute values, whereas the HBsAg measurements were relative values. The HBsAg-positive threshold was set at an S/N ratio of 10 (1). Statistics were calculated using GraphPad Prism and Microsoft Excel.

[DNA Extraction]

Using the QIAamp DNA Blood Kit (QIAGEN, 51106, Hilden, Germany), the nucleic acid from the cell supernatant was extracted. First, 100 µl of the cell supernatant was added to a microcentrifuge tube, followed by the addition of 200 µl of AL buffer, which was shaken and mixed thoroughly. Add 20 µl Protease K to shake and mix well, place the sample in an incubator at 56° C. for 10 minutes, remove the sample, shake and mix well, and then add 200 µl of 100 percent alcohol to shake and mix well. Transfer the liquid to the QIAamp Spin Column and centrifuge at 8000 rpm for 1 minute. Discard the liquid and add 500 µl AW1 buffer to wash the QIAamp Spin Column. Centrifuge at 8000 rpm for 1 minute. Centrifuge at maximum speed for three minutes and dispose any remaining liquid. The extracted nucleic acid sample is obtained by transferring the QIAamp Spin Column to a new microcentrifuge tube, adding 100 µl of AE buffer to the QIAamp Spin Column membrane, and centrifuging at 8000 rpm for 1 minute.

Experimental Example 1: In Vitro Cell Line Evaluation of Entecavir-Based Compounds In experimental example 1, five hepatitis treatment groups were prepared and added to HepG2 2.2.15 cells for evaluation. Group 1 is a control group containing only medium (PBS), whereby no drug compound is added. Group 2 is where a conventional drug Entecavir (100 mM) is used alone. Group 3 (CPD-0148) is directed to a compound of formula (IA2) (100 mM). Group 4 (CPD-0150) is directed to a compound of formula (IA3) (100 mM). Group 5 (CPD-0147) is directed to a compound of formula (IA4) (100 mM). After 6-9 days of incubation with the above treatment groups, the levels of hepatitis B surface antigen (HBsAg) were measured using an AXSYM system kit (Abbott Diagnostika), and the results are shown in FIG. 10.

Figure 10:
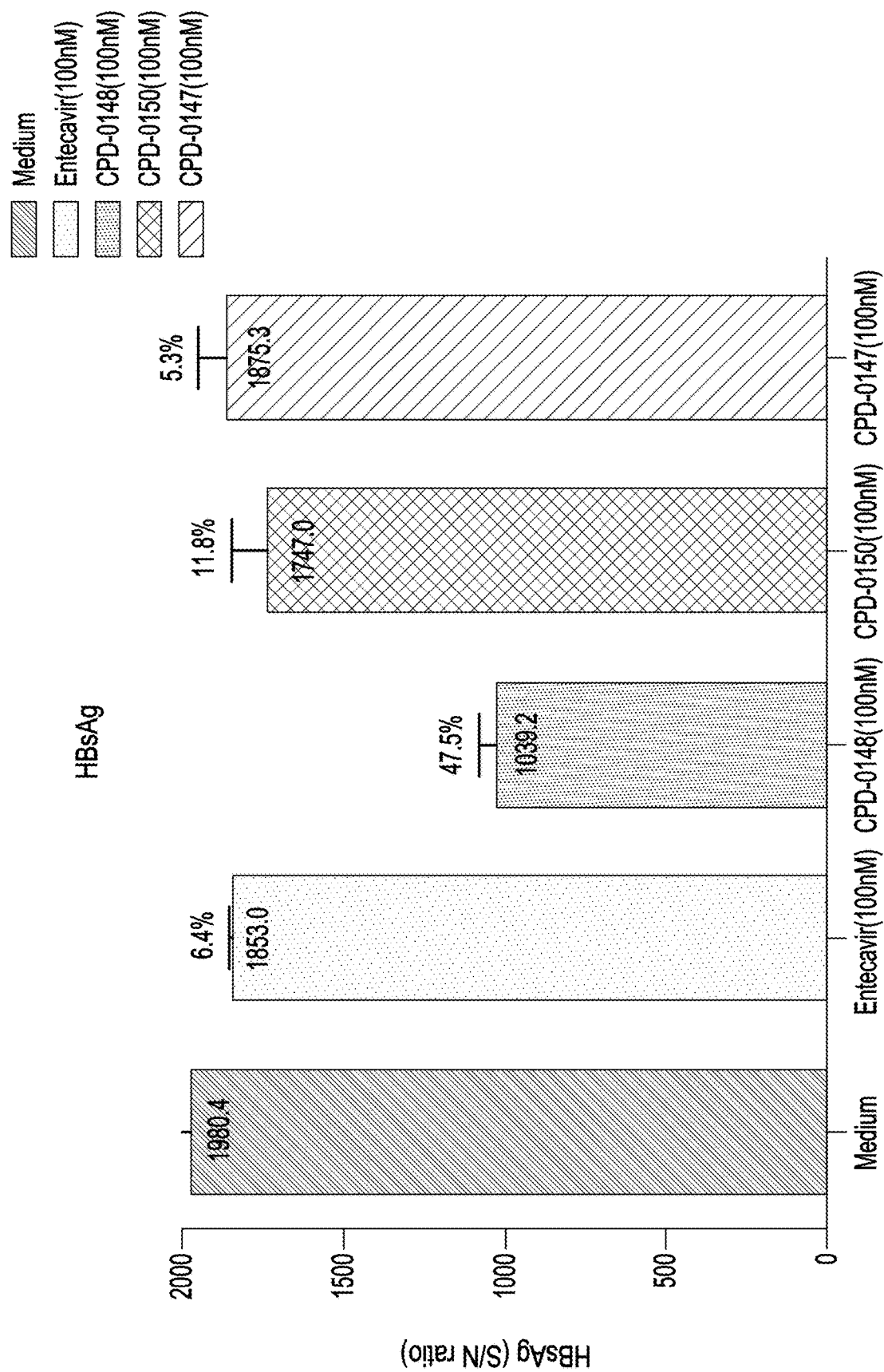
FIG. 10 is a graph illustrating the HBsAg levels from an in vitro cell line experiment for different Entecavir-based hepatitis B treatment groups in accordance with some embodiments of the present disclosure.

As shown in FIG. 10, it can be seen that the conventional drug Entecavir (Group 2) is capable of reducing the HBsAg level as compared with the control. Furthermore, it is found that when the conventional drug Entecavir is modified with the linker and sugar described in the present disclosure, for example when the compound of Formula (IA2) (CPD-0148; Group 3) or when the compound of Formula (IA3) (CPD-0150; Group 4) are used, the HBsAg level are further lowered as compared to the unmodified drug Entecavir (Group 2). It is noted that not all types of linkers and sugars can be used to effectively reduce the HBsAg levels. For example, as shown in FIG. 10, when the compound of Formula (IA4) (CPD-0147; Group 5) is used, the HBsAg level seems to be similar to that of the unmodified drug Entecavir (Group 2), and a significant reduction in the HBsAg level cannot be observed. These results indicated that a carbamate linkage (>N—C(=O)—O— Group 3) of the linker to the sugar or a carbonate linkage (—O—C(=O)—O—; Group 4) of the linker to the sugar seems to be superior than an ester linkage (—R—C(=O)—O—); Group 5) in further reducing the HBsAg levels.

Experimental Example 2: In Vitro Cell Line Evaluation of Birinapant-Based Compounds In experimental example 2, eight hepatitis treatment groups were prepared and added to HepG2 2.2.15 cells for evaluation. Group 1 is a control group containing only medium (PBS), whereby no drug compound is added. Group 2 is where a conventional drug Birinapant (500 mM) is used alone. Group 3 (CPD-0004) is directed to a compound of formula (IB1) (500 mM). Group 4 (CPD-0030) is directed to a compound of formula (IB7) (500 mM). Group 5 (CPD-0036) is directed to a compound of formula (IB2) (500 mM). Group 6 (CPD-0133) is directed to a compound of formula (IB3) (500 mM). Group 7 (CPD-0142) is directed to a compound of formula (IB4) (500 mM). Group 8 (CPD-0186) is directed to a compound of formula (IB5) (500 mM). After 6-9 days of incubation with the above treatment groups, the levels of hepatitis B surface antigen (HBsAg) were measured using an AXSYM system kit (Abbott Diagnostika), and the results are shown in FIG. 11.

Figure 11:
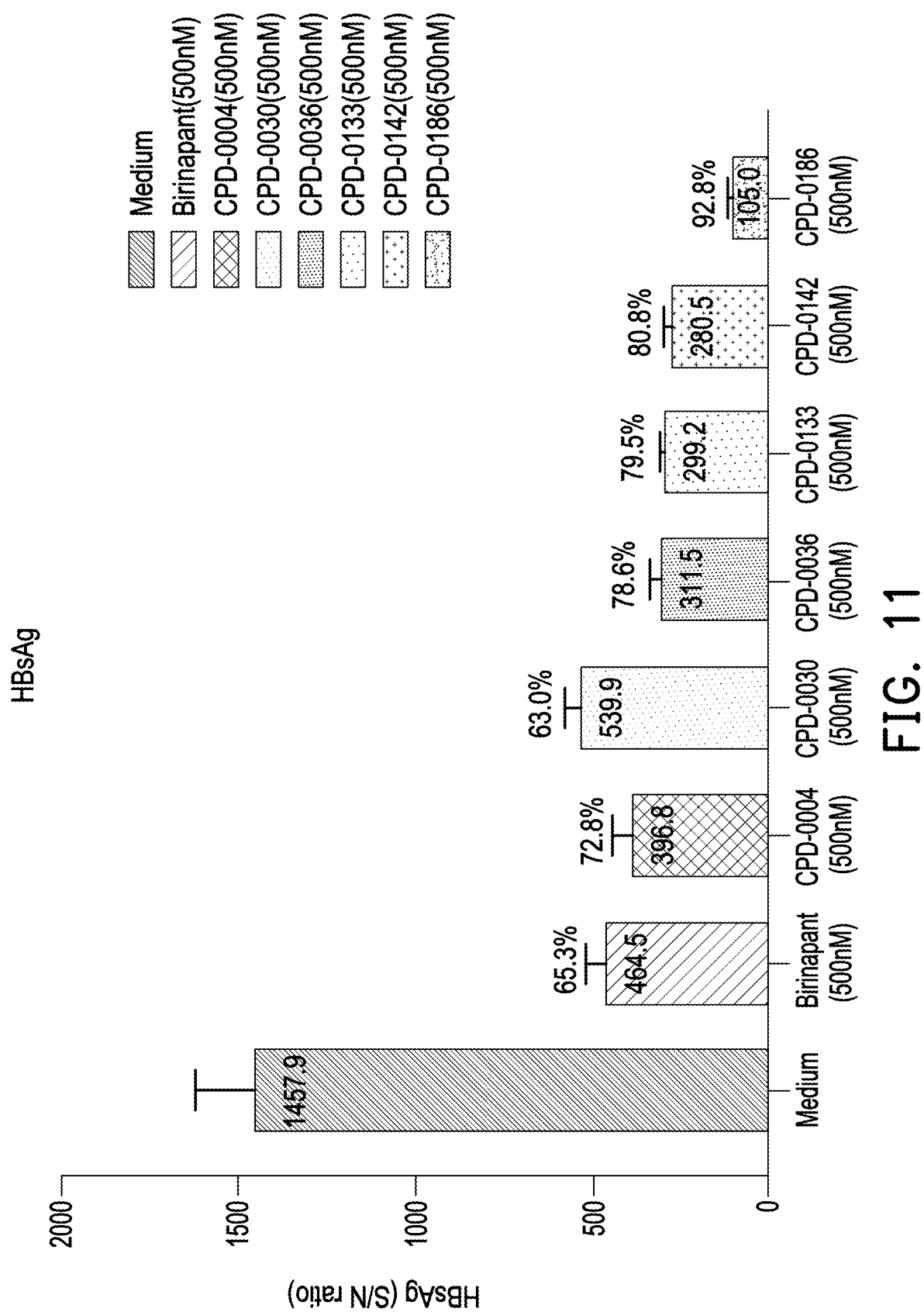
FIG. 11 is a graph illustrating the HBsAg levels from an in vitro cell line experiment for different Birinapant-based hepatitis B treatment groups in accordance with some embodiments of the present disclosure.

As shown in FIG. 11, it can be seen that the conventional drug Birinapant (Group 2) is capable of reducing the HBsAg level as compared with the control. Furthermore, it is found that when the conventional drug Birinapant is modified with the linker and sugar described in the present disclosure, for example when the compound of Formula (IB1) (CPD-0004; Group 3), the compound of Formula (IB2) (CPD-0036; Group 5), the compound of Formula (IB3) (CPD-0133; Group 6), the compound of Formula (IB4) (CPD-0142; Group 7), and the compound of Formula (IB5) (CPD-0186; Group 8) are used, the HBsAg level are further lowered as compared to the unmodified drug Birinapant (Group 2). It is also noted that when a monomer Birinapant (formula (IB7); CPD-0030) is modified in a same way as the compound of Formula (IB1) (CPD-0004; Group 3), the same HBsAg level reduction cannot be observed. These results indicated that when two sugar chains (double chain) are connected to the drug through the linker, the HBsAg level reduction seems to be more apparent.

Experimental Example 3: In Vitro Cell Line Evaluation of Tenofovir-Based Compounds In experimental example 3, thirteen hepatitis treatment groups were prepared and added to HepG2 2.2.15 cells for evaluation. Group 1 is a control group containing only medium (PBS), whereby no drug compound is added. Group 2 (Teno-Int) is where an intermediate of the conventional drug Tenofovir (100 mM; structure shown in first step of FIG. 3) is used alone. Group 3 (CPD-0134) is directed to a compound of formula (IC1) (100 mM). Group 4 (CPD-0136) is directed to a compound of formula (IC2) (100 mM). Group 5 (CPD-0137) is directed to a compound of formula (IC3) (510 mM). Group 6 (CPD-0138) is directed to a compound of formula (IC4) (100 mM). Group 7 (CPD-0139) is directed to a compound of formula (IC5) (100 mM). Group 8 (CPD-0143) is directed to a compound of formula (IC6) (100 mM). Group 9 (CPD-0144) is directed to a compound of formula (IC7) (100 mM). Group 10 (CPD-0149) is directed to a compound of formula (IC8) (100 mM). Group 11 (CPD-0158) is directed to a compound of formula (IC9) (100 mM). Group 12 (CPD-0169) is directed to a compound of formula (IC10) (100 mM). Group 12 (CPD-0170) is directed to a compound of formula (IC11) (100 mM). After 6-9 days of incubation with the above treatment groups, the levels of hepatitis B surface antigen (HBsAg) were measured using an AXSYM system kit (Abbott Diagnostika), and the results are shown in FIG. 12.

Figure 12:
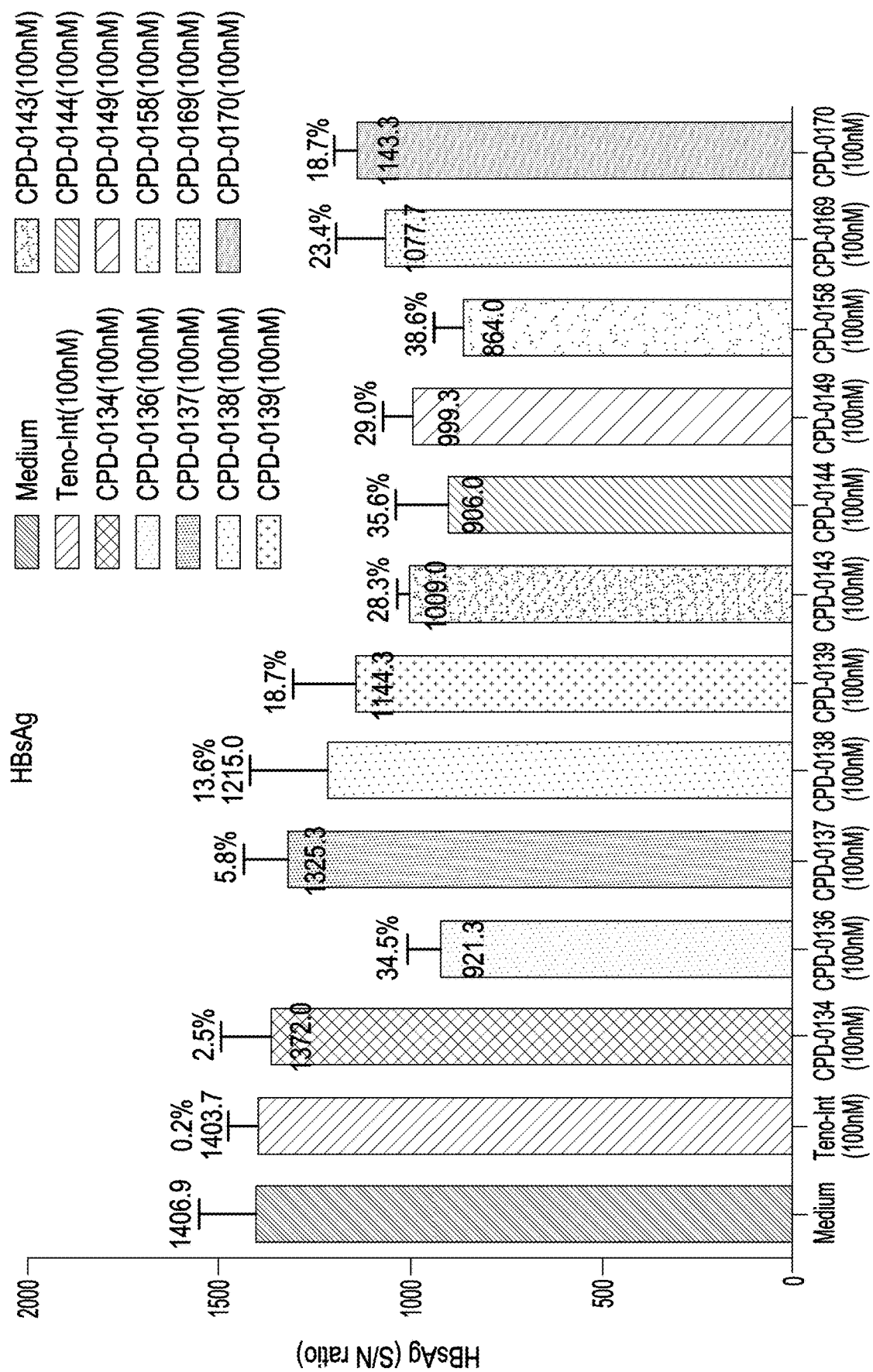
FIG. 12 is a graph illustrating the HBsAg levels from an in vitro cell line experiment for different Tenofovir-based hepatitis B treatment groups in accordance with some embodiments of the present disclosure.
Figure 13:
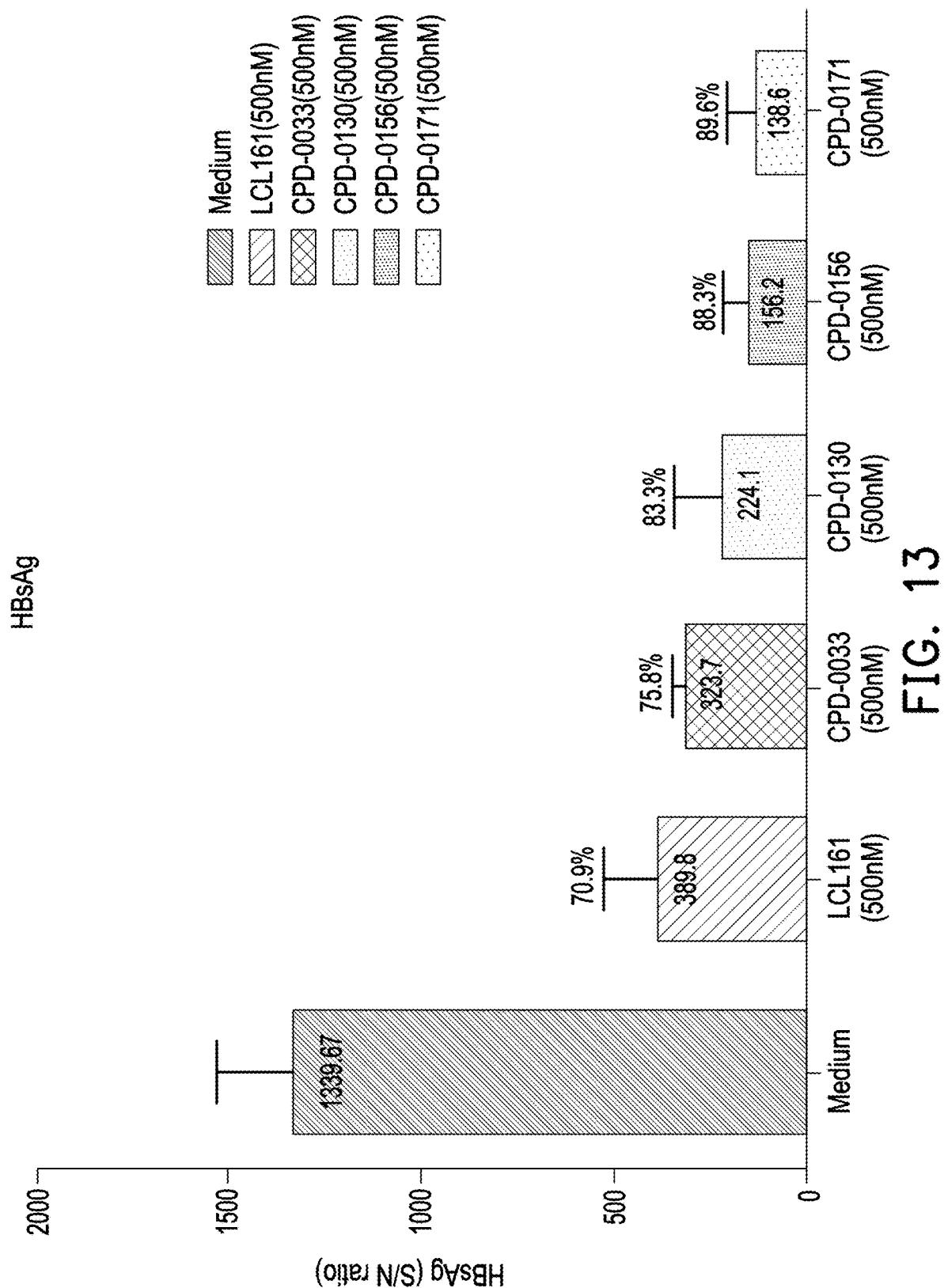
FIG. 13 is a graph illustrating the HBsAg levels from an in vitro cell line experiment for different LCL161-based hepatitis B treatment groups in accordance with some embodiments of the present disclosure.
Figure 14:
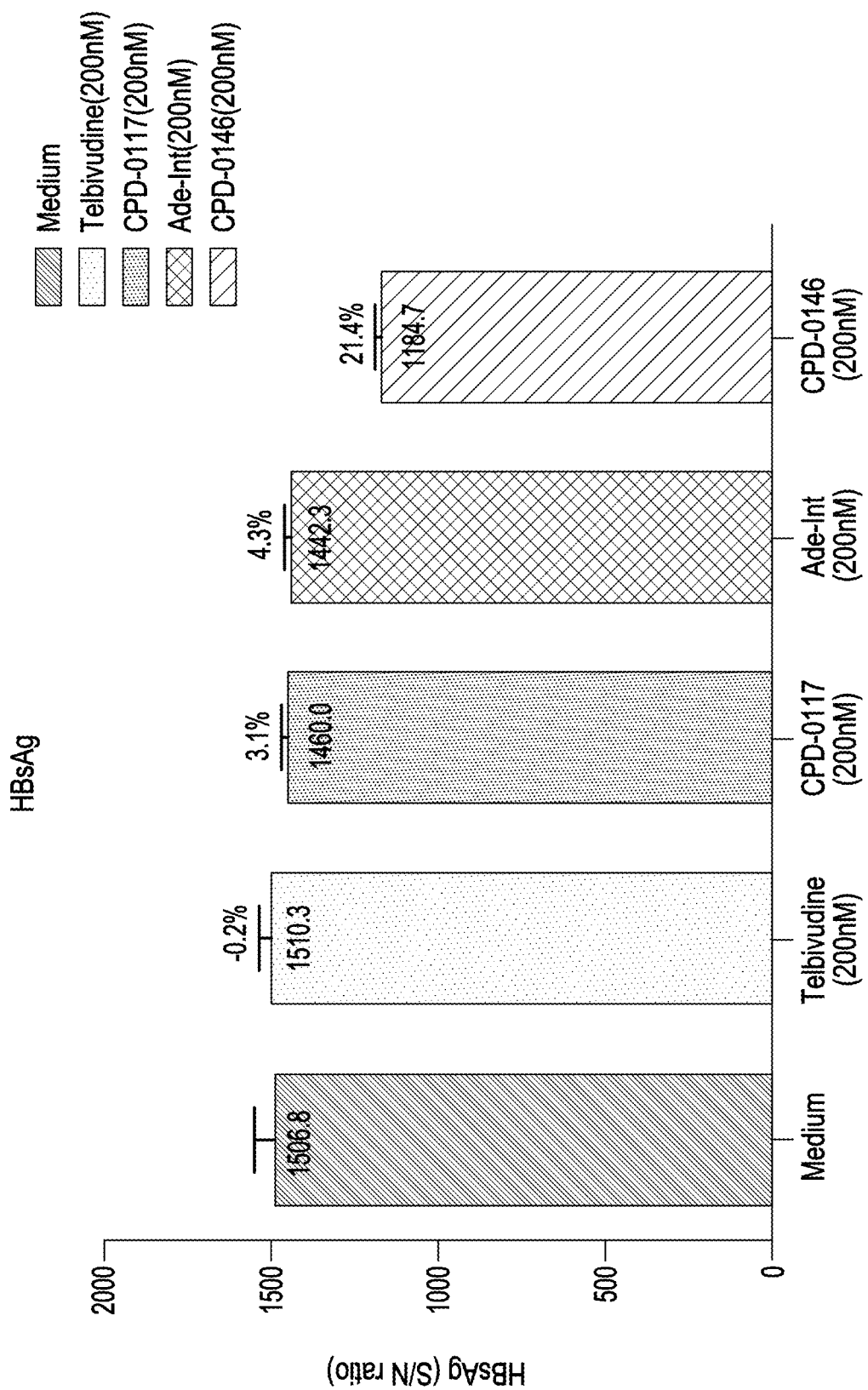
FIG. 14 is a graph illustrating the HBsAg levels from an in vitro cell line experiment for different Telbivudine-based or Adefovir-based hepatitis B treatment groups in accordance with some embodiments of the present disclosure.
Figure 15:
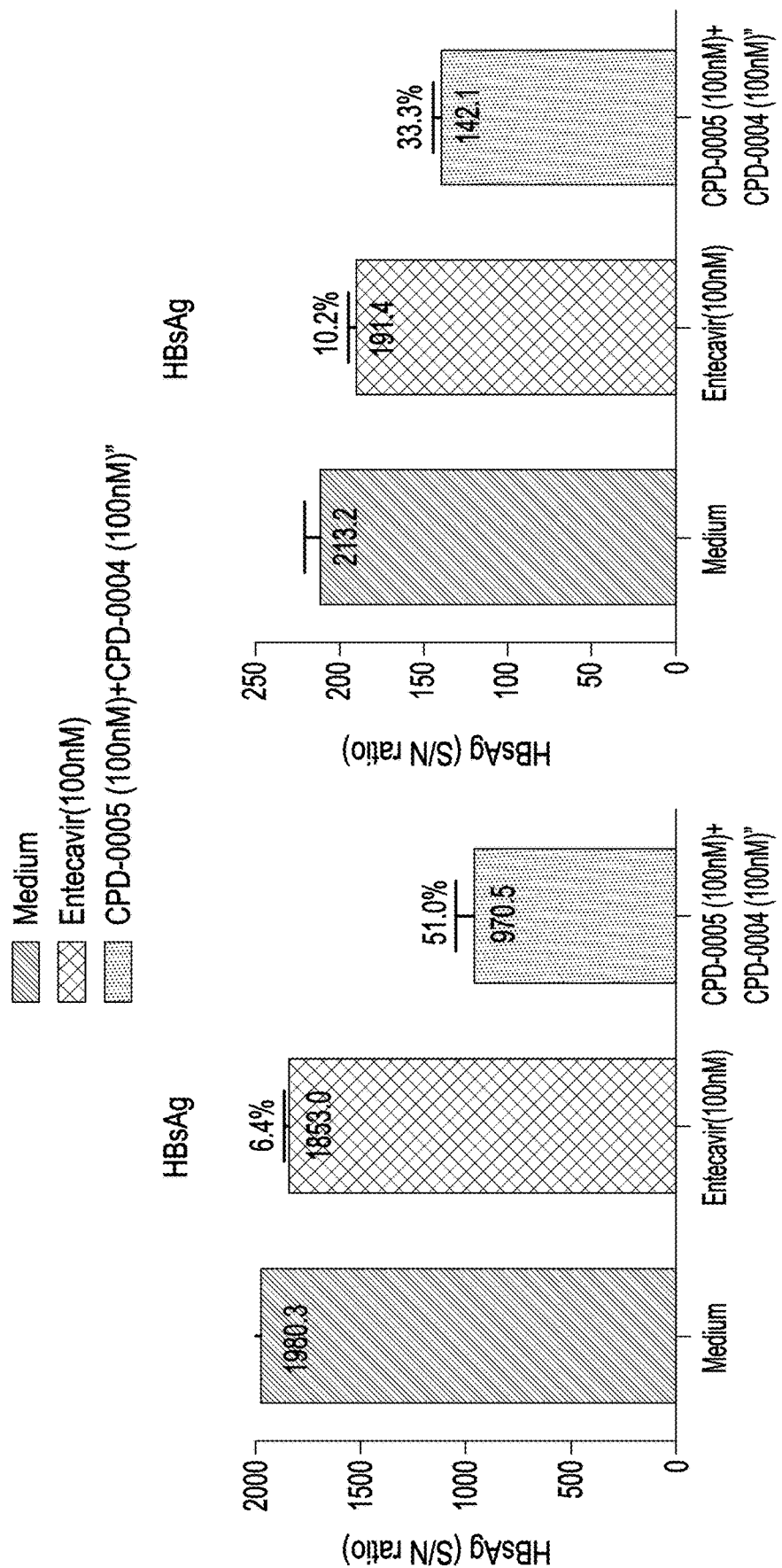
FIG. 15 illustrates graphs showing HBsAg levels and HBeAg levels from in vitro cell line experiment for different hepatitis B treatment groups in accordance with some embodiments of the present disclosure.
Figure 16A:
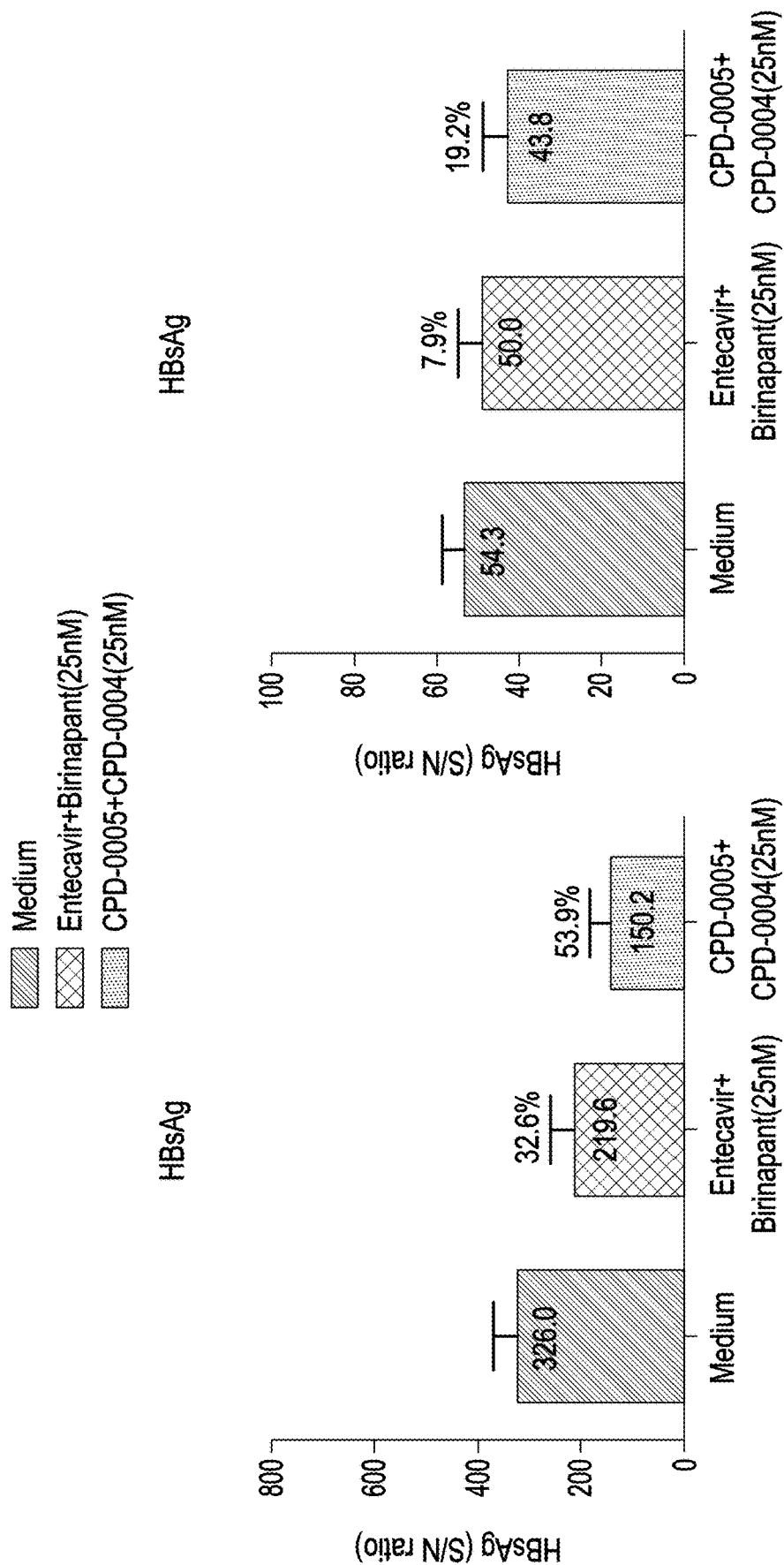
FIG. 16A illustrates graphs showing HBsAg levels and HBeAg levels from in vitro cell line experiment for different hepatitis B treatment groups in accordance with some embodiments of the present disclosure.
Figure 16B:
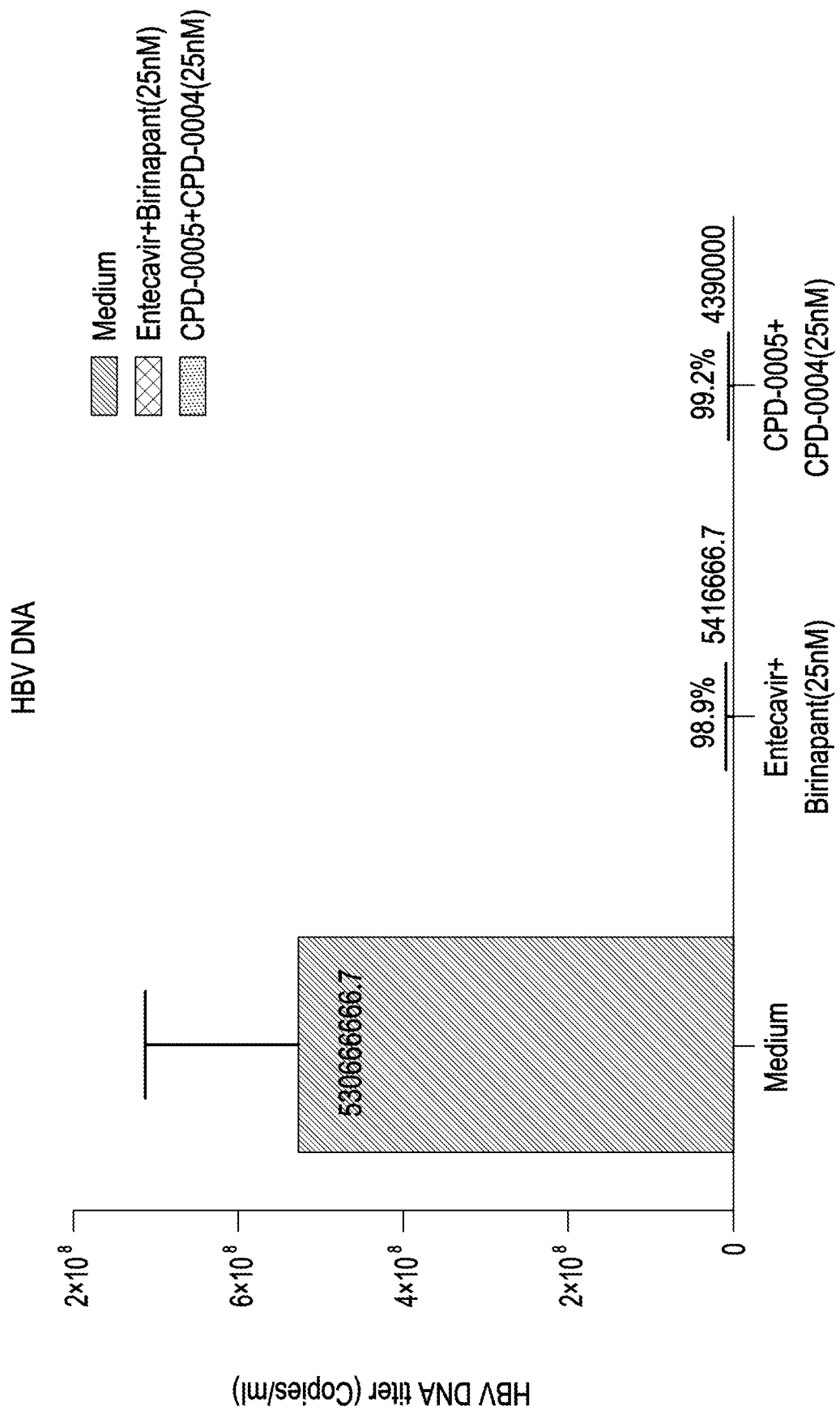
FIG. 16B is a graph illustrating the hepatitis B virus (HBV) DNA levels from n vitro cell line experiment for different hepatitis B treatment groups in accordance with some embodiments of the present disclosure.
Figure 17A:
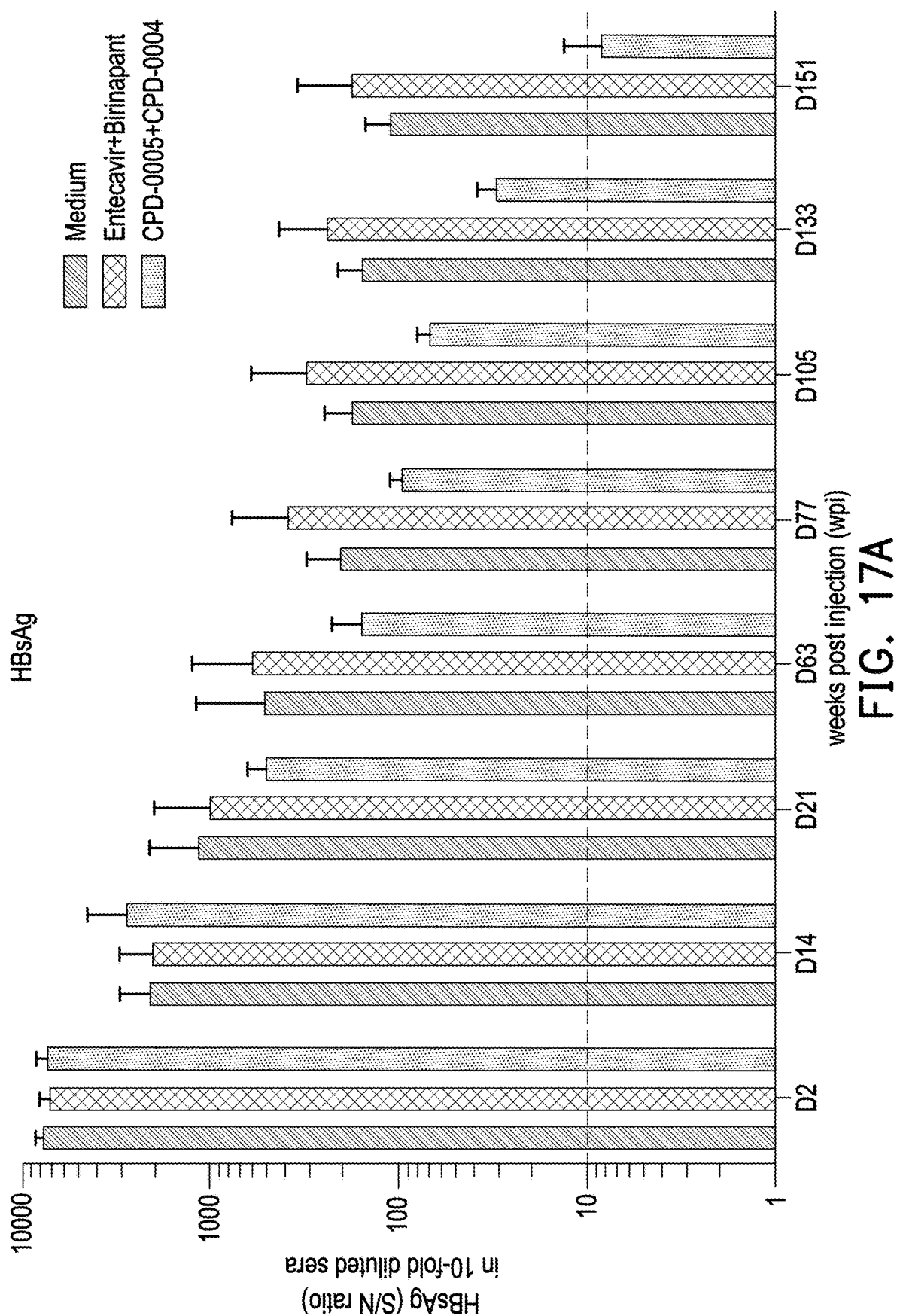
FIG. 17A and FIG. 17B are graphs illustrating HBsAg levels from an animal experiment for different hepatitis B treatment groups in accordance with some embodiments of the present disclosure.
Figure 17B:
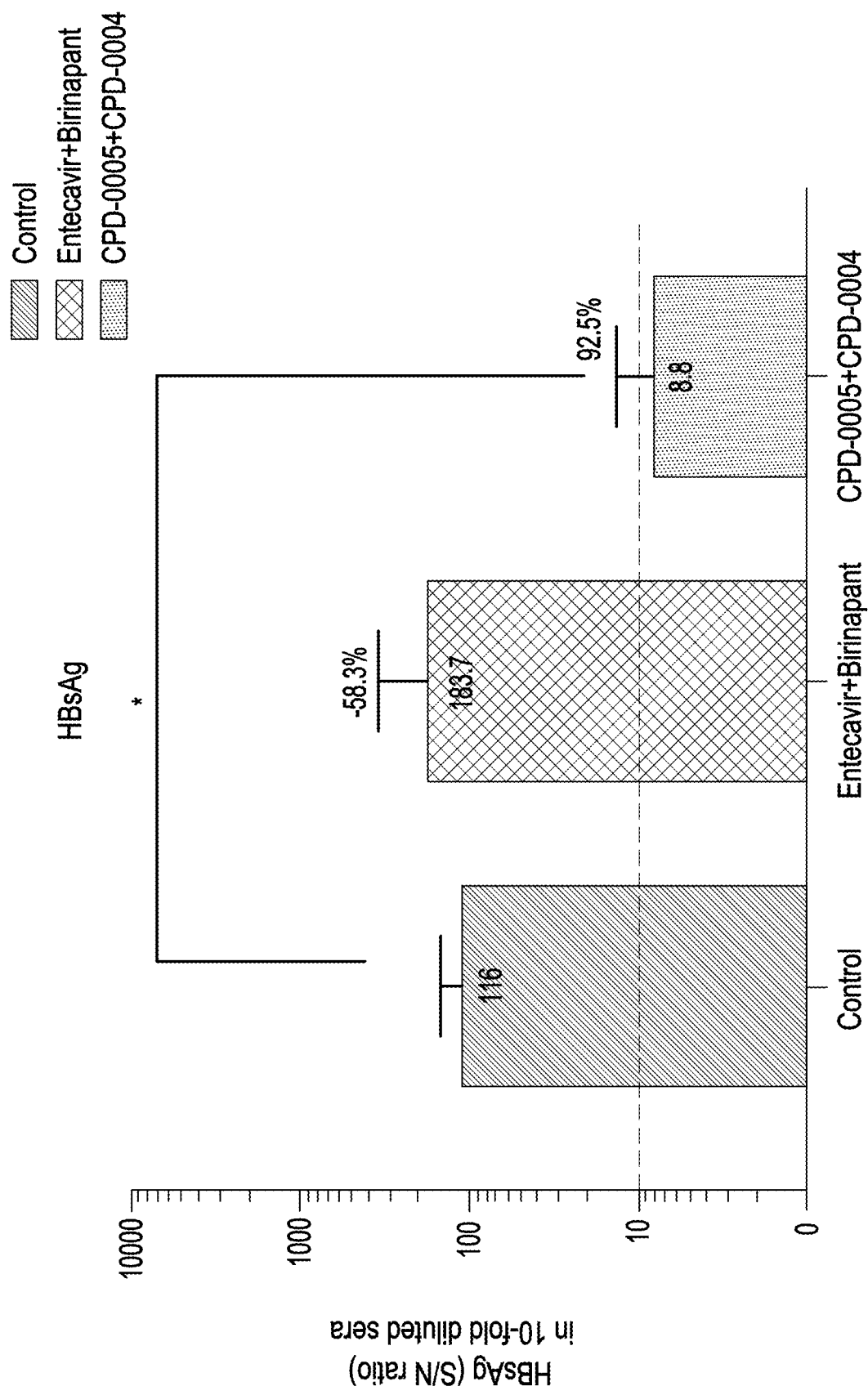
Figure 18A:
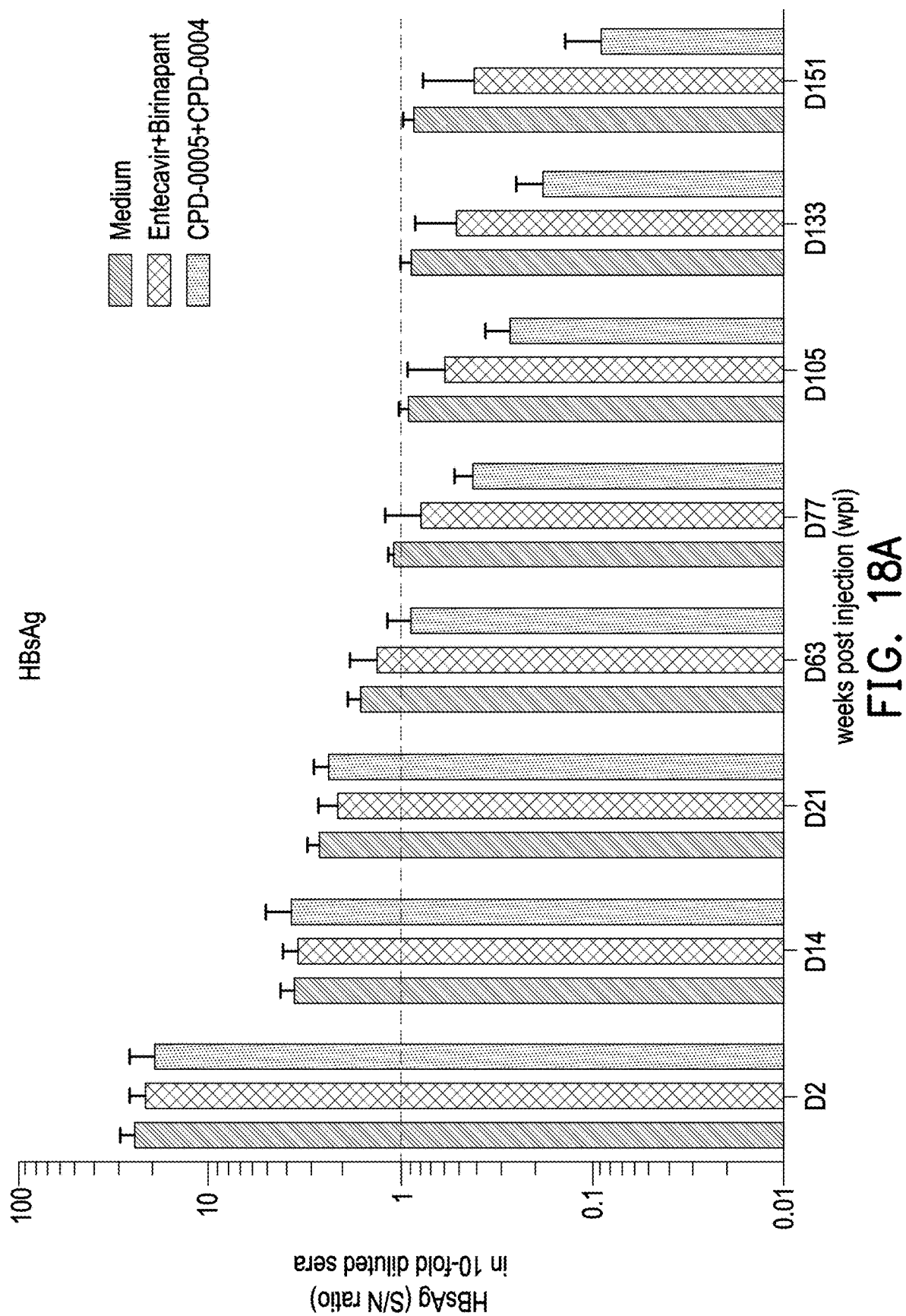
FIG. 18A and FIG. 18B are graphs illustrating HBeAg levels from an animal experiment for different hepatitis B treatment groups in accordance with some embodiments of the present disclosure.
Figure 18B:
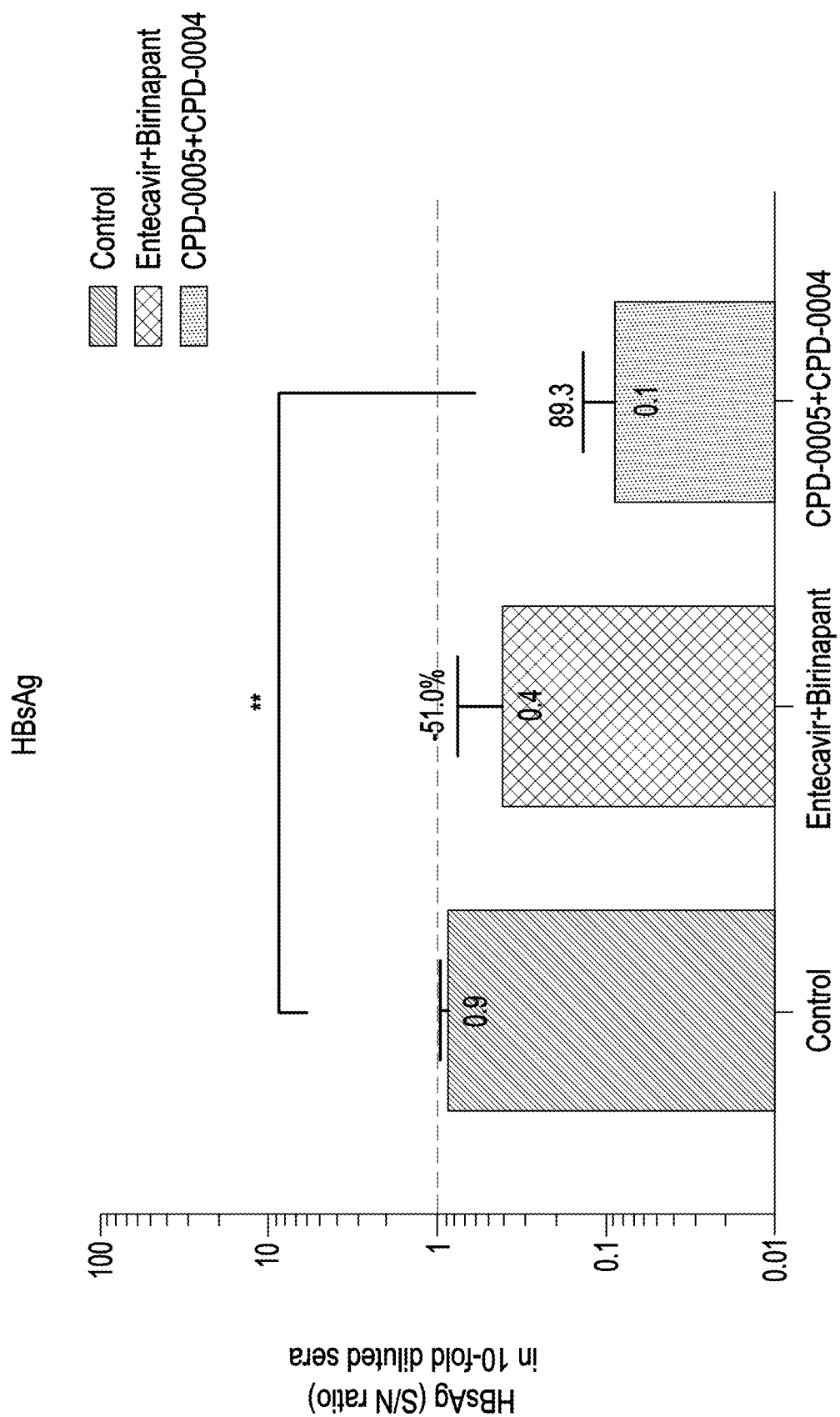

As shown in FIG. 12, it can be seen that when the Tenofovir intermediate (Teno-Int) is used alone, the HBsAg levels can be slightly reduced as compared to the control. Furthermore, when the conventional Tenofovir intermediate is modified with the linker and sugar described in the present disclosure, for example when the compound of Formula (IC1) (CPD-0134; Group 3), the compound of Formula (IC2) (CPD-0136; Group 4), the compound of Formula (IC3) (CPD-0137; Group 5), the compound of Formula (IC4) (CPD-0138; Group 6), the compound of Formula (IC5) (CPD-0139; Group 7), the compound of Formula (IC6) (CPD-0143; Group 8), the compound of Formula (IC7) (CPD-0144; Group 9), the compound of Formula (IC8) (CPD-0149; Group 10), the compound of Formula (IC9) (CPD-0158; Group 11), the compound of Formula (IC10) (CPD-0169; Group 12), and the compound of Formula (IC11) (CPD-0170; Group 13), are used, the HBsAg level are further lowered as compared to the unmodified Tenofovir intermediate (Group 2).

Furthermore, it can be seen that the HBsAg levels are the lowest when the compounds of Formula (IC2), Formula (IC7) and Formula (IC9) are used. These results indicated that the presence of a carbamate linkage (>N—C(=O)—O—) joining the linker and the sugar chain, and the presence of a triazole group in the linker might be responsible for further lowering the HBsAg levels.

Experimental Example 4: In Vitro Cell Line Evaluation of LCL161-Based Compounds

In experimental example 4, six hepatitis treatment groups were prepared and added to HepG2 2.2.15 cells for evaluation. Group 1 is a control group containing only medium (PBS), whereby no drug compound is added. Group 2 is where a conventional drug LCL161 (500 mM) is used alone. Group 3 (CPD-0033) is directed to a compound of formula (ID1) (500 mM). Group 4 (CPD-0130) is directed to a compound of formula (ID2) (500 mM). Group 5 (CPD-0156) is directed to a compound of formula (ID3) (500 mM). Group 6 (CPD-0171) is directed to a compound of formula (ID4) (500 mM). After 6-9 days of incubation with the above treatment groups, the levels of hepatitis B surface antigen (HBsAg) were measured using an AXSYM system kit (Abbott Diagnostika), and the results are shown in FIG. 13.

As shown in FIG. 13, it can be seen that the conventional drug LCL161 (Group 2) is capable of reducing the HBsAg level as compared with the control. Furthermore, it is found that when the conventional drug LCL161 is modified with the linker and sugar described in the present disclosure, for example when the compound of Formula (ID1) (CPD-0033; Group 3), the compound of Formula (ID2) (CPD-0130; Group 4), the compound of Formula (ID3) (CPD-0156; Group 5), and the compound of Formula (ID4) (CPD-0171; Group 6) are used, the HBsAg level are further lowered as compared to the unmodified drug LCL161 (Group 2). Furthermore, it can be seen that the HBsAg levels are the lowest when the compounds of Formula (ID3), and Formula (ID4) are used. These results indicated that the presence of a carbamate linkage (>N—C(═O)—O—) joining the linker and the sugar chain, the presence of a triazole group in the linker, and controlling the number of sugars and the number of sugar chains might be responsible for further lowering the HBsAg levels.

Experimental Example 5: In Vitro Cell Line Evaluation of Telbivudine-Based Compounds and Adefovir-Based Compounds In experimental example 5, five hepatitis treatment groups were prepared and added to HepG2 2.2.15 cells for evaluation. Group 1 is a control group containing only medium (PBS), whereby no drug compound is added. Group 2 is where a conventional drug Telbivudine (200 mM) is used alone. Group 3 (CPD-0117) is directed to a compound of formula (IE1) (200 mM). Group 4 (Ade-Int) is where an intermediate of the conventional drug Adefovir (100 mM; structure shown in first step of FIG. 6) is used alone. Group 4 (CPD-0146) is directed to a compound of formula (IF1) (200 mM). After 6-9 days of incubation with the above treatment groups, the levels of hepatitis B surface antigen (HBsAg) were measured using an AXSYM system kit (Abbott Diagnostika), and the results are shown in FIG. 14.

As shown in FIG. 14, it can be seen that when the conventional drug Telbivudine (group 2) is further modified with the linker and sugar described in the present disclosure, for example when the compound of Formula (IE1)(CPD-0117; Group 3) is used, then the HBsAg levels can be further reduced. Similarly, when the conventional Adefovir intermediate (group 4) is further modified with the linker and sugar described in the present disclosure, for example when the compound of Formula (IF1)(CPD-0146; Group 5) is used, then the HBsAg levels can be further reduced.

Experimental Example 6: In Vitro Cell Line Evaluation of Combined Use of the Drug Conjugates In experimental example 6, three hepatitis treatment groups were prepared and added to HepG2 2.2.15 cells for evaluation. Group 1 is a control group containing only medium (PBS), whereby no drug compound is added. Group 2 is where a conventional drug Entecavir (100 mM) is used alone. Group 3 (CPD-0005+CPD-0004) is directed to the combined use of a compound of formula (IA1) (100 mM) and the compound of formula (IB1) (100 mM). After 6-9 days of incubation with the above treatment groups, the levels of hepatitis B surface antigen (HBsAg) and hepatitis B e antigen (HBeAg) were measured using an AXSYM system kit (Abbott Diagnostika), and the results are shown in FIG. 15.

As shown in FIG. 15, it can be seen that the conventional drug Entecavir is effective in reducing the HBsAg and HBeAg levels as compared with the control. However, when the drug conjugates of formula (IA1) and the drug conjugate of formula (IB1) are used in combination, it can be seen that the HBsAg and the HBeAg levels are further reduced. These results indicated that when the drug conjugates of the present disclosure are used in combination, they are more effective than the conventional drug in reducing the HBsAg and the HBeAg levels.

Experimental Example 7: In Vitro Cell Line Evaluation of Combined Use of the Drug Conjugates In experimental example 7, three hepatitis treatment groups were prepared and added to HepAD38 cells for evaluation. Group 1 is a control group containing only medium (PBS), whereby no drug compound is added. Group 2 is where conventional drugs Entecavir (25 nM) and Birinapant (25 nM) are used in combination. Group 3 (CPD-0005+CPD-0004) is directed to the combined use of a compound of formula (IA1) (25 nM) and the compound of formula (IB1) (25 nM). After 6-9 days of incubation with the above treatment groups, the levels of hepatitis B surface antigen (HBsAg), hepatitis B e antigen (HBeAg) were measured using an AXSYM system kit (Abbott Diagnostika), and supernatant medium was assayed for the presence of HBV DNA by RT-PCR. The results are shown in FIG. 16A and FIG. 16B.

As shown in FIG. 16A, it can be seen that when the conventional drugs Entecavir and Birinapant are used in combination, they are effective in reducing the HBsAg and HBeAg levels as compared with the control. However, when the drug conjugates of formula (IA1) and the drug conjugate of formula (IB1) are used in combination, it can be seen that the HBsAg and the HBeAg levels are further reduced. These results indicated that when the drug conjugates of the present disclosure are used in combination, they are more effective than the conventional drug in reducing the HBsAg and the HBeAg levels. Furthermore, as illustrated in FIG. 16B, it was also found that the combined use of the drug conjugates of formula (IA1) and formula (IB1) of the invention seems to have a better effect in lowering HBV DNA levels as compared with the combined use of the conventional drugs Entecavir and Birinapant.

Figure 19A:
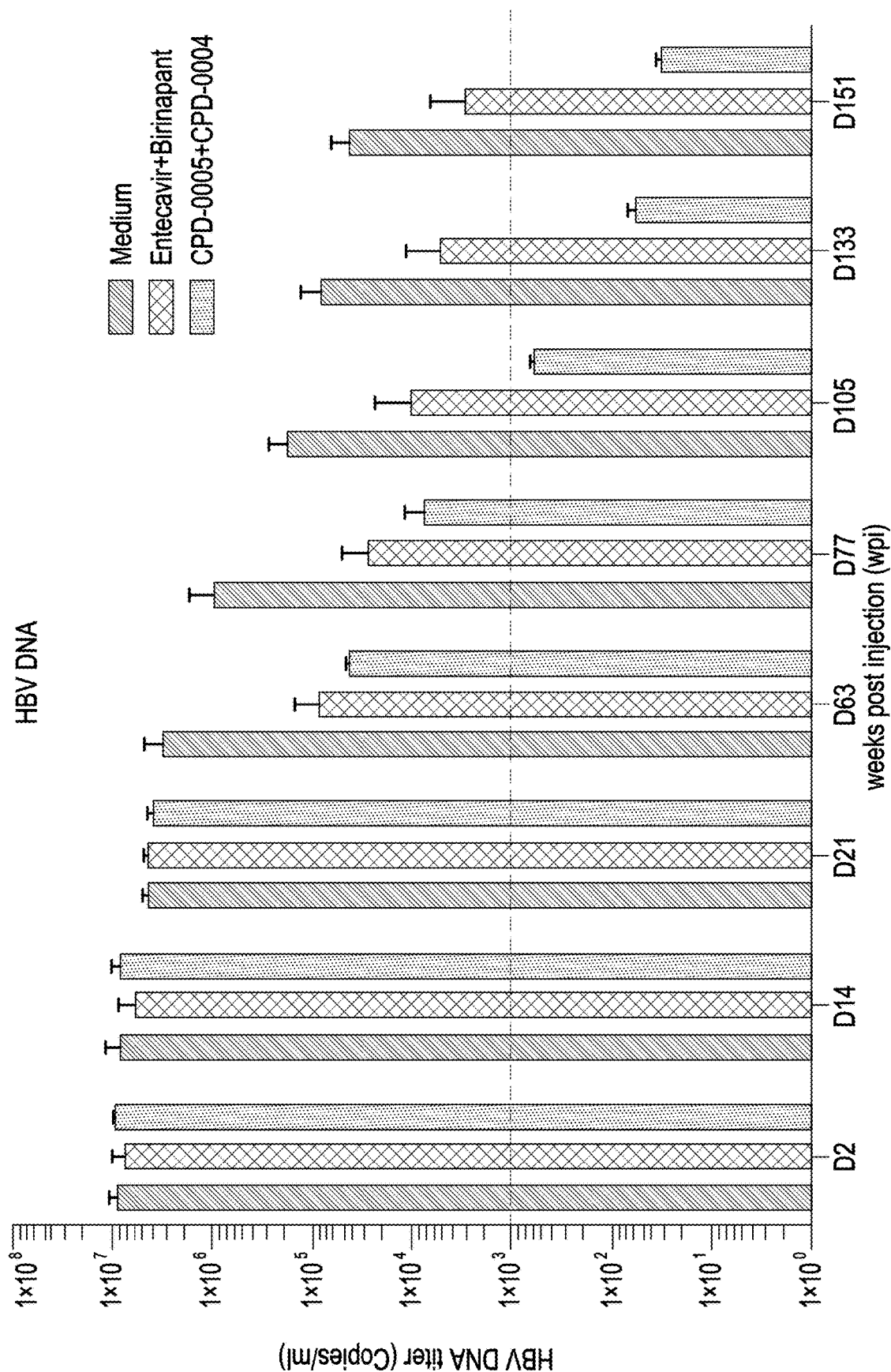
FIG. 19A and FIG. 19B are graphs illustrating HBV DNA levels from an animal experiment for different hepatitis B treatment groups in accordance with some embodiments of the present disclosure.
Figure 19B:
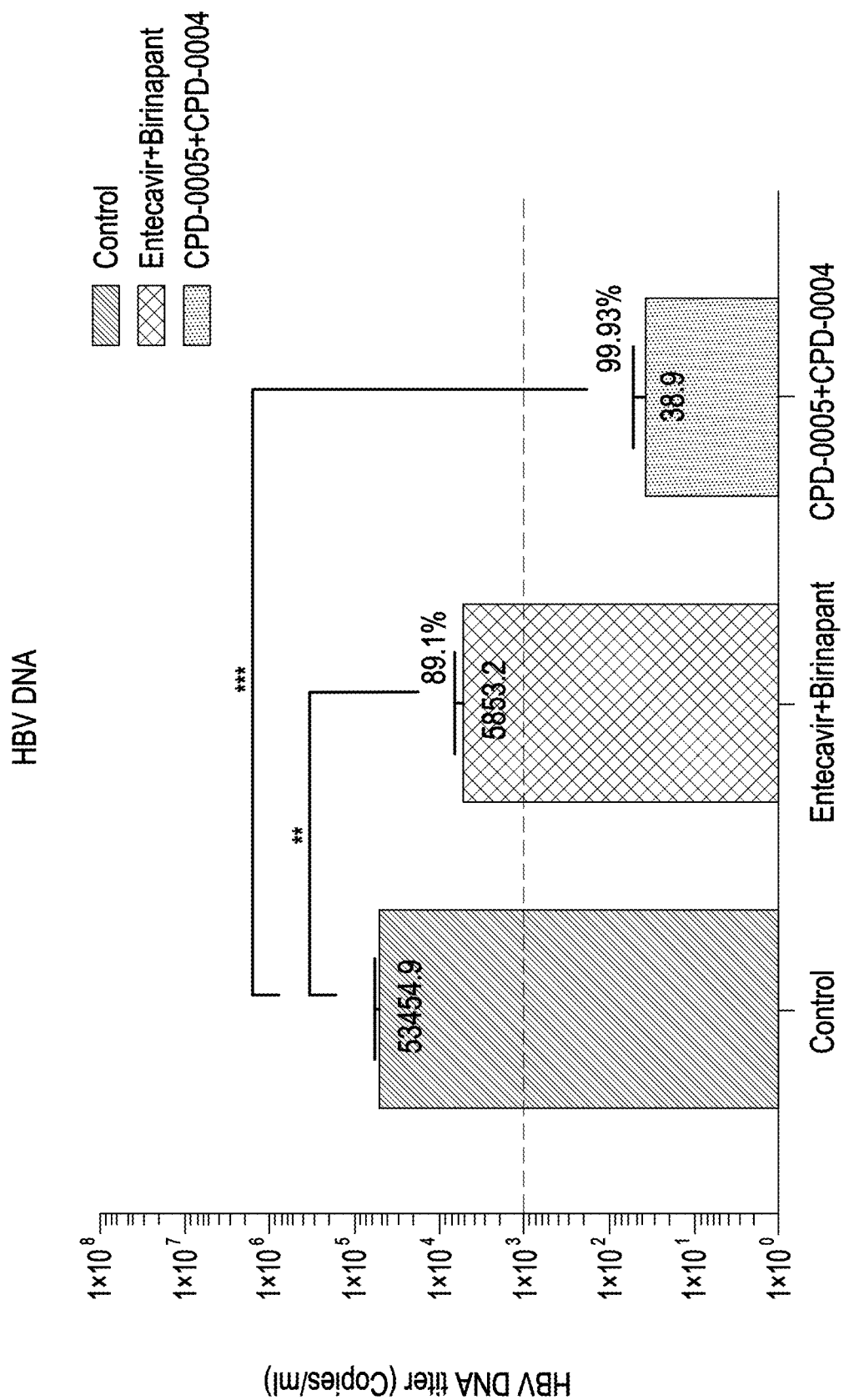
Figure 20:
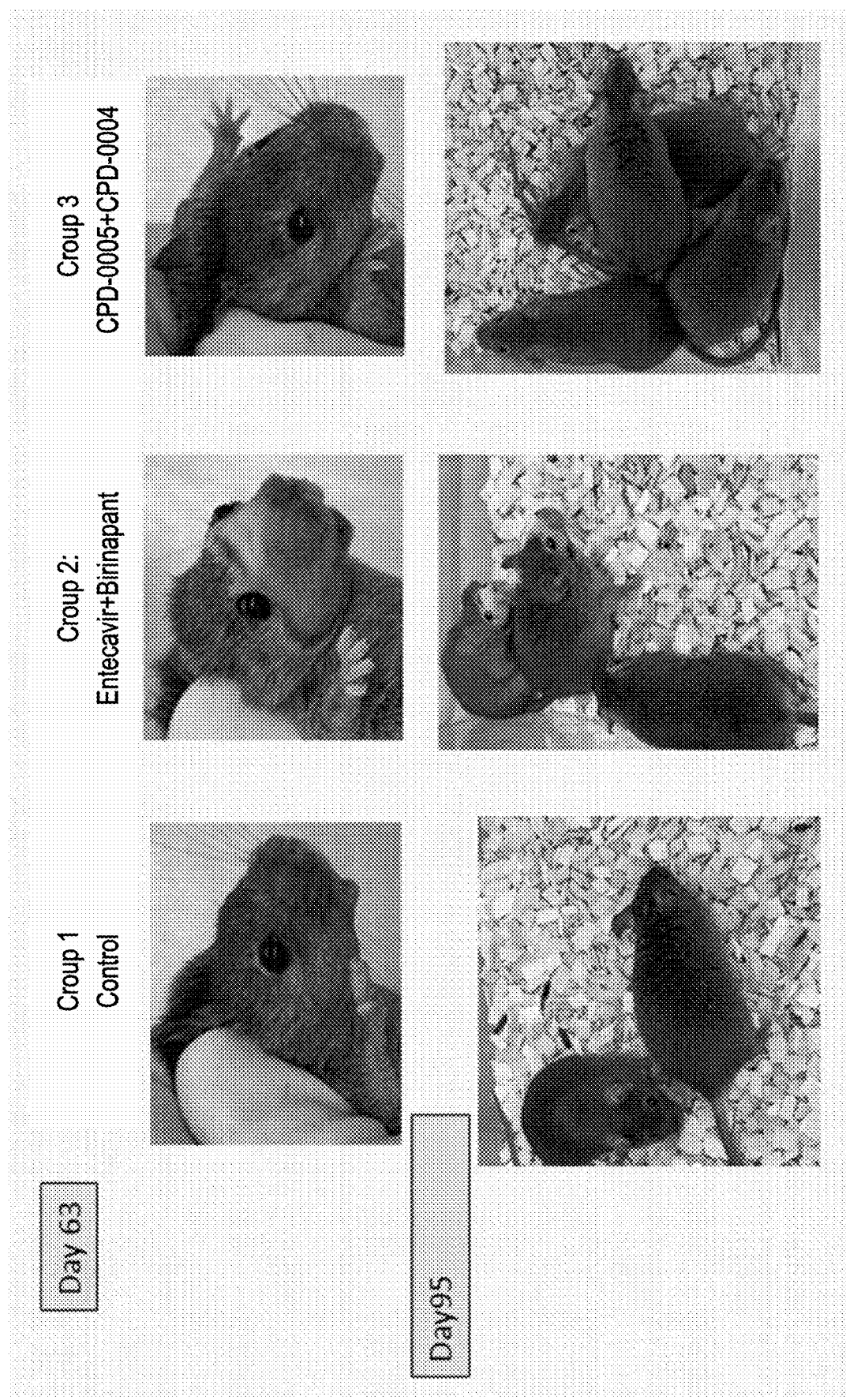
FIG. 20 is the observation results of hair loss in C3H mice after administration of the different hepatitis B treatment groups in accordance with some embodiments of the present disclosure.

Experimental Example 8: In Vivo Evaluation of Combined Use of the Drug Conjugates In experimental example 8, three hepatitis treatment groups were prepared and administered to C3H mice (intraperitoneal (ip) administration). Group 1 is a control group where no drug compound is used (PBS as control). Group 2 is where a conventional drug Entecavir (1.5 mg/kg, ip) and a conventional drug Birinapant (10 mg/kg, ip) are used in combination. Group 3 is where the drug conjugate of formula (IA1) (3.8 mg/kg, ip), and the drug conjugate of formula (IB1) (16.6 mg/kg, ip) of the present disclosure are used in combination (CPD-0005+CPD-0004). The HBsAg, HBeAg and HBV DNA levels of mice were measured at day2 (following the HDI), day14, day21, day63, day77, day105, day133, and day151. The results are illustrated in FIG. 17A to FIG. 19B. Furthermore, the hair loss of the C3H mice were also evaluated, whereby the hair loss observation results are shown in FIG. 20. The anti-HBsAg levels of mice were also measured at day 151, and the results are illustrated in FIG. 21.

As illustrated in FIG. 17A, FIG. 17B and FIG. 18A and FIG. 18B, it can be seen that when the drug conjugates of formula (IA1) and the drug conjugate of formula (IB1) are used in combination, both of the HBsAg and the HBeAg levels are further reduced as compared to the conventional drugs (combined use of Entecavir and Birinapant). The reduction in the HBsAg and the HBeAg levels are more apparent after day 63. Furthermore, as illustrated in FIG. 19A and FIG. 19B, it was also found that the combined use of the drug conjugates of formula (IA1) and formula (IB1) of the invention have a significantly better effect in lowering HBV DNA levels as compared with the combined use of the conventional drugs Entecavir and Birinapant. These results proved that when the drug conjugates of the present disclosure are used in combination in animals (in vivo), a synergistic effect can be achieved, whereby the combined use of the drug conjugates are more effective than the conventional drug in reducing the HBsAg and the HBeAg levels. The results are consistent with the results obtained in the in vitro cell line studies.

In addition, as shown in FIG. 20, it is noted that although the conventional drugs Entecavir and Birinapant are effective in reducing HBeAg and HBV DNA levels, significant hair loss in C3H mice was also observed. In comparison, the drug conjugates of formula (IA1) and (IB1) of the instant application showed no hair loss in C3H mice even after 95 days. These results indicate that the drug conjugates of the instant application are more effective in lowering HBsAg, HBeAg and HBV DNA levels, while less side effects can be achieved.

Figure 21:
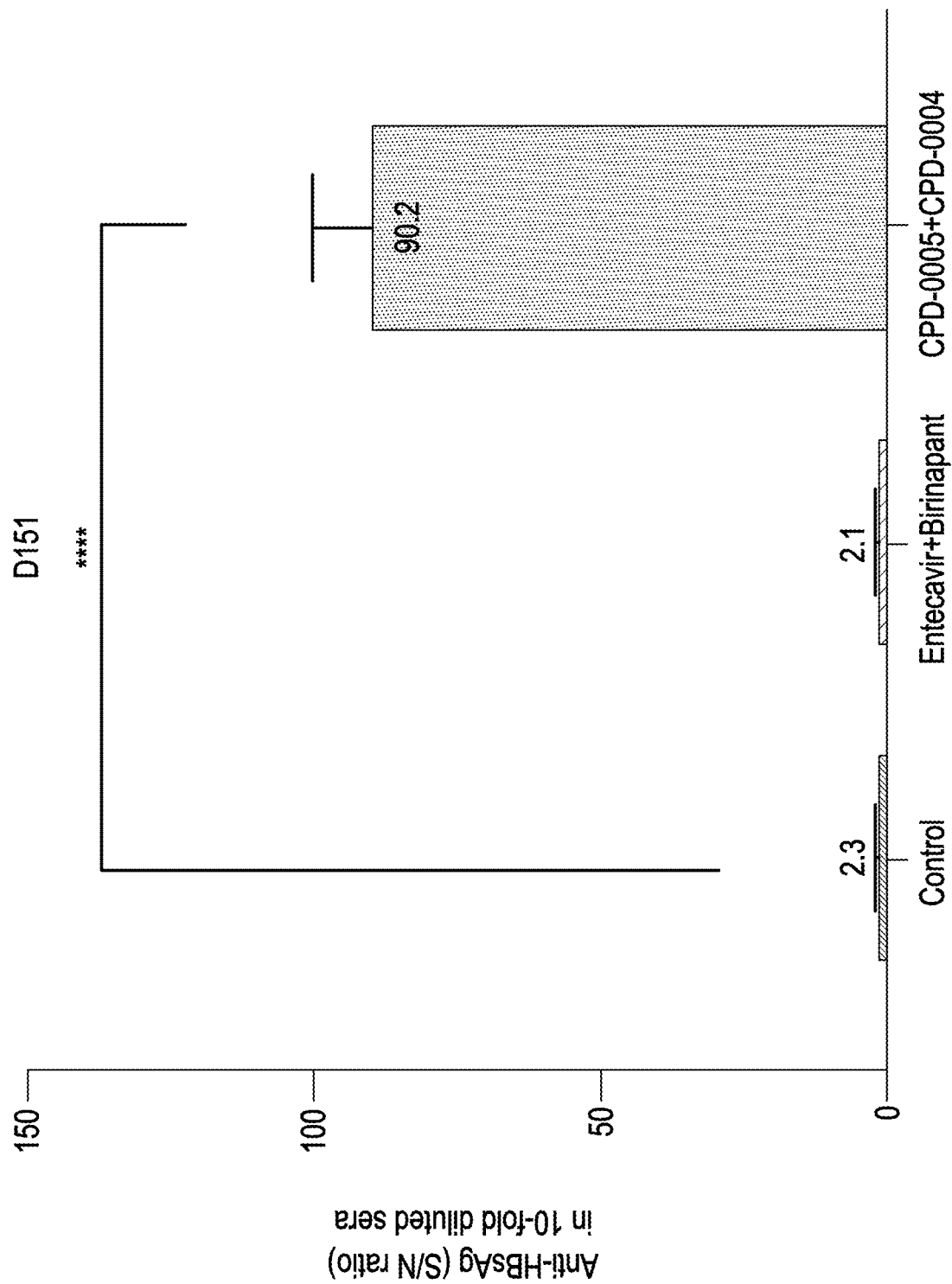
FIG. 21 is a graph illustrating the anti-HBsAg levels from an animal experiment of the different hepatitis B treatment groups in accordance with some embodiments of the present disclosure.
Figure 22A:
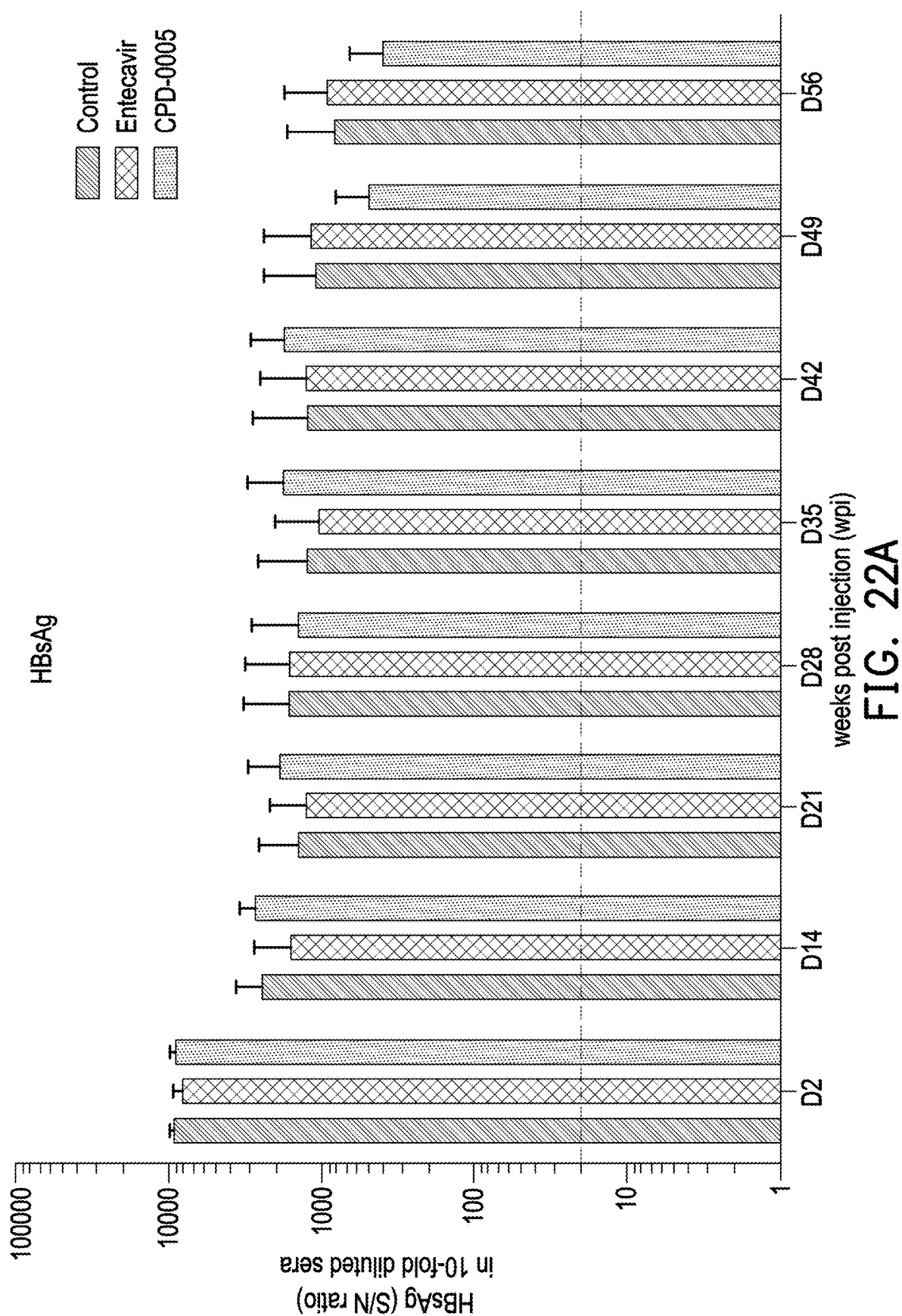
FIG. 22A and FIG. 22B are graphs illustrating HBsAg levels from an animal experiment for Entecavir-based hepatitis B treatment groups in accordance with some embodiments of the present disclosure.
Figure 22B:
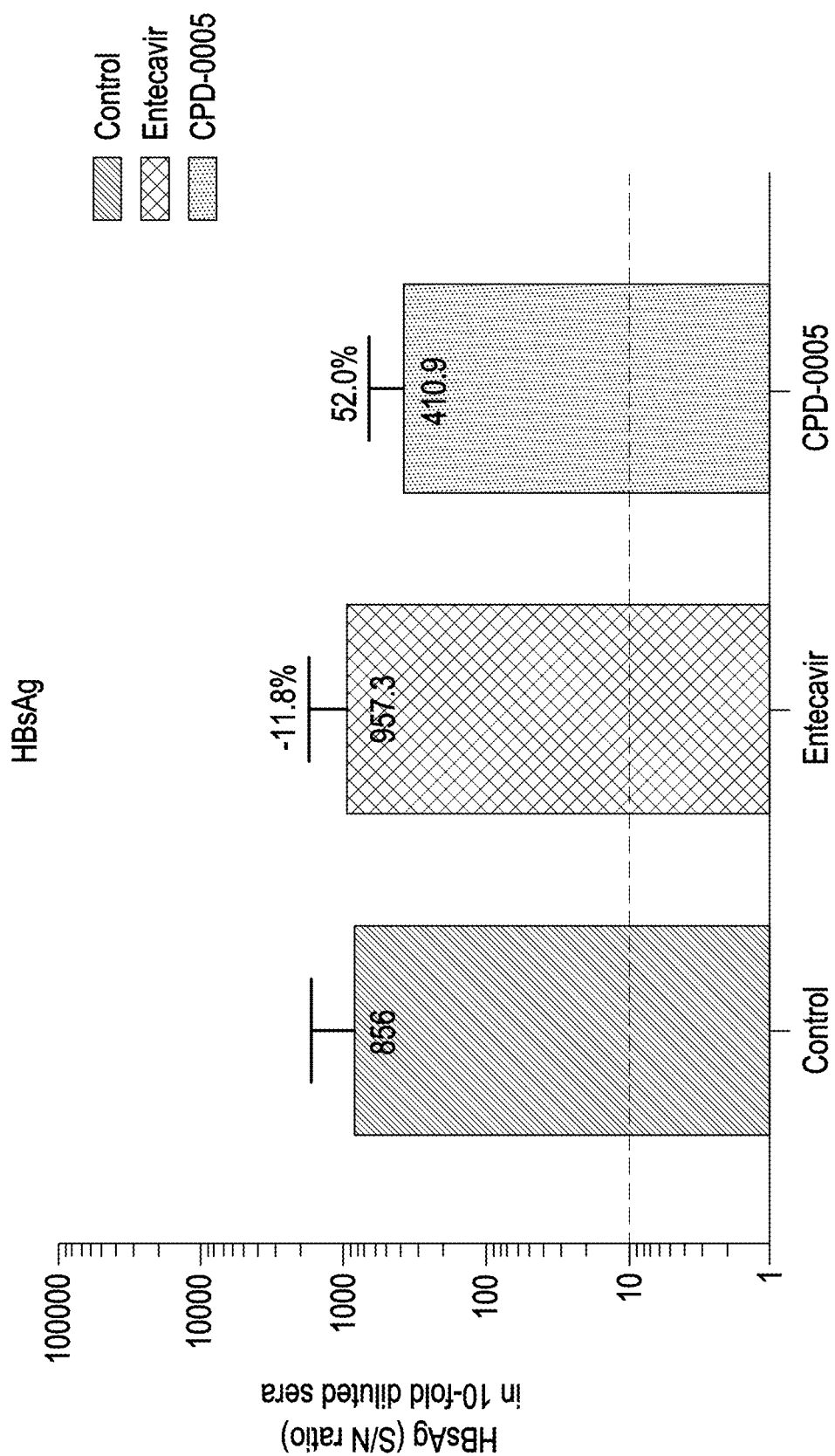
Figure 23A:
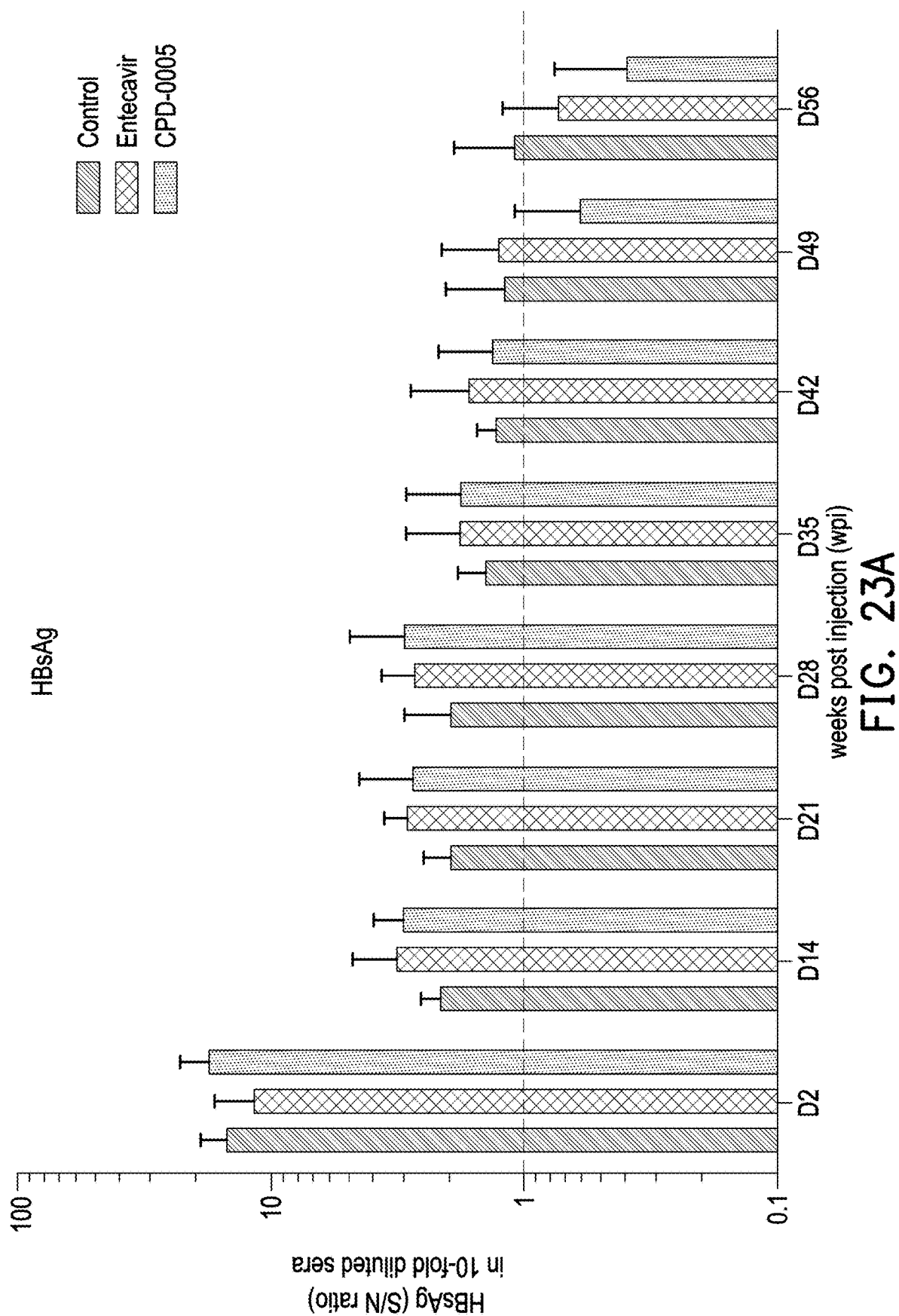
FIG. 23A and FIG. 23B are graphs illustrating HBeAg levels from an animal experiment for Entecavir-based hepatitis B treatment groups in accordance with some embodiments of the present disclosure.
Figure 23B:
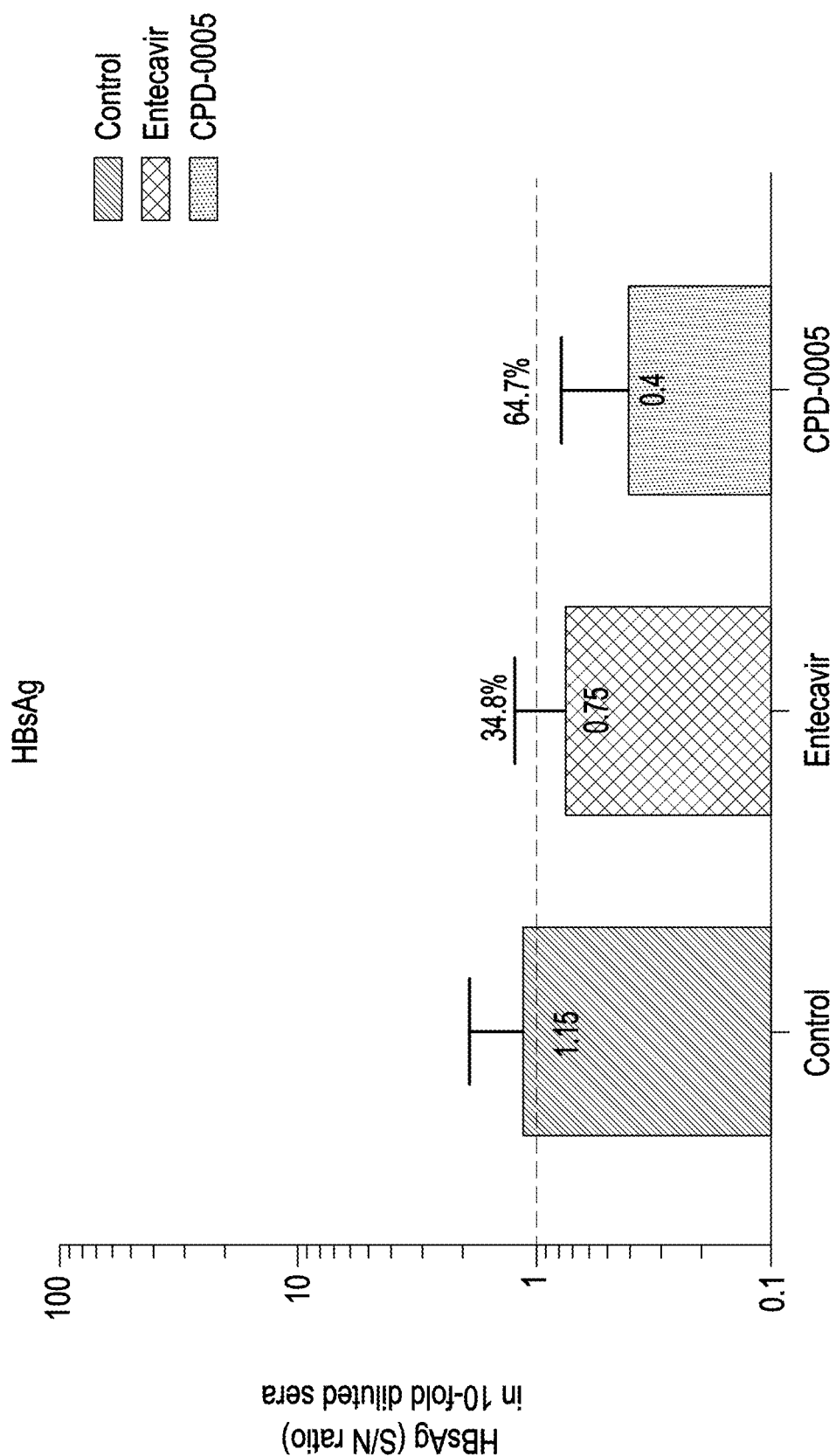

Moreover, as illustrated in FIG. 21, it was found that even if the conventional drugs Entecavir and Birinapant are used in combination, the obtained anti-HBsAg levels were similar to that of the control. In comparison, when the drug conjugate of formula (IA1) and the drug conjugate of formula (IB1) are used in combination (CPD-0005+CPD-0004), a significantly higher anti-HBsAg level was observed. These results indicate that the composition including the drug conjugates of formula (IA1) and formula (IB1) is effective in eliciting an immune response against the hepatitis B virus, while such an effect is not observed in conventional drugs.

Experimental Example 9: In vivo evaluation of the compound of formula (IA1)

In experimental example 9, three hepatitis treatment groups were prepared and administered to C3H mice (intraperitoneal (ip) administration). Group 1 is a control group where no drug compound is used (PBS as control). Group 2 is where a conventional drug Entecavir (1.5 mg/kg, ip) is used alone. Group 3 is where the drug conjugate of formula (IA1) (3.8 mg/kg, ip) is used. The HBsAg, HBeAg and HBV DNA levels of mice were measured at day2 (following the HDI), day14, day21, day28, day35, day42, day49, and day56. The results are illustrated in FIG. 22A to FIG. 24B.

Figure 24A:
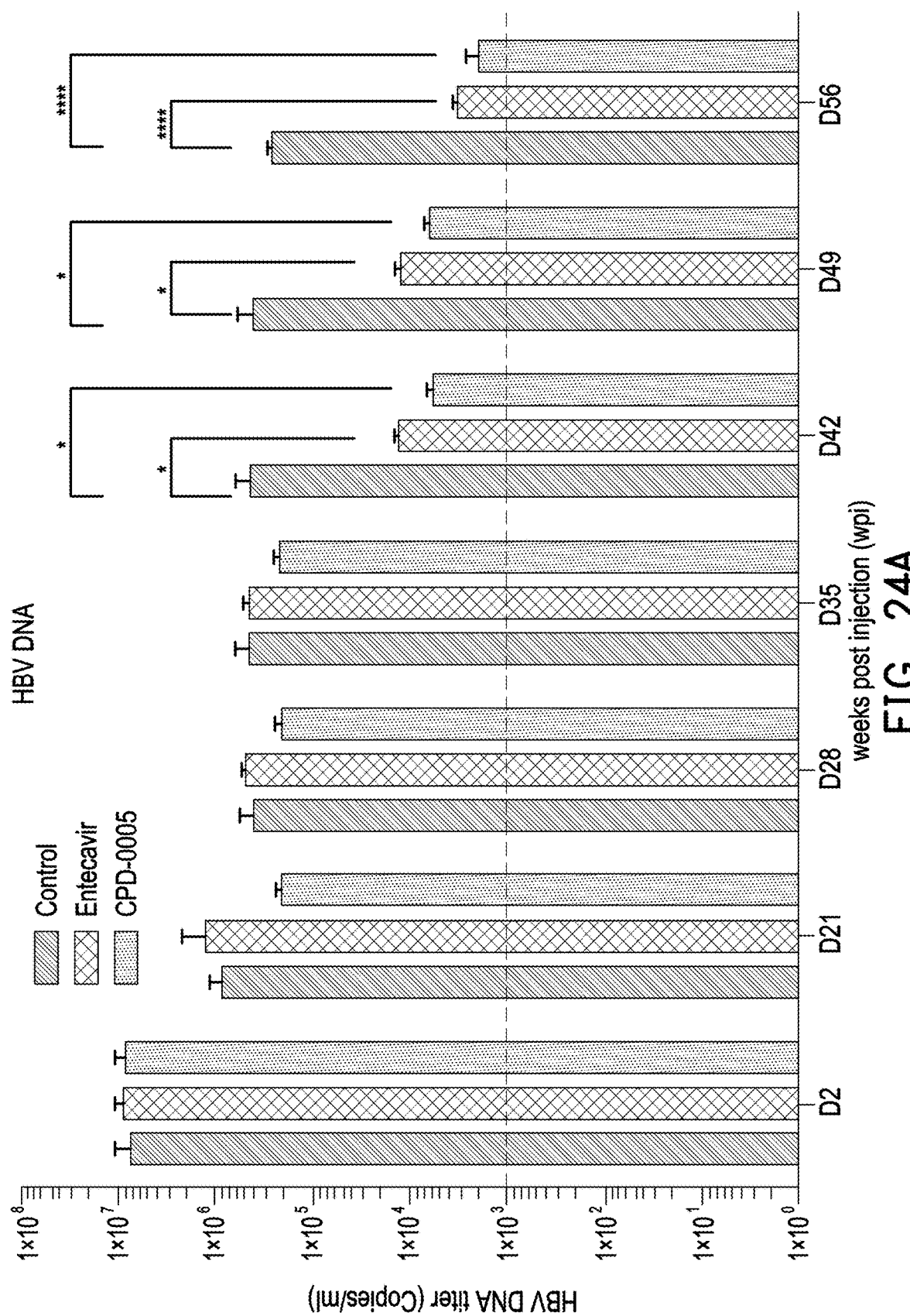
FIG. 24A and FIG. 24B are graphs illustrating HBV DNA levels from an animal experiment for Entecavir-based hepatitis B treatment groups in accordance with some embodiments of the present disclosure.
Figure 24B:
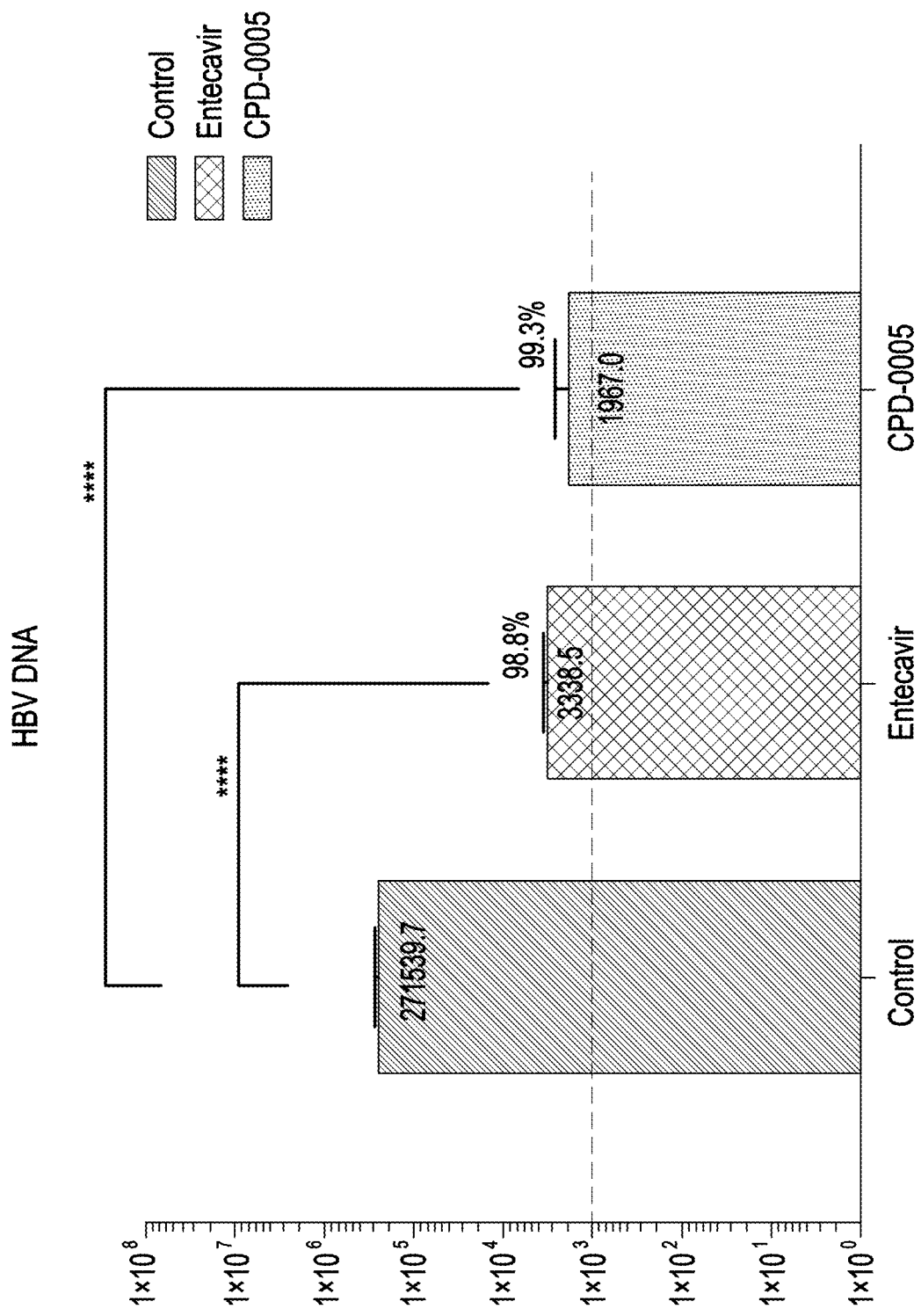
Figure 25A:
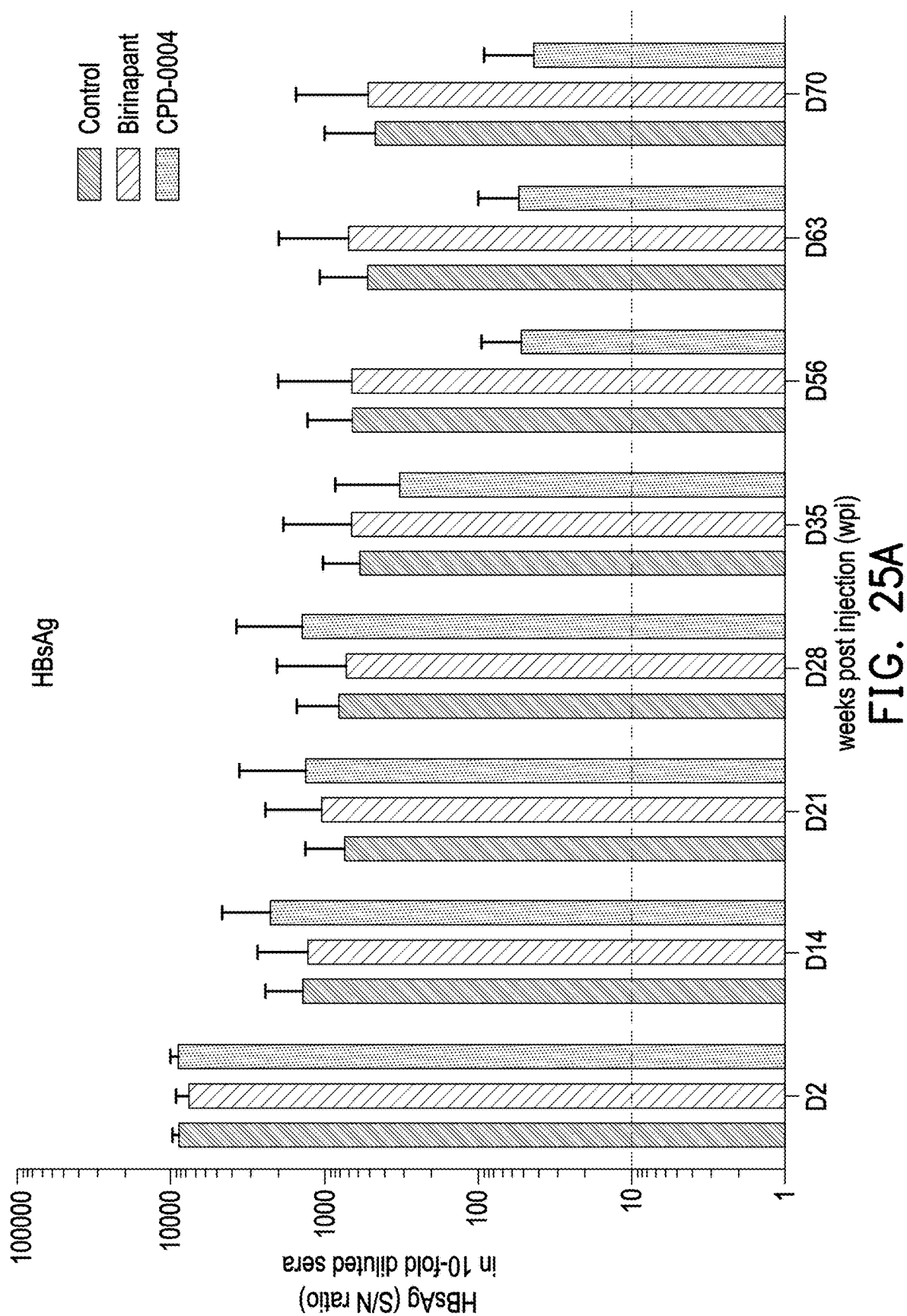
FIG. 25A and FIG. 25B are graphs illustrating HBsAg levels from an animal experiment for Birinapant-based hepatitis B treatment groups in accordance with some embodiments of the present disclosure.
Figure 25B:
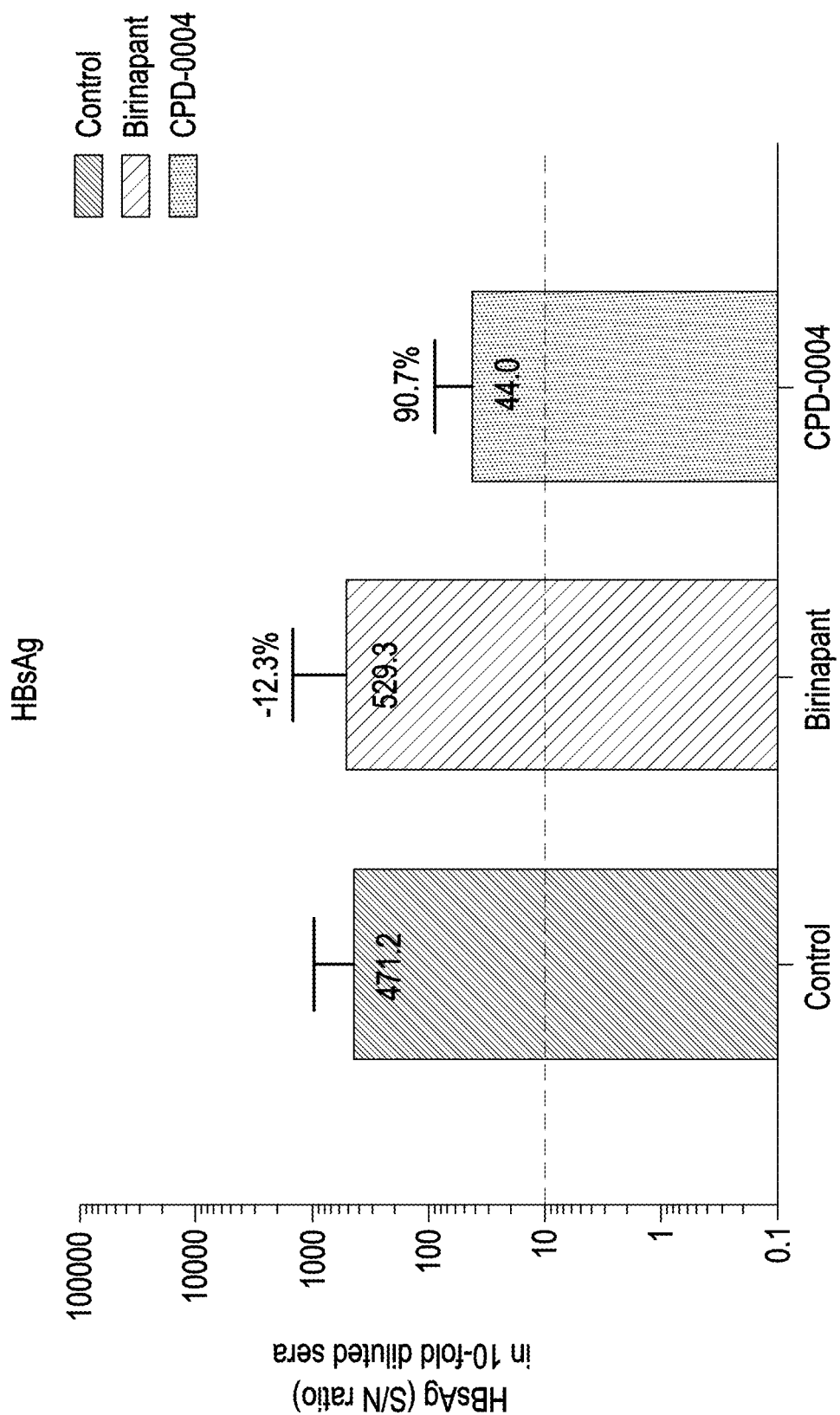
Figure 26A:
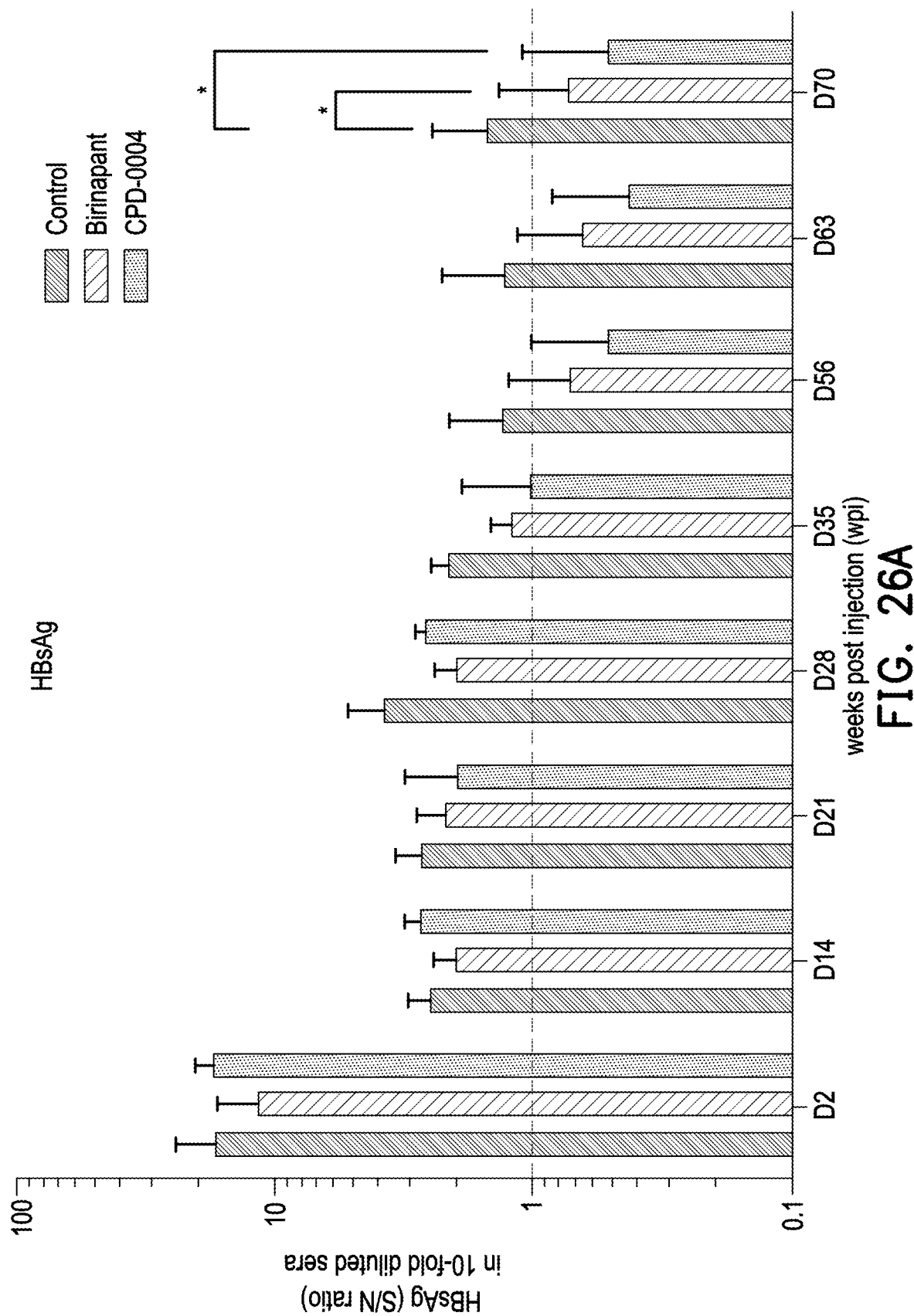
FIG. 26A and FIG. 26B are graphs illustrating HBeAg levels from an animal experiment for Birinapant-based hepatitis B treatment groups in accordance with some embodiments of the present disclosure.
Figure 26B:
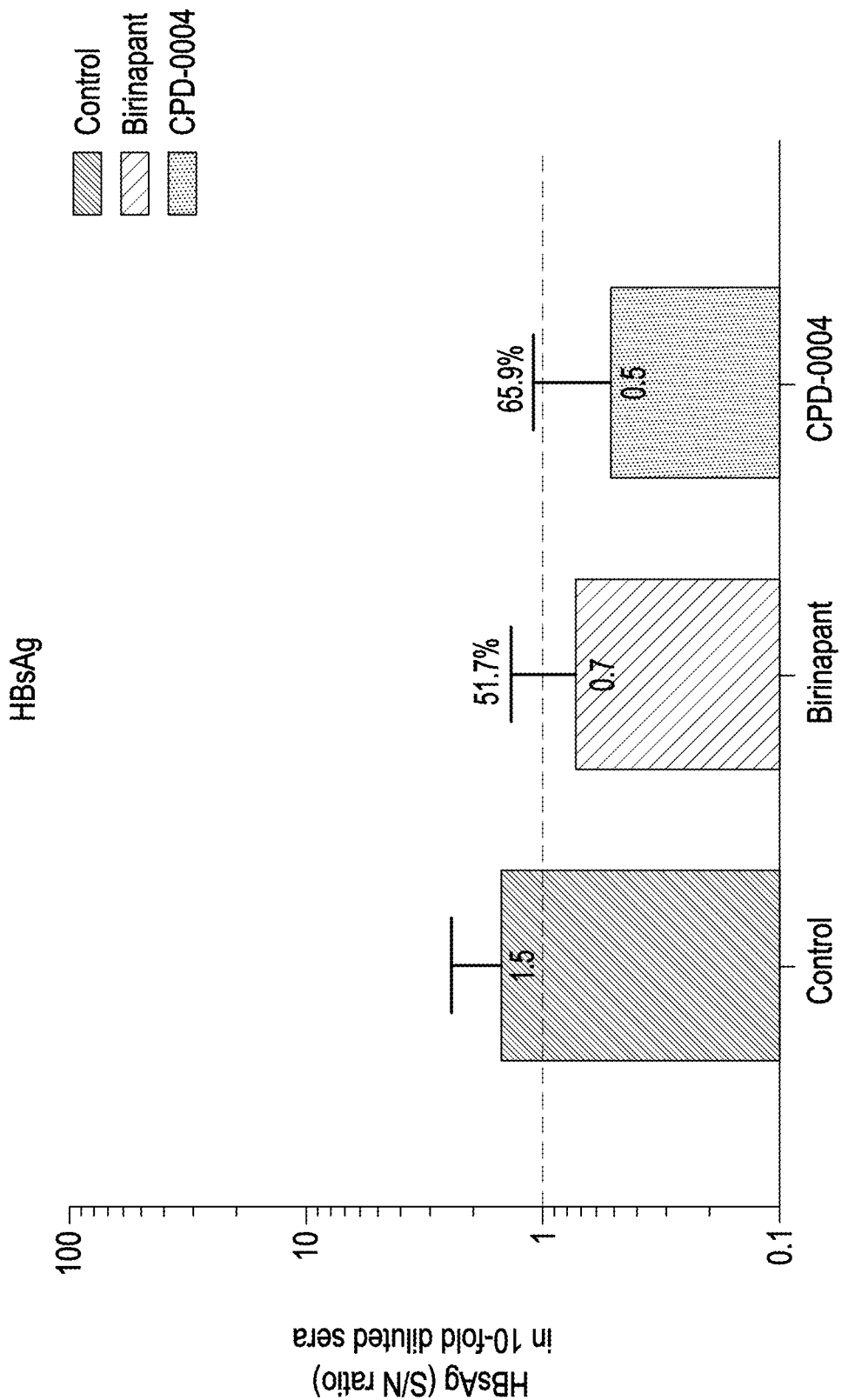

As illustrated in FIG. 22A, FIG. 22B and FIG. 23A and FIG. 23B, it can be seen that when the conventional drug Entecavir is modified to form a drug conjugate of Formula (IA1) (CPD-0005) of the present disclosure, both of the HBsAg and the HBeAg levels are further reduced as compared to the conventional drug. The reduction in the HBsAg and the HBeAg levels are more apparent after day 49. Furthermore, as illustrated in FIG. 24A and FIG. 24B, it was also found that the drug conjugate of formula (IA1) of the invention have a better effect in lowering HBV DNA levels as compared with the conventional drug Entecavir. These results proved that when the drug conjugates of the present disclosure are used in animals (in vivo), they are more effective than the conventional drug in reducing the HBsAg, HBeAg and HBV DNA levels. The results are consistent with the results obtained in the in vitro cell line studies.

Experimental Example 10: In Vivo Evaluation of the Compound of Formula (IB1)

In experimental example 10, three hepatitis treatment groups were prepared and administered to C3H mice (intraperitoneal (ip) administration). Group 1 is a control group where no drug compound is used (PBS as control). Group 2 is where a conventional drug Birinapant (10 mg/kg, ip) is used alone. Group 3 is where the drug conjugate of formula (IB1) (16.6 mg/kg, ip) is used. The HBsAg, HBeAg and HBV DNA levels of mice were measured at day2 (following the HDI), day14, day21, day28, day35, day56, day63, and day70. The results are illustrated in FIG. 25A to FIG. 27B.

Figure 27A:
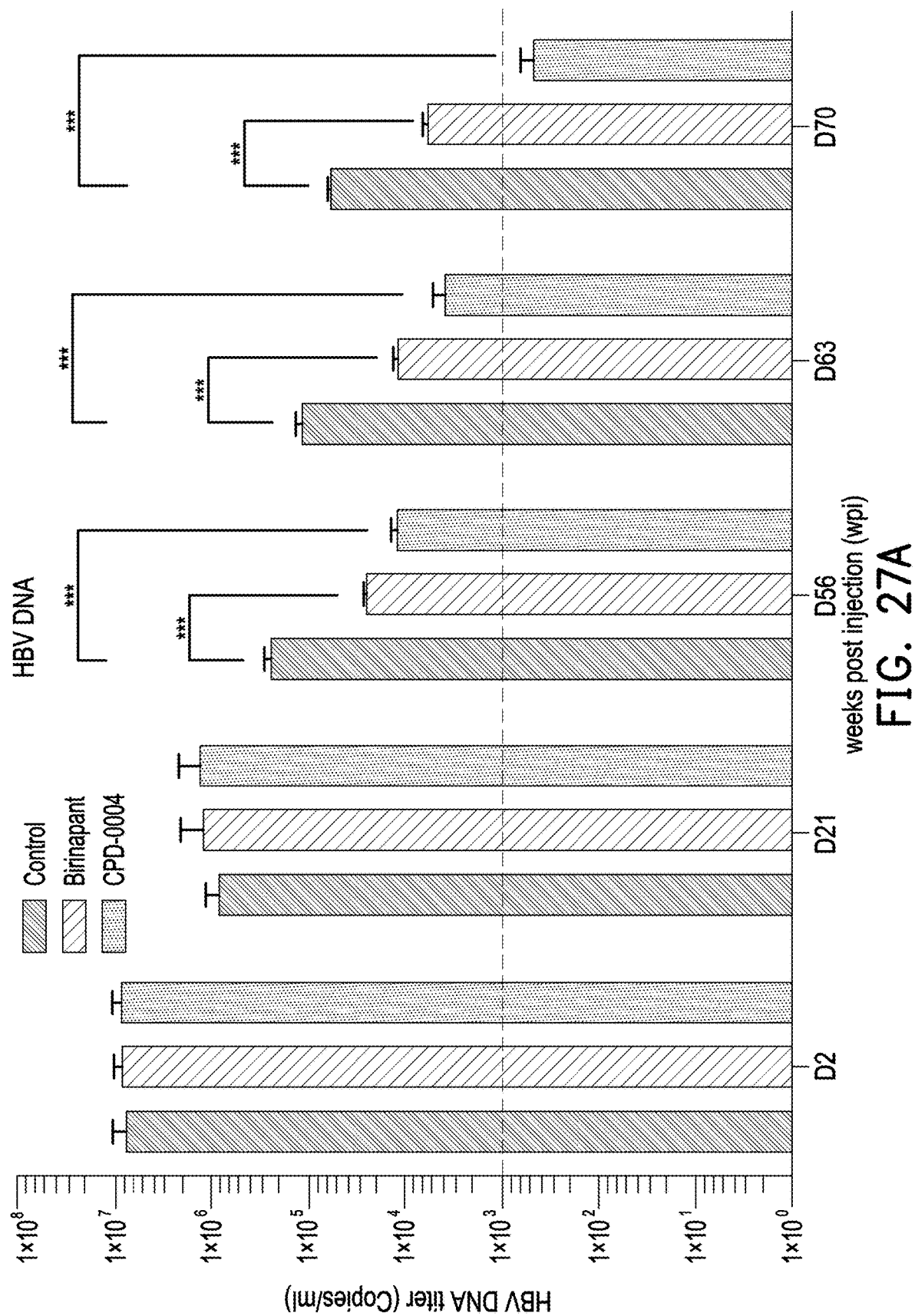
FIG. 27A and FIG. 27B are graphs illustrating HBV DNA levels from an animal experiment for Birinapant-based hepatitis B treatment groups in accordance with some embodiments of the present disclosure.
Figure 27B:
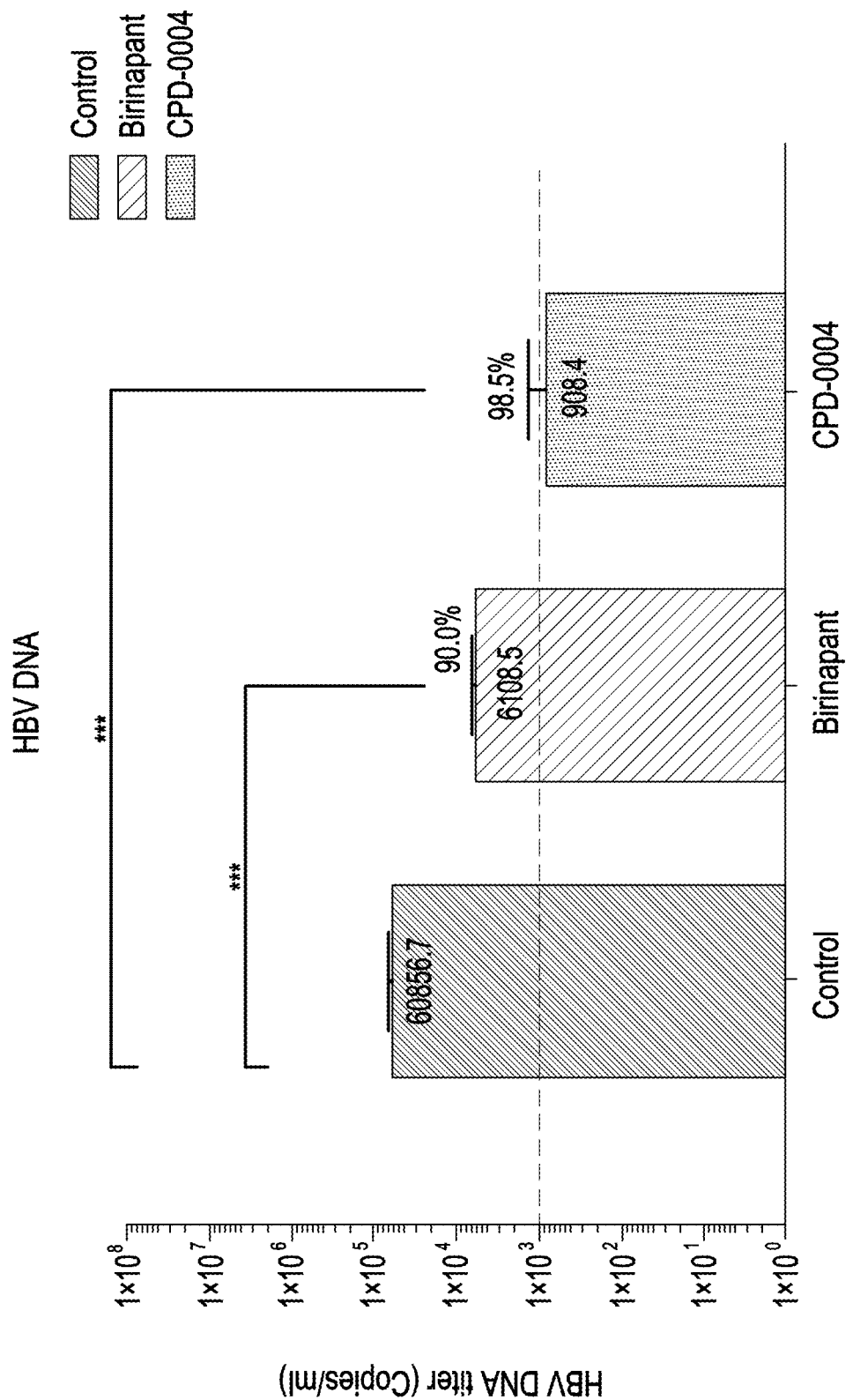

As illustrated in FIG. 25A, FIG. 25B and FIG. 26A and FIG. 26B, it can be seen that when the conventional drug Birinapant is modified to form a drug conjugate of Formula (IB1) (CPD-0004) of the present disclosure, both of the HBsAg and the HBeAg levels are further reduced as compared to the conventional drug. The reduction in the HBsAg and the HBeAg levels are more apparent after day 56. Furthermore, as illustrated in FIG. 27A and FIG. 27B, it was also found that the drug conjugate of formula (IB1) of the invention have a better effect in lowering HBV DNA levels as compared with the conventional drug Birinapant. These results proved that when the drug conjugates of the present disclosure are used in animals (in vivo), they are more effective than the conventional drug in reducing the HBsAg, HBeAg and HBV DNA levels. The results are consistent with the results obtained in the in vitro cell line studies.

In accordance with the exemplary embodiments of the present disclosure, the drug conjugate or the pharmaceutical composition of the present disclosure is more effective than conventional drugs in the treatment of hepatitis, such as hepatitis B. The drug conjugate or the pharmaceutical composition of the present disclosure may further lower the hepatitis B surface antigen (HBsAg), hepatitis B e antigen (HBeAg) levels and the HBV DNA levels, while improving hepatitis B surface antibody (anti-HBsAg) levels as compared with conventional hepatitis B treatment methods. Furthermore, in a pharmaceutical composition, when the first drug conjugate (including HBV drug) and the second drug conjugate (including IAP antagonists) are used in combination, at least the same or lower HBsAg, HBeAg and HBV DNA levels can be achieved while having less side effects (hair loss). In some embodiments, when any one of the first drug conjugate (including HBV drug) or the second drug conjugate (including IAP antagonists) are used in combination with conventional drugs (non-modified drug compounds), the HBsAg, HBeAg and HBV DNA levels may also be further lowered as compared to using conventional drugs alone.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A drug conjugate having the structure shown in formula (I):

Z-(linker-[R]$_m$)$_n$  (I)

wherein, in formula (I), Z is a drug compound, R is a sugar, and m and n are independently an integer from 1 to 6, wherein the drug compound Z is selected from the group consisting of Entecavir, Birinapant, Tenofovir, LCL161 and Adefovir, and the sugar R is selected from the group consisting of a monosaccharide, a disaccharide, a trisaccharide, a tetrasaccharide, an oligosaccharide, and a polysaccharide, and wherein in the drug conjugate, the drug compound Z is conjugated to the linker to form a carbamate linkage.

2. The drug conjugate according to claim 1, wherein the linker includes $L^1(L^2)_p$ groups, wherein the $L^1$ group is linked to the drug compound Z to form the carbamate linkage, and the $L^2$ group links the $L^1$ group to the sugar R, wherein p is an integer from 1 to 4, the $L^2$ group is selected from the group consisting of a single bond, an alkyl having 1 to 50 carbons, alkoxy having 1 to 50 carbons, alkenyl having 2 to 50 carbons, and alkenyloxy having 2 to 50 carbons, and wherein, the alkyl, alkoxy, alkenyl, alkenyloxy is linear or branched, at least one —CH$_2$— is optionally replaced by —CO—, —COO—, —OCO—, —S—, —O—, or —NH—, at least one —CH$_2$CH$_2$— is optionally replaced by —CH═CH— or —C≡C—, and at least one hydrogen in —CH$_2$—, —CH═ or —NH— described above is optionally replaced by a halogen, trifluoromethyl, alkyl having 1 to 20 carbons, alkoxy having 1 to 20 carbons, or alkanoyl having 1 to 20 carbons, and at least one —O— above is optionally replaced with a phosphate, phosphonate, phosphinate, phosphine oxide, phosphoramide, phosphoramidate, phosphite, phosphonite, phosphine, aminophosphine, phosphoramidite, phosphonamidite, phosphonamide, phosphinamide or phosphorodiamidite group.

3. The drug conjugate according to claim 1, wherein the linker is selected from any one of formula (LX1), formula (LX2), formula (LX7) to formula (LX11), and formula (LX20):

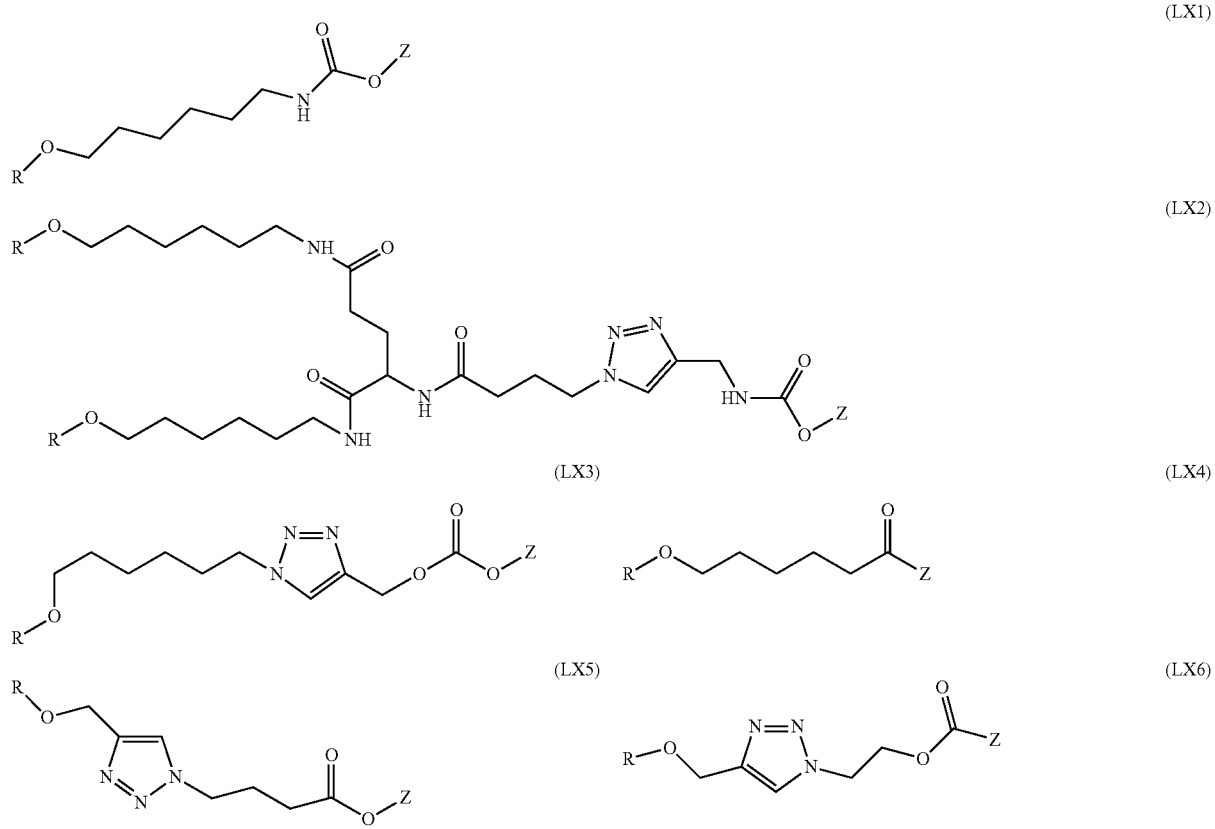

-continued
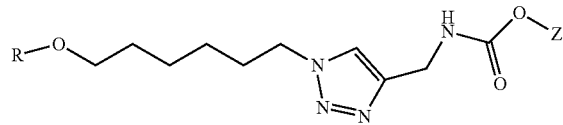
(LX7)
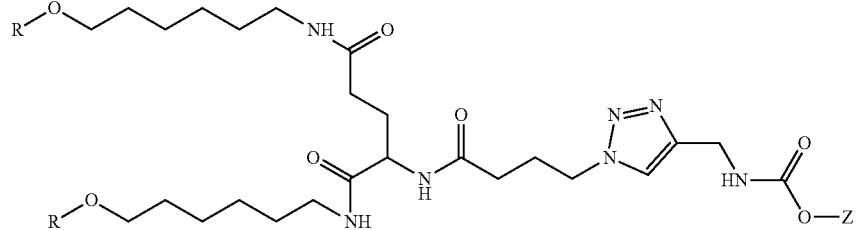
(LX8)
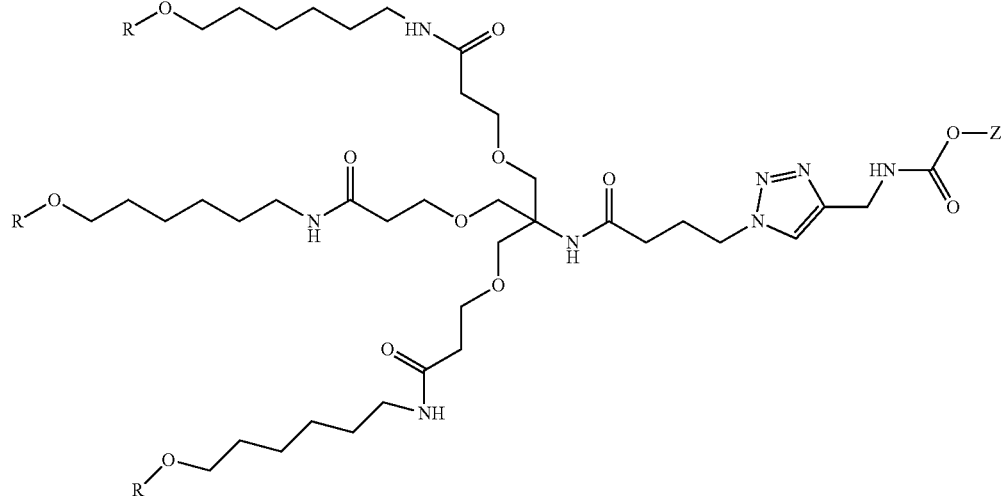
(LX9)
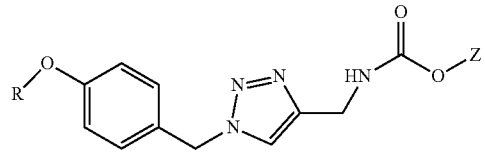
(LX10)
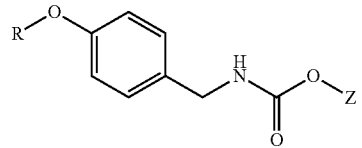
(LX11)
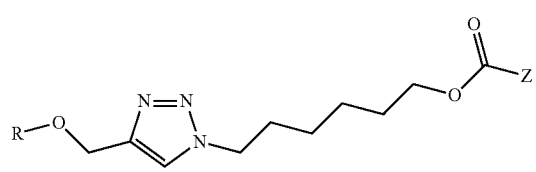
(LX12)
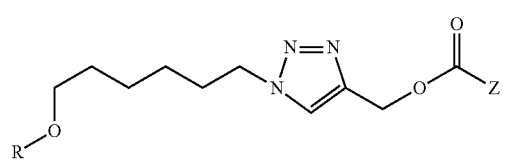
(LX13)
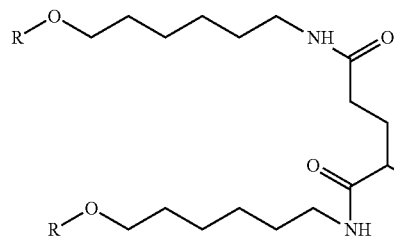
(LX14)
(LX15)
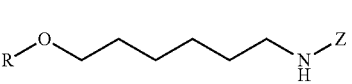
(LX16)

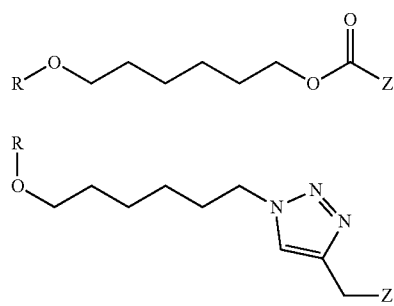
(LX17)

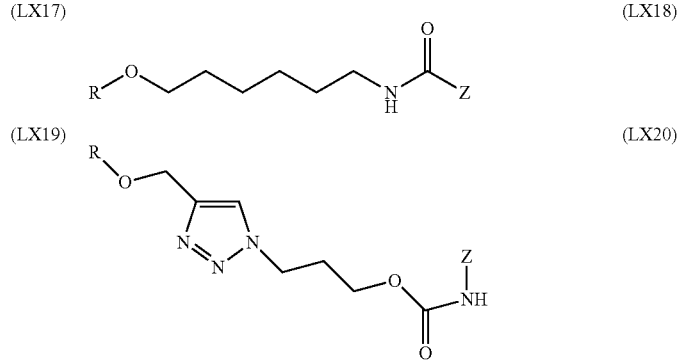
(LX18)

wherein, in formula (LX1), formula (LX2), formula (LX7) to formula (LX11), and formula (LX20), Z is the drug compound, and R is the sugar.

4. The drug conjugate according to claim 1, wherein the linker comprises a triazole.

5. The drug conjugate according to claim 1, wherein the structure shown in b formula (I) is formula (II):

Z-(linker-[R]$_m$)$_2$    formula (II)

wherein, in formula (II), Z is the drug compound, R is the sugar, and m is independently an integer from 1 to 3.

6. The drug conjugate according to claim 1, wherein the structure shown in formula (I) comprises formula (IA1) gr formula (IA2):

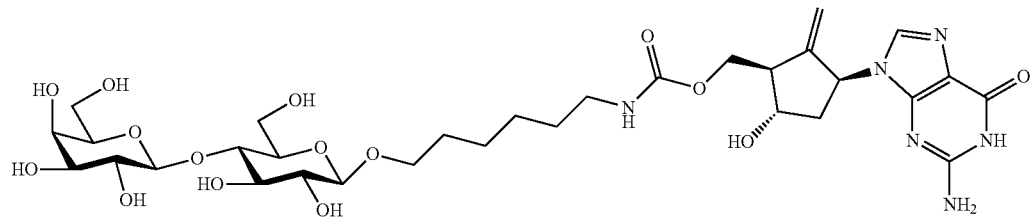
Formula (IA1)

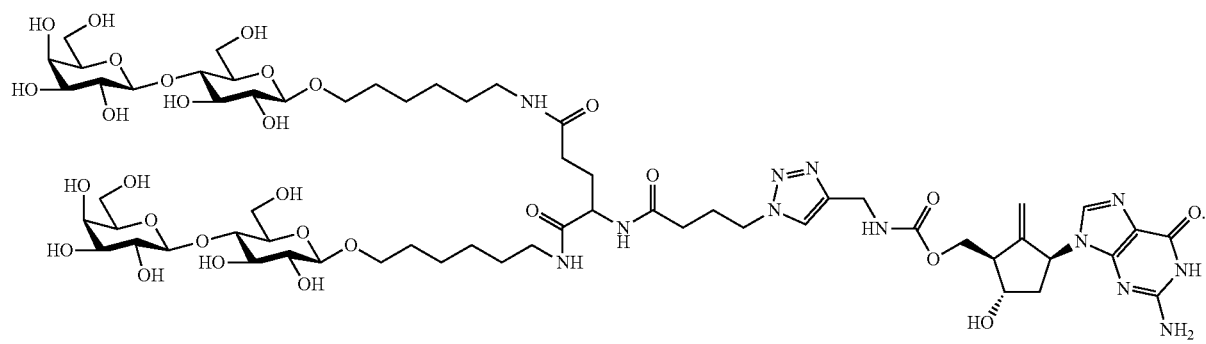
Formula (IA2)

7. The drug conjugate according to claim 1, wherein the structure shown in formula (I) comprises formula (IB3), formula (IB4), formula (IB5), formula (IB10) gr formula (IB11):

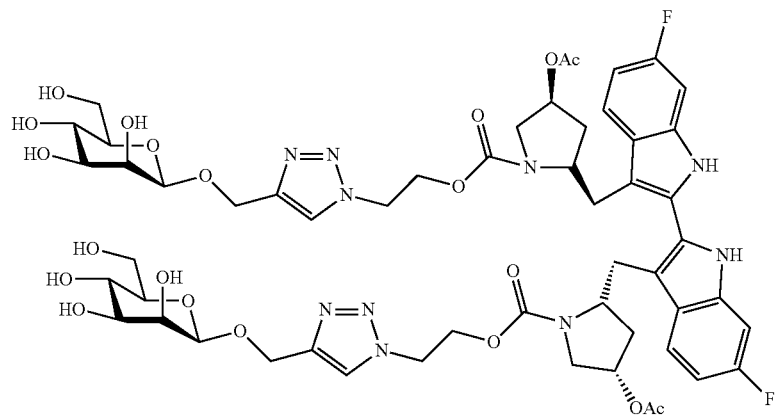
Formula (IB3)
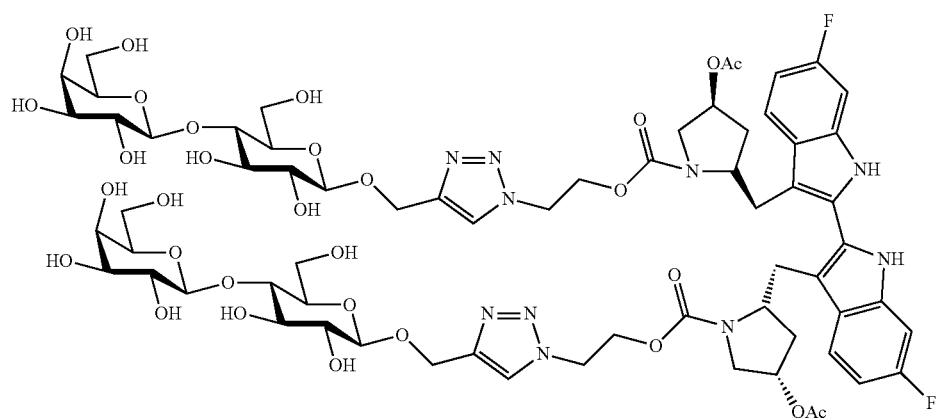
Formula (IB4)
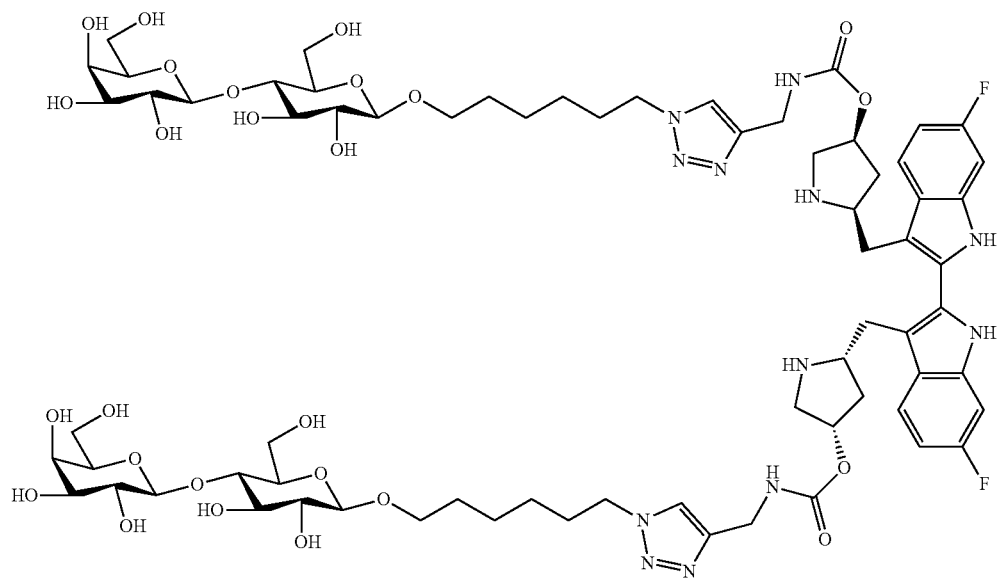
Formula (IB5)

Formula (IB6)
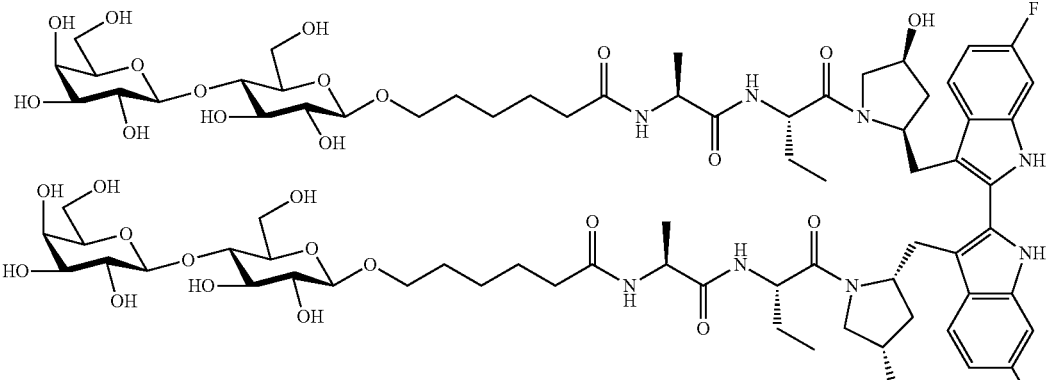
Formula (IB7)
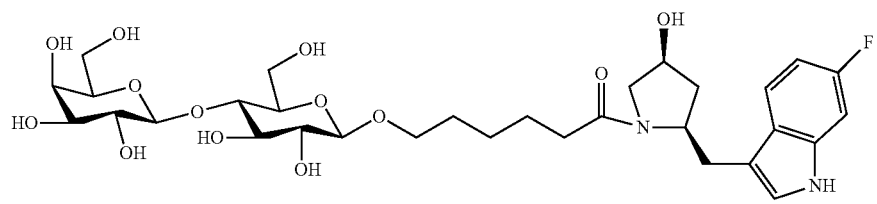
Formula (IB8)
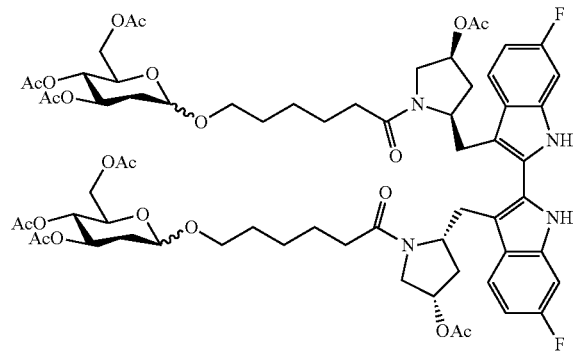
Formula (IB9)
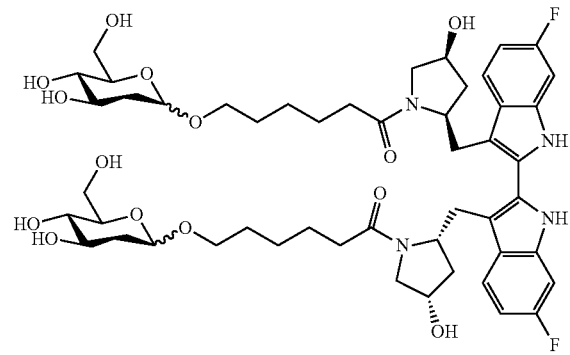
Formula (IB10)
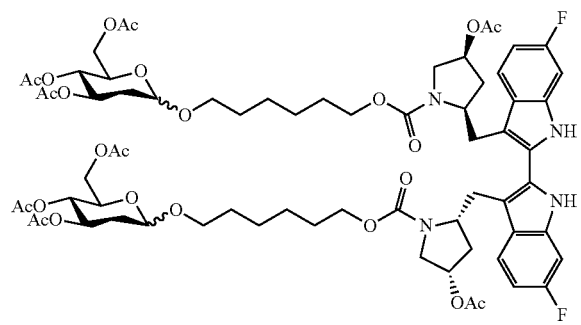
Formula (IB11)
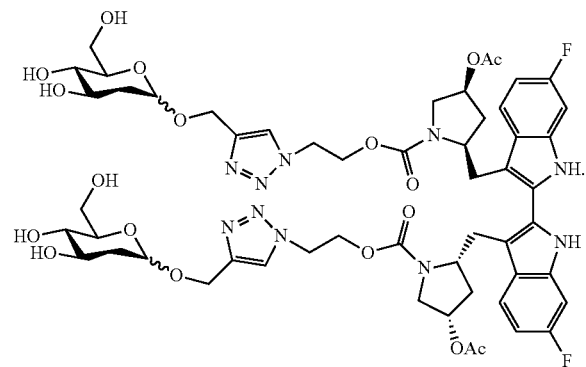

8. The drug conjugate according to claim 1, wherein the structure shown in formula (I) comprises formula (IC1), formula (IC2), formula (IC3), formula (IC4), formula (IC5), formula (IC6), formula (IC7), formula (IC8), formula (IC9), formula (IC10) or formula (IC11):
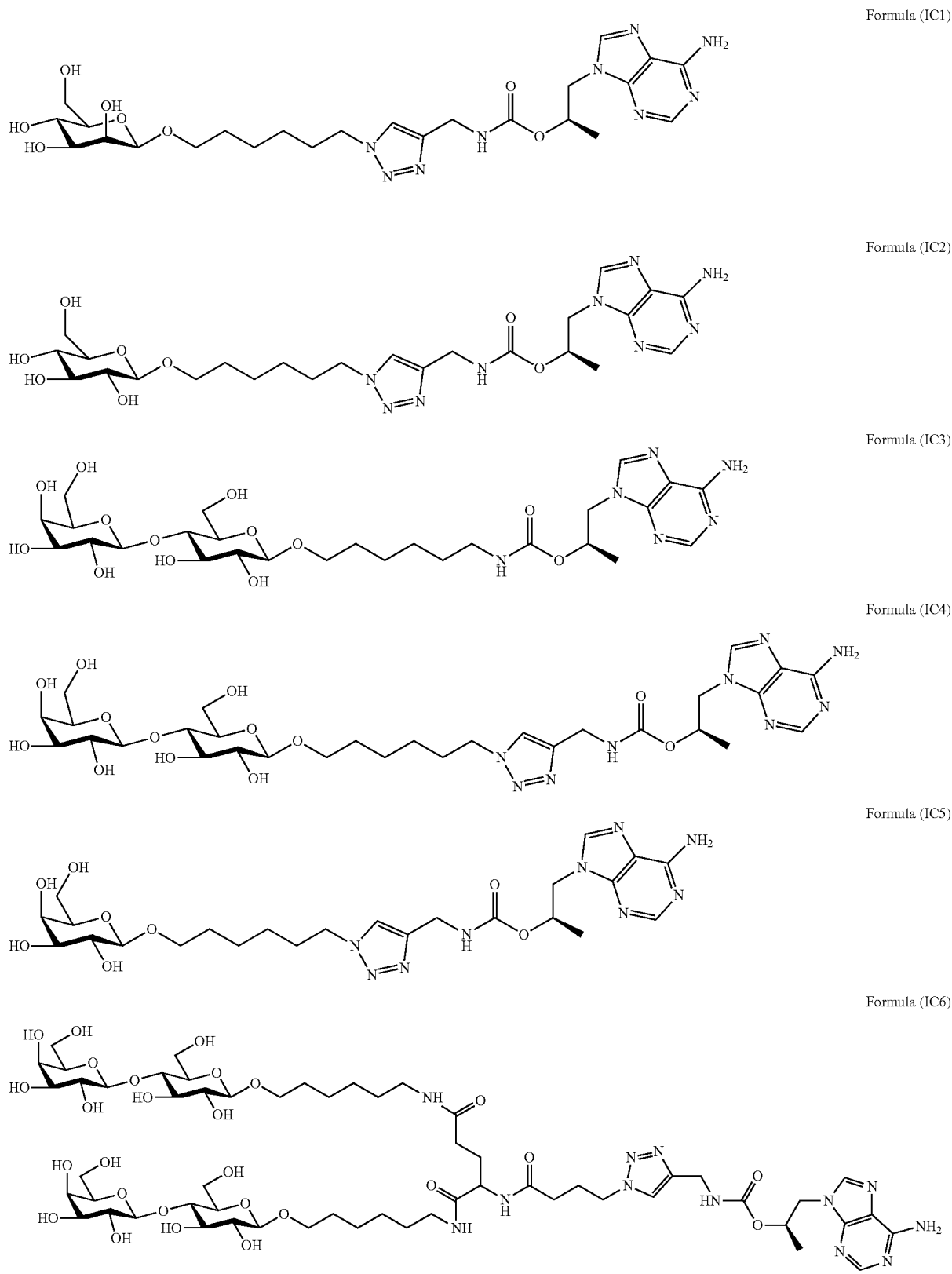

-continued
Formula (IC7)
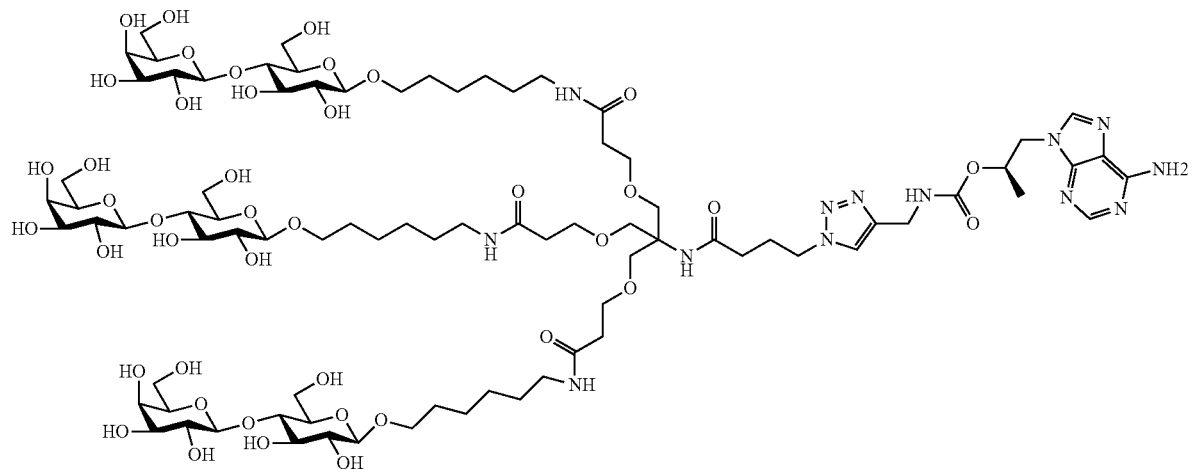
Formula (IC8)
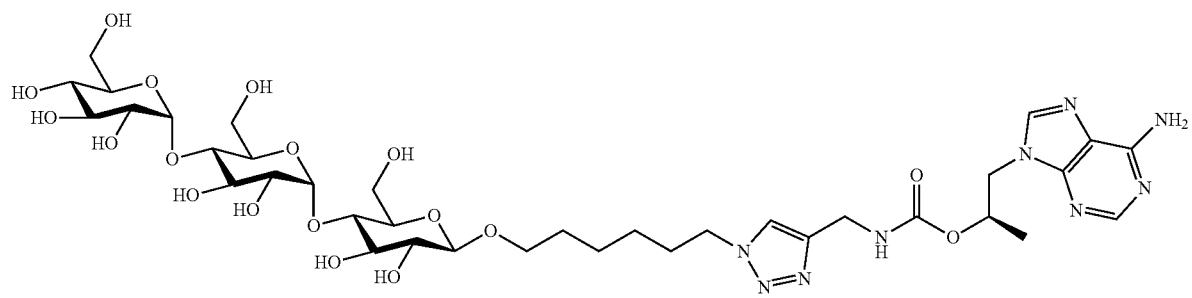
Formula (IC9)
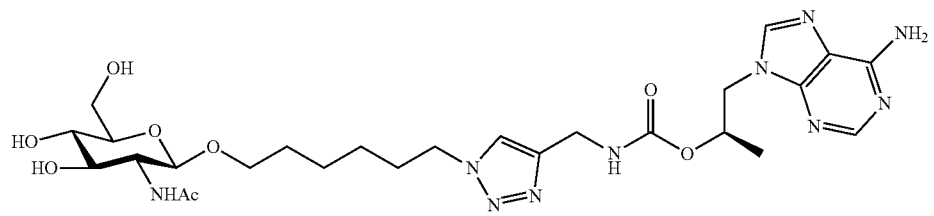
Formula (IC10)
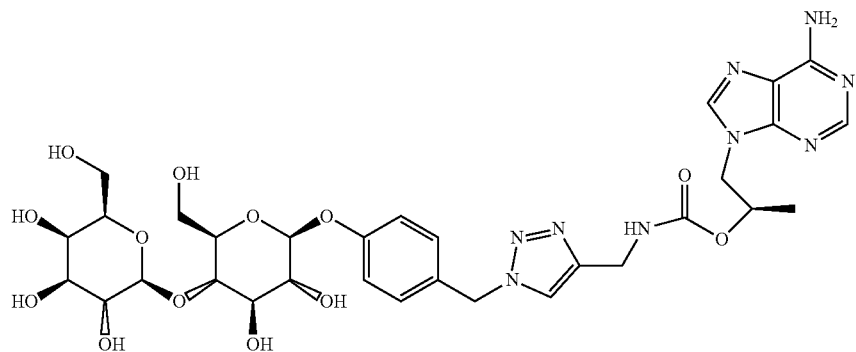

-continued
Formula (IC11)
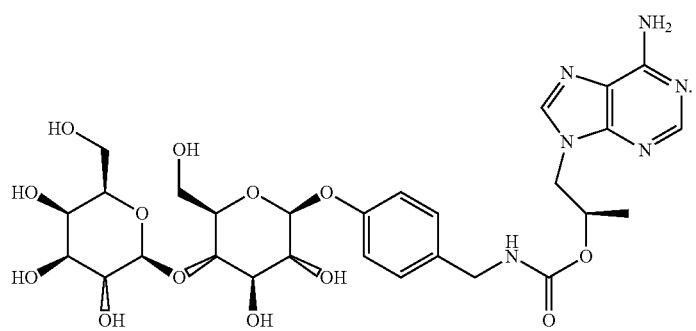
9. The drug conjugate according to claim 1, wherein the structure shown in formula (I) comprises formula (ID2), formula (ID3) or formula (ID4):
Formula (ID2)
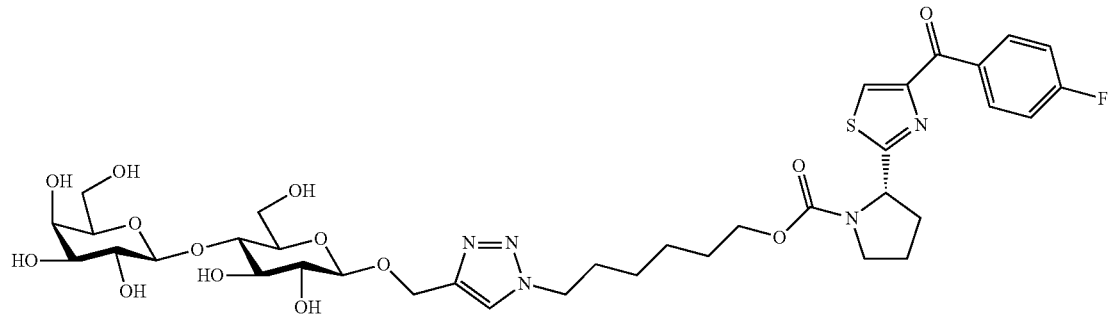
Formula (ID3)
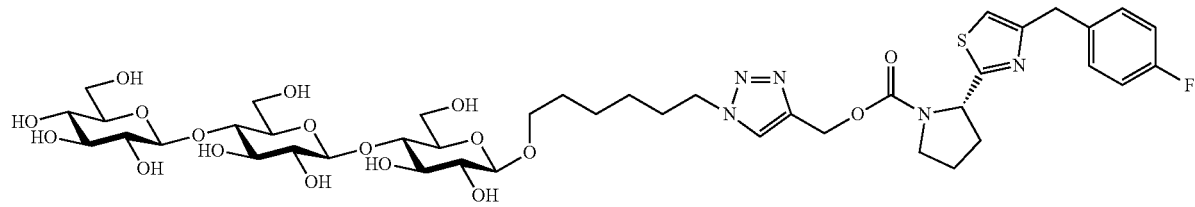
Formula (ID4)
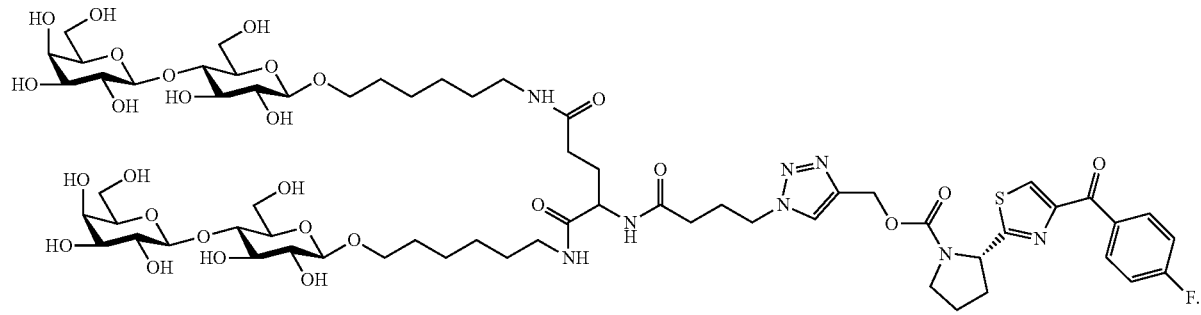

10. The drug conjugate according to claim 1, wherein the structure shown in formula (I) comprises formula (IE1):

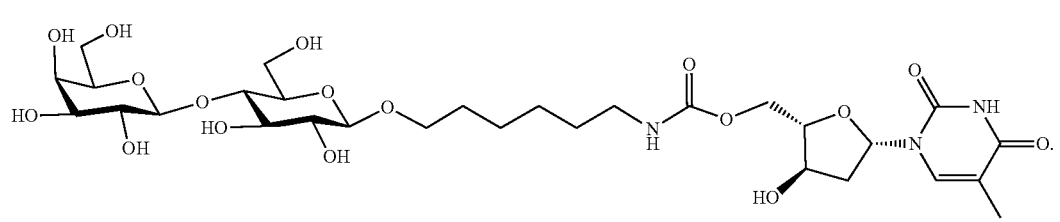

Formula (IE1)

11. The drug conjugate according to claim 1, wherein the structure shown in formula (I) comprises formula (IF1) or formula (IF2):

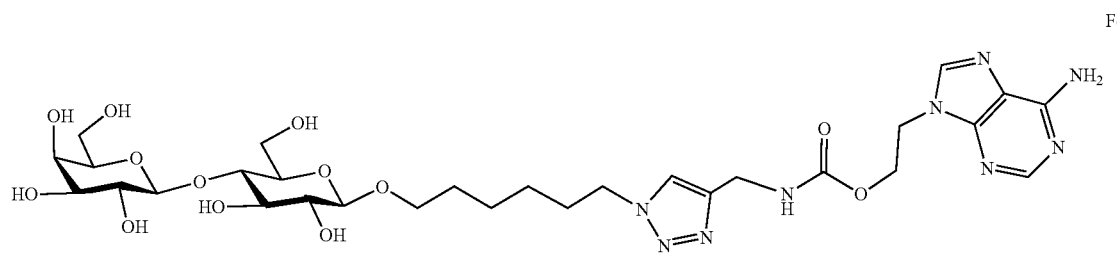

Formula (IF1)

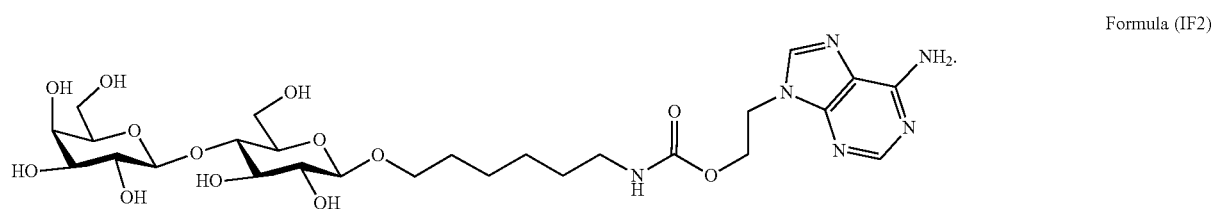

Formula (IF2)

12. The drug conjugate according to claim 1, wherein the structure shown in formula (I) comprises formula (IG1):

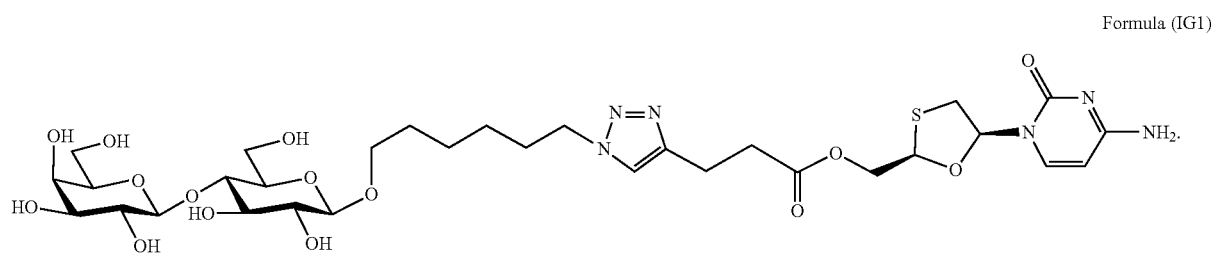

Formula (IG1)

13. The drug conjugate according to claim 1, wherein the structure shown in formula (I) comprises formula (IH3):

formula (IH3)

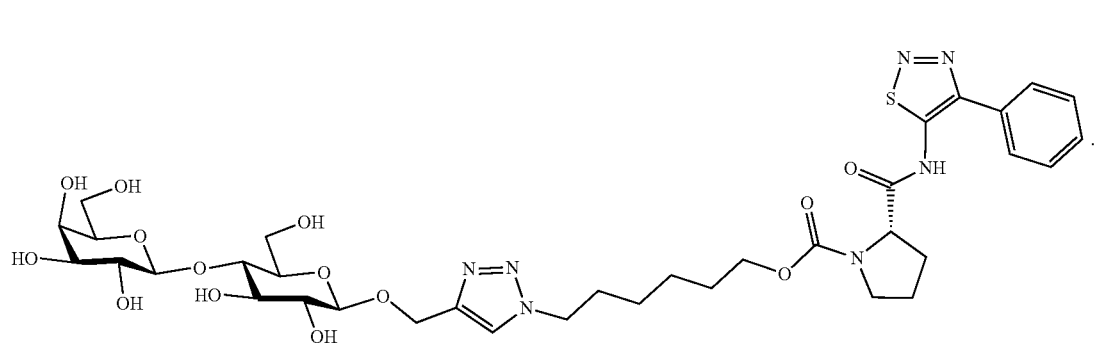

14. The drug conjugate according to claim 1, wherein the structure shown in formula (I) comprises formula (IJ2):

formula (IJ2)

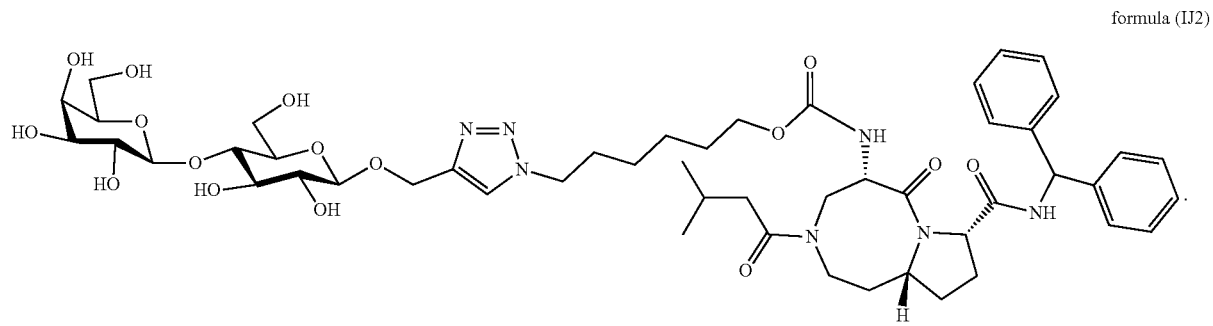

15. A pharmaceutical composition, comprising:
an active ingredient, wherein the active ingredient comprises a drug conjugate having the structure shown in formula (I):

Z-(linker-[R]$_m$)$_n$      formula(I)

wherein, in formula (I), Z is a drug compound, R is a sugar, and m and n are independently an integer from 1 to 6, the drug compound Z is selected from the group consisting of Entecavir, Birinapant Tenofovir, LCL161 and Adefovir, and the sugar R is selected from the group consisting of a monosaccharide, a disaccharide, a trisaccharide, a tetrasaccharide, an oligosaccharide, and a polysaccharide, and wherein in the drug conjugate, the drug compound Z is conjugated to the linker to form a carbamate linkage; and
at least one or more pharmaceutically acceptable excipients.

16. The pharmaceutical composition according to claim 15, wherein the drug conjugate of formula (I) comprises a first drug conjugate that is selected from the group consisting of formula (IA1), formula (IA2), formula (IC1), formula (IC2), formula (IC3), formula (IC4), formula (IC5), formula (IC6), formula (IC7, formula (IC8), formula (IC9), formula (IC10), formula (IC11), formula (IE1), formula (IF1), formula (IF2), and formula (IG1):

Formula (IA1)

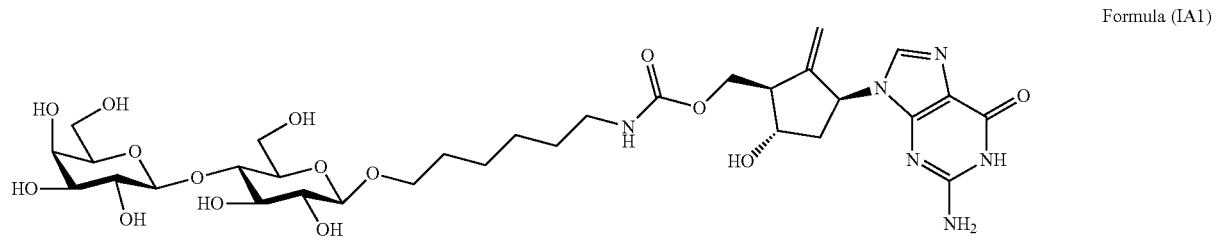

-continued
Formula (IA2)
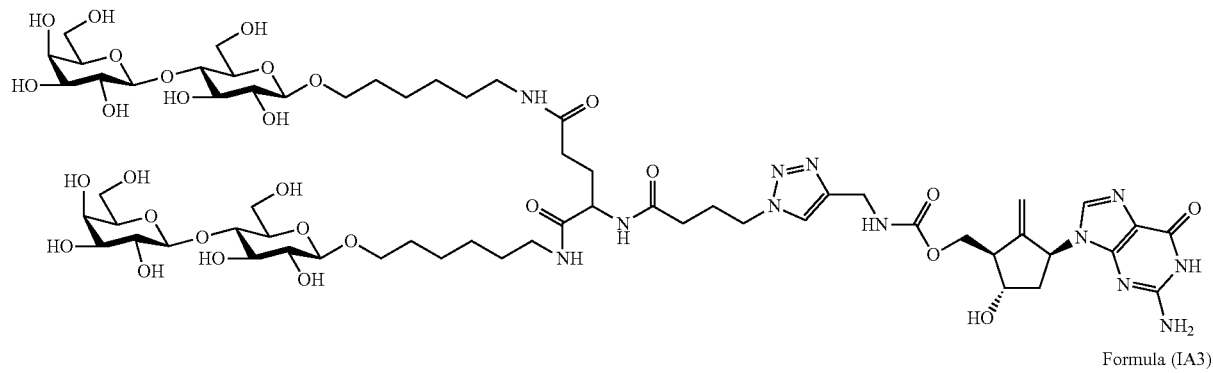
Formula (IA3)
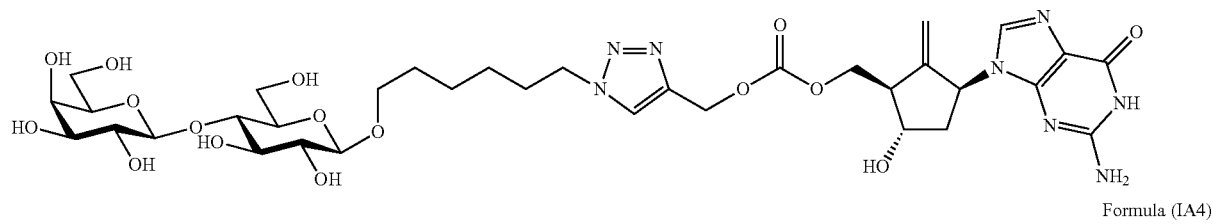
Formula (IA4)
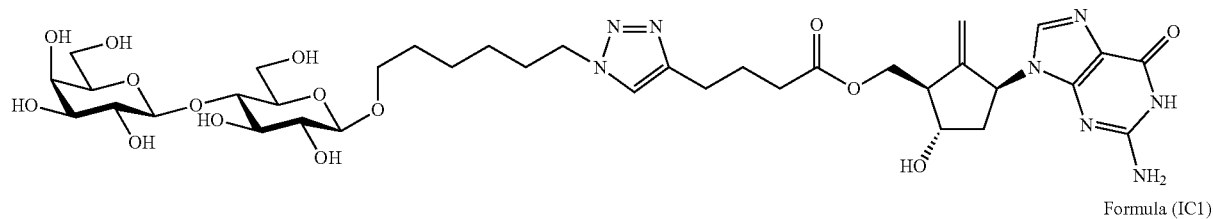
Formula (IC1)
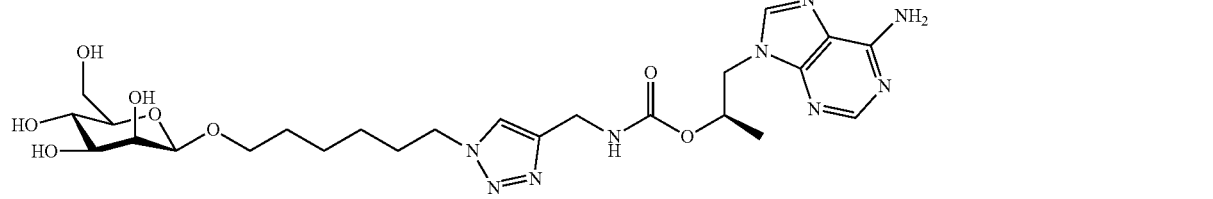
Formula (IC2)
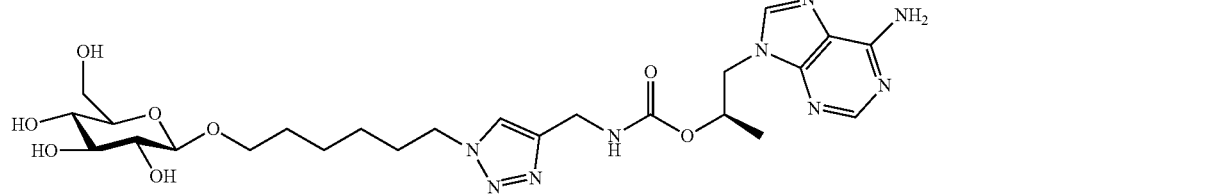
Formula (IC3)
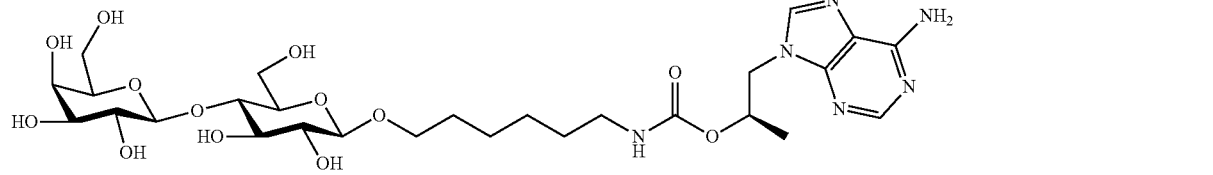

-continued
Formula (IC4)
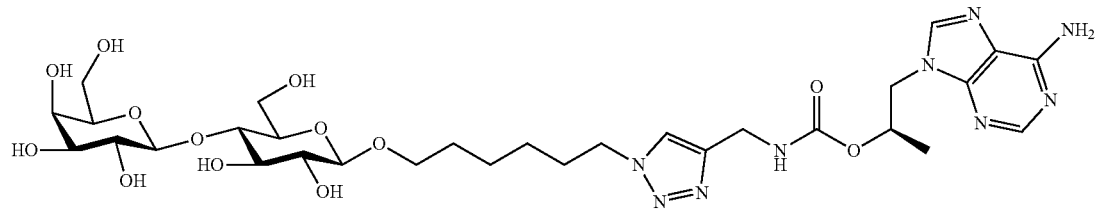
Formula (IC5)
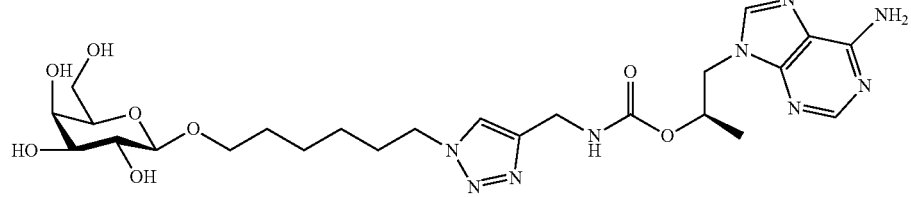
Formula (IC6)
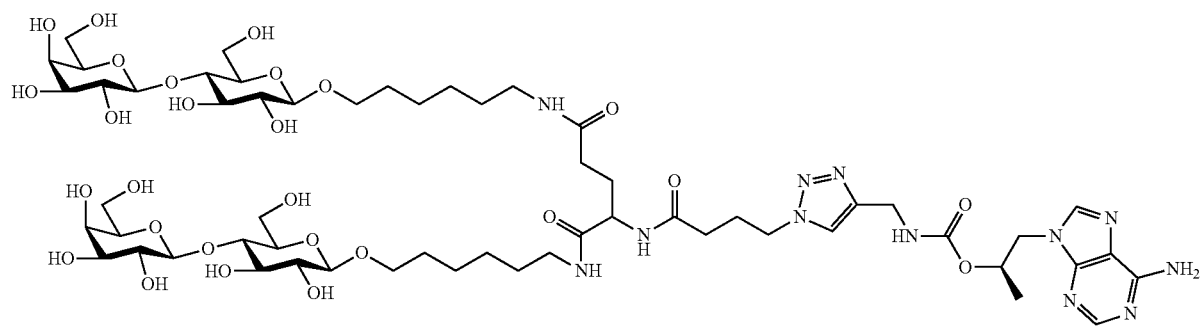
Formula (IC7)
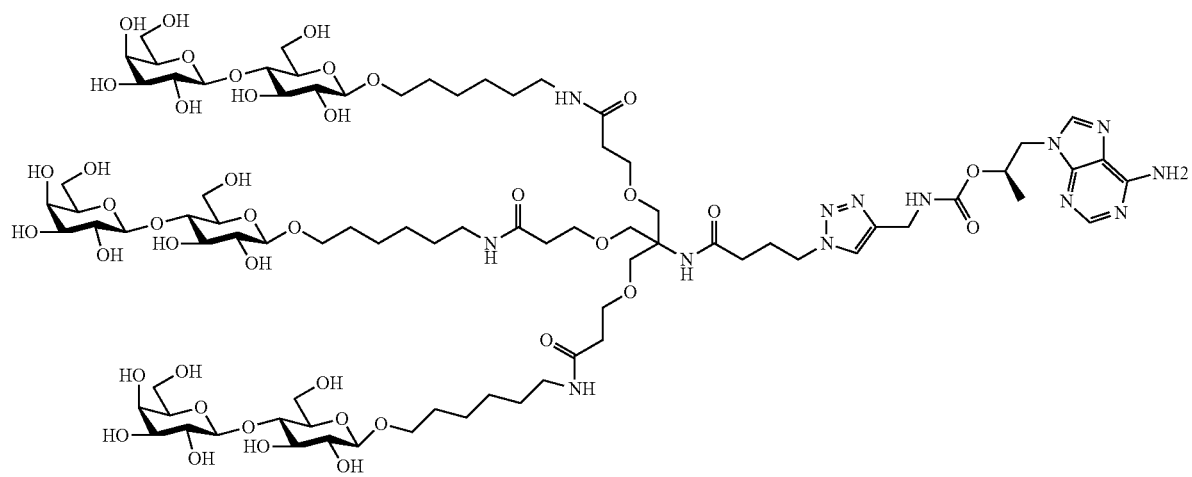
Formula (IC8)
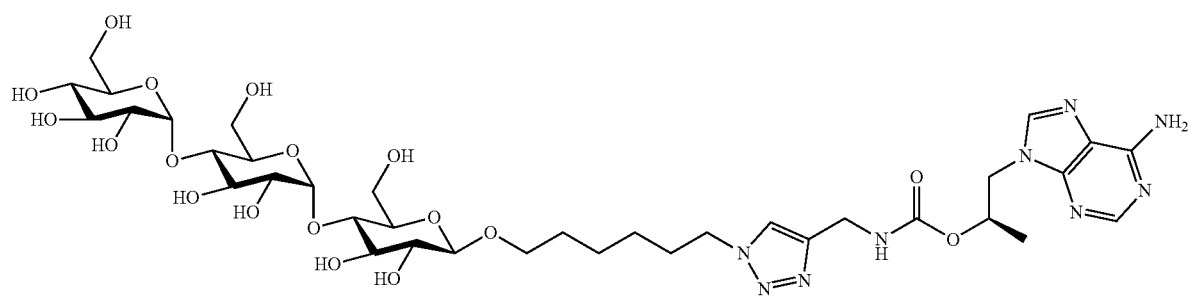

-continued
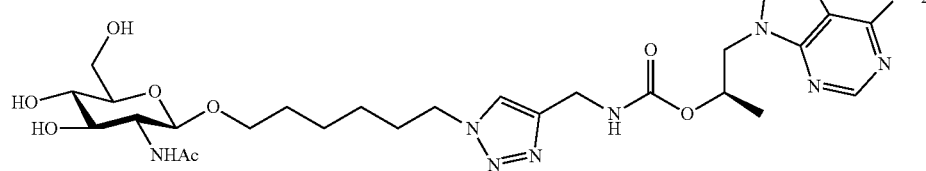
Formula (IC9)
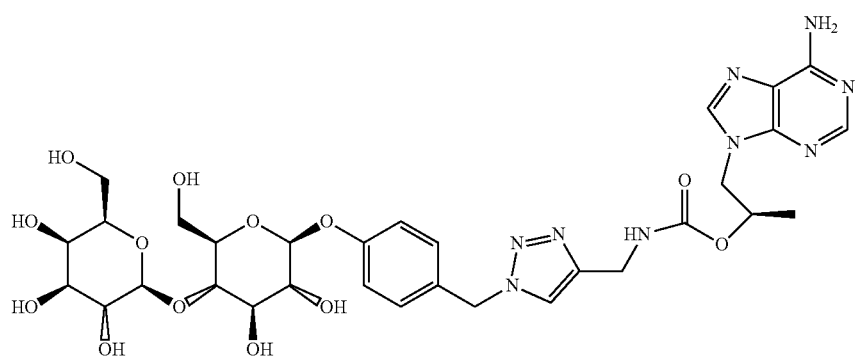
Formula (IC10)
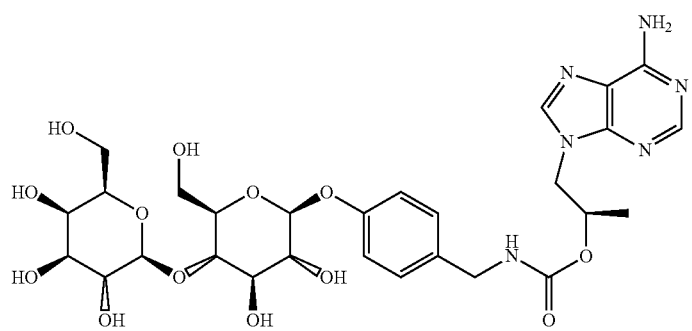
Formula (IC11)
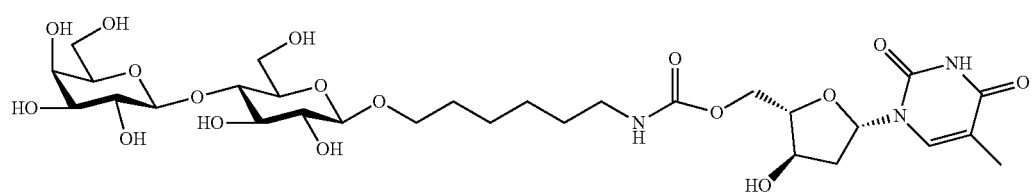
Formula (IE1)
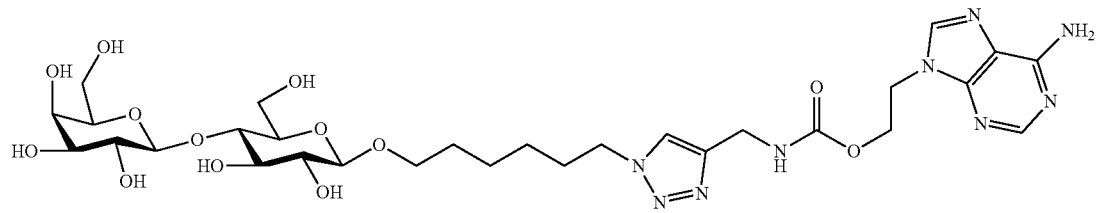
Formula (IF1)
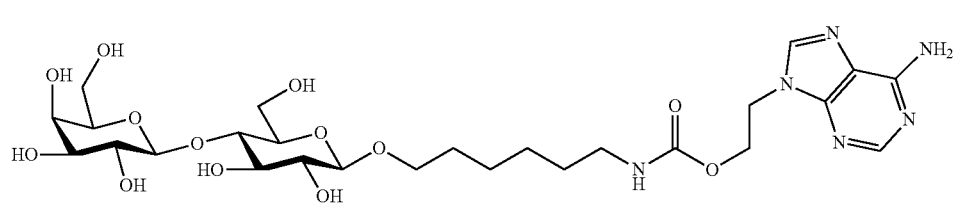
Formula (IF2)

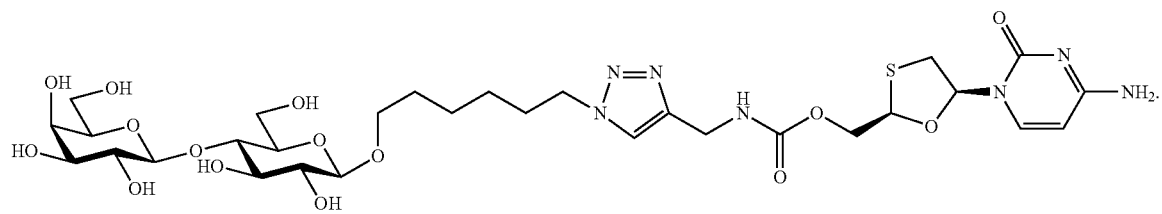
Formula (IG1)
17. The pharmaceutical composition according to claim 16, wherein the drug conjugate of by formula (I) further comprises a second drug conjugate that is selected from the group consisting of formula (IB3), formula (IB4), formula (IB5), formula (IB10), formula (IB11), formula (ID2), formula (ID3), formula (ID4), formula (IH3), and formula (IJ2):
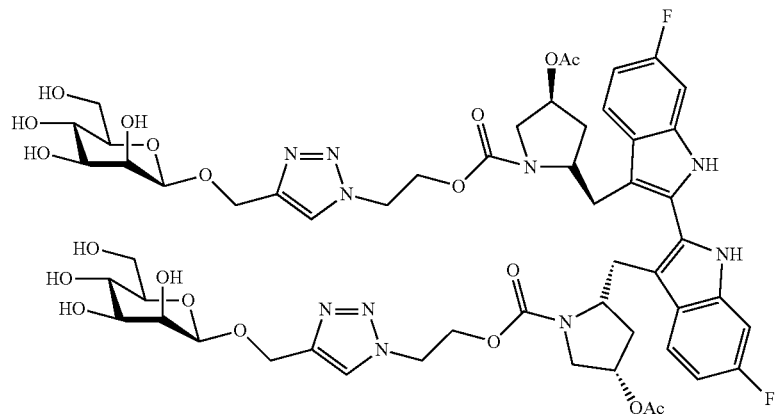
Formula (IB3)
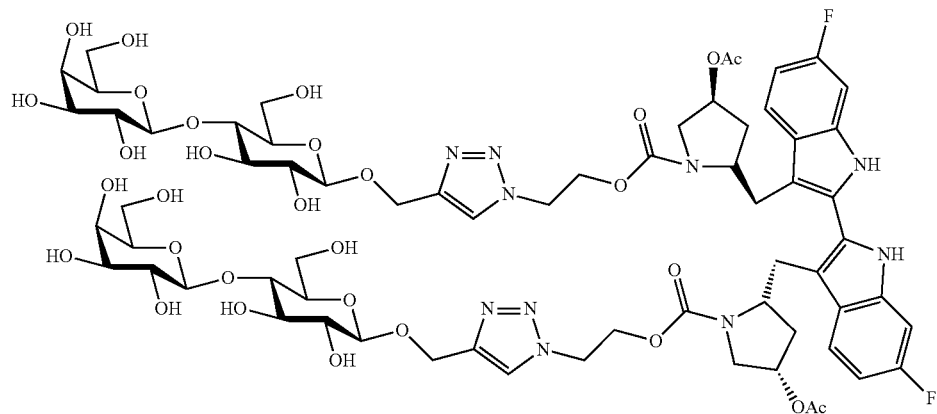
Formula (IB4)

-continued
Formula (IB5)
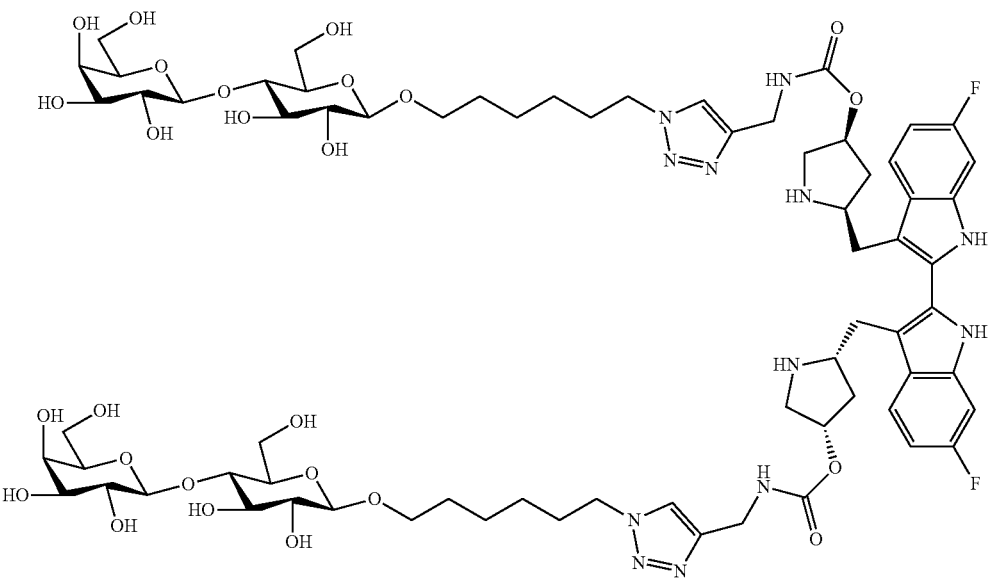
Formula (IB6)
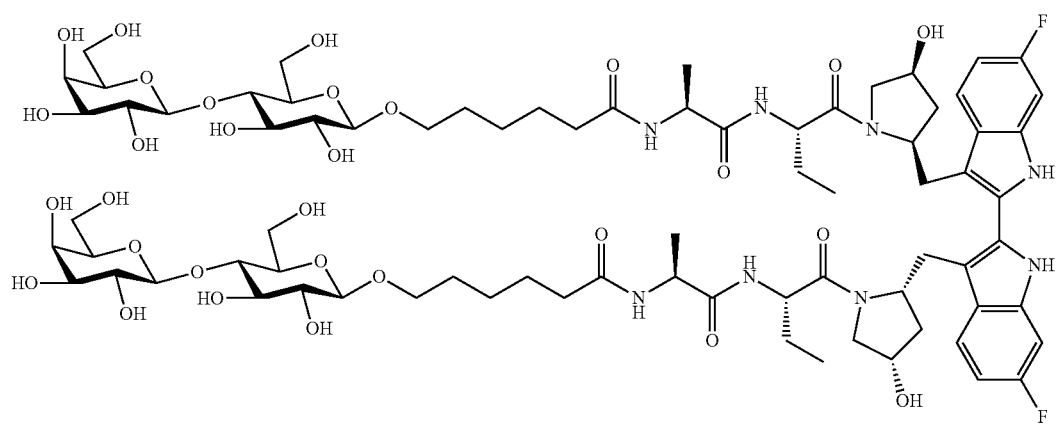
Formula (IB7)
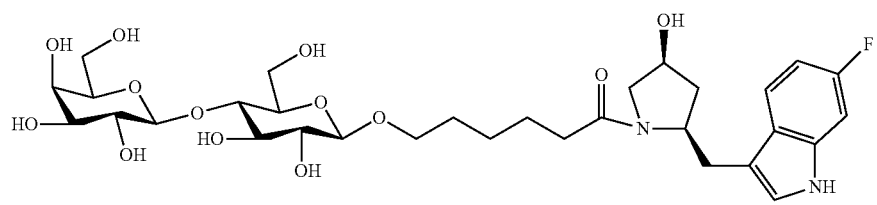
Formula (IB8)
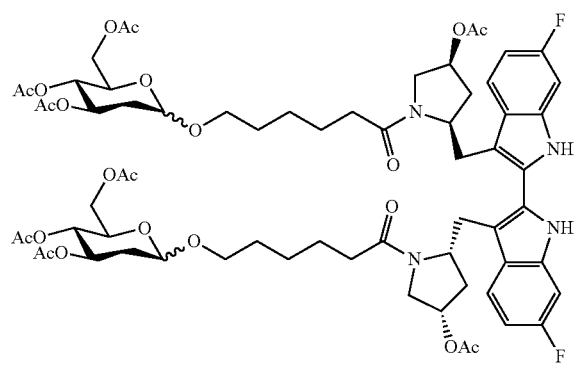
Formula (IB9)
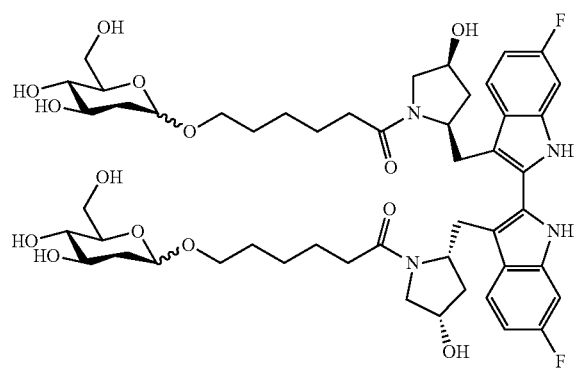

-continued
Formula (IB10)
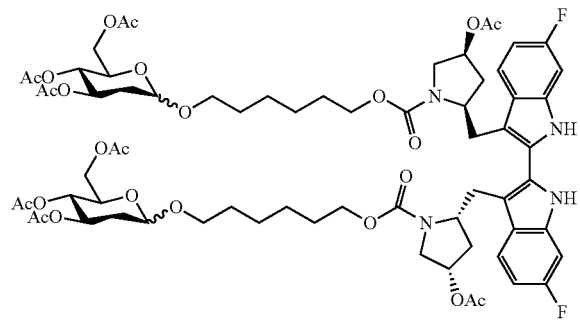
Formula (IB11)
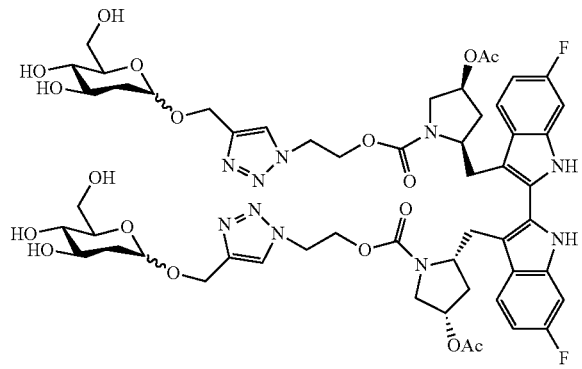
Formula (ID1)
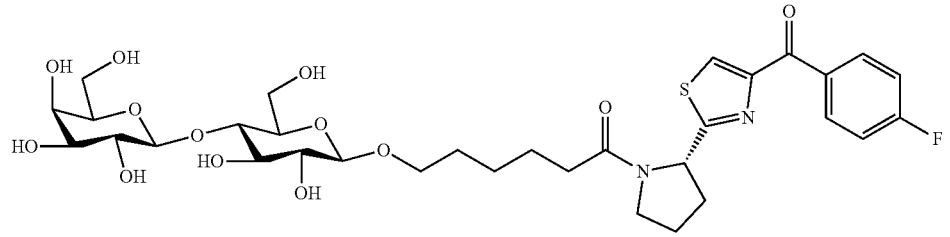
Formula (ID2)
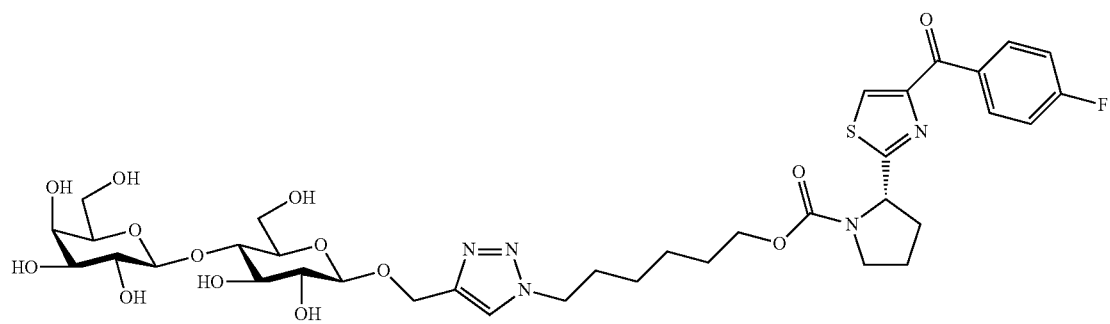
Formula (ID3)
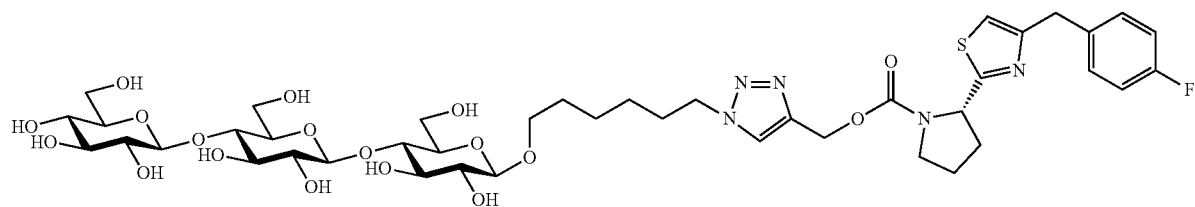
Formula (ID4)
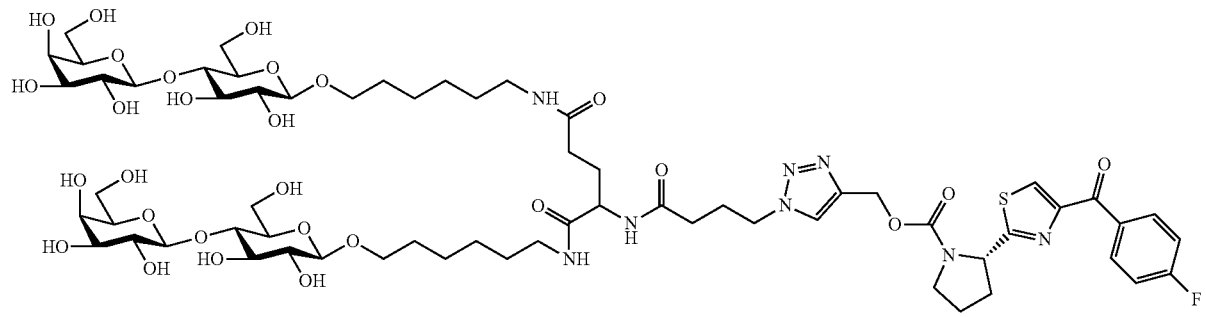

-continued

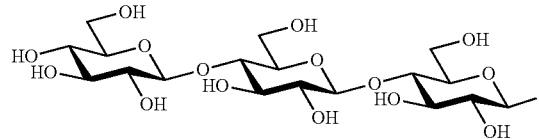

Formula (IH3)

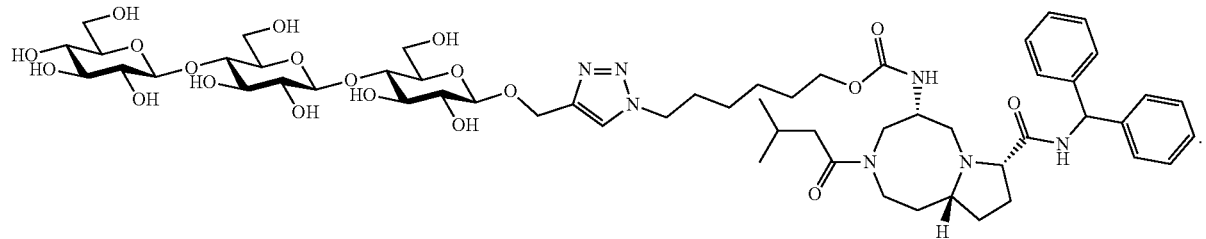

Formula (IJ2)

18. The pharmaceutical composition according to claim 15, wherein the pharmaceutical composition is prepared into tablets, capsules, granules, powders, solutions, syrups, spray, injections or inhalations, and the at least one or more pharmaceutically acceptable excipients is selected from the group consisting of fillers, extenders, binders, blending agents, surfactants, emulsifiers, dispersing agents, defoamers, lubricants, nonstick agents, blenders, coating materials, glidants, anti-sticking agents, diluents, dyes, pigments, dispersants, wetting agents, and combinations distinct excipients thereof.

19. A method of treating hepatitis, comprising:
administering a therapeutically effective amount of the drug conjugate according to claim 1, or a pharmaceutical composition comprising the drug conjugate of claim 1 to a patient having hepatitis.

* * * * *